April 6, 1954 — J. I. BELLAMY ET AL — 2,674,657

PRIMARY-SECONDARY-SPREAD CROSSBAR TELEPHONE SYSTEM

Filed April 4, 1949 — 55 Sheets-Sheet 1

INVENTORS:
JOHN I. BELLAMY
THERON L. BOWSER

BY C. R. Sofer

ATTORNEY

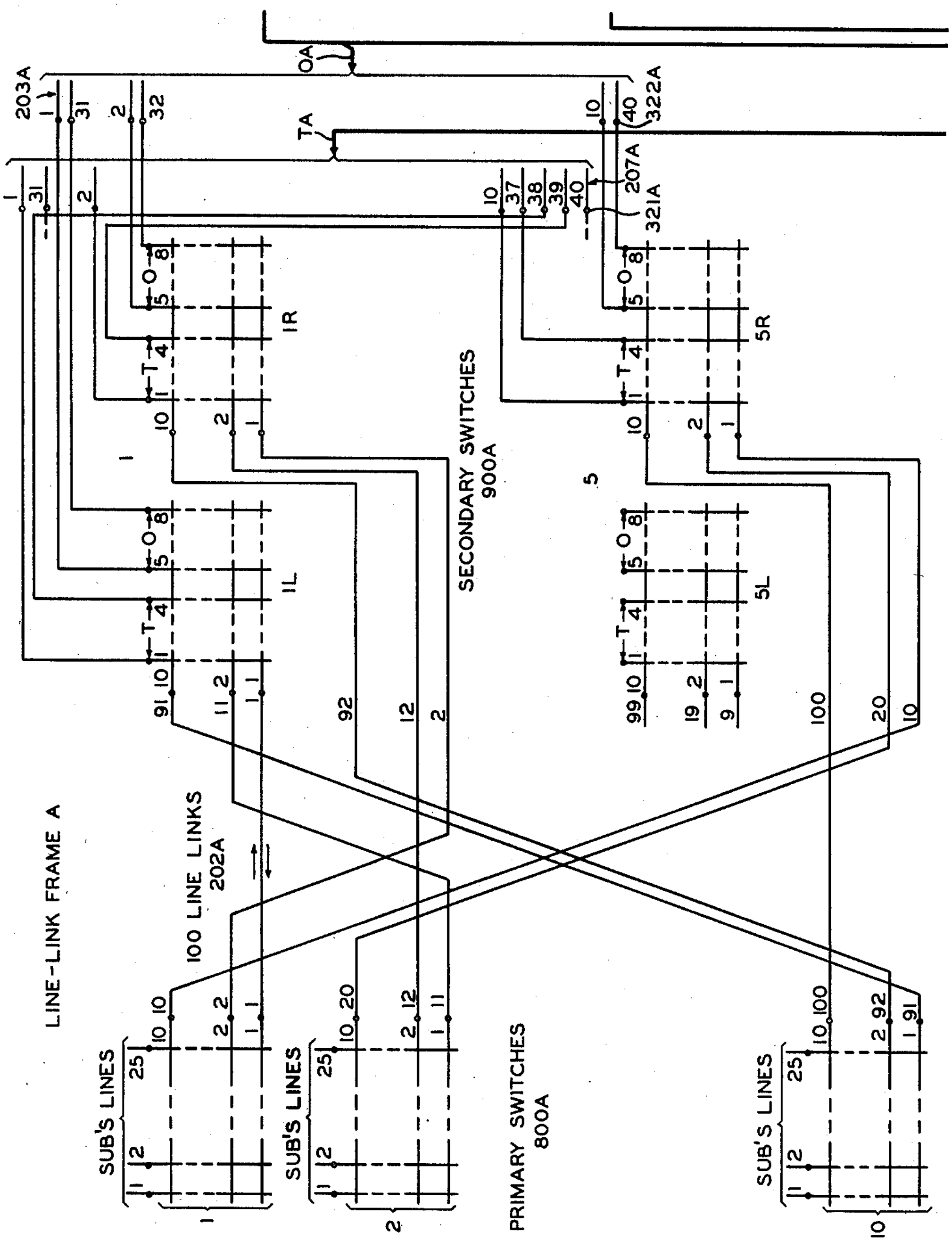
FIG. 3 PART 1
INVENTORS:
JOHN I. BELLAMY
THERON L. BOWSER
BY [signature]
ATTORNEY PRIMARY-SECONDARY-SPREAD CROSSBAR TELEPHONE SYSTEM
Filed April 4, 1949 55 Sheets-Sheet 3
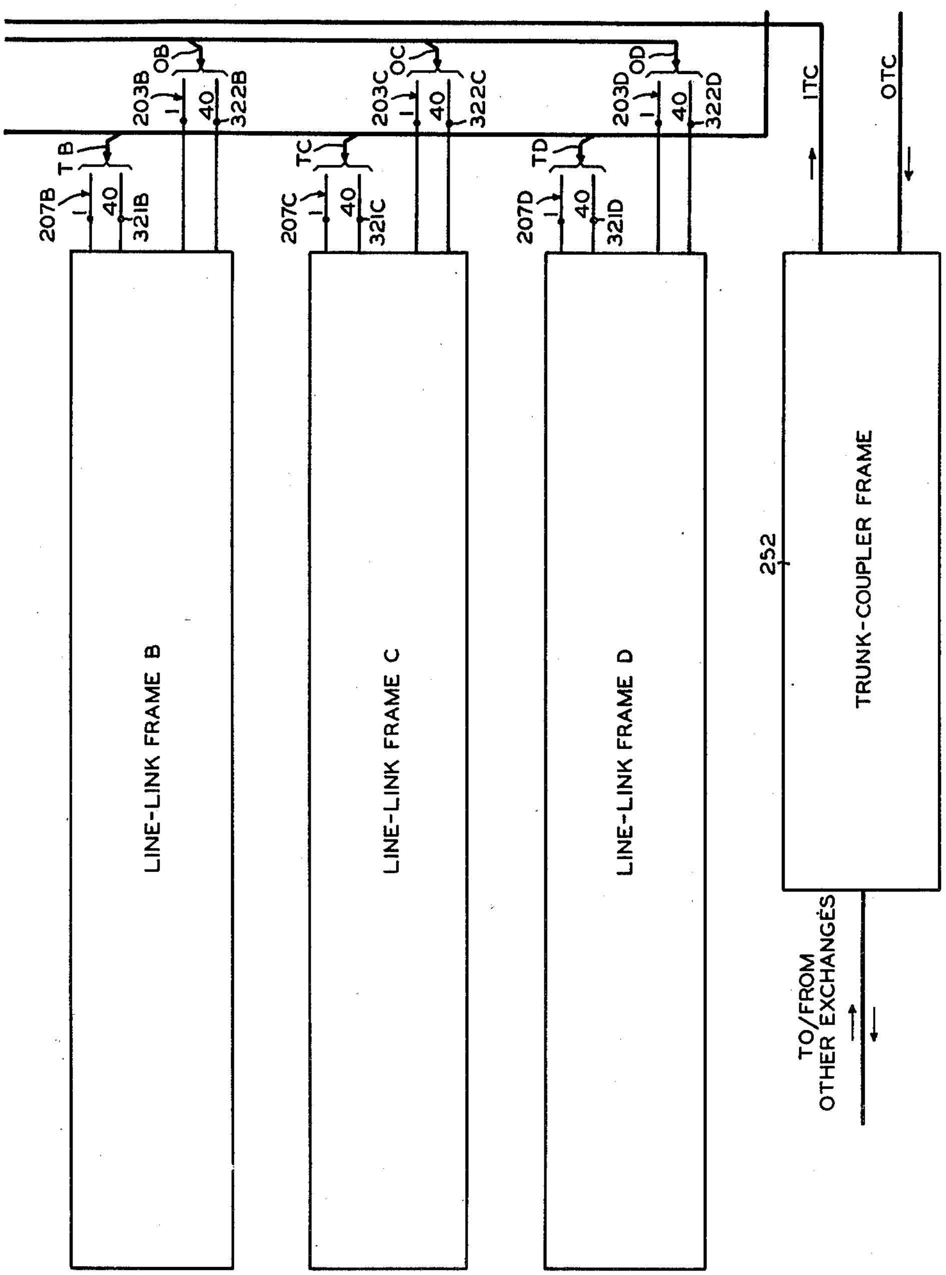
FIG. 3 PART 2
INVENTORS:
JOHN I. BELLAMY
THERON L. BOWSER
BY C. P. Soper
ATTORNEY

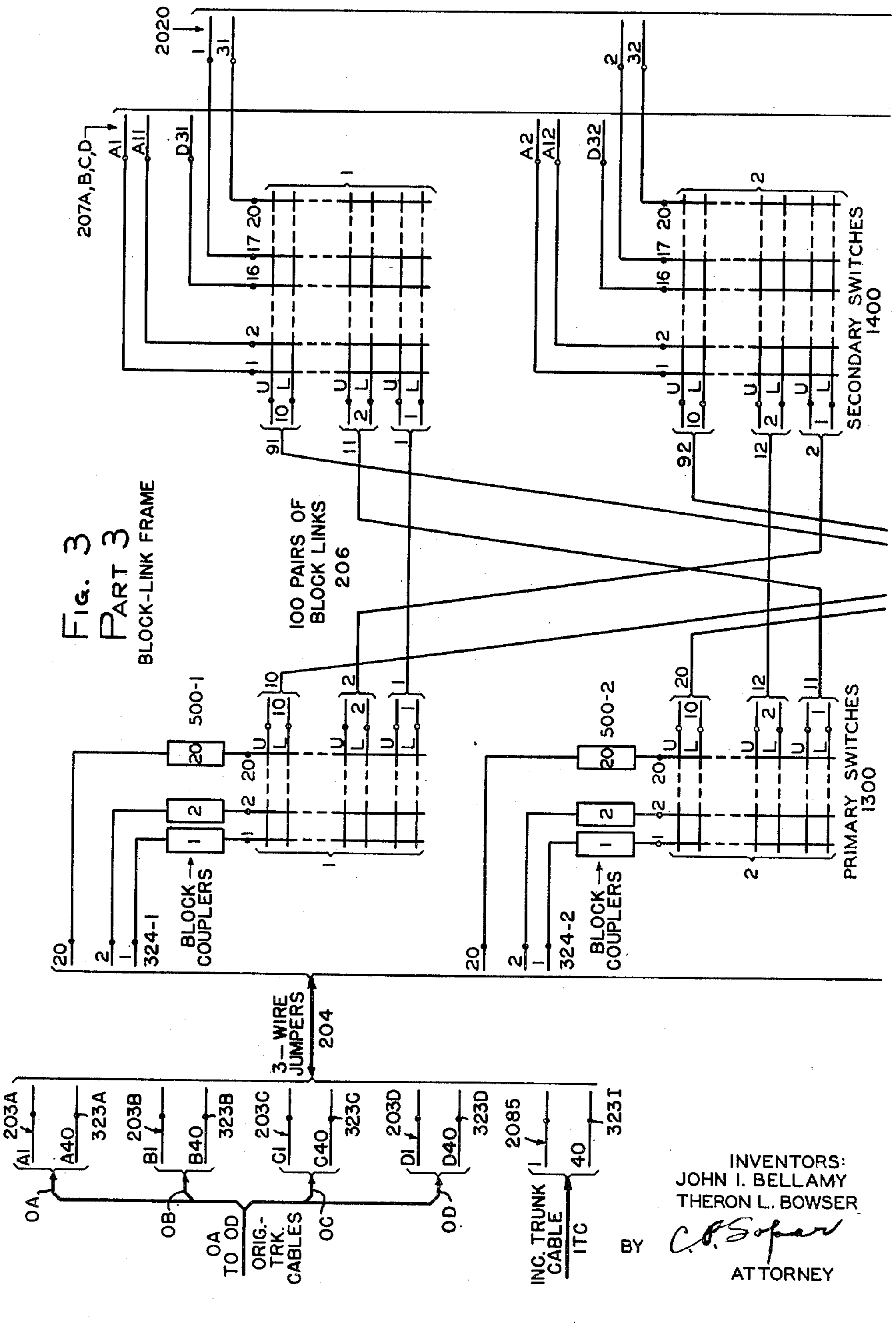
FIG. 3 PART 3
INVENTORS:
JOHN I. BELLAMY
THERON L. BOWSER
BY C. A. Sopar
ATTORNEY April 6, 1954 J. I. BELLAMY ET AL 2,674,657
PRIMARY-SECONDARY-SPREAD CROSSBAR TELEPHONE SYSTEM
Filed April 4, 1949 55 Sheets-Sheet 5
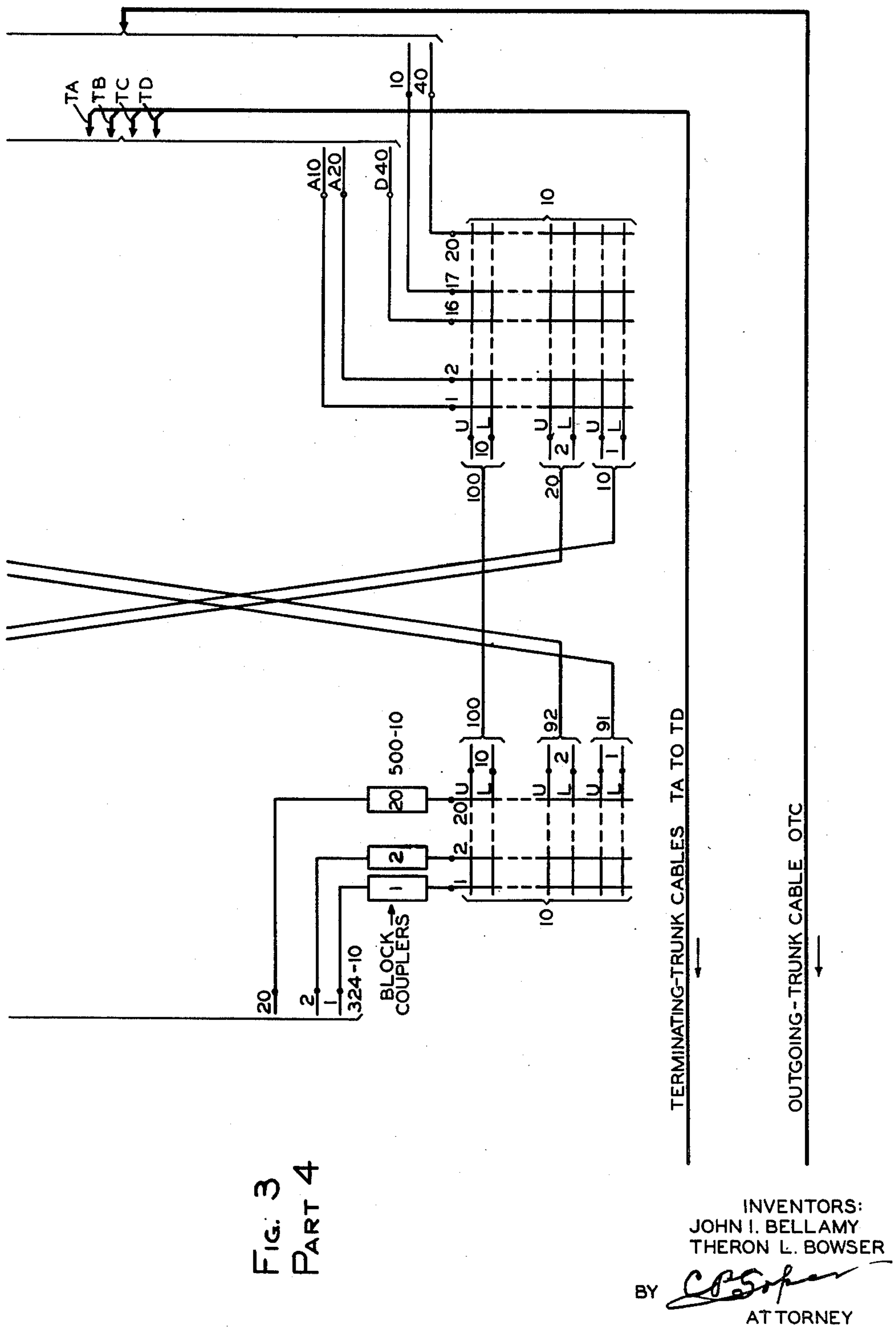
FIG. 3 PART 4
INVENTORS:
JOHN I. BELLAMY
THERON L. BOWSER
BY C. B. Soper
ATTORNEY

PRIMARY-SECONDARY-SPREAD CROSSBAR TELEPHONE SYSTEM

Filed April 4, 1949 55 Sheets-Sheet 6

INVENTORS:
JOHN I. BELLAMY
THERON L. BOWSER
BY C. P. Soper
ATTORNEY

PRIMARY-SECONDARY-SPREAD CROSSBAR TELEPHONE SYSTEM
Filed April 4, 1949 55 Sheets-Sheet 7
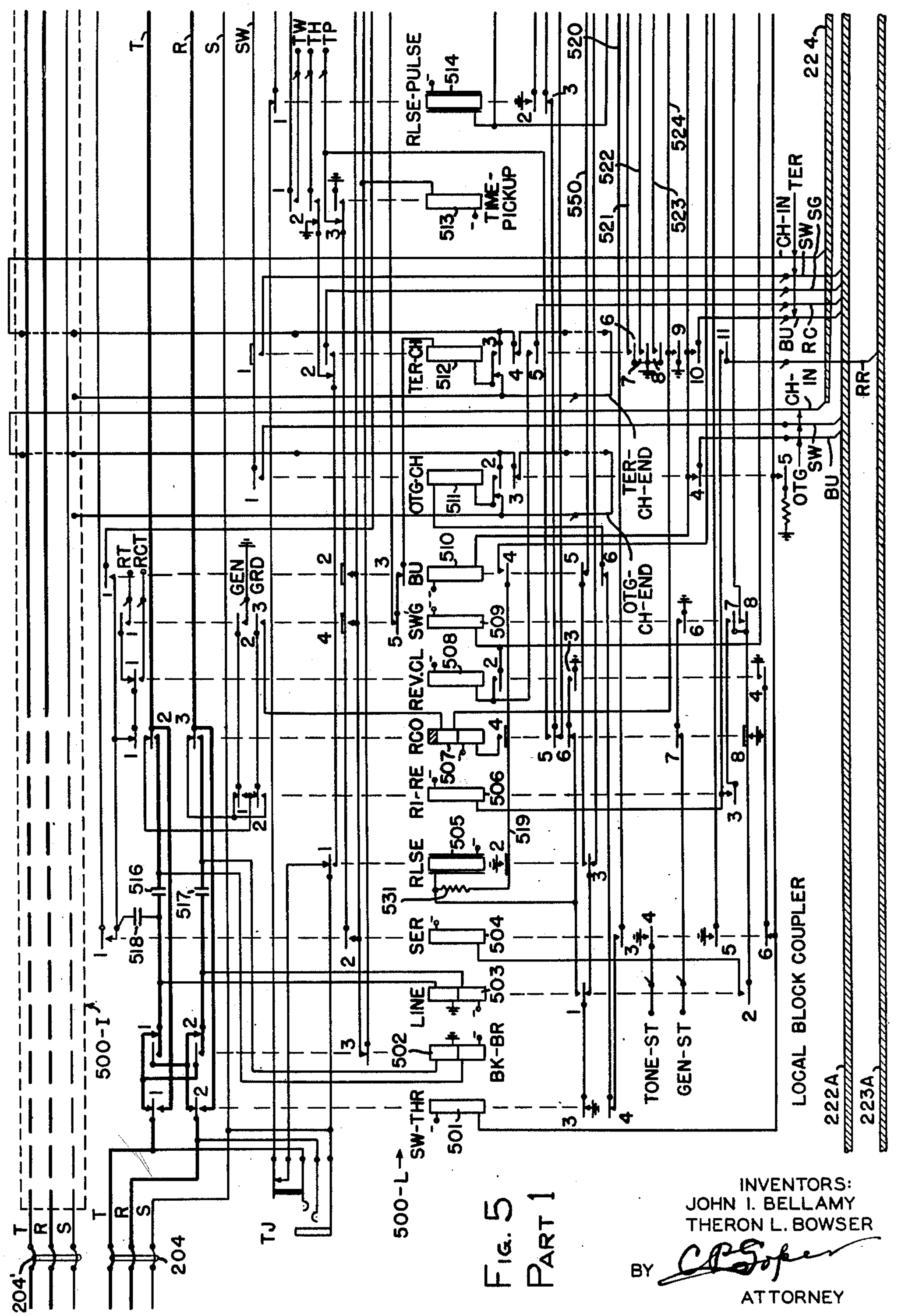
FIG. 5 PART 1
INVENTORS:
JOHN I. BELLAMY
THERON L. BOWSER
BY C. P. Soper
ATTORNEY April 6, 1954 J. I. BELLAMY ET AL 2,674,657
PRIMARY-SECONDARY-SPREAD CROSSBAR TELEPHONE SYSTEM
Filed April 4, 1949 55 Sheets-Sheet 8
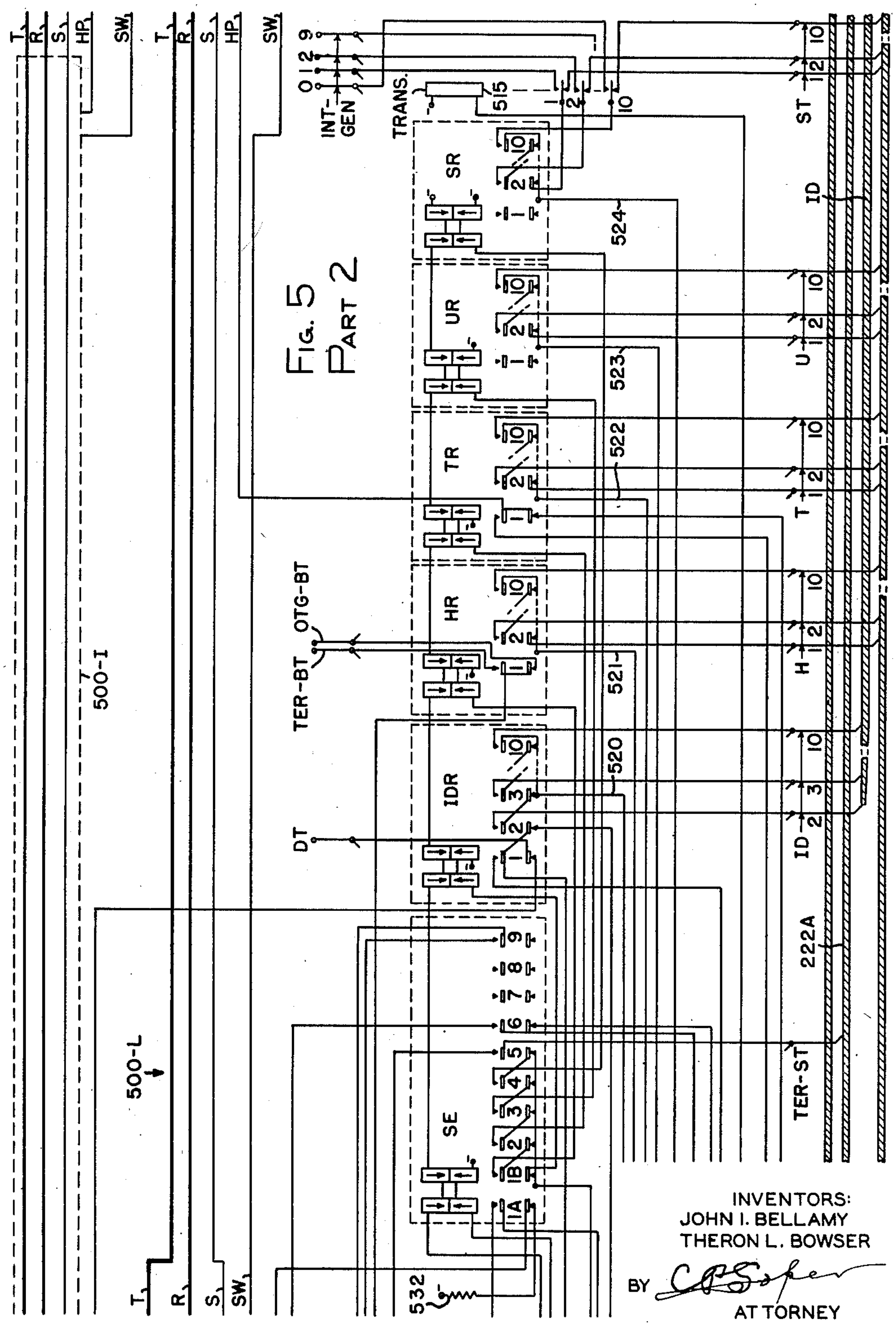
FIG. 5 PART 2
INVENTORS:
JOHN I. BELLAMY
THERON L. BOWSER
BY C. B. Soper
ATTORNEY INVENTORS:
JOHN I. BELLAMY
THERON L. BOWSER
BY C. R. Soper
ATTORNEY INVENTORS:
JOHN I. BELLAMY
THERON L. BOWSER
BY C. P. Soper
ATTORNEY April 6, 1954 J. I. BELLAMY ET AL 2,674,657

PRIMARY-SECONDARY-SPREAD CROSSBAR TELEPHONE SYSTEM

Filed April 4, 1949 55 Sheets-Sheet 11

FIG. 8 LINE-LINK PRIMARY SWITCH

INVENTORS:
JOHN I. BELLAMY
THERON L. BOWSER
BY C. L. Soper
ATTORNEY

INVENTORS:
JOHN I. BELLAMY
THERON L. BOWSER
BY [signature]
ATTORNEY

April 6, 1954 J. I. BELLAMY ET AL 2,674,657
PRIMARY-SECONDARY-SPREAD CROSSBAR TELEPHONE SYSTEM
Filed April 4, 1949 55 Sheets-Sheet 13
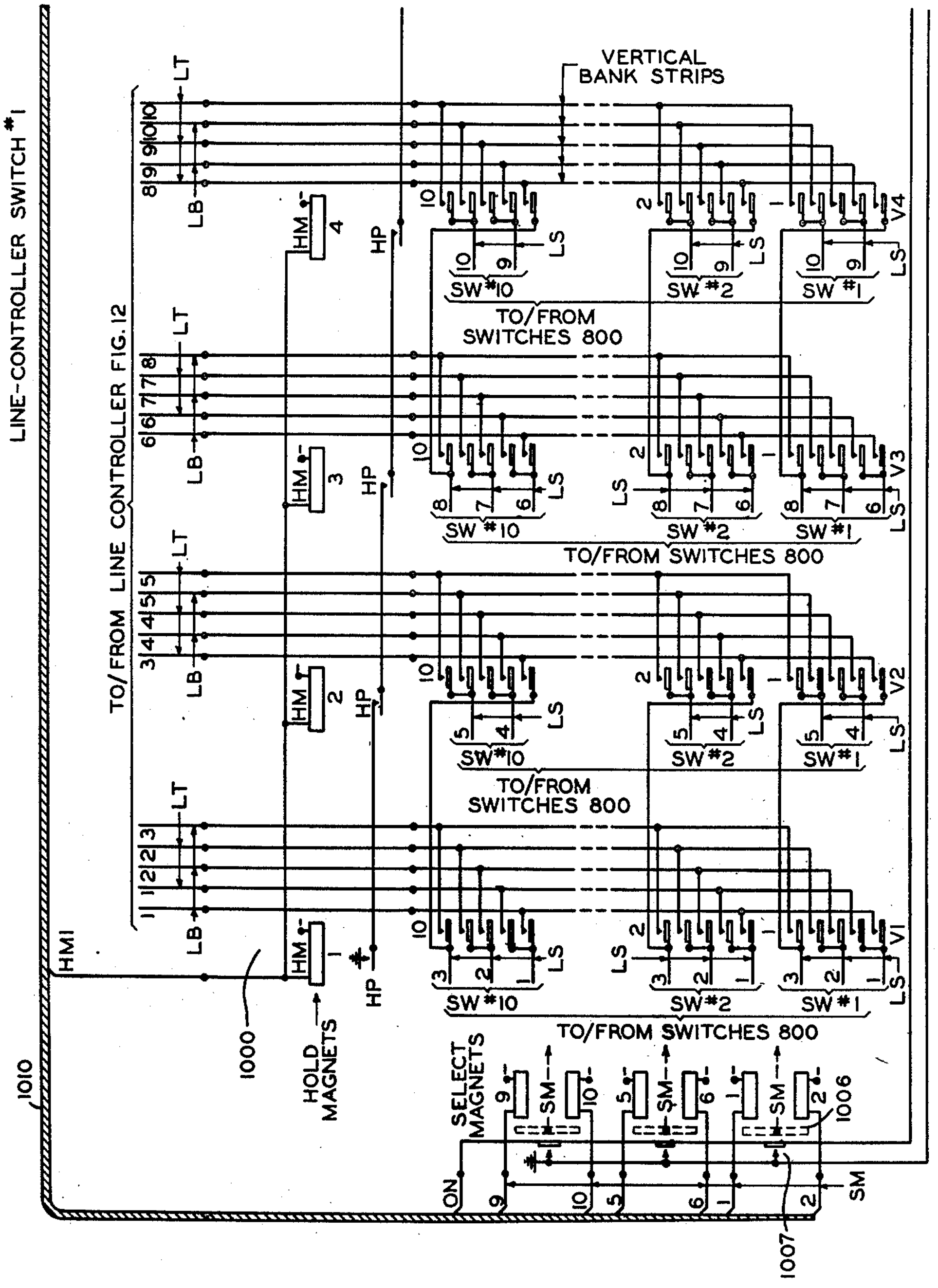
FIG. 10 PART 1
INVENTORS:
JOHN I. BELLAMY
THERON L. BOWSER
BY [signature]
ATTORNEY April 6, 1954 J. I. BELLAMY ET AL 2,674,657
PRIMARY-SECONDARY-SPREAD CROSSBAR TELEPHONE SYSTEM
Filed April 4, 1949 55 Sheets-Sheet 14
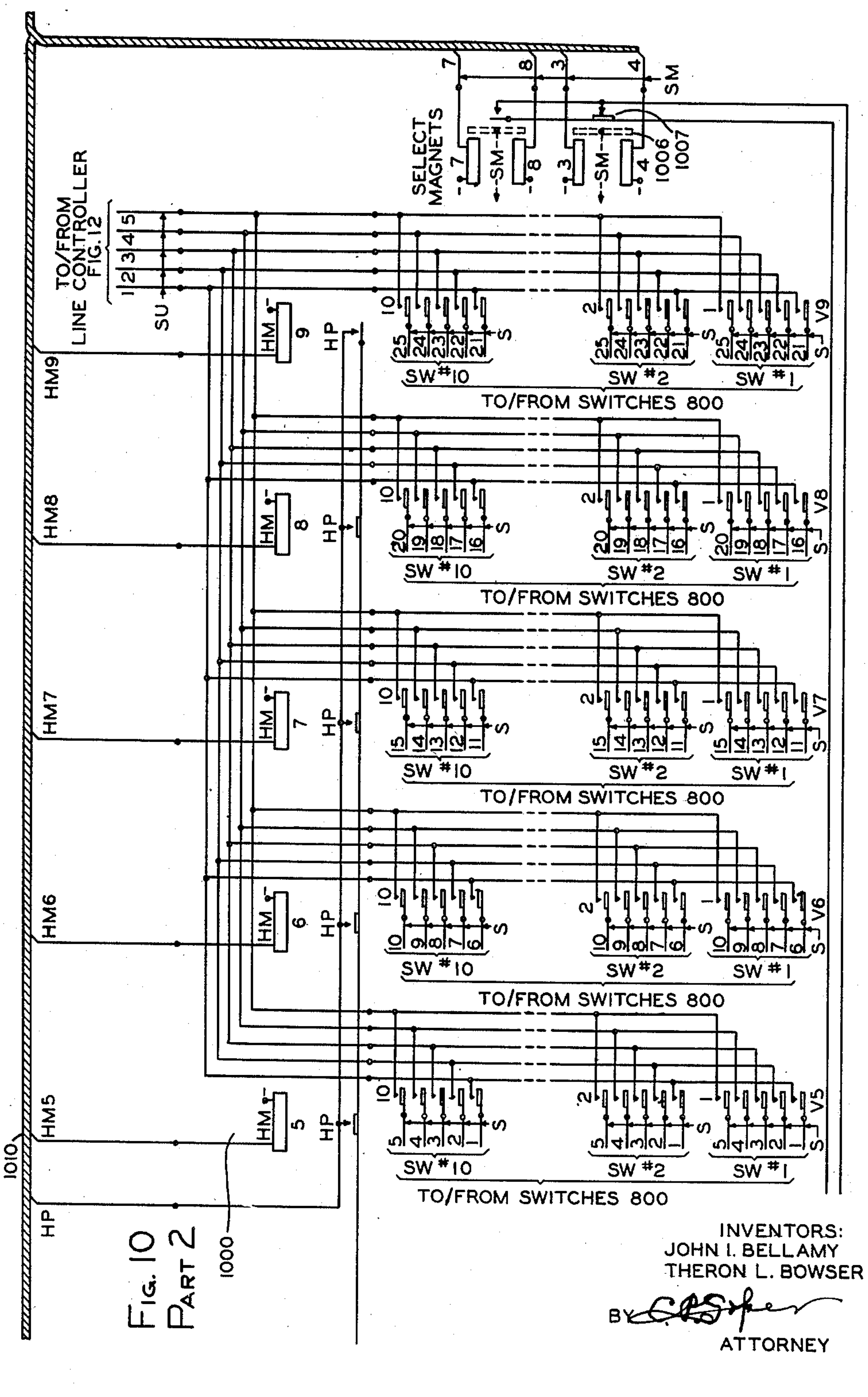
FIG. 10 PART 2
INVENTORS:
JOHN I. BELLAMY
THERON L. BOWSER
BY [signature]
ATTORNEY April 6, 1954 J. I. BELLAMY ET AL 2,674,657
PRIMARY-SECONDARY-SPREAD CROSSBAR TELEPHONE SYSTEM
Filed April 4, 1949 55 Sheets-Sheet 15
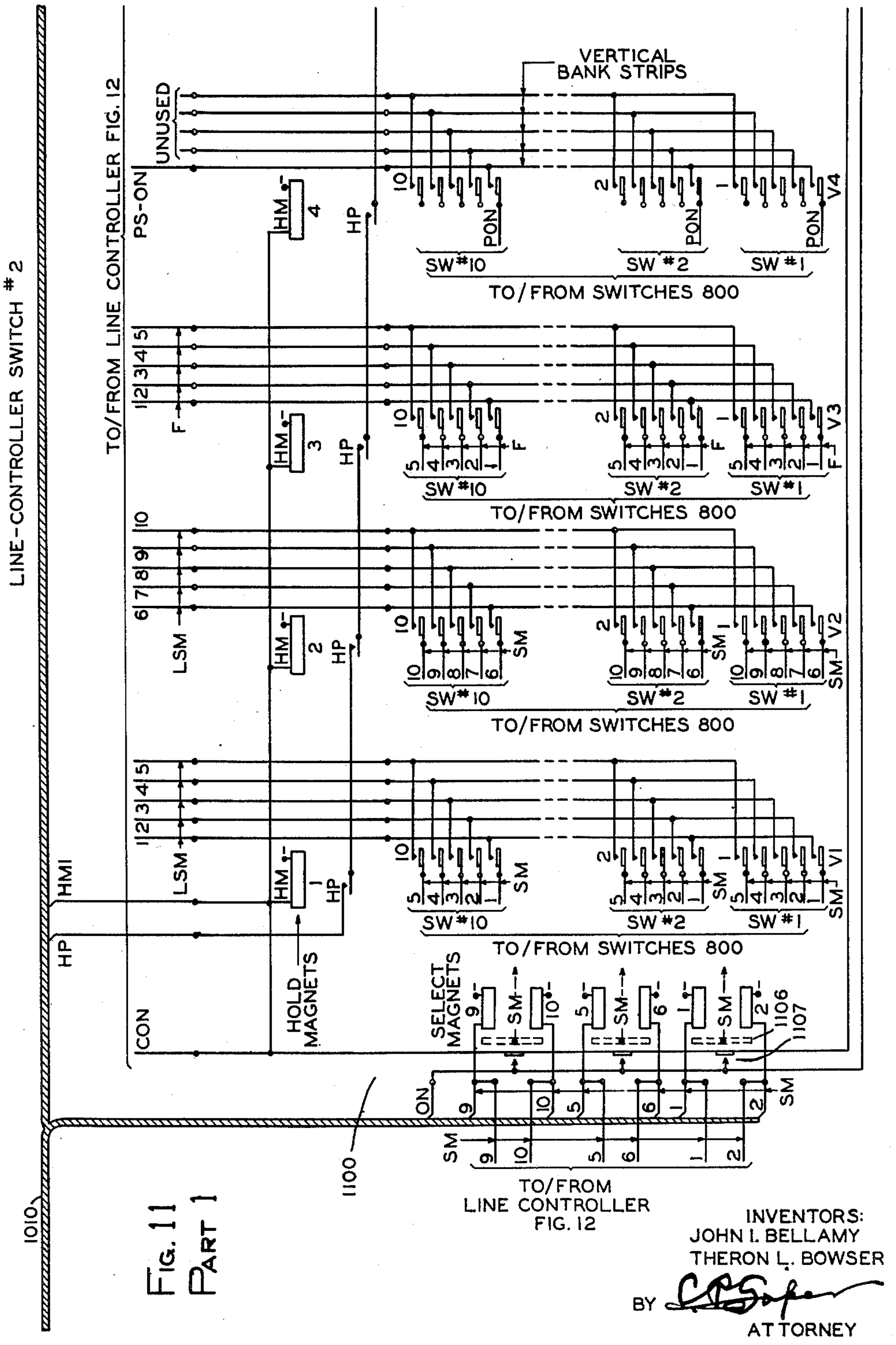
FIG. 11 PART 1
INVENTORS:
JOHN I. BELLAMY
THERON L. BOWSER
BY [signature]
ATTORNEY PRIMARY-SECONDARY-SPREAD CROSSBAR TELEPHONE SYSTEM
Filed April 4, 1949 55 Sheets-Sheet 16
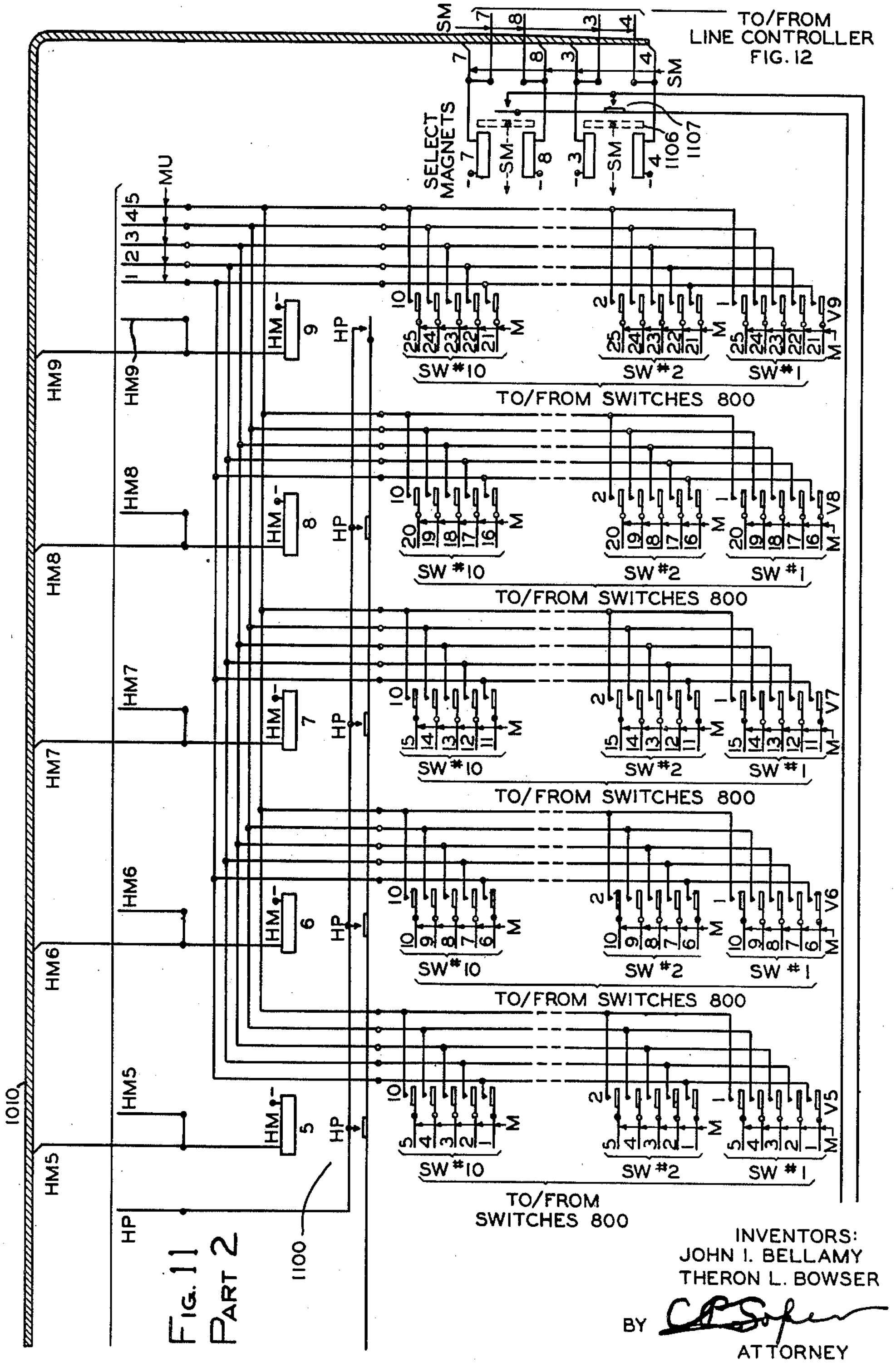
FIG. 11 PART 2
INVENTORS:
JOHN I. BELLAMY
THERON L. BOWSER
BY [signature]
ATTORNEY

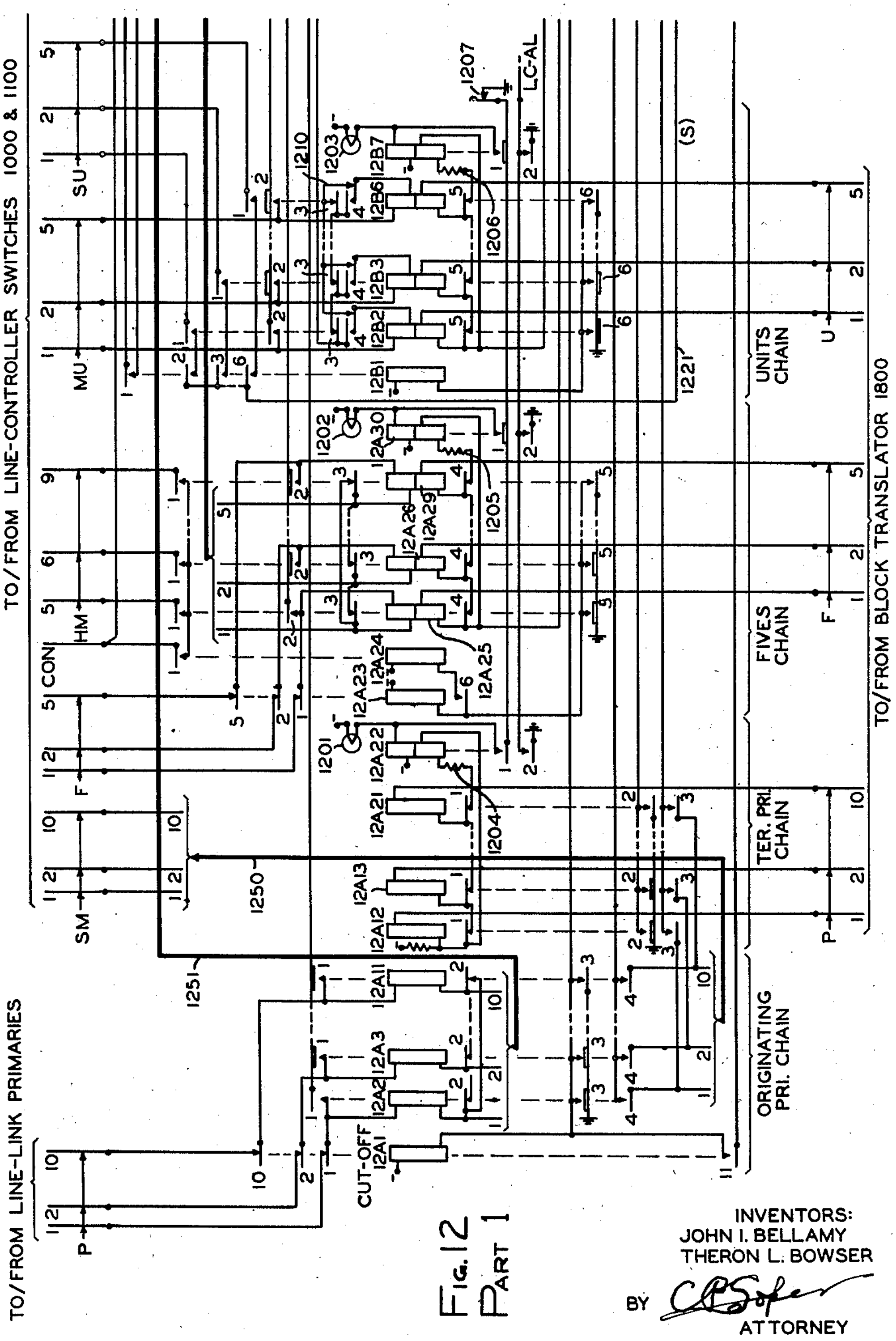
FIG. 12 PART 1
INVENTORS:
JOHN I. BELLAMY
THERON L. BOWSER
BY C.P. Soper
ATTORNEY PRIMARY-SECONDARY-SPREAD CROSSBAR TELEPHONE SYSTEM
Filed April 4, 1949 55 Sheets-Sheet 18
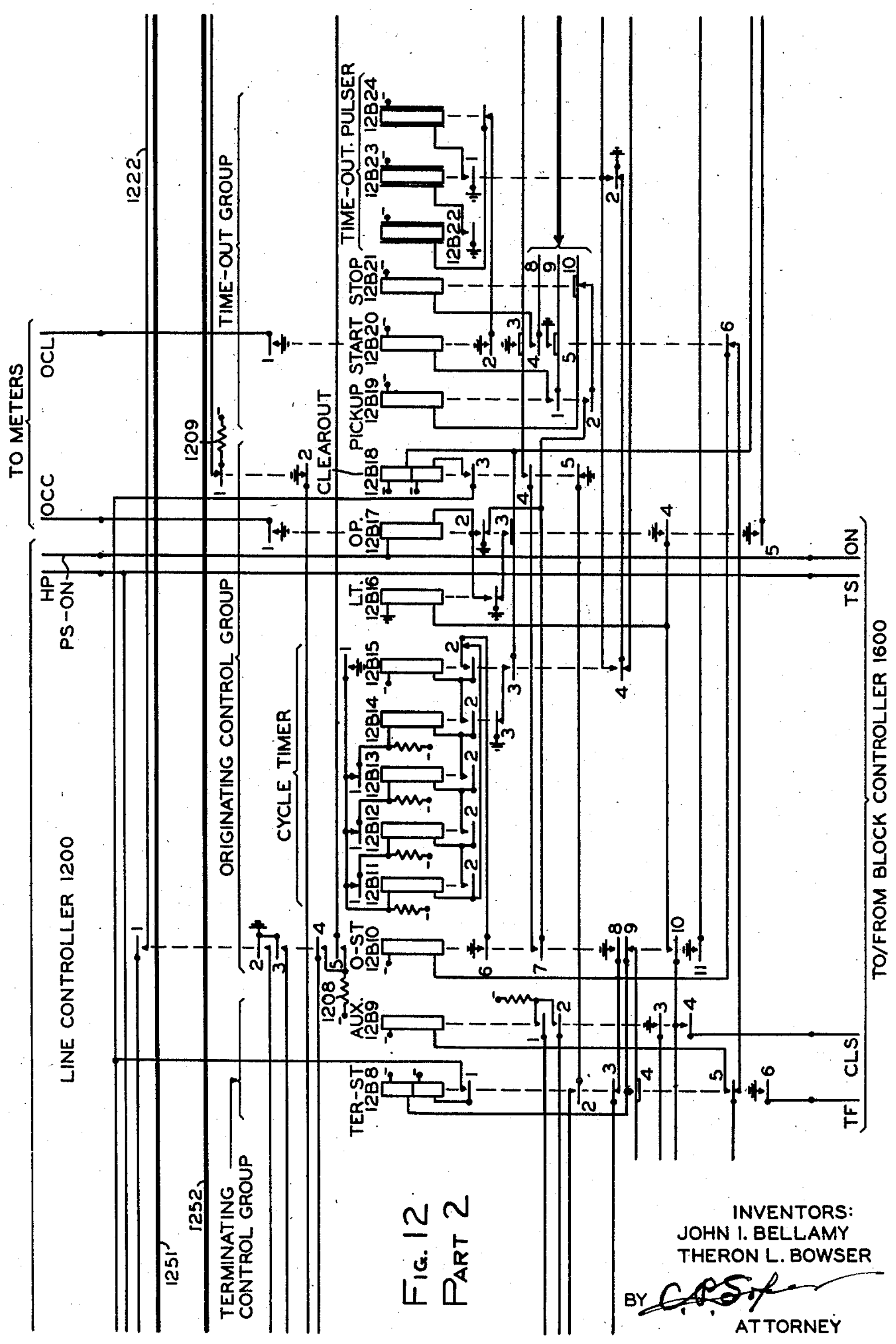
FIG. 12 PART 2
INVENTORS:
JOHN I. BELLAMY
THERON L. BOWSER
BY C. P. S.
ATTORNEY FIG. 12 PART 3
CHOICE ALLOTTER
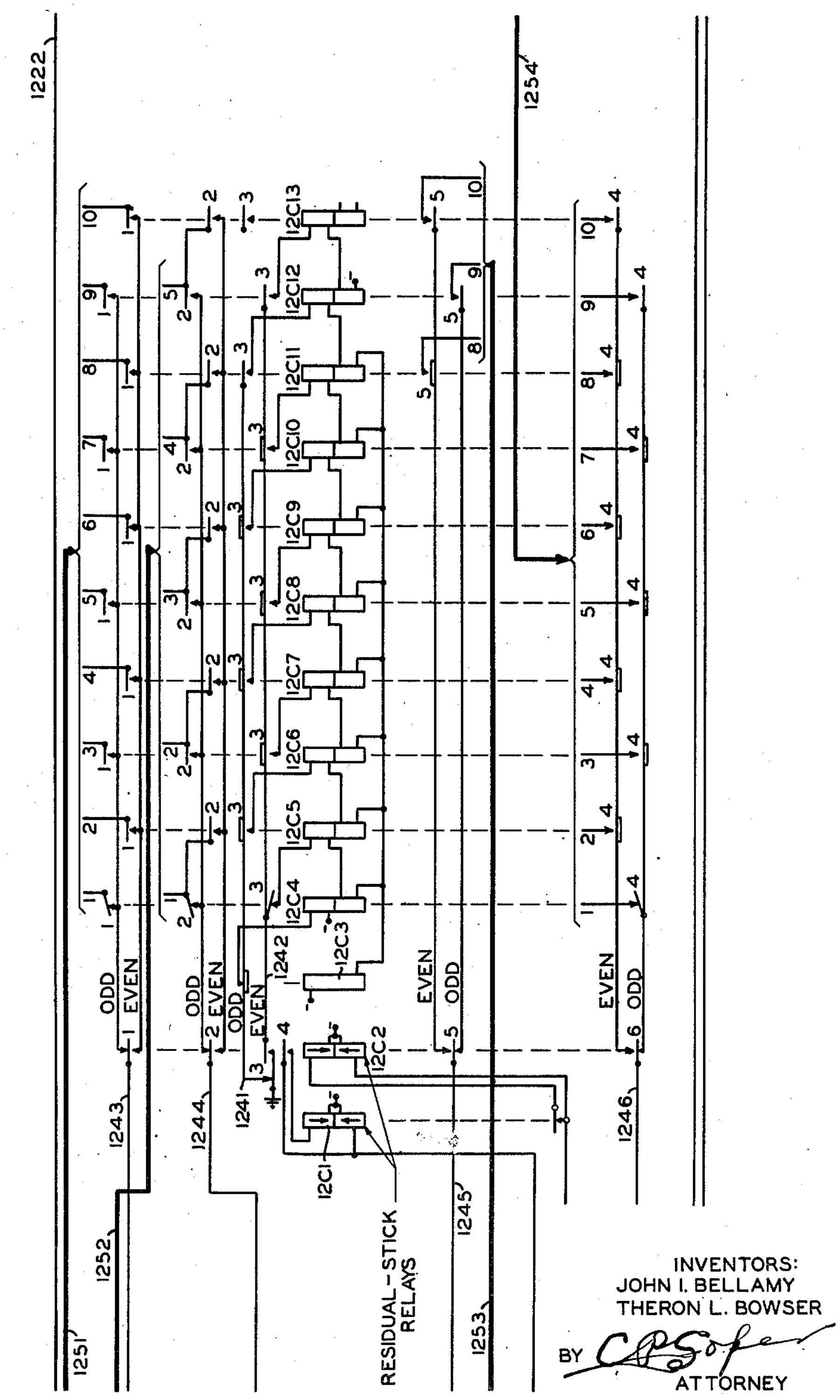
INVENTORS:
JOHN I. BELLAMY
THERON L. BOWSER
BY C.P. Soper
ATTORNEY

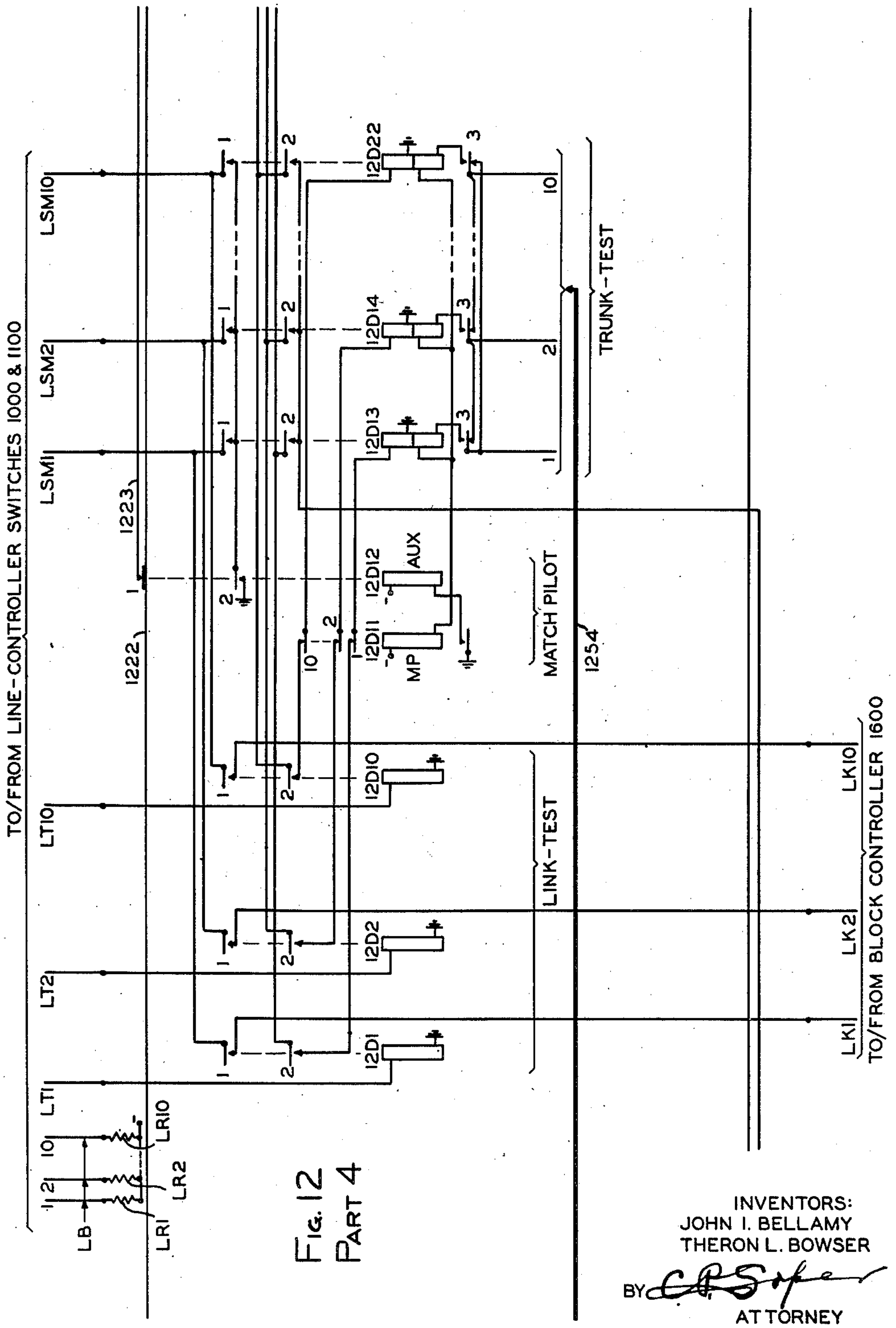
FIG. 12 PART 4
INVENTORS:
JOHN I. BELLAMY
THERON L. BOWSER
BY [signature]
ATTORNEY PRIMARY-SECONDARY-SPREAD CROSSBAR TELEPHONE SYSTEM
Filed April 4, 1949
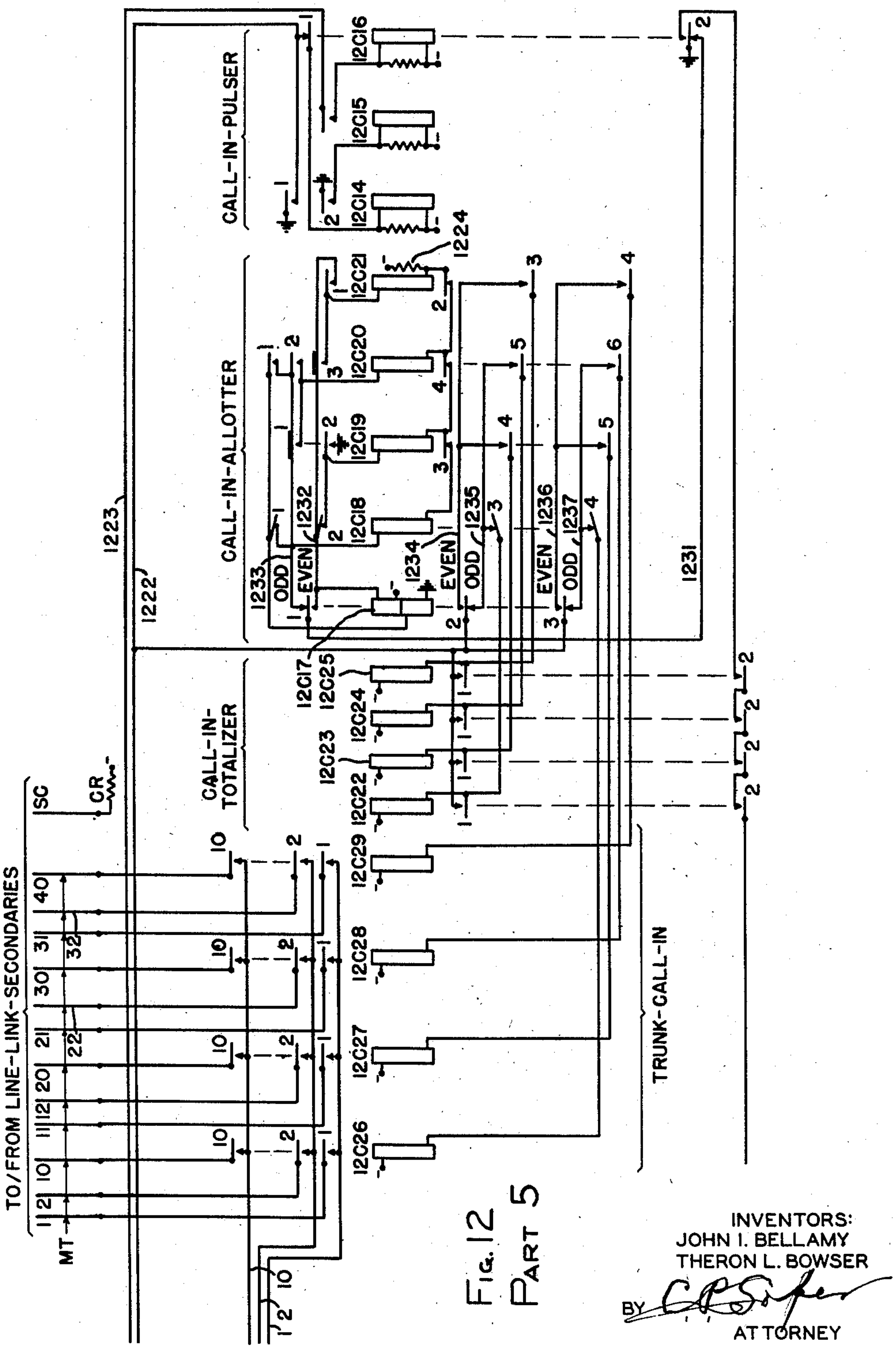
Fig. 12 Part 5
INVENTORS:
JOHN I. BELLAMY
THERON L. BOWSER
BY [signature]
ATTORNEY April 6, 1954 J. I. BELLAMY ET AL 2,674,657
PRIMARY-SECONDARY-SPREAD CROSSBAR TELEPHONE SYSTEM
Filed April 4, 1949 55 Sheets-Sheet 22
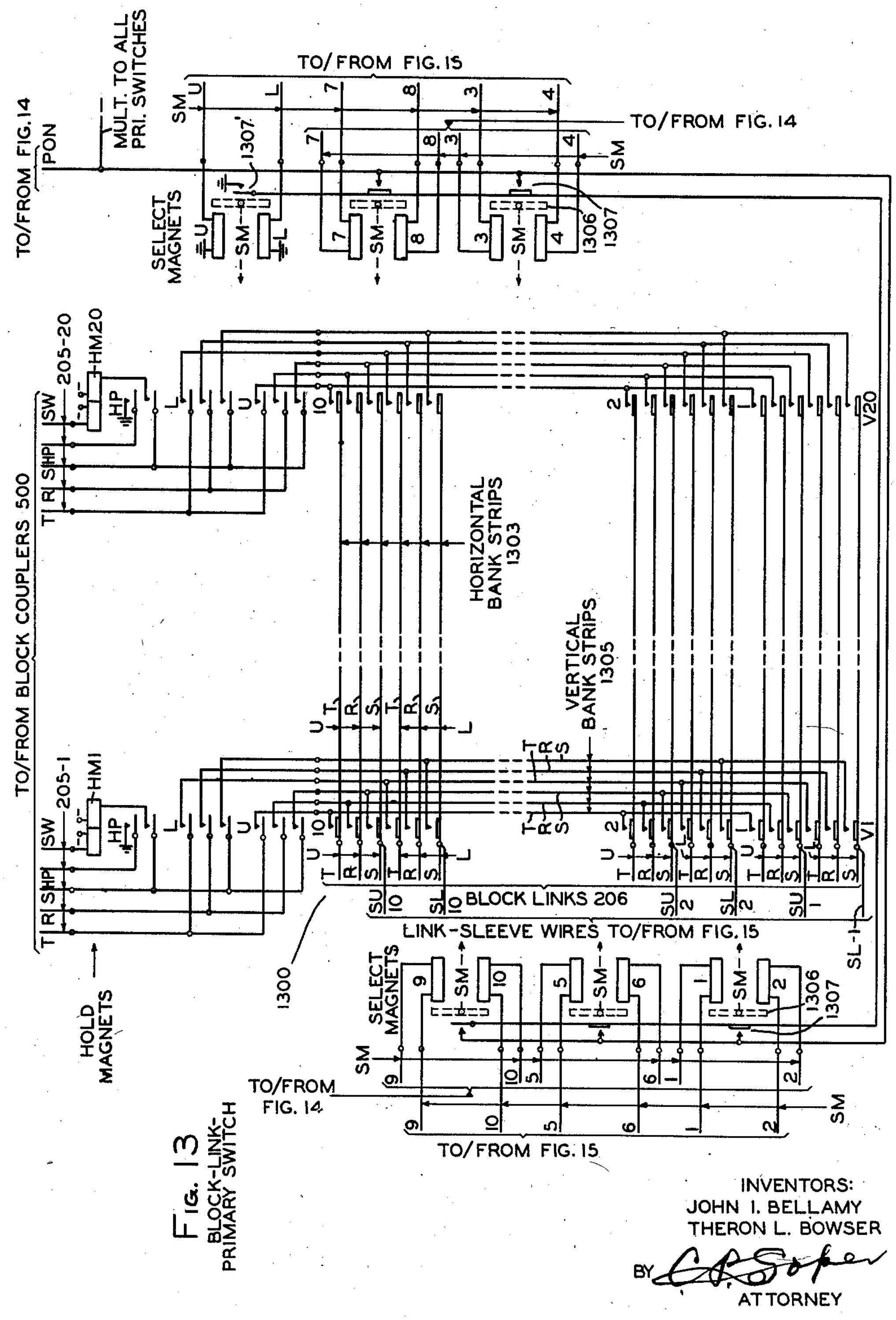
FIG. 13 BLOCK-LINK-PRIMARY SWITCH
INVENTORS:
JOHN I. BELLAMY
THERON L. BOWSER
BY [signature]
ATTORNEY

PRIMARY-SECONDARY-SPREAD CROSSBAR TELEPHONE SYSTEM

Filed April 4, 1949 55 Sheets-Sheet 23

INVENTORS:
JOHN I. BELLAMY
THERON L. BOWSER
BY C. P. Soper
ATTORNEY

PRIMARY-SECONDARY-SPREAD CROSSBAR TELEPHONE SYSTEM
Filed April 4, 1949 55 Sheets-Sheet 24
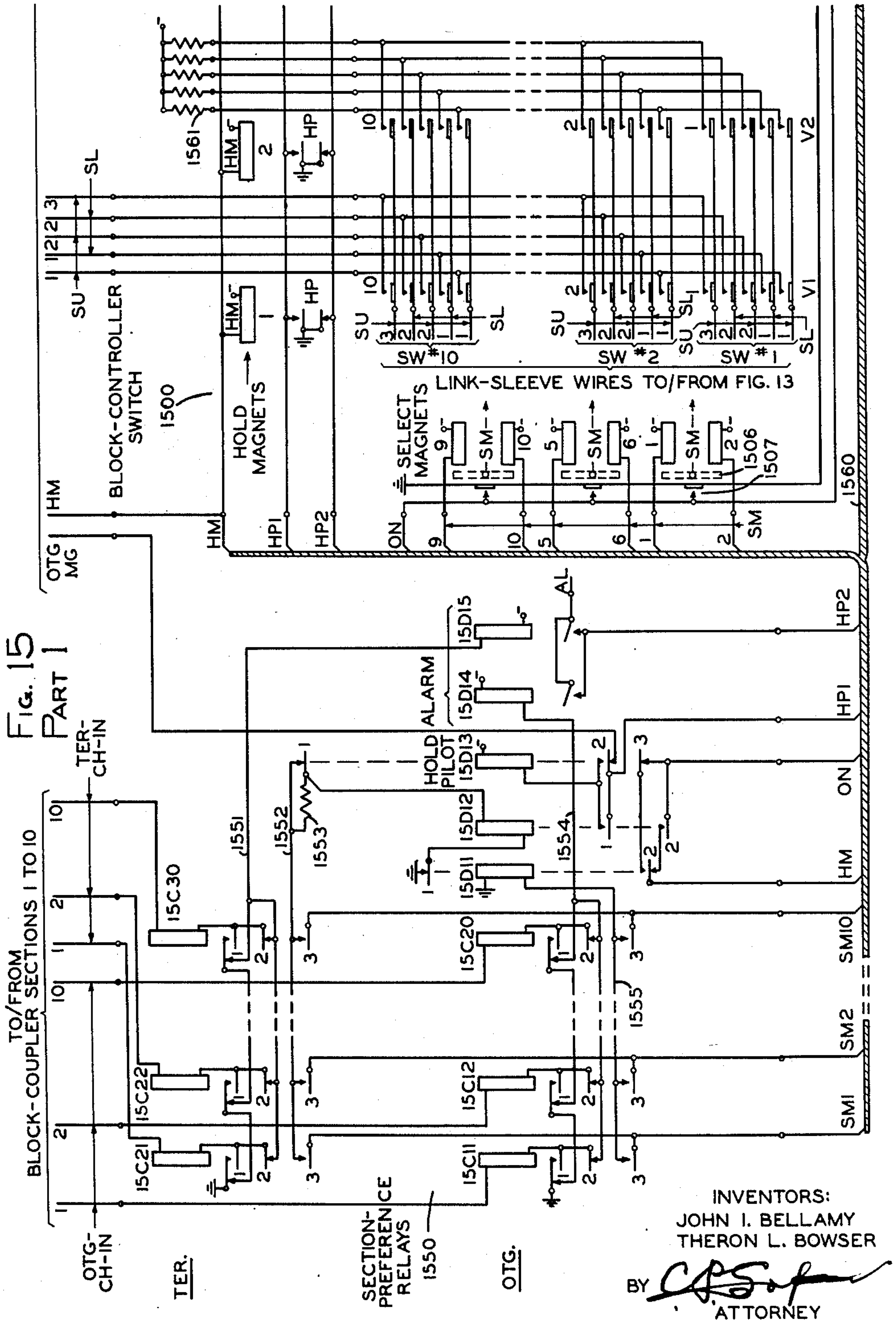
Fig. 15 Part 1
INVENTORS:
JOHN I. BELLAMY
THERON L. BOWSER
BY [signature]
ATTORNEY April 6, 1954 J. I. BELLAMY ET AL 2,674,657
PRIMARY-SECONDARY-SPREAD CROSSBAR TELEPHONE SYSTEM
Filed April 4, 1949 55 Sheets-Sheet 25
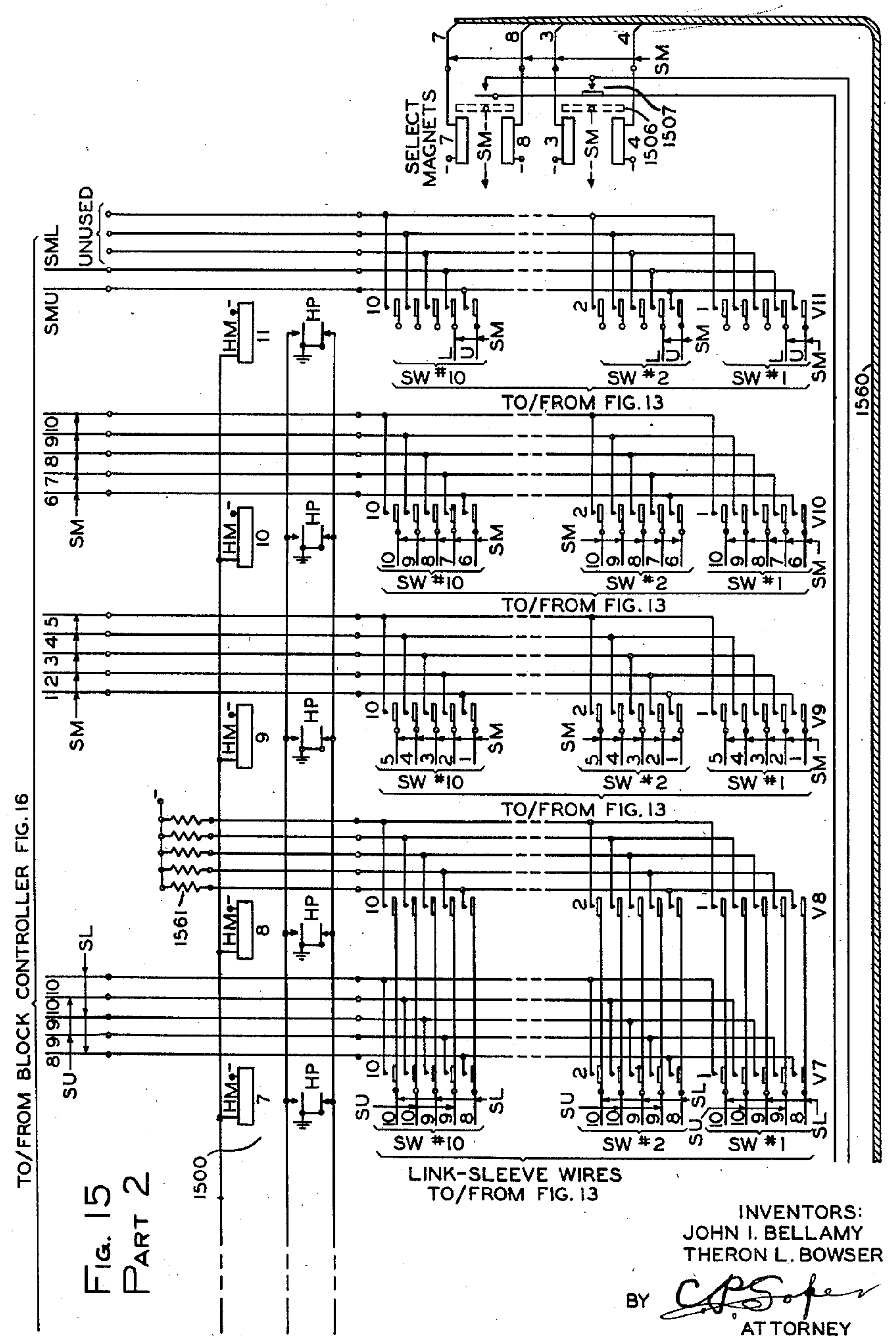
FIG. 15 PART 2
INVENTORS:
JOHN I. BELLAMY
THERON L. BOWSER
BY C. P. Soper
ATTORNEY April 6, 1954 J. I. BELLAMY ET AL 2,674,657
PRIMARY-SECONDARY-SPREAD CROSSBAR TELEPHONE SYSTEM
Filed April 4, 1949 55 Sheets-Sheet 26
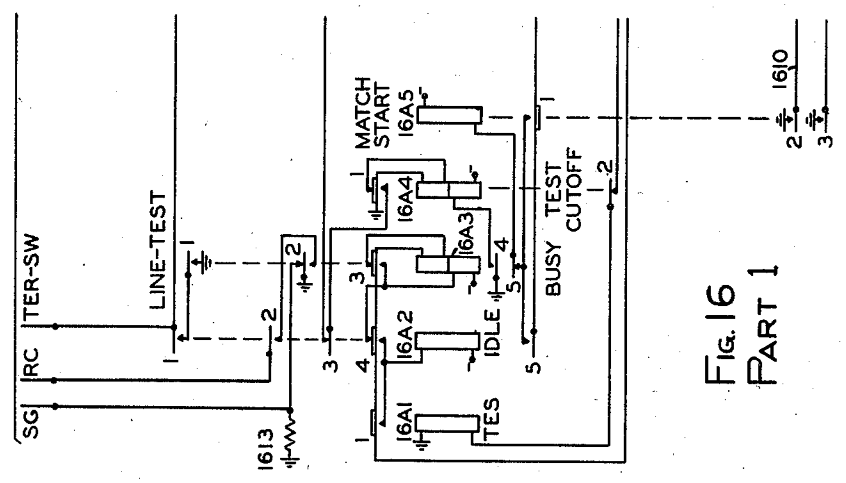
FIG. 16 PART 1
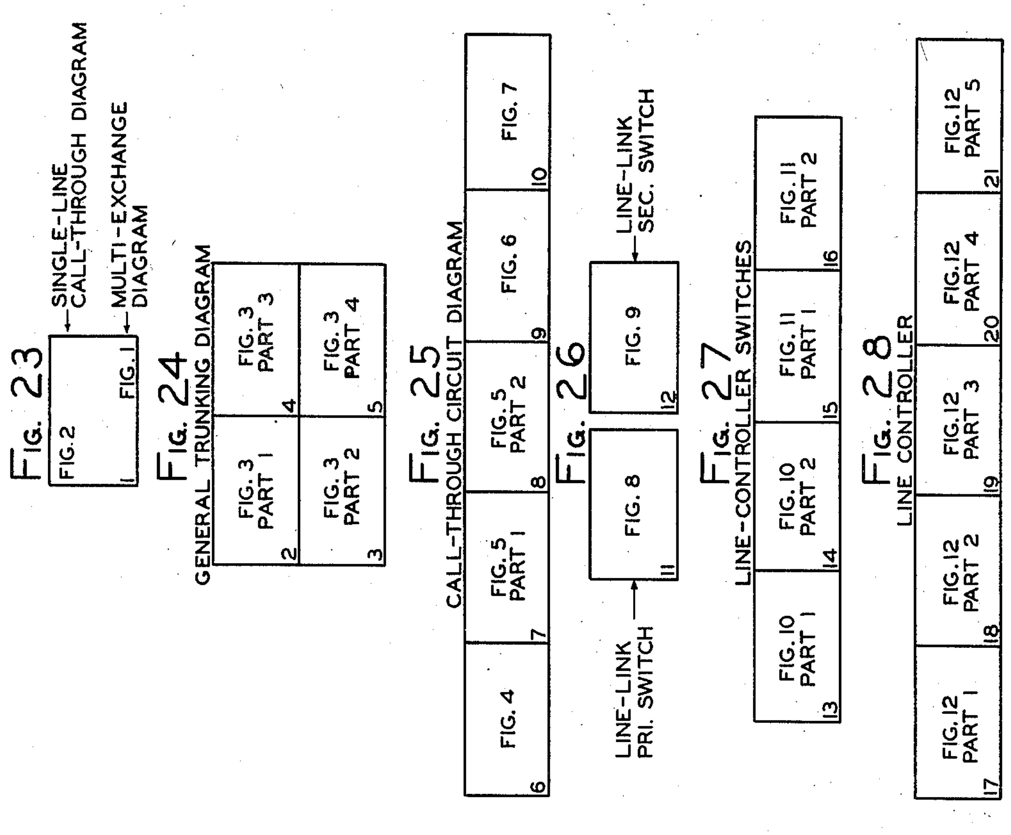
FIG. 23, FIG. 24, FIG. 25, FIG. 26, FIG. 27, FIG. 28
INVENTORS:
JOHN I. BELLAMY
THERON L. BOWSER
BY C. P. Sofer
ATTORNEY

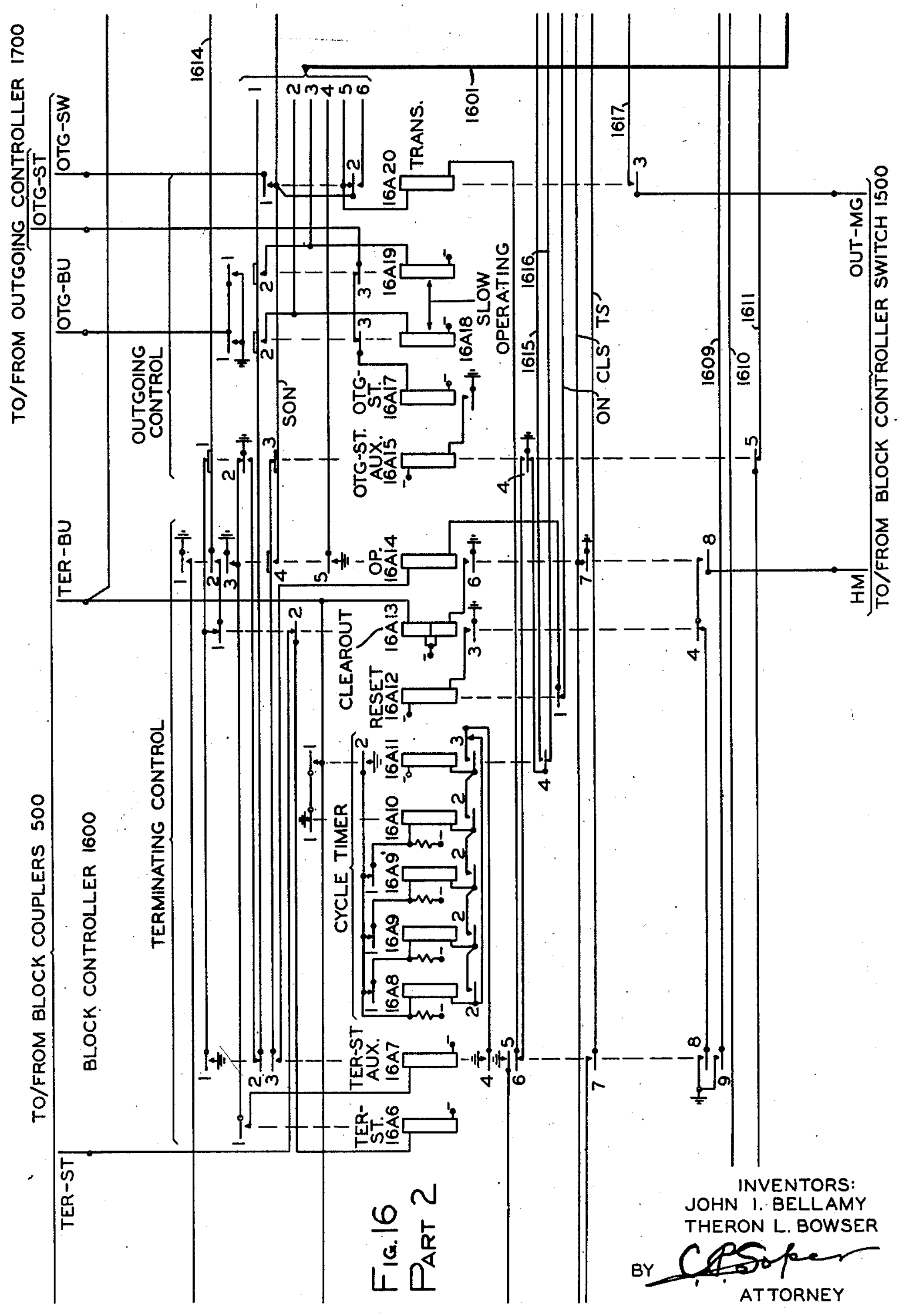
FIG. 16 PART 2
INVENTORS:
JOHN I. BELLAMY
THERON L. BOWSER
BY C. P. Soper
ATTORNEY

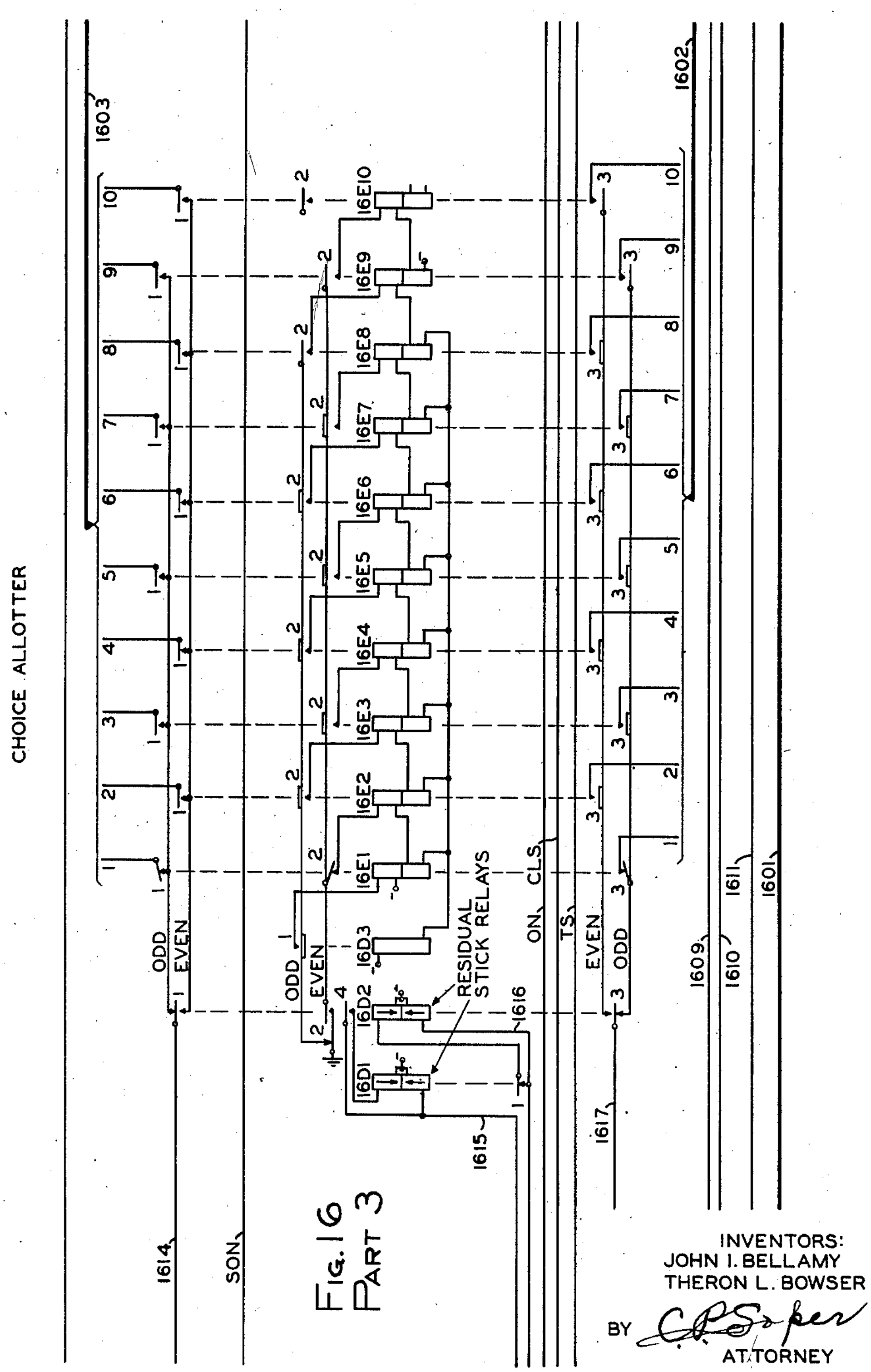
FIG. 16 PART 3
INVENTORS:
JOHN I. BELLAMY
THERON L. BOWSER
BY C. P. Soper
ATTORNEY

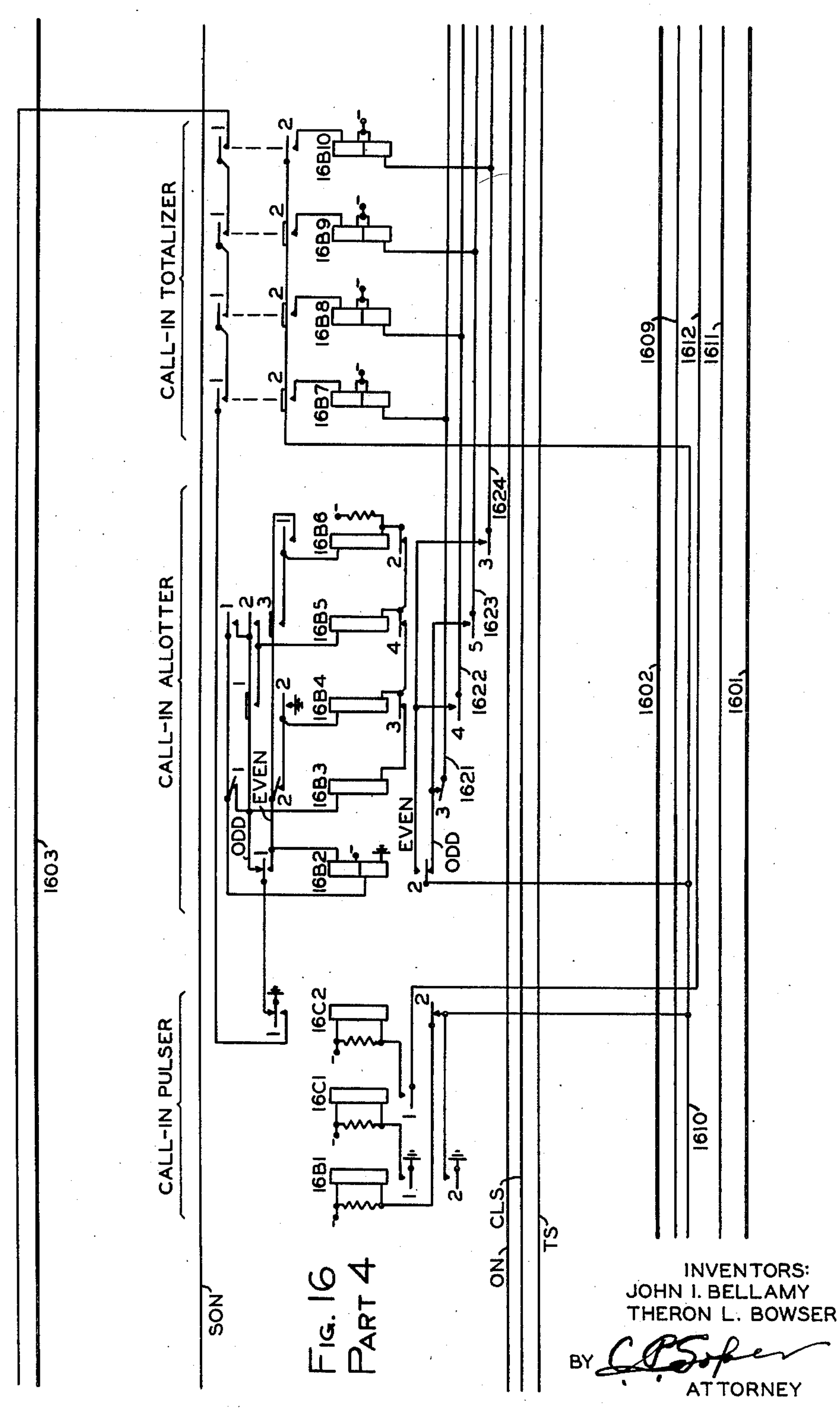
FIG. 16 PART 4
INVENTORS:
JOHN I. BELLAMY
THERON L. BOWSER
BY C. P. Soper
ATTORNEY PRIMARY-SECONDARY-SPREAD CROSSBAR TELEPHONE SYSTEM
Filed April 4, 1949
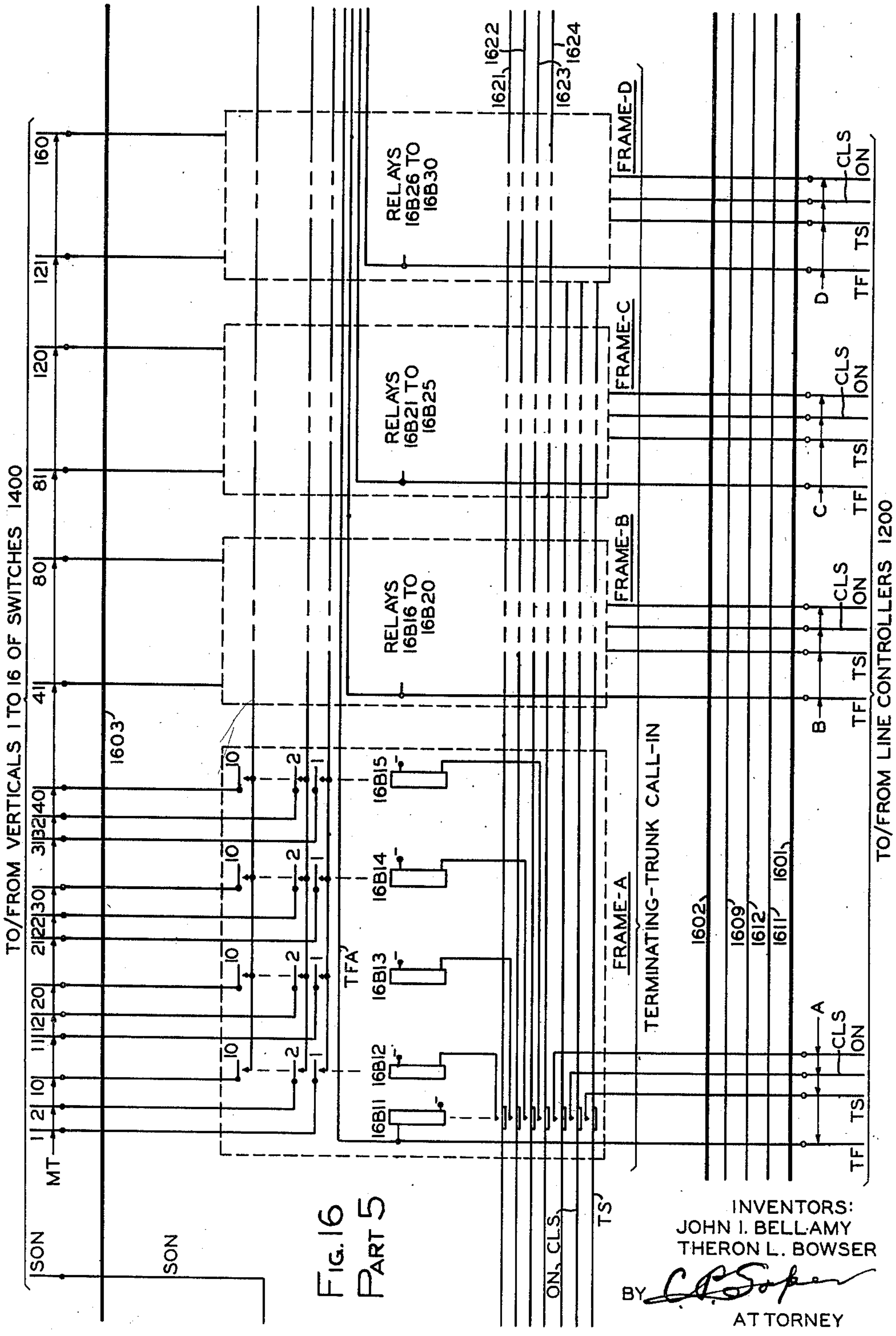
FIG. 16 PART 5
INVENTORS:
JOHN I. BELLAMY
THERON L. BOWSER
BY C. P. Soper
ATTORNEY FIG. 16 PART 6
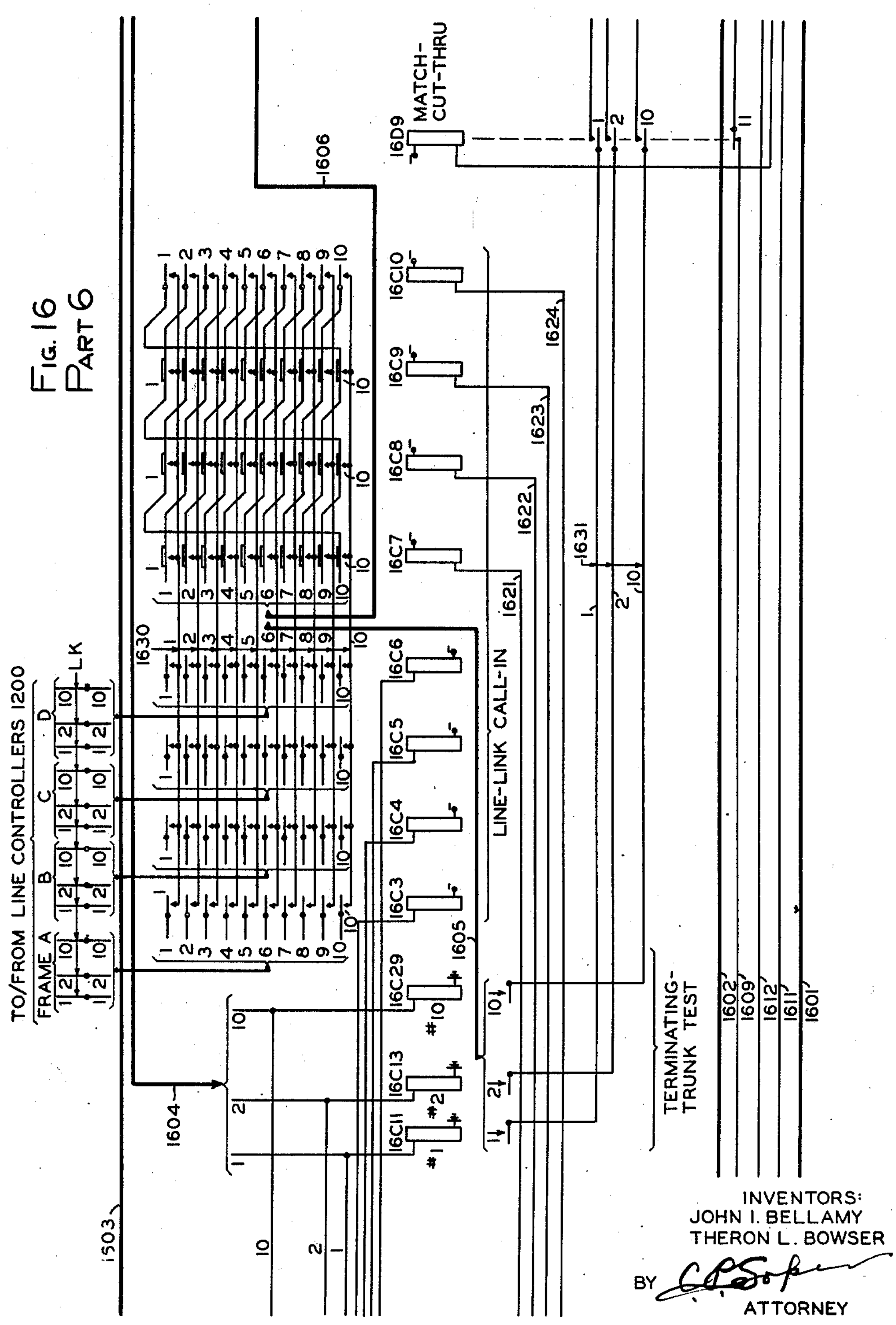
INVENTORS:
JOHN I. BELLAMY
THERON L. BOWSER
BY [signature]
ATTORNEY April 6, 1954 J. I. BELLAMY ET AL 2,674,657
PRIMARY-SECONDARY-SPREAD CROSSBAR TELEPHONE SYSTEM
Filed April 4, 1949 55 Sheets-Sheet 32
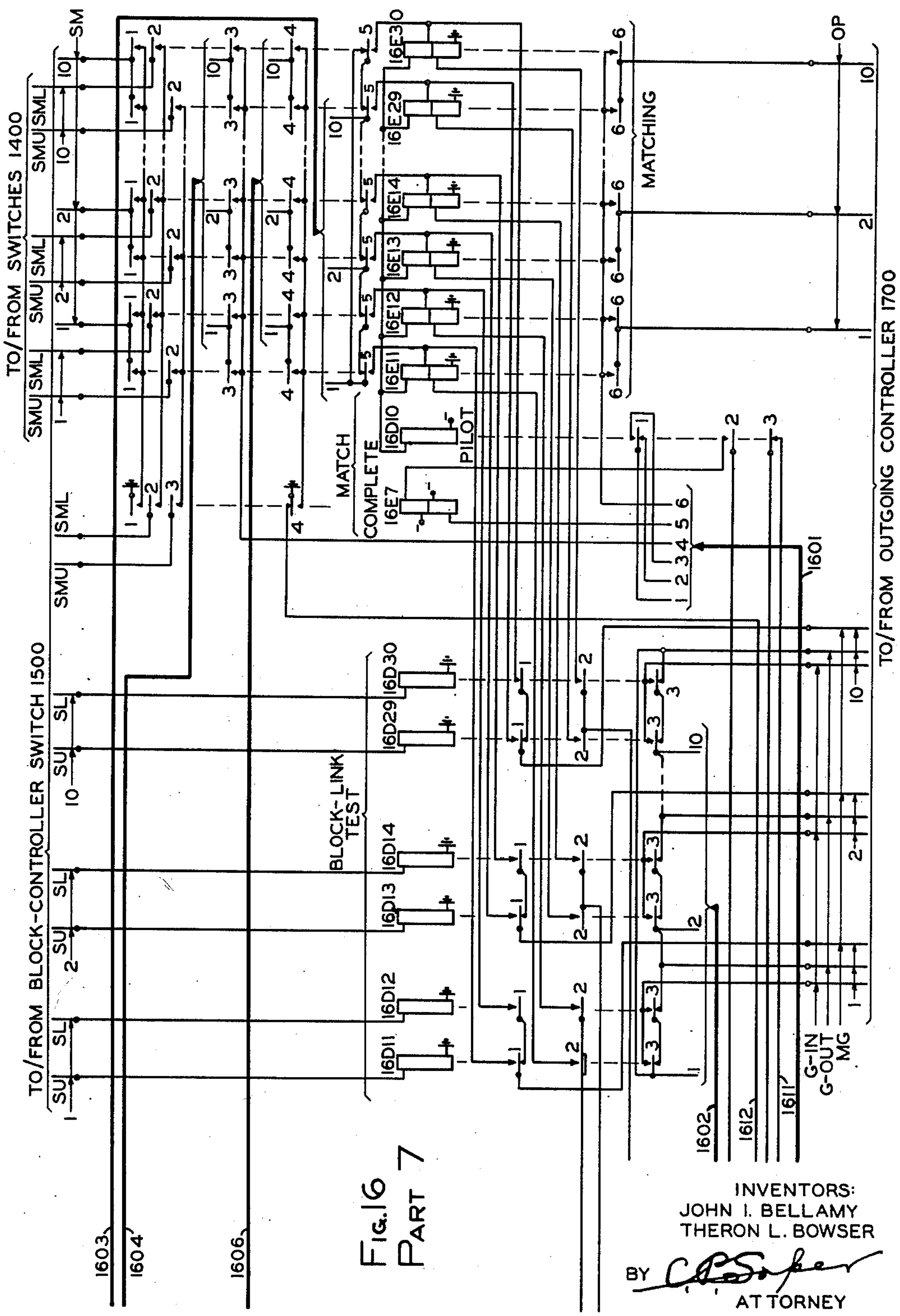
FIG. 16 PART 7
INVENTORS:
JOHN I. BELLAMY
THERON L. BOWSER
BY [signature]
ATTORNEY

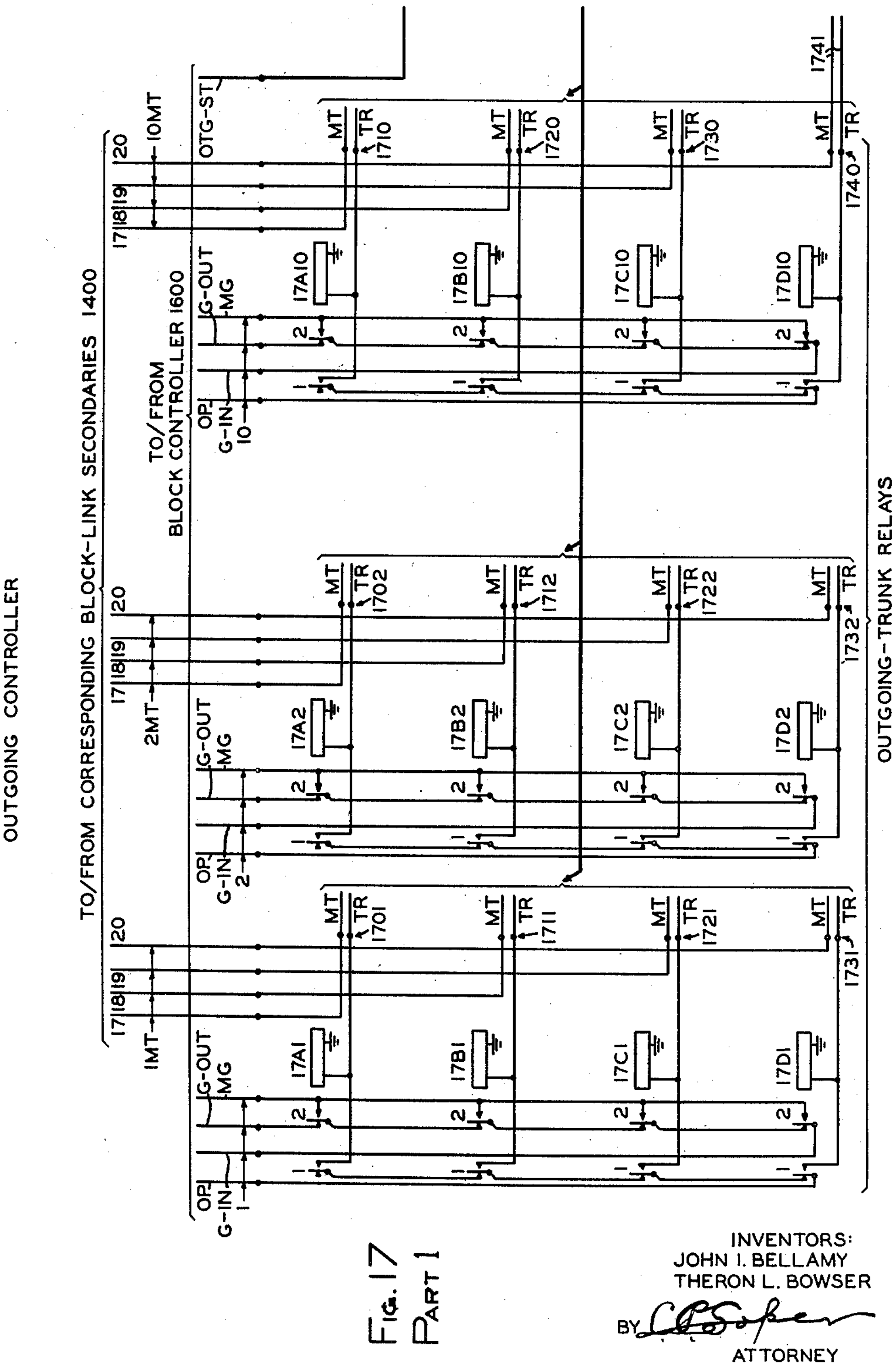
FIG. 17 PART 1
INVENTORS:
JOHN I. BELLAMY
THERON L. BOWSER
BY [signature]
ATTORNEY

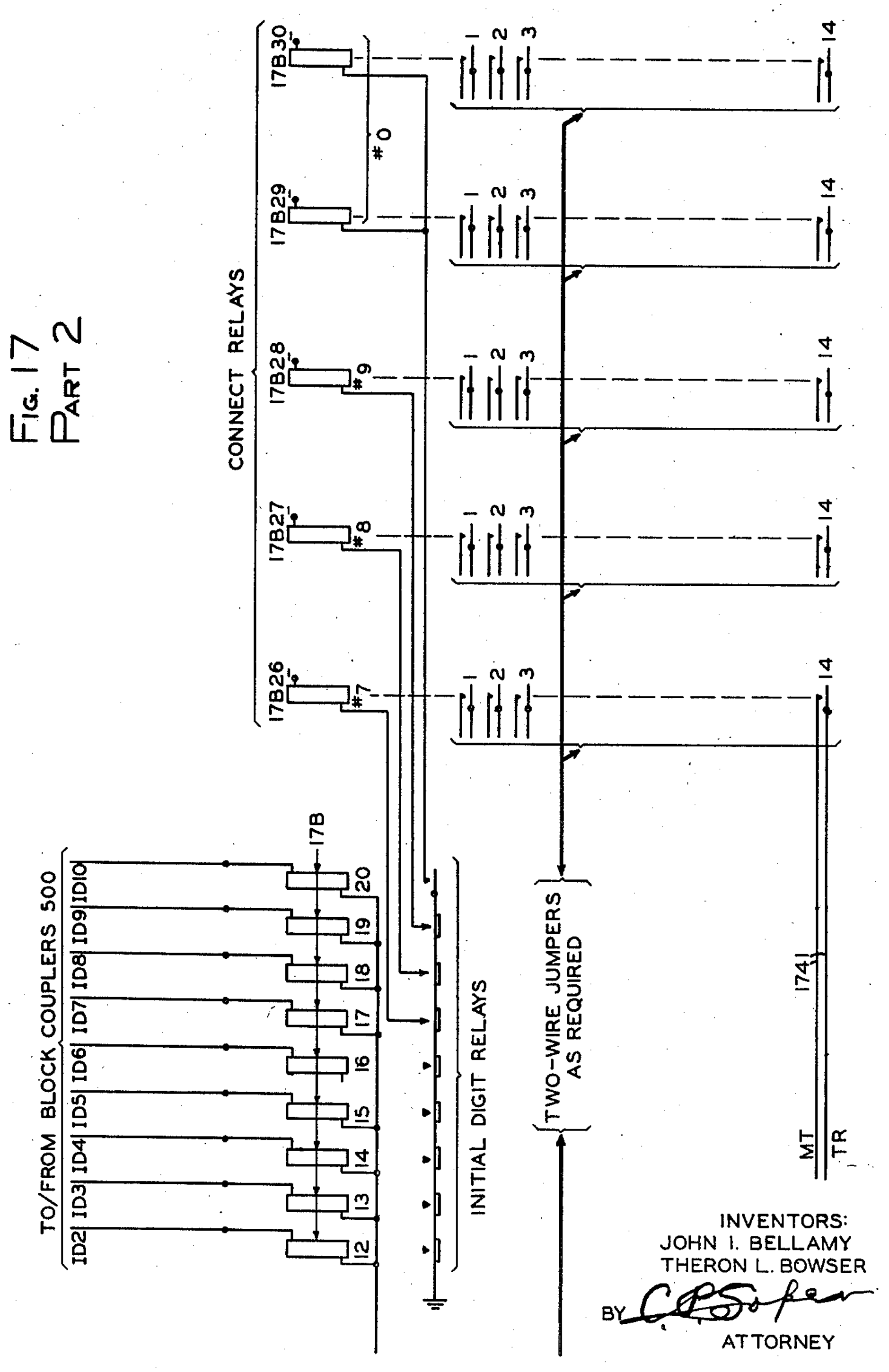
FIG. 17 PART 2
INVENTORS:
JOHN I. BELLAMY
THERON L. BOWSER
BY C. L. Soper
ATTORNEY PRIMARY-SECONDARY-SPREAD CROSSBAR TELEPHONE SYSTEM
Filed April 4, 1949 55 Sheets-Sheet 35
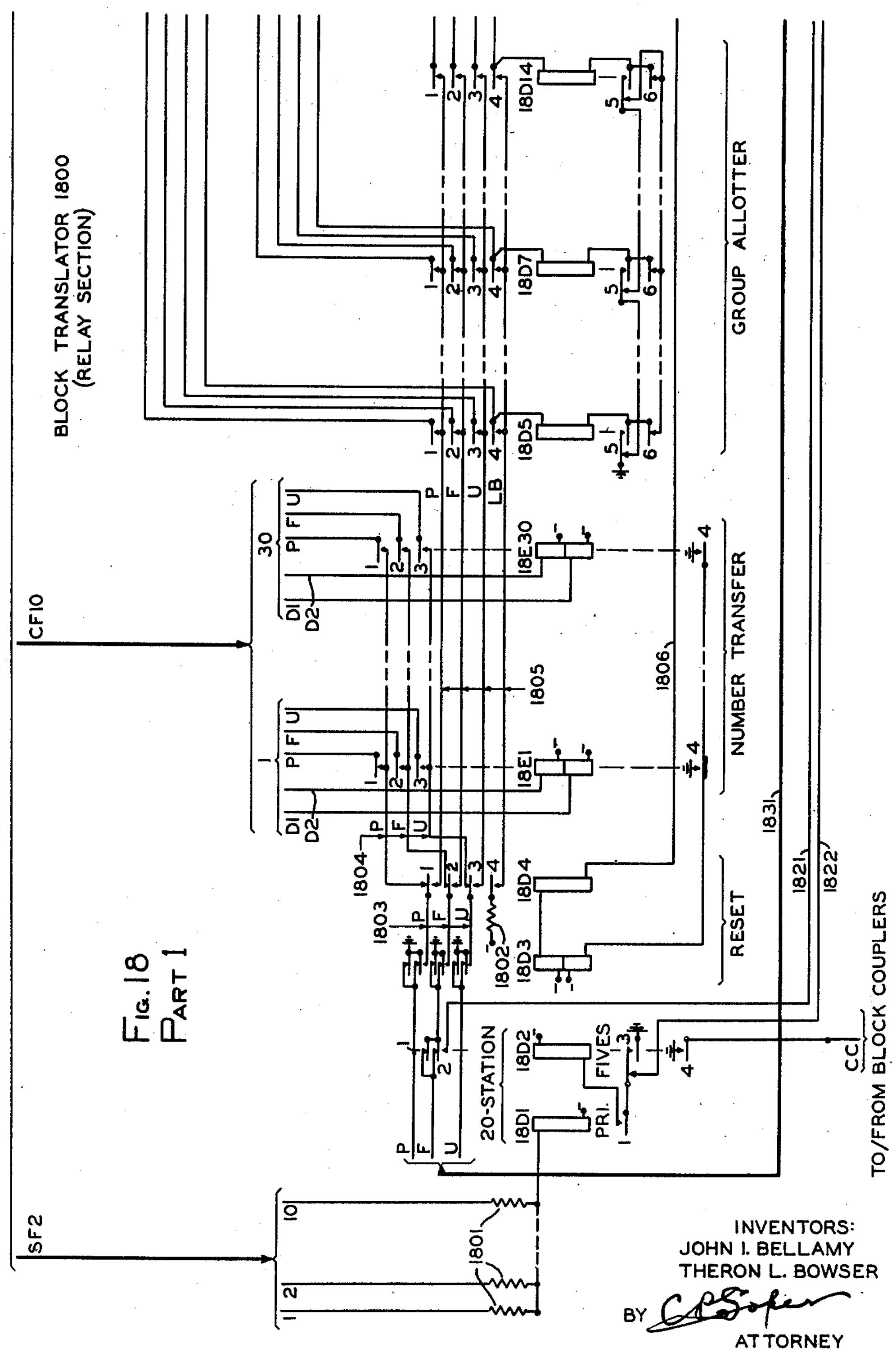
FIG. 18 PART 1
INVENTORS:
JOHN I. BELLAMY
THERON L. BOWSER
BY [signature]
ATTORNEY PRIMARY-SECONDARY-SPREAD CROSSBAR TELEPHONE SYSTEM
Filed April 4, 1949 55 Sheets-Sheet 36
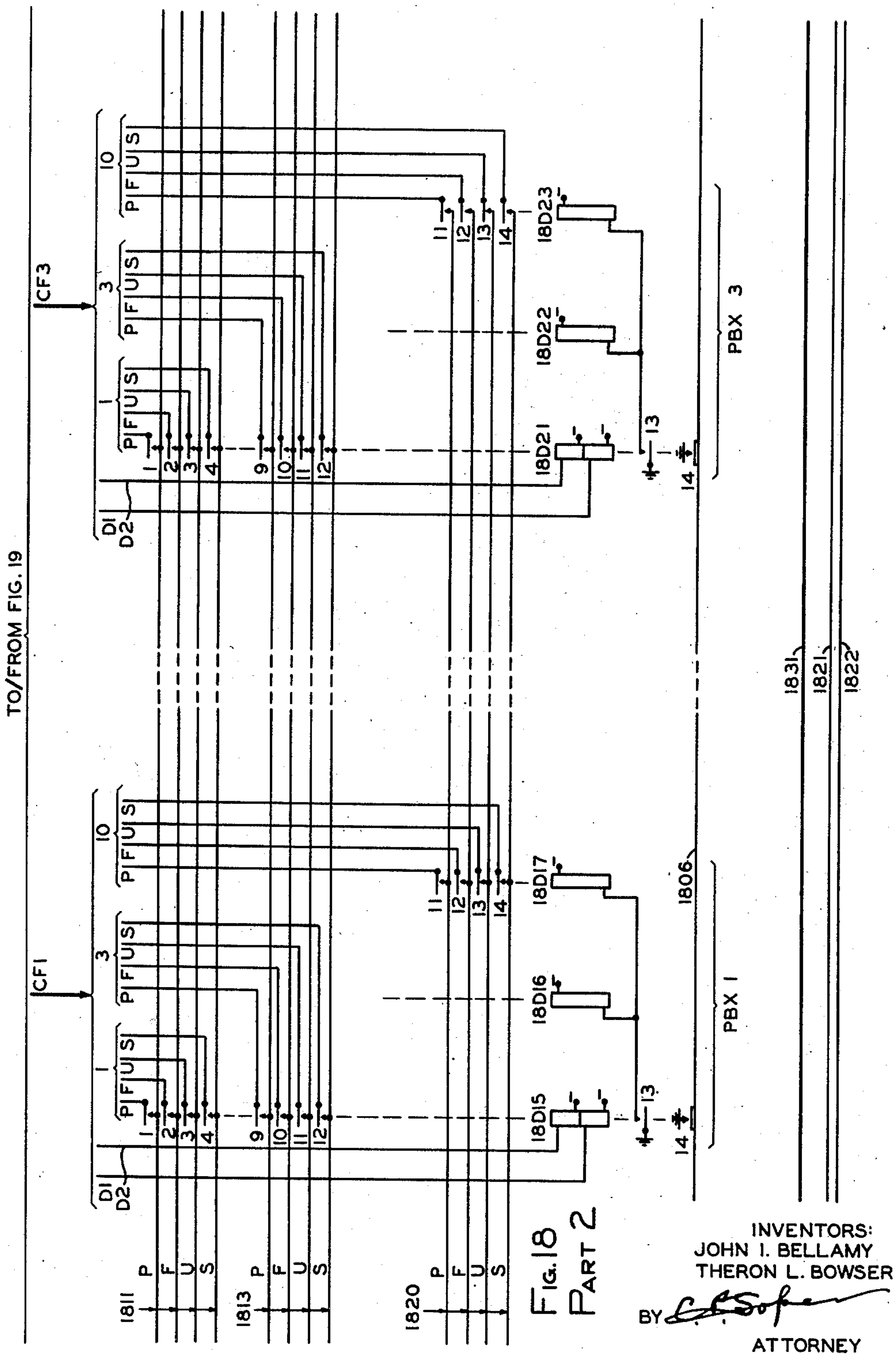
FIG. 18 PART 2
INVENTORS:
JOHN I. BELLAMY
THERON L. BOWSER
BY [signature]
ATTORNEY April 6, 1954 J. I. BELLAMY ET AL 2,674,657
PRIMARY-SECONDARY-SPREAD CROSSBAR TELEPHONE SYSTEM
Filed April 4, 1949 55 Sheets-Sheet 37
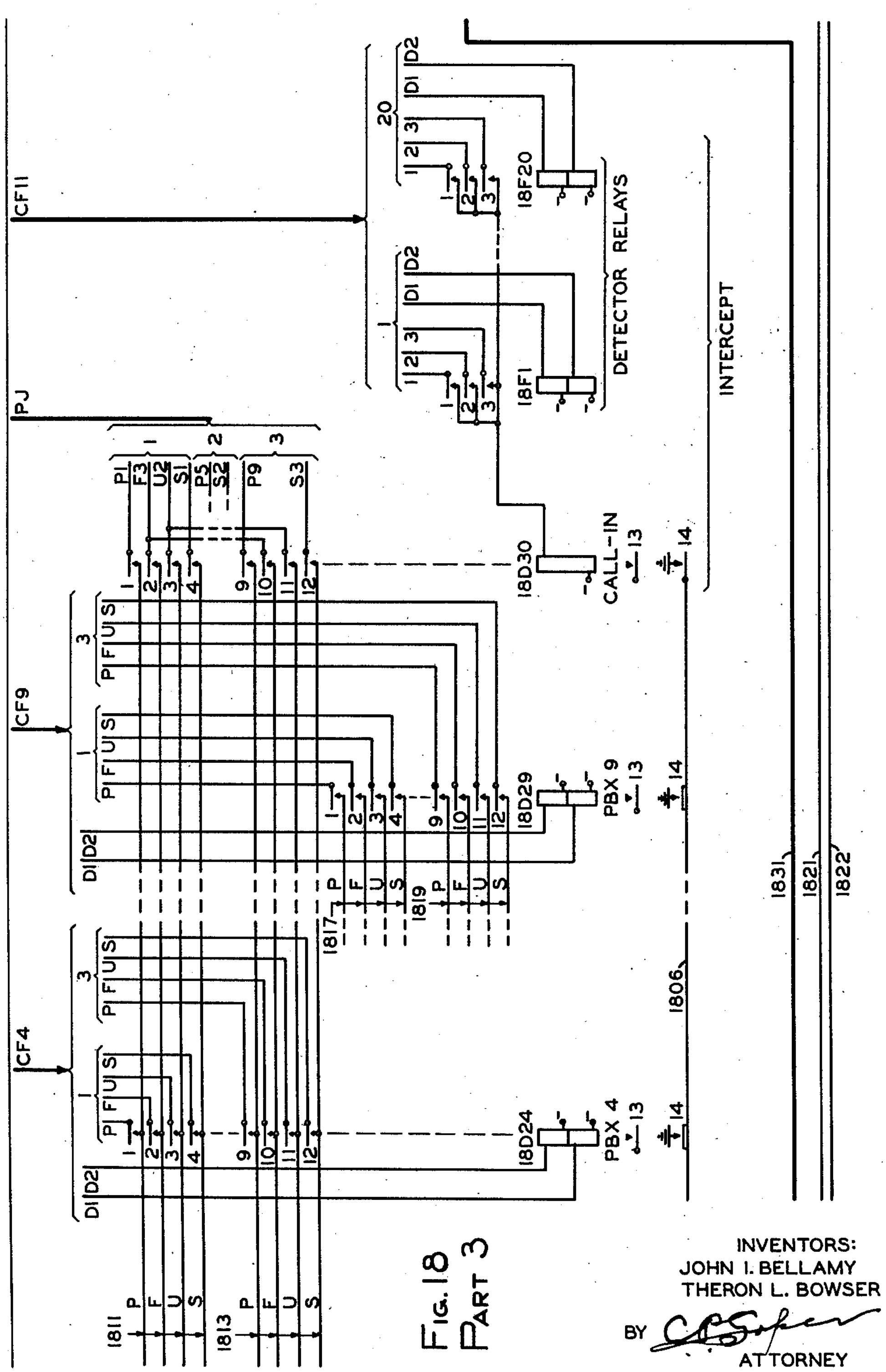
FIG. 18 PART 3
INVENTORS:
JOHN I. BELLAMY
THERON L. BOWSER
BY [signature]
ATTORNEY PRIMARY-SECONDARY-SPREAD CROSSBAR TELEPHONE SYSTEM
Filed April 4, 1949
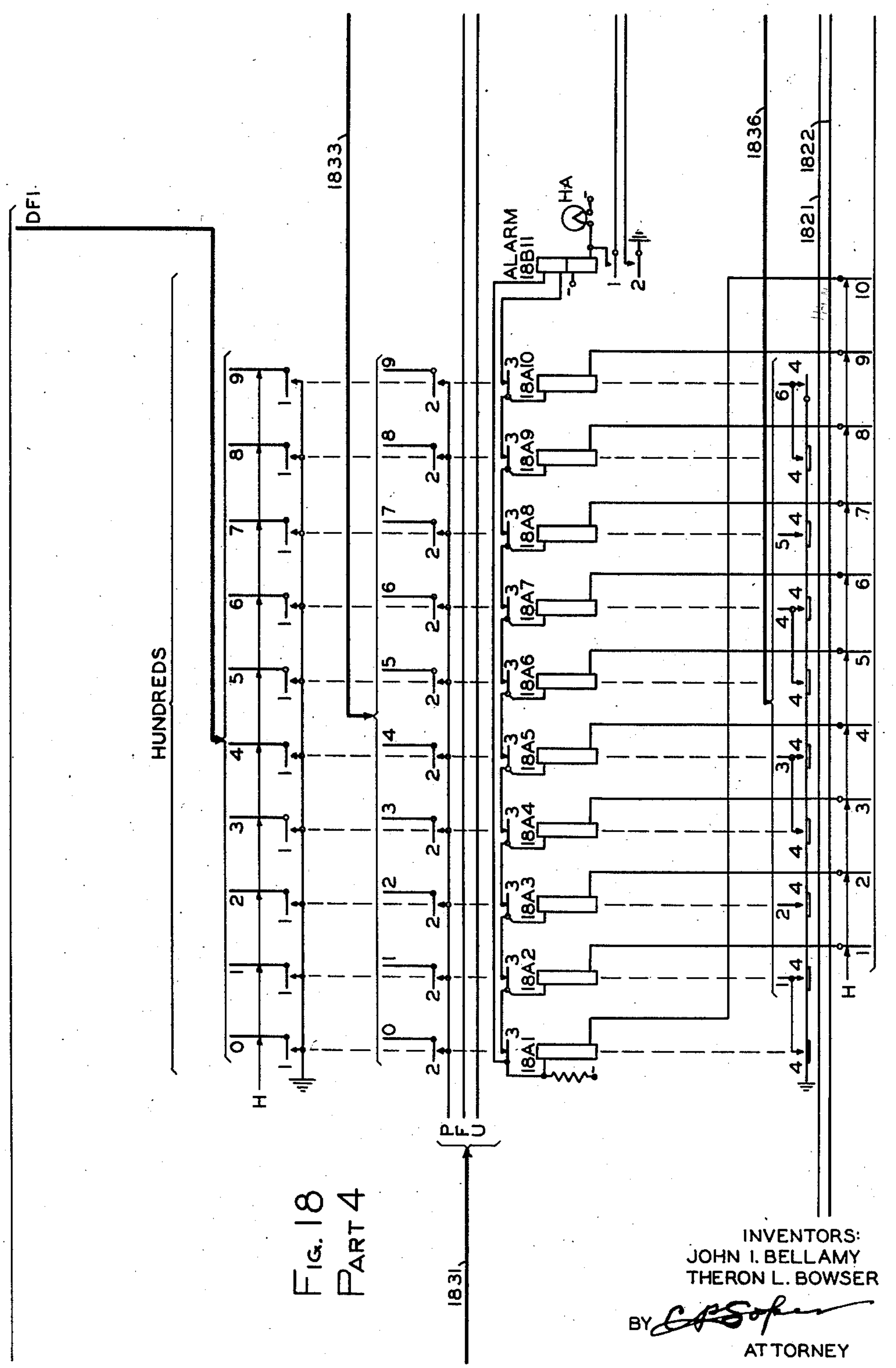
FIG. 18 PART 4
INVENTORS:
JOHN I. BELLAMY
THERON L. BOWSER
BY [signature]
ATTORNEY April 6, 1954 J. I. BELLAMY ET AL 2,674,657
PRIMARY-SECONDARY-SPREAD CROSSBAR TELEPHONE SYSTEM
Filed April 4, 1949 55 Sheets-Sheet 39
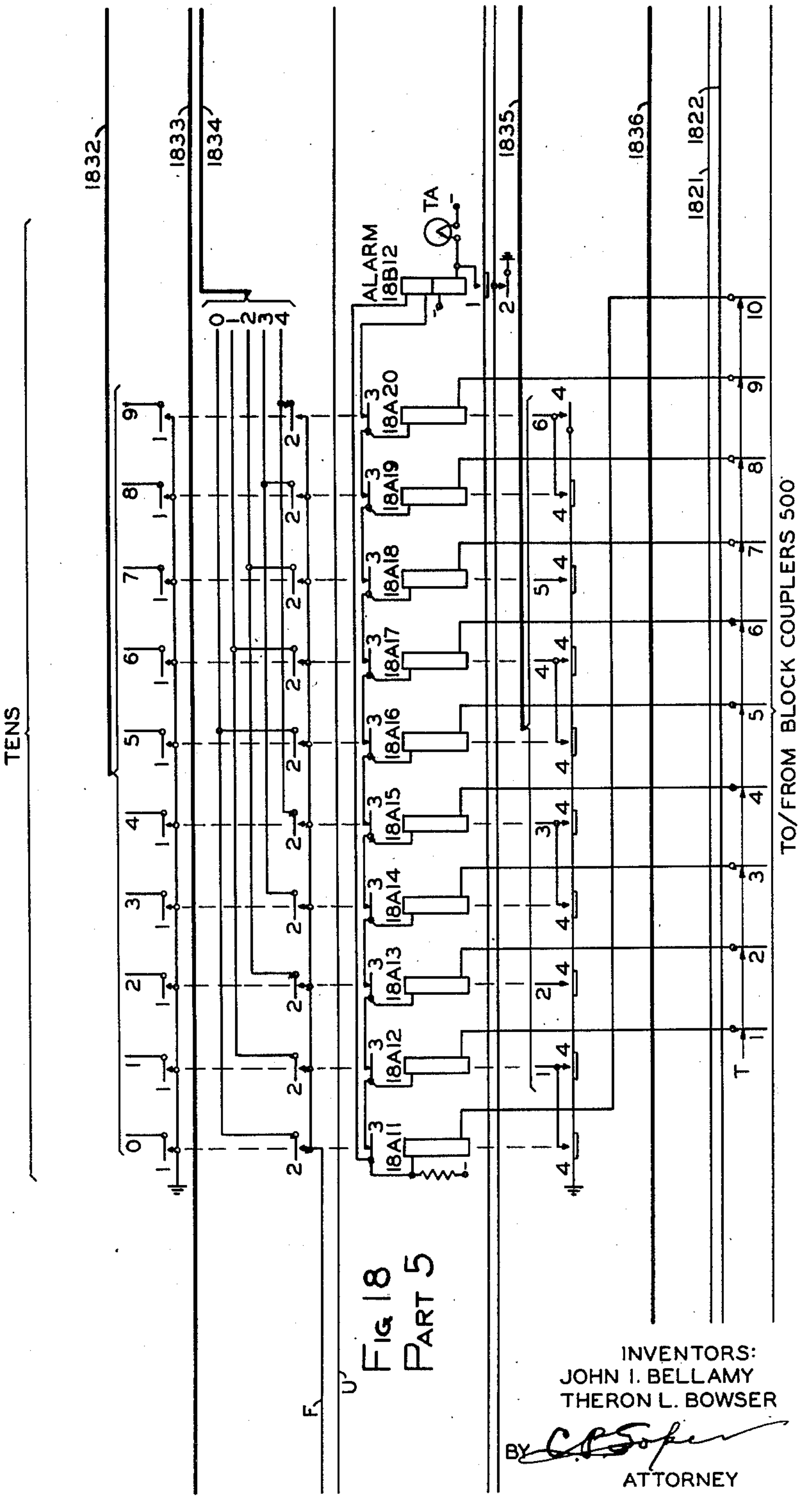
FIG 18 PART 5
INVENTORS:
JOHN I. BELLAMY
THERON L. BOWSER
BY C. P. Sofer
ATTORNEY PRIMARY-SECONDARY-SPREAD CROSSBAR TELEPHONE SYSTEM
Filed April 4, 1949 55 Sheets-Sheet 40
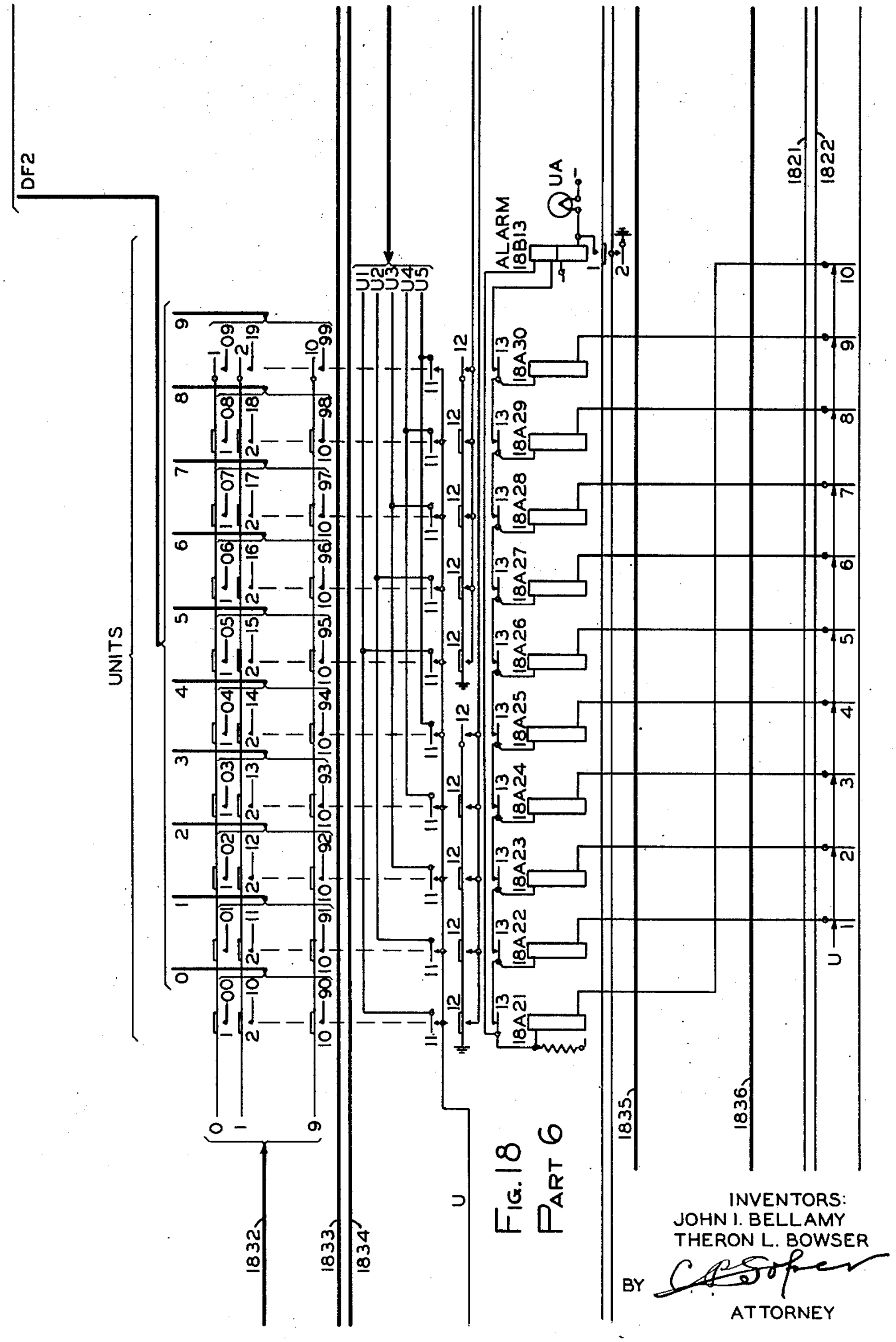
FIG. 18 PART 6
INVENTORS:
JOHN I. BELLAMY
THERON L. BOWSER
BY C. A. Sopher
ATTORNEY

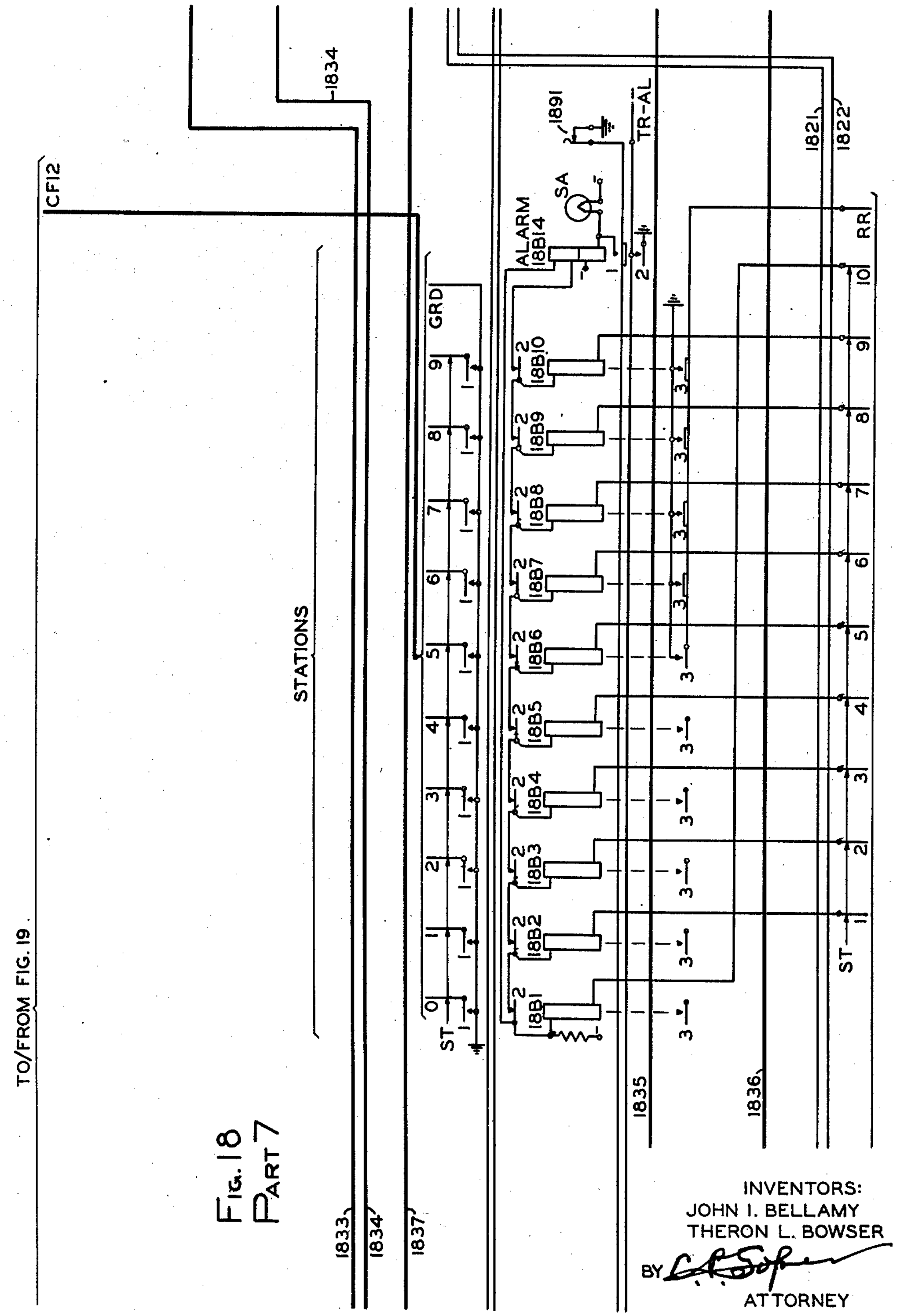
FIG. 18 PART 7
INVENTORS:
JOHN I. BELLAMY
THERON L. BOWSER
BY [signature]
ATTORNEY

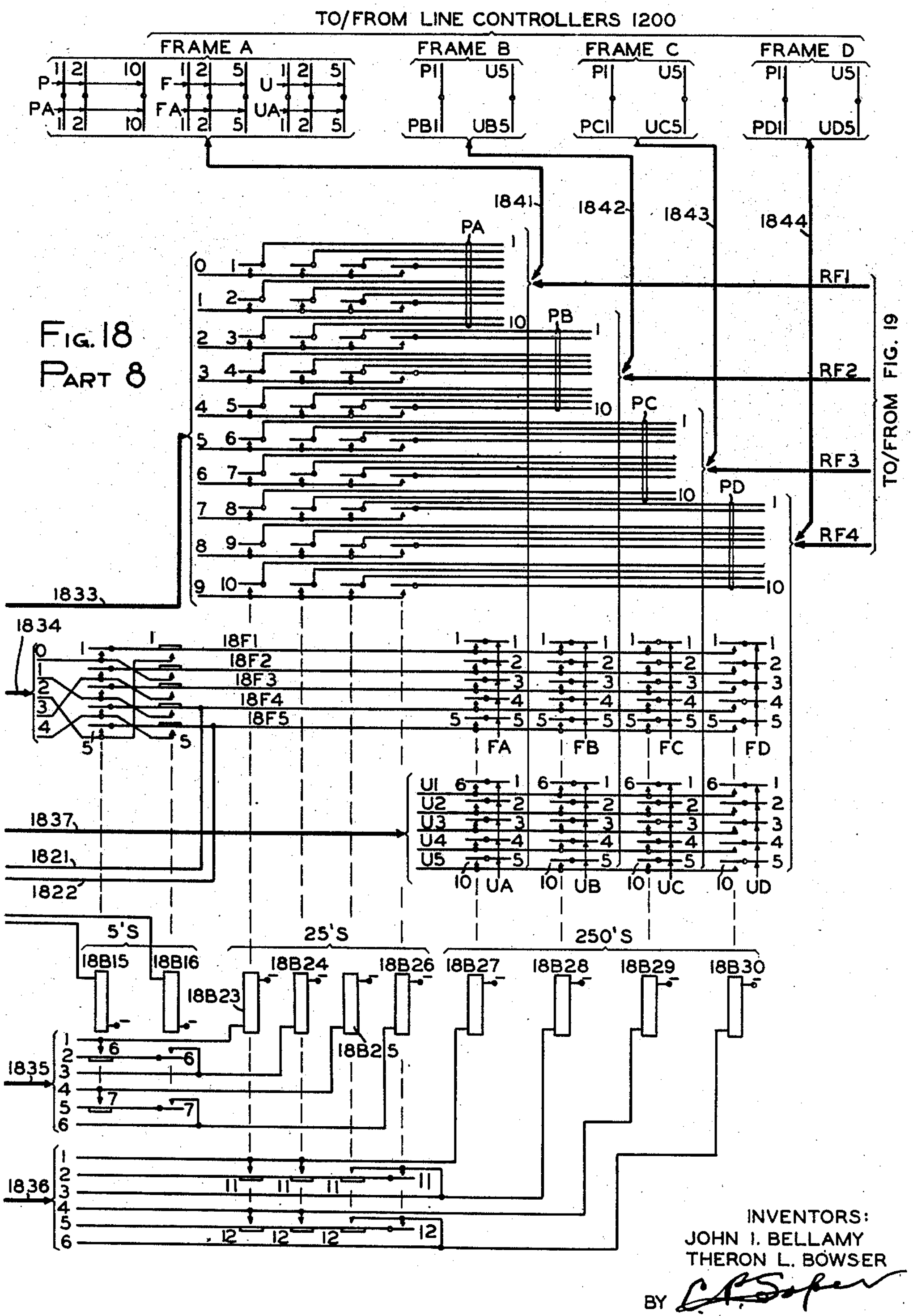
FIG. 18 PART 8
INVENTORS:
JOHN I. BELLAMY
THERON L. BOWSER
BY [signature]
ATTORNEY

BLOCK TRANSLATOR 1800
(TERMINAL-PIN SECTION)

PART 1

INVENTORS:
JOHN I. BELLAMY
THERON L. BOWSER
BY [signature]
ATTORNEY

April 6, 1954 J. I. BELLAMY ET AL 2,674,657

PRIMARY-SECONDARY-SPREAD CROSSBAR TELEPHONE SYSTEM

Filed April 4, 1949 55 Sheets-Sheet 44

PART 2

INVENTORS:
JOHN I. BELLAMY
THERON L. BOWSER
BY [signature]
ATTORNEY

FIG. 19 PART 3
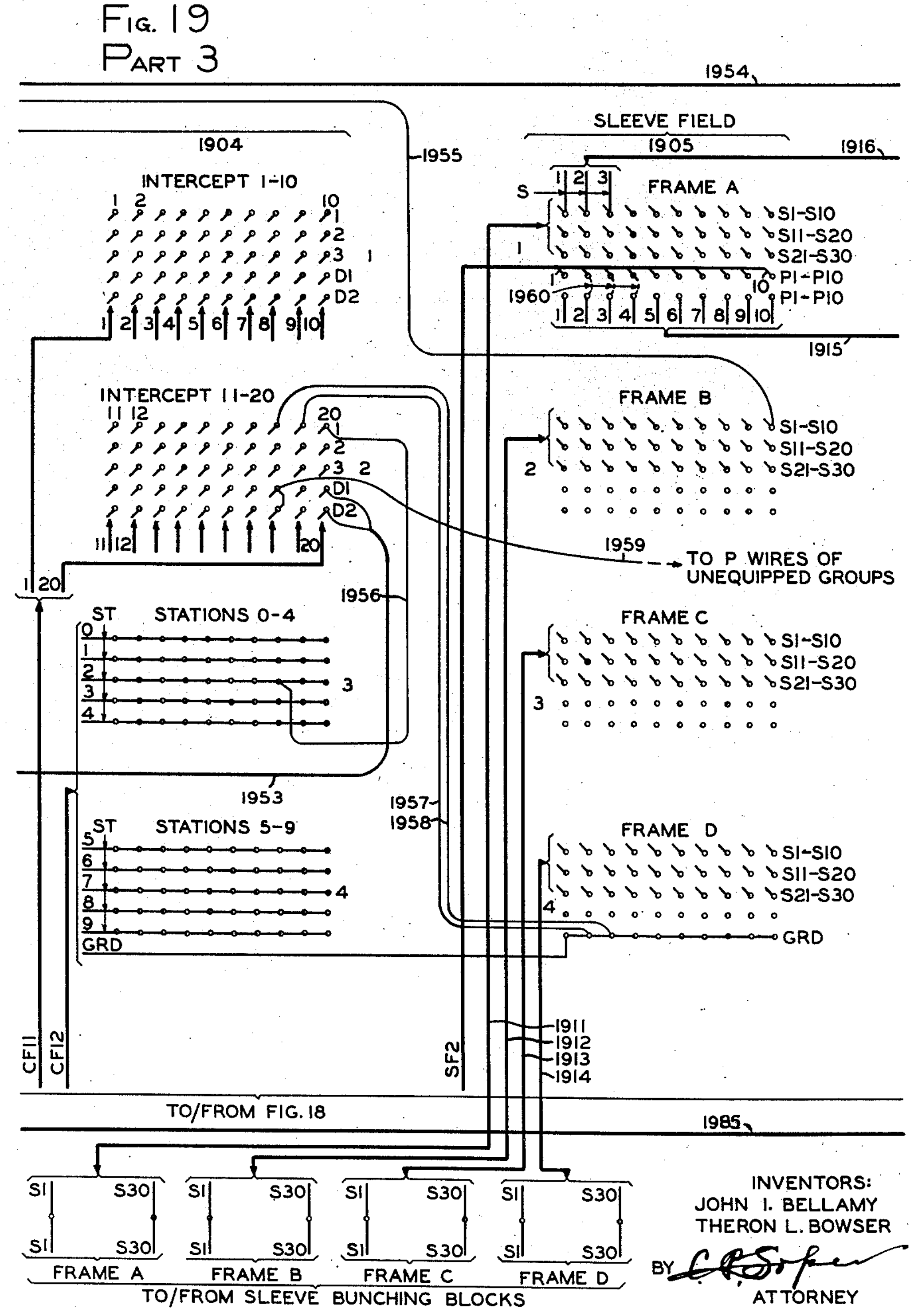
INVENTORS:
JOHN I. BELLAMY
THERON L. BOWSER
BY [signature]
ATTORNEY

PART 4

INVENTORS:
JOHN I. BELLAMY
THERON L. BOWSER
BY C. L. Soper
ATTORNEY

PRIMARY-SECONDARY-SPREAD CROSSBAR TELEPHONE SYSTEM

Filed April 4, 1949 55 Sheets-Sheet 47

PART 5

INVENTORS:
JOHN I. BELLAMY
THERON L. BOWSER
BY [signature]
ATTORNEY

April 6, 1954 J. I. BELLAMY ET AL 2,674,657

PRIMARY-SECONDARY-SPREAD CROSSBAR TELEPHONE SYSTEM

Filed April 4, 1949 55 Sheets-Sheet 48

INVENTORS:
JOHN I. BELLAMY
THERON L. BOWSER
BY [signature]
ATTORNEY

April 6, 1954 J. I. BELLAMY ET AL 2,674,657

PRIMARY-SECONDARY-SPREAD CROSSBAR TELEPHONE SYSTEM

Filed April 4, 1949 55 Sheets-Sheet 49

LINE NUMBERING & TRANSLATION PLAN

| LINE-LINK FRAME A | 1ST FIVE | | | | | 2ND FIVE | | | | | 3RD FIVE | | | | | 4TH FIVE | | | | | 5TH FIVE | | | | |
|---|---|---|---|---|---|---|---|---|---|---|---|---|---|---|---|---|---|---|---|---|---|---|---|---|---|
| | V1 | V2 | V3 | V4 | V5 | V6 | V7 | V8 | V9 | V10 | V11 | V12 | V13 | V14 | V15 | V16 | V17 | V18 | V19 | V20 | V21 | V22 | V23 | V24 | V25 |
| 1 | 000 111 | 001 112 | 002 113 | 003 114 | 004 115 | 005 121 | 006 122 | 007 123 | 008 124 | 009 125 | 010 131 | 011 132 | 012 133 | 013 134 | 014 135 | 015 141 | 016 142 | 017 143 | 018 144 | 019 145 | 020 151 | 021 152 | 022 153 | 023 154 | 024 155 |
| 2 | 025 211 | 026 212 | 027 213 | 028 214 | 029 215 | 030 221 | 031 222 | 032 223 | 033 224 | 034 225 | 035 231 | 036 232 | 037 233 | 038 234 | 039 235 | 040 241 | 041 242 | 042 243 | 043 243 | 044 245 | 045 251 | 046 252 | 047 253 | 048 254 | 049 255 |
| 3 | 050 311 | 051 312 | 052 313 | 053 314 | 054 315 | 055 321 | 056 322 | 057 323 | 058 324 | 059 325 | 060 331 | 061 332 | 062 333 | 063 334 | 064 335 | 065 341 | 066 342 | 067 343 | 068 344 | 069 345 | 070 351 | 071 352 | 072 353 | 073 354 | 074 355 |
| 4 | 075 411 | 076 412 | 077 413 | 078 414 | 079 415 | 080 421 | 081 422 | 082 423 | 083 424 | 084 425 | 085 431 | 086 432 | 087 433 | 088 434 | 089 435 | 090 441 | 091 442 | 092 443 | 093 444 | 094 445 | 095 451 | 096 452 | 097 453 | 098 454 | 099 455 |
| 5 | 100 511 | 101 512 | 102 513 | 103 514 | 104 515 | 105 521 | 106 522 | 107 523 | 108 524 | 109 525 | 110 531 | 111 532 | 112 533 | 113 534 | 114 535 | 115 541 | 116 542 | 117 543 | 118 544 | 119 545 | 120 551 | 121 552 | 122 553 | 123 554 | 124 555 |
| 6 | 125 611 | 126 612 | 127 613 | 128 614 | 129 615 | 130 621 | 131 622 | 132 623 | 133 624 | 134 625 | 135 631 | 136 632 | 137 633 | 138 634 | 139 635 | 140 641 | 141 642 | 142 643 | 143 644 | 144 645 | 145 651 | 146 652 | 147 653 | 148 654 | 149 655 |
| 7 | 150 711 | 151 712 | 152 713 | 153 714 | 154 715 | 155 721 | 156 722 | 157 723 | 158 724 | 159 725 | 160 731 | 161 732 | 162 733 | 163 734 | 164 735 | 165 741 | 166 742 | 167 743 | 168 744 | 169 745 | 170 751 | 171 752 | 172 753 | 173 754 | 174 755 |
| 8 | 175 811 | 176 812 | 177 813 | 178 814 | 179 815 | 180 821 | 181 822 | 182 823 | 183 824 | 184 825 | 185 831 | 186 832 | 187 833 | 188 834 | 189 835 | 190 841 | 191 842 | 192 843 | 193 844 | 194 845 | 195 851 | 196 852 | 197 853 | 198 854 | 199 855 |
| 9 | 200 911 | 201 912 | 202 913 | 203 914 | 204 915 | 205 921 | 206 922 | 207 923 | 208 924 | 209 925 | 210 931 | 211 932 | 212 933 | 213 934 | 214 935 | 215 941 | 216 942 | 217 943 | 218 944 | 219 945 | 220 951 | 221 952 | 222 953 | 223 954 | 224 955 |
| 10 | 225 011 | 226 012 | 227 013 | 228 014 | 229 015 | 230 021 | 231 022 | 232 023 | 233 024 | 234 025 | 235 031 | 236 032 | 237 033 | 238 034 | 239 035 | 240 041 | 241 042 | 242 043 | 243 044 | 244 045 | 245 051 | 246 052 | 247 053 | 248 054 | 249 055 |

FIG. 21
PART 1

INVENTORS:
JOHN I. BELLAMY
THERON L. BOWSER
BY [signature]
ATTORNEY

PRIMARY-SECONDARY-SPREAD CROSSBAR TELEPHONE SYSTEM

Filed April 4, 1949 55 Sheets-Sheet 50

| | 1ST FIVE | | | | | 2ND FIVE | | | | | 3RD FIVE | | | | | 4TH FIVE | | | | | 5TH FIVE | | | | |
|---|---|---|---|---|---|---|---|---|---|---|---|---|---|---|---|---|---|---|---|---|---|---|---|---|---|
| LINE-LINK FRAME B | V1 | V2 | V3 | V4 | V5 | V6 | V7 | V8 | V9 | V10 | V11 | V12 | V13 | V14 | V15 | V16 | V17 | V18 | V19 | V20 | V21 | V22 | V23 | V24 | V25 |
| 1 | 250<br>111 | 251<br>112 | 252<br>113 | 253<br>114 | 254<br>115 | 255<br>121 | 256<br>122 | 257<br>123 | 258<br>124 | 259<br>125 | 260<br>131 | 261<br>132 | 262<br>133 | 263<br>134 | 264<br>135 | 265<br>141 | 266<br>142 | 267<br>143 | 268<br>144 | 269<br>145 | 270<br>151 | 272<br>152 | 273<br>153 | 274<br>154 | 274<br>155 |
| 2 | 275<br>211 | 276<br>212 | 277<br>213 | 278<br>214 | 279<br>215 | 280<br>221 | 281<br>222 | 282<br>223 | 283<br>224 | 284<br>225 | 285<br>231 | 286<br>232 | 287<br>233 | 288<br>234 | 289<br>235 | 290<br>241 | 291<br>242 | 292<br>243 | 293<br>244 | 294<br>245 | 295<br>251 | 296<br>252 | 297<br>253 | 298<br>254 | 299<br>255 |
| 3 | 300<br>311 | 301<br>312 | 302<br>313 | 303<br>314 | 304<br>315 | 305<br>321 | 306<br>322 | 307<br>323 | 308<br>324 | 309<br>325 | 310<br>331 | 311<br>332 | 312<br>333 | 313<br>334 | 314<br>335 | 315<br>341 | 316<br>342 | 317<br>343 | 318<br>344 | 319<br>345 | 320<br>351 | 321<br>352 | 322<br>353 | 323<br>354 | 324<br>355 |
| 4 | 325<br>411 | 326<br>412 | 327<br>413 | 328<br>414 | 329<br>415 | 330<br>421 | 331<br>422 | 332<br>423 | 333<br>424 | 334<br>425 | 335<br>431 | 336<br>432 | 337<br>433 | 338<br>434 | 339<br>435 | 340<br>441 | 341<br>442 | 342<br>443 | 343<br>444 | 344<br>445 | 345<br>451 | 346<br>452 | 347<br>453 | 348<br>454 | 349<br>455 |
| 5 | 350<br>511 | 351<br>512 | 352<br>513 | 353<br>514 | 354<br>515 | 355<br>521 | 356<br>522 | 357<br>523 | 358<br>524 | 359<br>525 | 360<br>531 | 361<br>532 | 362<br>533 | 363<br>534 | 364<br>535 | 365<br>541 | 366<br>542 | 367<br>543 | 368<br>544 | 369<br>545 | 370<br>551 | 371<br>552 | 372<br>553 | 373<br>554 | 374<br>555 |
| 6 | 375<br>611 | 376<br>612 | 377<br>613 | 378<br>614 | 379<br>615 | 380<br>621 | 381<br>622 | 382<br>623 | 383<br>624 | 384<br>625 | 385<br>631 | 386<br>632 | 387<br>633 | 388<br>634 | 389<br>635 | 390<br>641 | 391<br>642 | 392<br>643 | 393<br>644 | 394<br>645 | 395<br>651 | 396<br>652 | 397<br>653 | 398<br>654 | 399<br>655 |
| 7 | 400<br>711 | 401<br>712 | 402<br>713 | 403<br>714 | 404<br>715 | 405<br>721 | 406<br>722 | 407<br>723 | 408<br>724 | 409<br>725 | 410<br>731 | 411<br>732 | 412<br>733 | 413<br>734 | 414<br>735 | 415<br>741 | 416<br>742 | 417<br>743 | 418<br>744 | 419<br>745 | 420<br>751 | 421<br>752 | 422<br>753 | 423<br>754 | 424<br>755 |
| 8 | 425<br>811 | 426<br>812 | 427<br>813 | 428<br>814 | 429<br>815 | 430<br>821 | 431<br>822 | 432<br>823 | 433<br>824 | 434<br>825 | 435<br>831 | 436<br>832 | 437<br>833 | 438<br>834 | 439<br>835 | 440<br>841 | 441<br>842 | 442<br>843 | 443<br>844 | 444<br>845 | 445<br>851 | 446<br>852 | 447<br>853 | 448<br>854 | 449<br>855 |
| 9 | 450<br>911 | 451<br>912 | 452<br>913 | 453<br>914 | 454<br>915 | 455<br>921 | 456<br>922 | 457<br>923 | 458<br>924 | 459<br>925 | 460<br>931 | 461<br>932 | 462<br>933 | 463<br>934 | 464<br>935 | 465<br>941 | 466<br>942 | 467<br>943 | 468<br>944 | 469<br>945 | 470<br>951 | 471<br>952 | 472<br>953 | 473<br>954 | 474<br>955 |
| 10 | 475<br>011 | 476<br>012 | 477<br>013 | 478<br>014 | 479<br>015 | 480<br>021 | 481<br>022 | 482<br>023 | 483<br>024 | 484<br>025 | 485<br>031 | 486<br>032 | 487<br>033 | 488<br>034 | 489<br>035 | 490<br>041 | 491<br>042 | 492<br>043 | 493<br>044 | 494<br>045 | 495<br>051 | 496<br>052 | 497<br>053 | 498<br>054 | 499<br>055 |

FIG. 21
PART 2

INVENTORS:
JOHN I. BELLAMY
THERON L. BOWSER
BY [signature]
ATTORNEY

PRIMARY-SECONDARY-SPREAD CROSSBAR TELEPHONE SYSTEM

Filed April 4, 1949 55 Sheets-Sheet 51

1ST FIVE

| LINE-LINK FRAME C | V1 | V2 | V3 | V4 | V5 |
|---|---|---|---|---|---|
| 1 | 500 111 | 501 112 | 502 113 | 503 114 | 504 115 |
| 2 | 525 211 | 526 212 | 527 213 | 528 214 | 529 215 |
| 3 | 550 311 | 551 312 | 552 313 | 553 314 | 554 315 |
| 4 | 575 411 | 576 412 | 577 413 | 578 414 | 579 415 |
| 5 | 600 511 | 601 512 | 602 513 | 603 514 | 604 515 |
| 6 | 625 611 | 626 612 | 627 613 | 628 614 | 629 615 |
| 7 | 650 711 | 651 712 | 652 713 | 653 714 | 654 715 |
| 8 | 675 811 | 676 812 | 677 813 | 678 814 | 679 815 |
| 9 | 700 911 | 701 912 | 702 913 | 703 914 | 704 915 |
| 10 | 725 011 | 726 012 | 727 013 | 728 014 | 729 015 |

2ND FIVE

| LINE-LINK FRAME C | V6 | V7 | V8 | V9 | V10 |
|---|---|---|---|---|---|
| 1 | 505 121 | 506 122 | 507 123 | 508 124 | 509 125 |
| 2 | 530 221 | 531 222 | 532 223 | 533 224 | 534 225 |
| 3 | 555 321 | 556 322 | 557 323 | 558 324 | 559 325 |
| 4 | 580 421 | 581 422 | 582 423 | 583 424 | 584 425 |
| 5 | 605 521 | 606 522 | 607 523 | 608 524 | 609 525 |
| 6 | 630 621 | 631 622 | 632 623 | 633 624 | 634 625 |
| 7 | 655 721 | 656 722 | 657 723 | 658 724 | 659 725 |
| 8 | 680 821 | 681 822 | 682 823 | 683 824 | 684 825 |
| 9 | 705 921 | 706 922 | 707 923 | 708 924 | 709 925 |
| 10 | 730 021 | 731 022 | 732 023 | 733 024 | 734 025 |

3RD FIVE

| LINE-LINK FRAME C | V11 | V12 | V13 | V14 | V15 |
|---|---|---|---|---|---|
| 1 | 510 131 | 511 132 | 512 133 | 513 134 | 514 135 |
| 2 | 535 231 | 536 232 | 537 233 | 538 234 | 539 235 |
| 3 | 560 331 | 561 332 | 562 333 | 563 334 | 564 335 |
| 4 | 585 431 | 586 432 | 587 433 | 588 434 | 589 435 |
| 5 | 610 531 | 611 532 | 612 533 | 613 534 | 614 535 |
| 6 | 635 631 | 636 632 | 637 633 | 638 634 | 639 635 |
| 7 | 660 731 | 661 732 | 662 733 | 663 734 | 664 735 |
| 8 | 685 831 | 686 832 | 687 833 | 688 834 | 689 835 |
| 9 | 710 931 | 711 932 | 712 933 | 713 934 | 714 935 |
| 10 | 735 031 | 736 032 | 737 033 | 738 034 | 739 035 |

4TH FIVE

| LINE-LINK FRAME C | V16 | V17 | V18 | V19 | V20 |
|---|---|---|---|---|---|
| 1 | 515 141 | 516 142 | 517 143 | 518 144 | 519 145 |
| 2 | 540 241 | 541 242 | 542 243 | 543 244 | 544 245 |
| 3 | 565 341 | 566 342 | 567 343 | 568 344 | 569 345 |
| 4 | 590 441 | 591 442 | 592 443 | 593 444 | 594 445 |
| 5 | 615 541 | 616 542 | 617 543 | 618 544 | 619 545 |
| 6 | 640 641 | 641 642 | 642 643 | 643 644 | 644 645 |
| 7 | 665 741 | 666 742 | 667 743 | 668 744 | 669 745 |
| 8 | 690 841 | 691 842 | 692 843 | 693 844 | 694 845 |
| 9 | 715 941 | 716 942 | 717 943 | 718 944 | 719 945 |
| 10 | 740 041 | 741 042 | 742 043 | 743 044 | 744 045 |

5TH FIVE

| LINE-LINK FRAME C | V21 | V22 | V23 | V24 | V25 |
|---|---|---|---|---|---|
| 1 | 520 151 | 521 152 | 522 153 | 523 154 | 524 155 |
| 2 | 545 251 | 546 252 | 547 253 | 548 254 | 549 255 |
| 3 | 570 351 | 571 352 | 572 353 | 573 354 | 574 355 |
| 4 | 595 451 | 596 452 | 597 453 | 598 454 | 599 455 |
| 5 | 620 551 | 621 552 | 622 553 | 623 554 | 624 555 |
| 6 | 645 651 | 646 652 | 647 653 | 648 654 | 649 655 |
| 7 | 670 751 | 671 752 | 672 753 | 673 754 | 674 755 |
| 8 | 695 851 | 696 852 | 697 853 | 698 854 | 699 855 |
| 9 | 720 951 | 721 952 | 722 953 | 723 954 | 724 955 |
| 10 | 745 051 | 746 052 | 747 053 | 748 054 | 749 055 |

FIG. 21
PART 3

INVENTORS:
JOHN I. BELLAMY
THERON L. BOWSER
BY [signature]
ATTORNEY

PRIMARY-SECONDARY-SPREAD CROSSBAR TELEPHONE SYSTEM

1<sup></sup>

| LINE-LINK FRAME D | 1ST FIVE V1 | V2 | V3 | V4 | V5 |
|---|---|---|---|---|---|
| 1 | 750 111 | 751 112 | 752 113 | 753 114 | 754 115 |
| 2 | 775 211 | 776 212 | 777 213 | 778 214 | 779 215 |
| 3 | 800 311 | 801 312 | 802 313 | 803 314 | 804 315 |
| 4 | 825 411 | 826 412 | 827 413 | 828 414 | 829 415 |
| 5 | 850 511 | 851 512 | 852 513 | 853 514 | 854 515 |
| 6 | 875 611 | 876 612 | 877 613 | 878 614 | 879 615 |
| 7 | 900 711 | 901 712 | 902 713 | 903 714 | 904 715 |
| 8 | 925 811 | 926 812 | 927 813 | 928 814 | 929 815 |
| 9 | 950 911 | 951 912 | 952 913 | 953 914 | 954 915 |
| 10 | 975 011 | 976 012 | 977 013 | 978 014 | 979 015 |

| LINE-LINK FRAME D | 2ND FIVE V6 | V7 | V8 | V9 | V10 |
|---|---|---|---|---|---|
| 1 | 755 121 | 756 122 | 757 123 | 758 124 | 759 125 |
| 2 | 780 221 | 781 222 | 782 223 | 783 224 | 784 225 |
| 3 | 805 321 | 806 322 | 807 323 | 808 324 | 809 325 |
| 4 | 830 421 | 831 422 | 832 423 | 833 424 | 834 425 |
| 5 | 855 521 | 856 522 | 857 523 | 858 524 | 859 525 |
| 6 | 880 621 | 881 622 | 882 623 | 883 624 | 884 625 |
| 7 | 905 721 | 906 722 | 907 723 | 908 724 | 909 725 |
| 8 | 930 821 | 931 822 | 932 823 | 933 824 | 934 825 |
| 9 | 955 921 | 956 922 | 957 923 | 958 924 | 959 925 |
| 10 | 980 021 | 981 022 | 982 023 | 983 024 | 984 025 |

| LINE-LINK FRAME D | 3RD FIVE V11 | V12 | V13 | V14 | V15 |
|---|---|---|---|---|---|
| 1 | 760 131 | 761 132 | 762 133 | 763 134 | 764 135 |
| 2 | 785 231 | 786 232 | 787 233 | 788 234 | 789 235 |
| 3 | 810 331 | 811 332 | 812 333 | 813 334 | 814 335 |
| 4 | 835 431 | 836 432 | 837 433 | 838 434 | 839 435 |
| 5 | 860 531 | 861 532 | 862 533 | 863 534 | 864 535 |
| 6 | 885 631 | 886 632 | 887 633 | 888 634 | 889 635 |
| 7 | 910 731 | 911 732 | 912 733 | 913 734 | 914 735 |
| 8 | 935 831 | 936 832 | 937 833 | 938 834 | 939 835 |
| 9 | 960 931 | 961 932 | 962 933 | 963 934 | 964 935 |
| 10 | 985 031 | 986 032 | 987 033 | 988 034 | 989 035 |

| LINE-LINK FRAME D | 4TH FIVE V16 | V17 | V18 | V19 | V20 |
|---|---|---|---|---|---|
| 1 | 765 141 | 766 142 | 767 143 | 768 144 | 769 145 |
| 2 | 790 241 | 791 242 | 792 243 | 793 244 | 794 245 |
| 3 | 815 341 | 816 342 | 817 343 | 818 344 | 819 345 |
| 4 | 840 441 | 841 442 | 842 443 | 843 444 | 844 445 |
| 5 | 865 541 | 866 542 | 867 543 | 868 544 | 869 545 |
| 6 | 890 641 | 891 642 | 892 643 | 893 644 | 894 645 |
| 7 | 915 741 | 916 742 | 917 743 | 918 744 | 919 745 |
| 8 | 940 841 | 941 842 | 942 843 | 943 844 | 944 845 |
| 9 | 965 941 | 966 942 | 967 943 | 968 944 | 969 945 |
| 10 | 990 041 | 991 042 | 992 043 | 993 044 | 994 045 |

| LINE-LINK FRAME D | 5TH FIVE V21 | V22 | V23 | V24 | V25 |
|---|---|---|---|---|---|
| 1 | 770 151 | 771 152 | 772 153 | 773 154 | 774 155 |
| 2 | 795 251 | 796 252 | 797 253 | 798 254 | 799 255 |
| 3 | 820 351 | 821 352 | 822 353 | 823 354 | 824 355 |
| 4 | 845 451 | 846 452 | 847 453 | 848 454 | 849 455 |
| 5 | 870 551 | 871 552 | 872 553 | 873 554 | 874 555 |
| 6 | 895 651 | 896 652 | 897 653 | 898 654 | 899 655 |
| 7 | 920 751 | 921 752 | 922 753 | 923 754 | 924 755 |
| 8 | 945 851 | 946 852 | 947 853 | 948 854 | 949 855 |
| 9 | 970 951 | 971 952 | 972 953 | 973 954 | 974 955 |
| 10 | 995 051 | 996 052 | 997 053 | 998 054 | 999 055 |

1000 LINE NOS.,000 TO 999 & THEIR TRANSLATED EQUIVALENTS, A111 TO D055

FIG. 21 PART 4

INVENTORS:
JOHN I. BELLAMY
THERON L. BOWSER
BY [signature]
ATTORNEY

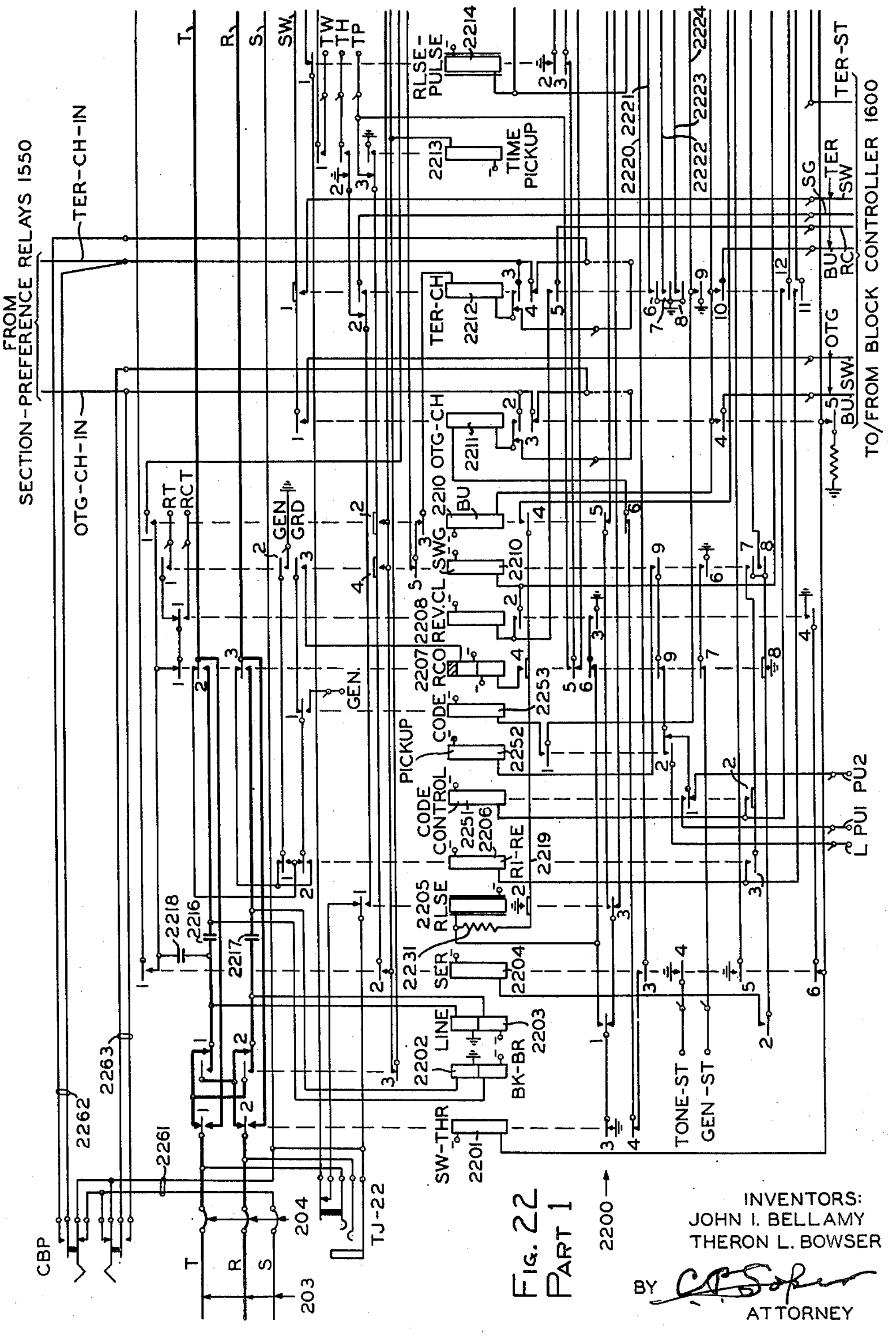
FIG. 22 PART 1
INVENTORS:
JOHN I. BELLAMY
THERON L. BOWSER
BY C. P. Soper
ATTORNEY PRIMARY-SECONDARY-SPREAD CROSSBAR TELEPHONE SYSTEM
Filed April 4, 1949 55 Sheets-Sheet 54
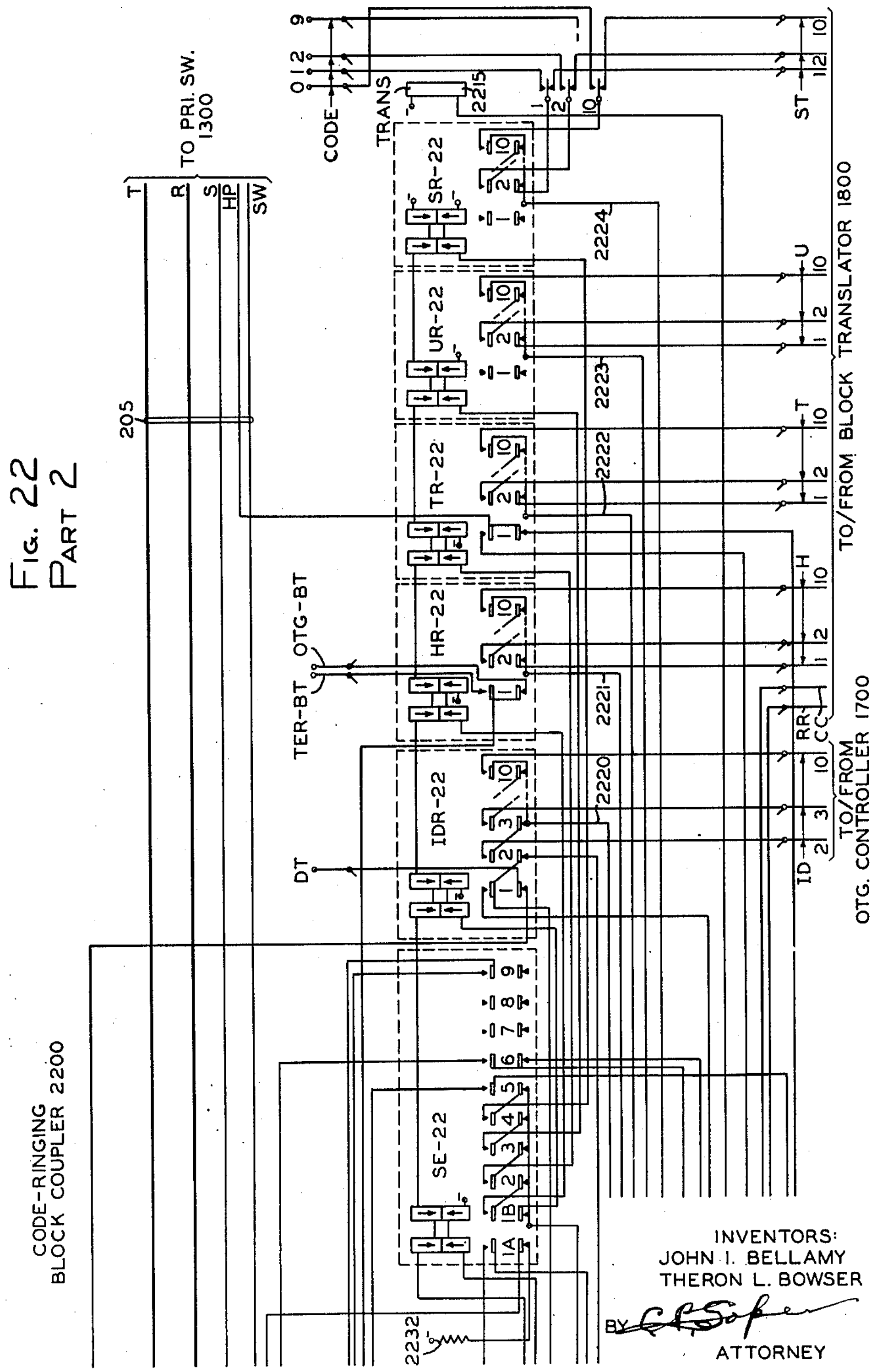
FIG. 22 PART 2
INVENTORS:
JOHN I. BELLAMY
THERON L. BOWSER
BY [signature]
ATTORNEY April 6, 1954 J. I. BELLAMY ET AL 2,674,657

PRIMARY-SECONDARY-SPREAD CROSSBAR TELEPHONE SYSTEM

Filed April 4, 1949 55 Sheets-Sheet 55

INVENTORS:
JOHN I. BELLAMY
THERON L. BOWSER
BY [signature]
ATTORNEY

Patented Apr. 6, 1954 2,674,657

UNITED STATES PATENT OFFICE 2,674,657

PRIMARY-SECONDARY-SPREAD CROSSBAR TELEPHONE SYSTEM

John I. Bellamy, Wheaton, Ill., and Theron L. Bowser, Englewood, Colo.; said Theron L. Bowser, now by change of name Theron L. Bowers, assignors, by mesne assignments, to International Telephone and Telegraph Corporation, a corporation of Maryland Application April 4, 1949, Serial No. 85,292

75 Claims. (Cl. 179—22)

This invention relates to a primary-secondary-spread crossbar telephone system. Its principal object is to provide an economical switching and switch-control arrangement for a telephone system serving a definite number block of subscriber lines comprising subdivisions of consecutively numbered lines, there being separate groups of primary-secondary-spread crossbar switches for the respective subdivisions, and a common group of primary-secondary-spread crossbar switches having access to each such separate group.

I. *General description*

In the illustrated embodiment, the primary and secondary crossbar switches of any group serving a separate subdivision of lines are interconnected by line links containing the primary-secondary-spread for the group of switches. Such crossbar switches, together with their related control apparatus, are mounted on a frame termed the line-link frame. These crossbar switches are termed line-link primary and line-link secondary switches.

The primary and secondary crossbar switches of the common group are interconnected by block links containing the primary-secondary-spread for the common group. Such common crossbar switches, together with their related control apparatus, are mounted on a frame termed the block-link frame. These switches are termed block-link primary and block-link secondary switches.

IA. *The crossbar switches*

In the illustrated embodiment, the crossbar switches are assumed to be of the type disclosed in the co-pending application of R. P. Arthur, Serial Number 8,900, filed February 17, 1948, now Patent No. 2,577,067, issued December 4, 1951. Basically, a crossbar switch of this type provides for ten horizontal connections therethrough (represented respectively by the ten horizontal rows of selective contact sets), and provides for a desired number of vertical connections therethrough (represented respectively by the intersecting vertical rows of contact sets).

IB. *Line-link frames*

An object of the invention is to provide an arrangement wherein the number of line-link frames (or subdivisions of the number block) is so chosen with reference to a practical size and arrangement of the line-link primary switches and of the line-link secondary switches that each line-link frame serves a relatively large number of lines, making a comparatively efficient use of the groups of originating trunks and terminating trunks, employed to handle calls respectively to and from the lines served by a line-link frame.

In the illustrated embodiment, the definite number block referred to comprises one thousand three-digit numbers (000 to 999), which may be assigned respectively to one thousand subscriber lines. The one thousand lines of the number block are arranged in four 250-line subdivisions, each served by a separate one of four line-link frames designated as frame A to frame D. Line-link frame A serves lines 000 to 249; frame B serves lines 250 to 499; frame C serves lines 500 to 749; and frame D serves lines 750 to 999.

The 250 lines served by a line-link frame are divided into ten groups of twenty-five, which are served by respective ones of ten primary switches. Traffic observations have established that ten two-way links (represented respectively by the ten horizontal connections through a crossbar switch) can adequately serve close to thirty average subscriber lines. Twenty-five was then chosen as the number of lines to be served by a line-link primary switch since a standard ten by ten spread between primary and secondary switches encompasses ten primary switches, and since 250 (ten times twenty-five) is a sub-multiple of one thousand, the size of the chosen number block.

Functionally, ten secondary switches are required in a standard ten by ten spread with the ten primary switches. It is a feature of the invention that only five line-link secondary switches are employed to provide the essential functions of ten. Each such secondary switch is arranged to serve effectively as two switches by splitting the horizontal bank multiple at the midpoint to provide two sections each having its own set of ten horizontal connecting paths. Advantages of this arrangement are that (1) five larger (longer) secondary switches mount more compactly and efficiently than ten shorter ones; and that (2) the number of secondary-switch frames, shafts, and select magnets is halved.

At the secondary end, the one hundred line-links are terminated on the horizontals of the ten secondary sections, ten links to a section. At each section, certain of the verticals serve as connecting points for originating trunks, and the remainder serve as connecting points for terminating trunks.

IB1. *Line-controller apparatus*

It is an object of the invention to provide any line-link frame with efficient and reliable line-controller apparatus capable of being economically produced. This apparatus includes a line controller and associated connecting apparatus. It must be capable of handling calls to and from the associated lines, and the calls must be handled on a one-at-a-time basis in order to simplify controlling the crossbar switches in their mechanical selection of line links, and to avoid confusion during the extension of connections.

It is a feature of the invention that the primary and secondary select magnets on the line-link frame are serially related in a spread pattern corresponding to the line-link spread, thereby rendering it unnecessary to associate the line-controller apparatus specifically with any secondary switch.

It is a further feature that crossbar-switching apparatus (two line-controller switches in the illustrated embodiment) is used as the noted associated connecting apparatus to individualize the line controller with the line-link primary switch serving a calling line or a called line, and with the ten line links thereof, and to assist in individualizing the line controller with the concerned calling line or called line. These line-controller crossbar switches perform their noted connecting functions by the use of a minimum amount of systematized contact and electromagnet apparatus, as compared to prior arrangements of individual relays employed for generally similar functions.

A feature of the line controller is that relay apparatus (a units chain) is employed to make a final selection among five lines selected by the line-controller switches, thereby simplifying the line-selecting function of the line-controller switches to selecting the group of five lines containing the calling or the called line.

In the illustrated embodiment, the line controller comprises an organization of control relays. It may be considered as an improvement on, and an adaptation of, the line controller disclosed in the patent to J. I. Bellamy, No. 2,443,945, issued June 22, 1948. Features of improvement over such prior line controller include the following:

1. The line controller includes control chains (originating-primary, terminating- primary, and fives chains) for controlling the line-controller switches, and the above-noted units chain cooperating therewith.

2. The line controller goes through its normal full cycle of operations to extend a calling line over a matched path to an idle originating trunk subject to the sleeve wire of the calling line being intact. As will later appear, this provision assists in enabling the line controller to be arranged to avoid undergoing an indefinite number of successive attempts to extend a line which cannot be successfully extended.

3. An improved cycle-timer is employed wherein the relays must operate sequentially to condition them for restoring sequentially, thereby simplifying the circuit arrangement; extending the cycle time of a given number of cycle-timer relays, and rendering the previous employment of a slow-operating start relay unnecessary.

4. The total number of originating trunks to be tested incidental to extending a calling line is divided into groups which are called in one after another until an available idle trunk is found in one of them, thereby greatly reducing the number of trunk-test relays required. A totalizing device is employed for terminating the testing operation when all of the trunk groups have been called in and tested.

5. The choice allotter is arranged to shift the choice successively among (1) the secondary sections, (2) the primary switches, and (3) the fives groups of lines on a primary switch, thereby distributing the originating-trunk load more evenly among the secondary sections, and rendering it less likely that calls from any selected line will be precluded by defects which may develop at a primary switch, or within a fives group of the lines served thereby.

Additional features of the apparatus on the line-link frame will appear as the description progresses.

IC. *The block-link frame*

A further object of the invention is to render economies in switching apparatus possible, and to render the service more flexible, by delaying the extension of the connection across the block-link frame until all digits indexing the called line have been dialed, and then selecting an idle and available terminating trunk extending to the called line-link frame, subject to that terminating trunk being one which can be extended across the line-link frame to the called line by way of an idle line link. This delayed control arrangement gives rise to the following advantages.

1. By selecting a terminating trunk subject to its being one which can be extended to the desired called line by way of an idle line link, the apparatus on the block-link frame, in addition to selecting the desired trunk group and an idle terminating trunk therein, renders otherwise-required tertiary switching apparatus unnecessary on the line-link frames. Such tertiary apparatus is termed "distributors" in the Bellamy patent previously cited.

2. By withholding selection of a path toward the called line until all line digits have been dialed, the subdivision of the number block of lines need not be in accordance with any power of ten (of which the second power, or 100, would be the only useful one) permitting subdivision into the larger and more economical 250-line groups referred to.

3. An additional advantage is that only one set of bridging (battery feed) and related control relays need be employed for any connection, rather than requiring duplication of such relays at each of the two frames through which the connections pass.

4. An additional advantage of the delayed control arrangement being discussed is that it renders feasible certain arrangements hereinafter described in detail for handling intercept service, number-transfer service, and common-number service at a single point, treating the lines of all line-link frames as a single group.

A further object is to adapt the block of switching equipment to serve as a complete telephone exchange interconnected with other exchanges by tie trunks arranged and grouped as required. This is accomplished in the illustrated embodiment by (1) extending incoming tie trunks (or the incoming branches of two-way trunks) to the incoming side of the block-link frame, and by (2) extending outgoing tie trunks (or the outgoing branches of two-way trunks)

from the outgoing side of the block-link frame to desired other exchanges.

In the illustrated embodiment, the initial digit dialed is employed to select between exchanges. The initial digit 1, being likely to be inadvertently simulated as is well known, is arranged to be absorbed, leaving nine initial-digit values (2 to 9, and 0) available for assignment as exchange digits. One of these values of the initial digit is used to index the local 1000-line exchange, leaving eight initial-digit values available for assignment to other exchanges reached directly from the local exchange.

The dialing of the initial digit assigned to the local exchange causes no immediate switching operation to occur on the block-link frame (such operation being delayed as stated until all line-designating digits have been dialed), but the dialing of an initial digit assigned to any other exchange causes an immediate switching operation to occur on the block-link frame to extend a connection over an idle trunk line to the called exchange.

A further object of the invention is to provide controlling arrangements which enable the cross-bar switches on the block-link frame to extend a connection to an idle outgoing trunk well within the normal inter-digital interval occurring during dialing, whereby the calling subscriber can continue dialing uninterruptedly in the event that the called exchange is provided with an automatic switchboard which stands ready to accept dial pulses received over the last-named trunk line.

In the illustrated embodiment, the noted prompt extension of outgoing calls through the block-link frame is rendered feasible by an arrangement hereinafter described for giving outgoing calls preference over locally terminated calls, setting aside control operations on the block-link frame related to the completion of locally terminated calls.

In the illustrated embodiment, the full equipment on the block-link frame includes ten block-link primary switches and ten block-link secondary switches interconnected horizontal-to-horizontal by one hundred pairs of block links, ten pairs to each switch. The two hundred block links thus obtained are ample to handle busy-hour traffic in excess of the maximum probable requirements.

Each primary switch and each secondary switch on the block-link frame has twenty verticals (for twenty trunk connections with the frame) and has ten double-path horizontals, each accommodating a separate pair of the block links.

The originating trunks incoming from the line-link frames correspond respectively to verticals on the block-link primary switches. The incoming tie trunks (or the incoming branches of two-way trunks) are assigned respectively to other verticals on the block-link primary switches.

The two hundred primary verticals provided on the fully equipped block-link frame (twenty verticals per block-link primary switch) can accommodate 160 originating trunks (forty per line-link frame) and forty incoming trunks.

The two hundred secondary verticals on the block-link frame (twenty per block-link secondary switch) serve as connecting points for 160 terminating trunks (forty per link-link frame) and forty outgoing trunks.

In the illustrated embodiment, the first sixteen verticals on any block-link secondary switch are employed respectively as connecting points from which terminating trunks extend; the last four verticals on any such switch serve as connecting points for respective outgoing trunks.

IC1. *The block couplers*

Each trunk (originating and incoming) extending to the block-link frame has a block coupler inserted between it and its assigned vertical on a block-link primary switch. Each block coupler includes sufficient apparatus to couple the associated originating or incoming trunk to the switchboard apparatus on the block-link frame incidental to controlling the switching apparatus in the extension of connections responsive to the dialing of called numbers, to supply talking current to the called line and ringing current and talking current to the called line, and to perform the related circuit functions required of trunk equipment in an exchange of the character under discussion.

Each block coupler includes a number of control relays, a sequence device operable step-by-step as the dialed digits are received, together with registers for recording the respective dialed digits. These registers include an initial-digit register, registers for the hundreds, tens, and units digits, respectively, and a register for a station digit dialed following the dialing of the units digit.

Features of the invention residing in or involving the block couplers include the following:

1. In order to avoid confusion in the extension of connections across the block-link frame, the block couplers must be associated with common apparatus on the frame only one at a time. Preference relay chains are employed for this purpose. Each block coupler is included in two alternative chains which are used respectively according to whether an outgoing trunk group or a local line is being called. This double-chain arrangement is employed as a part of the previously-described arrangement for giving outgoing calls the preference over calls to local lines.

2. The block couplers are considered in sections, a section comprising those assigned to the same primary switch. Considering either the local chain or the outgoing chain of the block couplers, such chain has a main portion (comprising a section-preference chain), from which branches extend to the respective chains of the block-coupler sections. This arrangement enables the common apparatus to readily identify the block-link primary switch which must be used for a connection being extended, and has the advantage that an inadvertent open-circuit condition of the chain at any one section of block couplers leaves the common chain and its remaining branches intact.

3. The block coupler absorbs the initial digit 1 whenever dialed; it calls in the common apparatus of the block-link frame upon the dialing of an initial digit indexing an outgoing group of trunks; and it calls in the common apparatus of the block-link frame only after all digits of the number of a local line have been dialed.

4. Spare steps on the sequence device are employed as an aid in timing conversations, thereby considerably reducing and simplifying the remaining timing and control apparatus employed for this purpose.

Additional features of the block coupler will appear as the description progresses.

IC2. *Common control equipment on the block-link frame*

It is a further object of the invention to provide the block-link frame with efficient common control equipment which takes information from the block couplers and extends connections across the block-link frame according thereto, cooperating with the line controllers in extending calls through the line-link frames to the local lines. This common control equipment includes the following:

1. A "block-controller switch" (generally similar to either line-controller switch, and controlled from either preference chain of the block couplers), for making the required connections with the block-link primary switch serving the block coupler which has called in the common apparatus;

2. A "block controller," which (like the block-controller switch) is called in on all calls whether outgoing or locally terminated. The block controller has general supervision over the extension of connections. On outgoing calls, it matches an idle path across the block-link frame from the concerned primary switch, over an idle block link, to an outgoing trunk in the called group. On terminating calls, it cooperates with the line controller on the concerned line-link frame to match a path to the called line by way of the concerned block-link primary switch, an idle block link, an idle terminating trunk leading to the concerned line-link frame, and an idle line link accessible therefrom and leading to the line-link primary switch serving the called line;

3. A "block translator" (employed only on locally terminated calls), which translates the hundreds, tens, and units digit information of the called number into primary, fives, and units information, usable on the line-link frame serving the called 250-line group; and 4. An "outgoing controller," which accepts the initial digit information received from a block coupler on an outgoing call and sets up circuit conditions for the called group of trunks, showing which are busy and which are idle.

The block translator, the outgoing controller, and the block controller each consists largely of a group of relays interconnected to perform their respective functions, including the general ones indicated above.

IC2*a*. *Block-translator features*

A special feature of the block translator is that, while it is arranged and interconnected to normally effect a translation of the line digits of the called number according to the fixed locations of the respective line terminations on the line-link frames, it is provided with jumper fields and associated relay apparatus enabling it to set aside the fixed translation as required and to substitute another translation, which will extend the connection to a different line on the same line-link frame, or to a line on any other line-link frame, as required. This arrangement on the block translator gives rise to the following features:

1. When desired, the number assigned to a line terminated at one location on a line-link frame may be transferred to a line terminated at any other location on any one of the line-link frames. The outstanding utility of this feature is that traffic unbalance among the several primary switches on a line-link frame may be corrected without changing line numbers, such correction comprising interchanging high-traffic lines terminated at a given line-link primary switch with low-traffic lines terminated on other line-link primary switches. Service according to this feature is referred to as number-transfer service.

2. Common-number groups of lines may be provided as desired. On the receipt of the number assigned to a common-number group of lines, the translator cancels the fixed translation for that number; calls in the sleeves of the lines of the common-number group for test and selects an idle one of them; and sets up a new translation corresponding to the frame location, and to the primary, fives, and units location of the selected line on the concerned line-link frame. Service according to this feature is referred to as common-number service.

3. Calls to disconnected lines as well as calls to disconnected stations on party lines are detected by the translator (through appropriate jumper connections therein) whereupon the translator cancels the fixed translation respecting any such call and substitutes a translation to route the call to an intercept operator. It is a special aspect of this feature that the substituted translation is varied to coincide with the positional location of a line found by the translator to be idle among a group of lines serving the intercept operator. Service according to this feature is referred to as intercept service.

IC2*b*. *Block-controller features*

Features of the block controller include the following:

1. While it ordinarily permits interruption of the control operations preparatory to the extension of a connection to a called local line to give priority to an outgoing call which must be completed during the normal inter-digital interval, the block controller prevents interruption of the said operations when attempted during the critical period existing just as the hold magnets of the crossbar switches are being operated in the process of final completion of a connection to a local line, thereby avoiding operational confusion which might result either in a local call being lost or in a double extension thereof.

2. On a call to a local line of the exchange, the block controller closes operating circuits for the primary and secondary switches on the block-link frame and on the called line-link frame subject to the receipt of off-normal information from each of the two frames indicating that the matched link on each frame has been selected mechanically at the concerned crossbar switches thereon.

3. The block controller calls in the terminating trunks leading to a called line-link frame by groups, generally in accordance with a corresponding feature of the line controller with respect to originating trunks. On each call-in of terminating trunks, however, such trunks are presented for test in a separate respective correspondence to the pairs of block links extending from the concerned block-link primary switch to the block-link secondary switch, in accordance with the spread variation occurring in the terminating trunks with respect to the separate call-in groups thereof.

IC2*c*. *Outgoing-controller features*

1. A feature of the outgoing controller is that it includes test relays corresponding respectively to the outgoing tie trunks (four from each block-link secondary switch) together with contact groups controlled respectively by initial digit relays, and jumper facilities enabling any test relay to be interconnected with any said contact group to thereby become operated responsive to the dialing of the corresponding initial digit. This provision cooperates with contact arrangements controlled by said test relays to enable the trunk extending from any physical location on the block-link frame to be placed in the trunk group to which any initial digit is assigned. The same standard switchboard arrangement is thereby enabled to serve for a wide variety of specifically different requirements as to the number of groups of outgoing trunks, and as to the respective number of trunks in such groups.

2. On the dialing of an unassigned initial digit, the common apparatus on the block-link frame treats the occurrence as though an outgoing trunk group had been called. On being notified by the outgoing controller that no idle path can be matched across the block-link frame to the called (non-existing) trunk group, the block controller transmits a signal which causes the block coupler in use to place a busy tone on the calling line to indicate that the attempted connection cannot be completed. This feature, in cooperation with the immediately preceding one enables the block couplers to be wired in the same standard manner for a large number of situations involving the use of different combinations of used and unused initial digits.

Additional features of the control apparatus on the block-link frame will appear as the description progresses.

ID. *The drawings*

The accompanying drawings, comprising Figs. 1 to 37, disclose a preferred embodiment of the invention as follows:

Fig. 3 (parts 1 to 4) is a complete single-line trunking diagram showing the relationship between the crossbar switches employed to extend connections to and from lines and trunks of exchange B of Figs. 1 and 2;

Figures 1, 2:
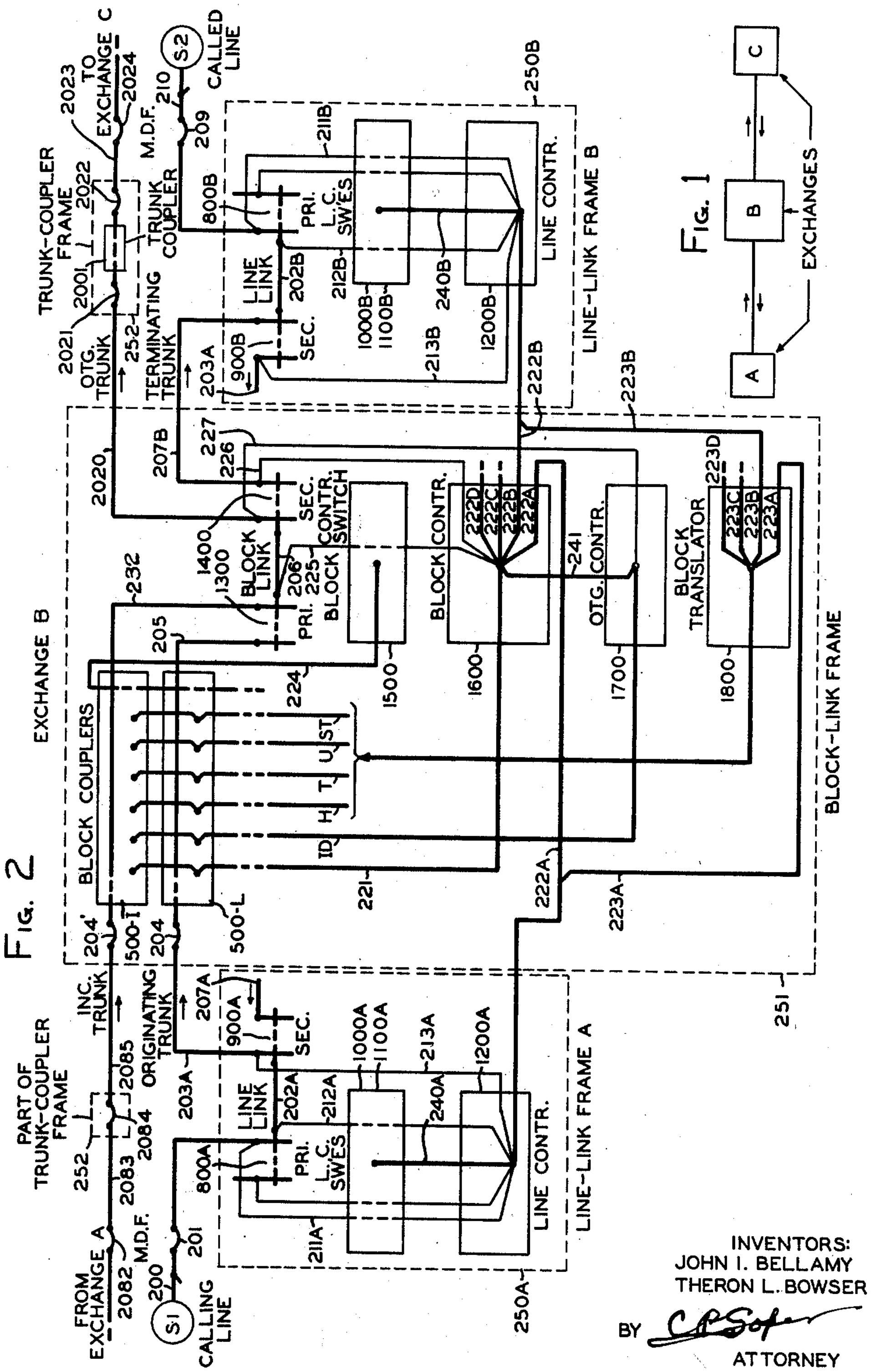
Fig. 1 shows three interconnected telephone exchanges A, B, and C, of which exchange B contains telephone switchboard apparatus embodying the features of the invention.
Fig. 2 is a single-line block diagram of apparatus in exchange B which is employed in extending connections to and from lines of the exchange and in extending connections to and from trunks interconnecting exchange B with exchanges A and C.
Figure 4:
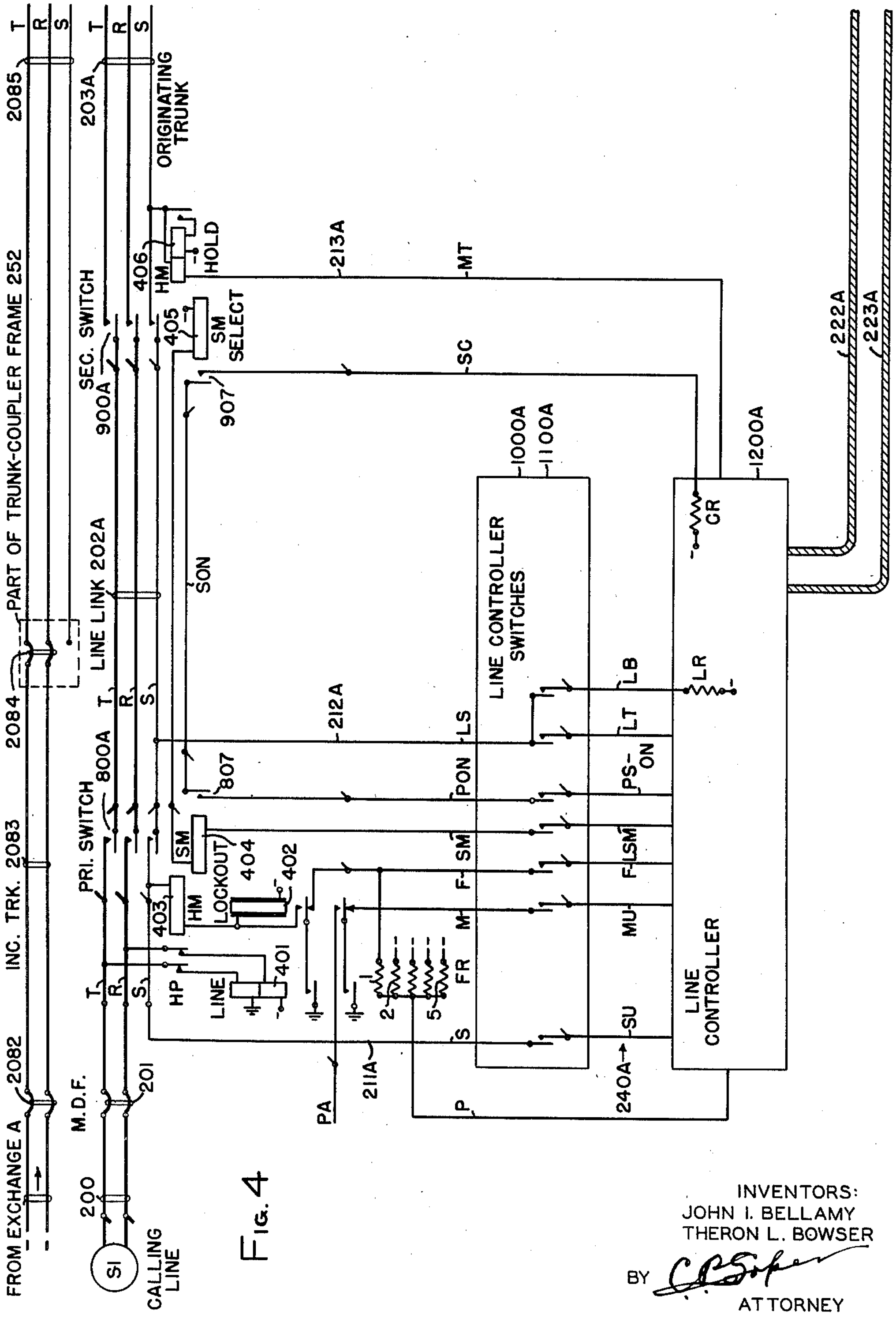
Figure 6:
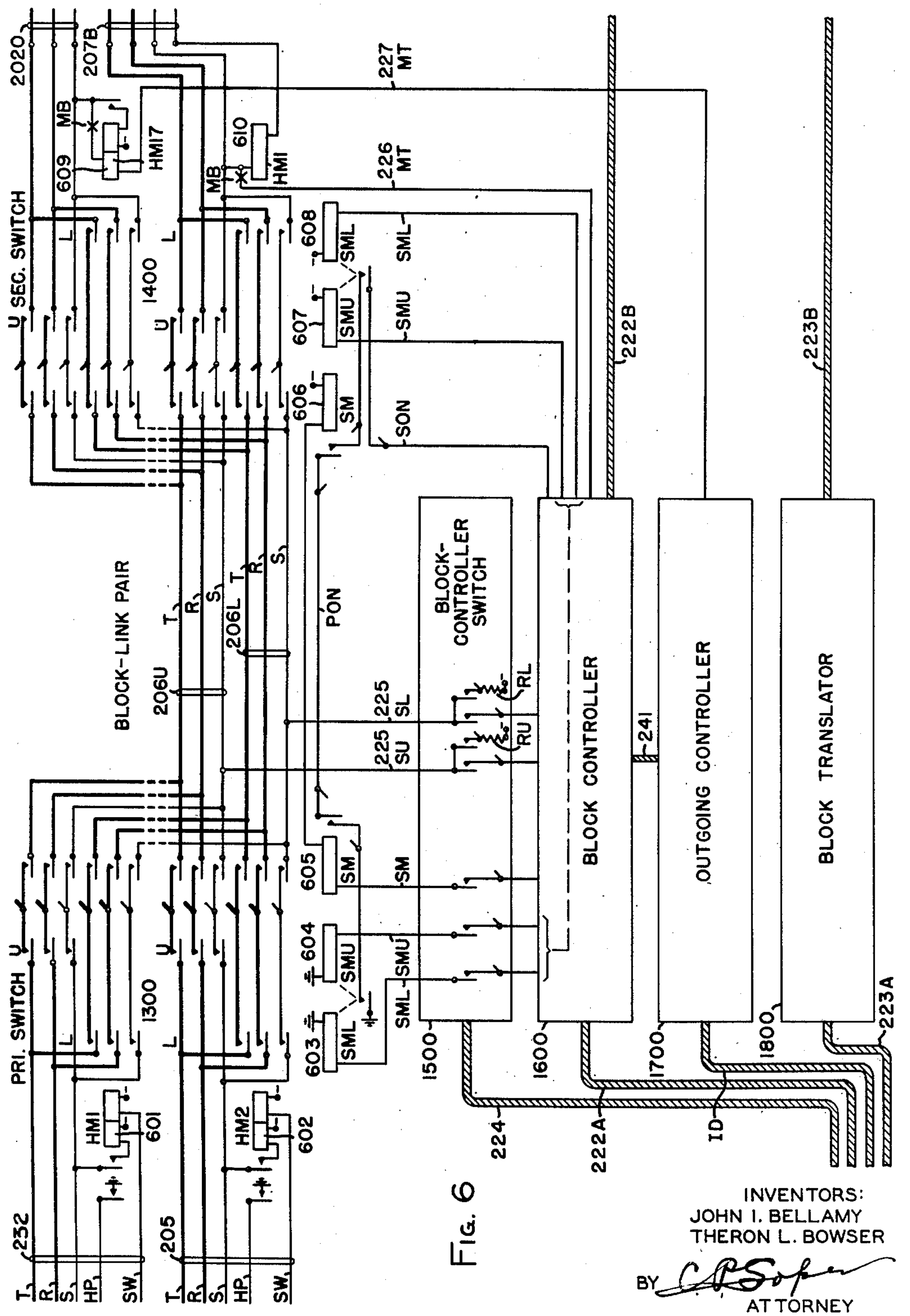
Figure 7:
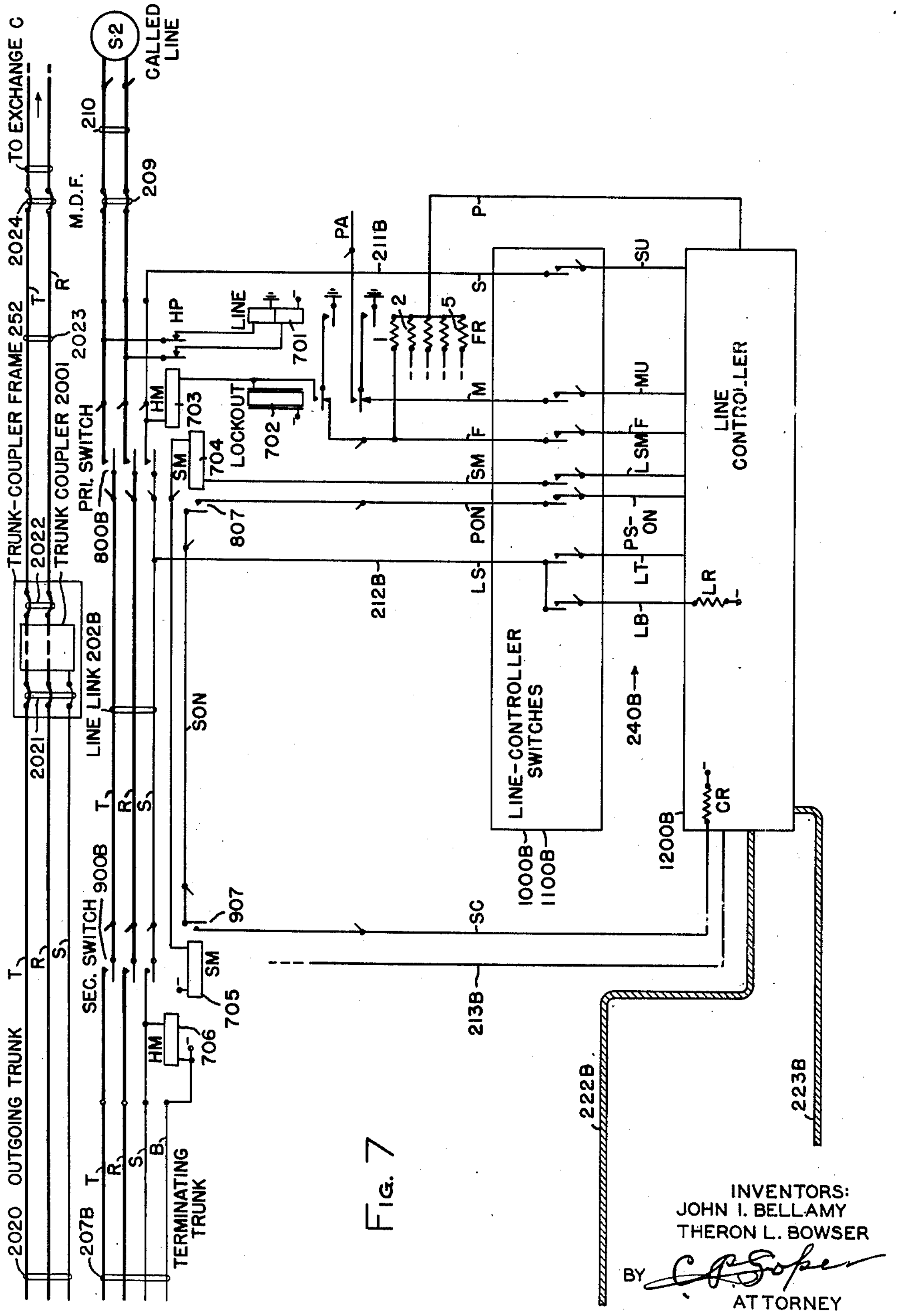
Figure 8:
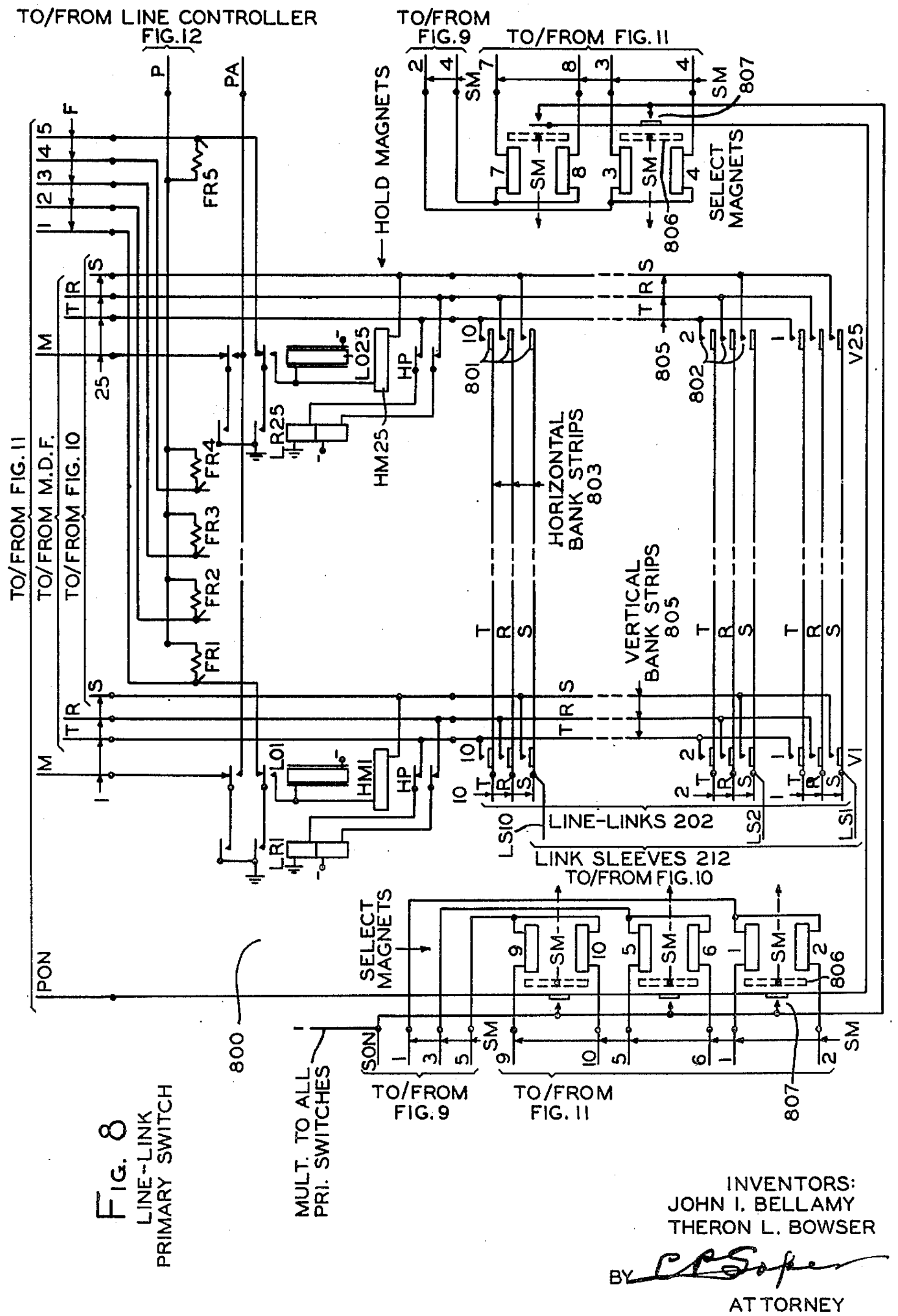
Figure 9:
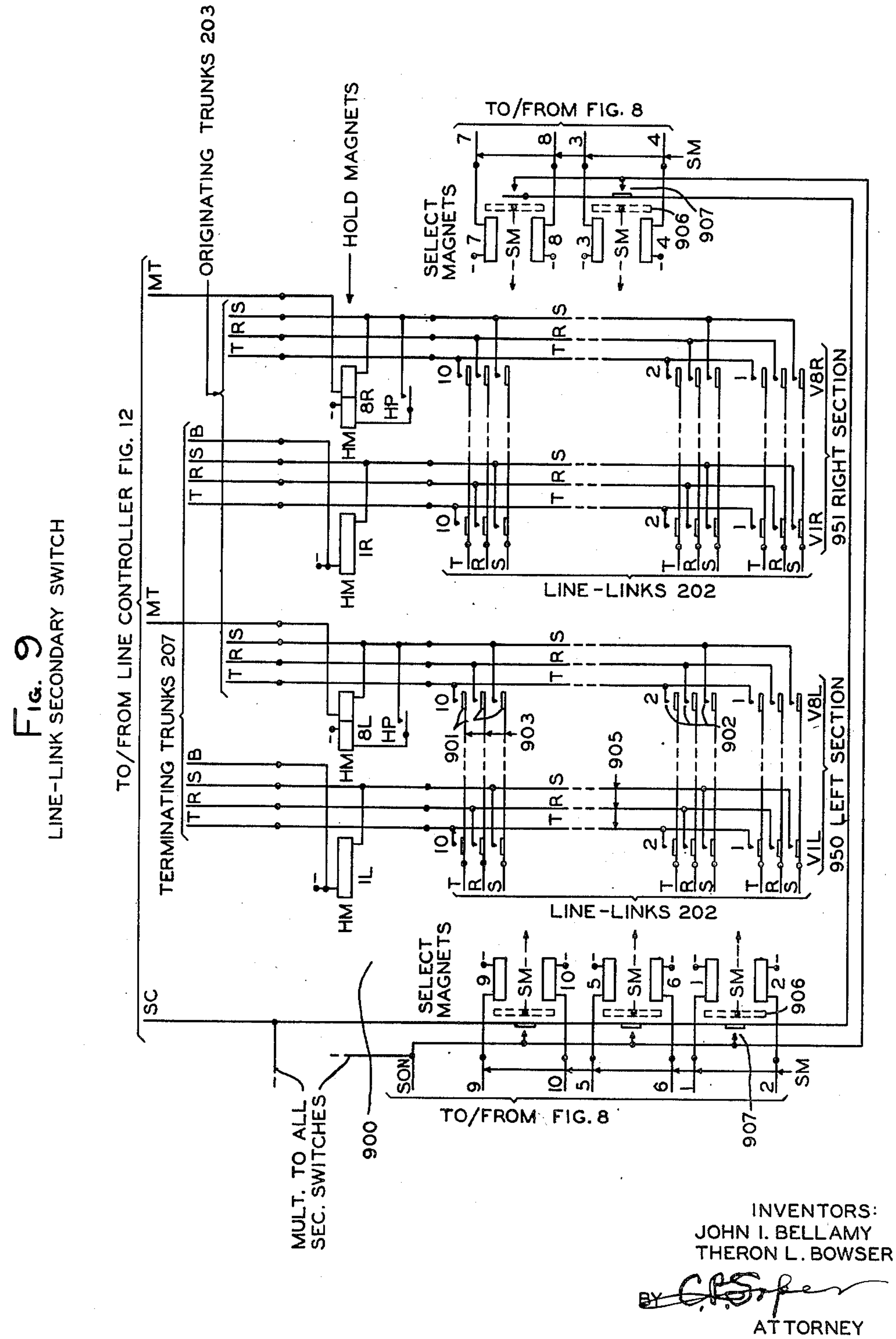
Figure 14:
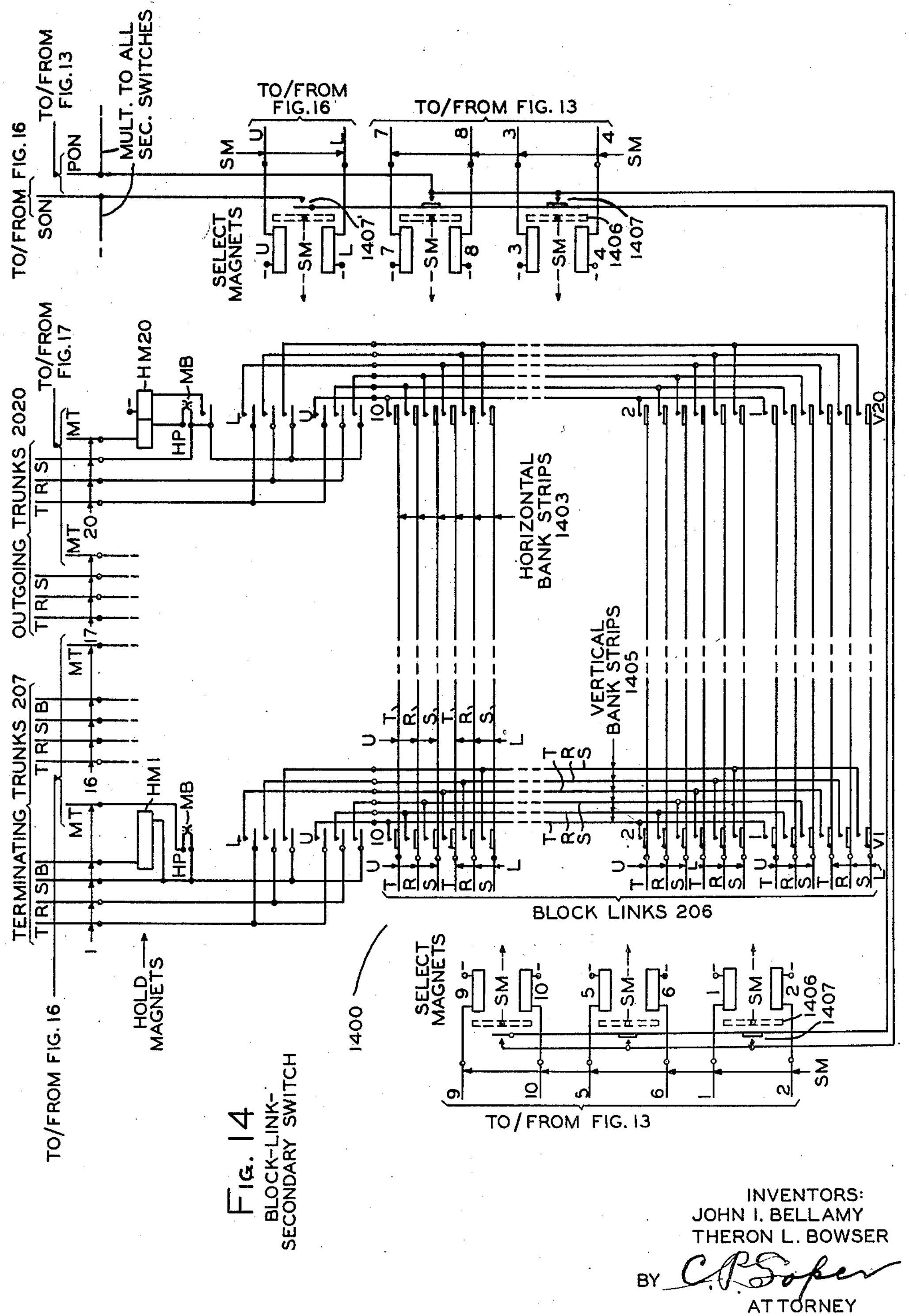
Figure 19:
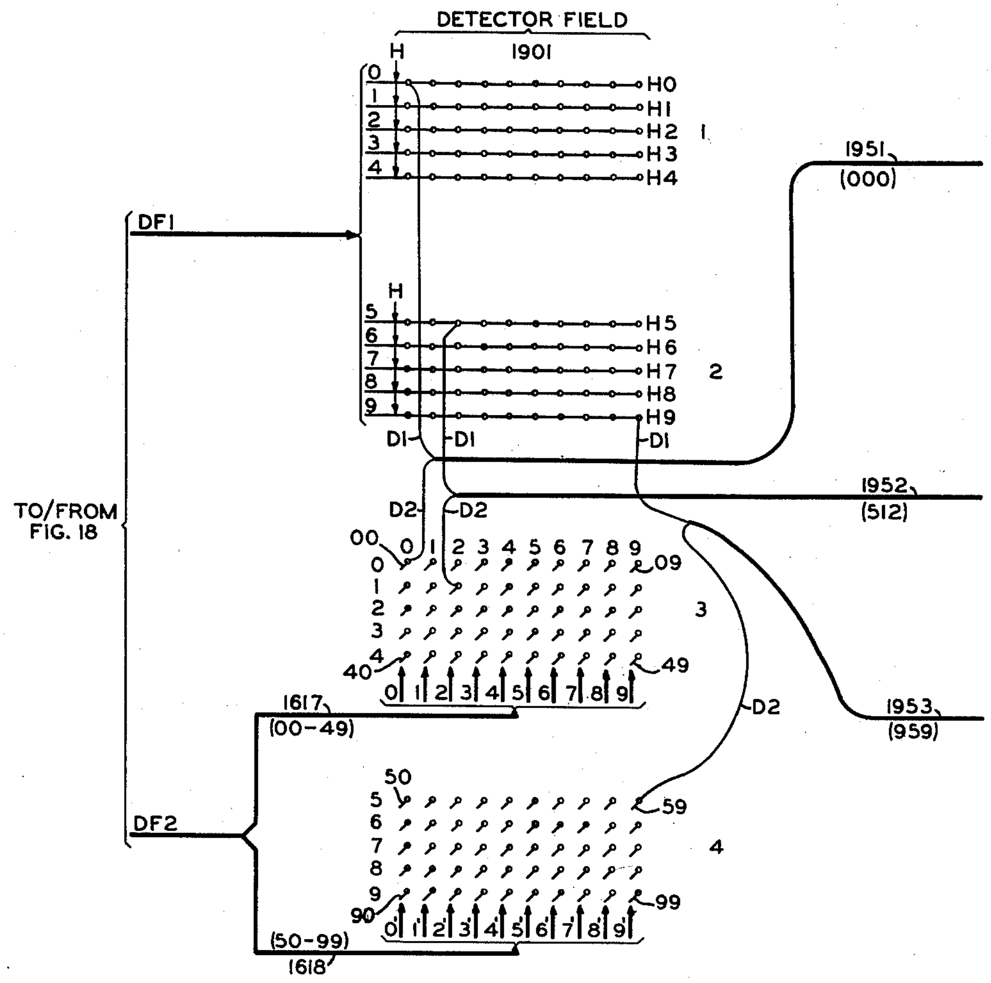
Figure 19:
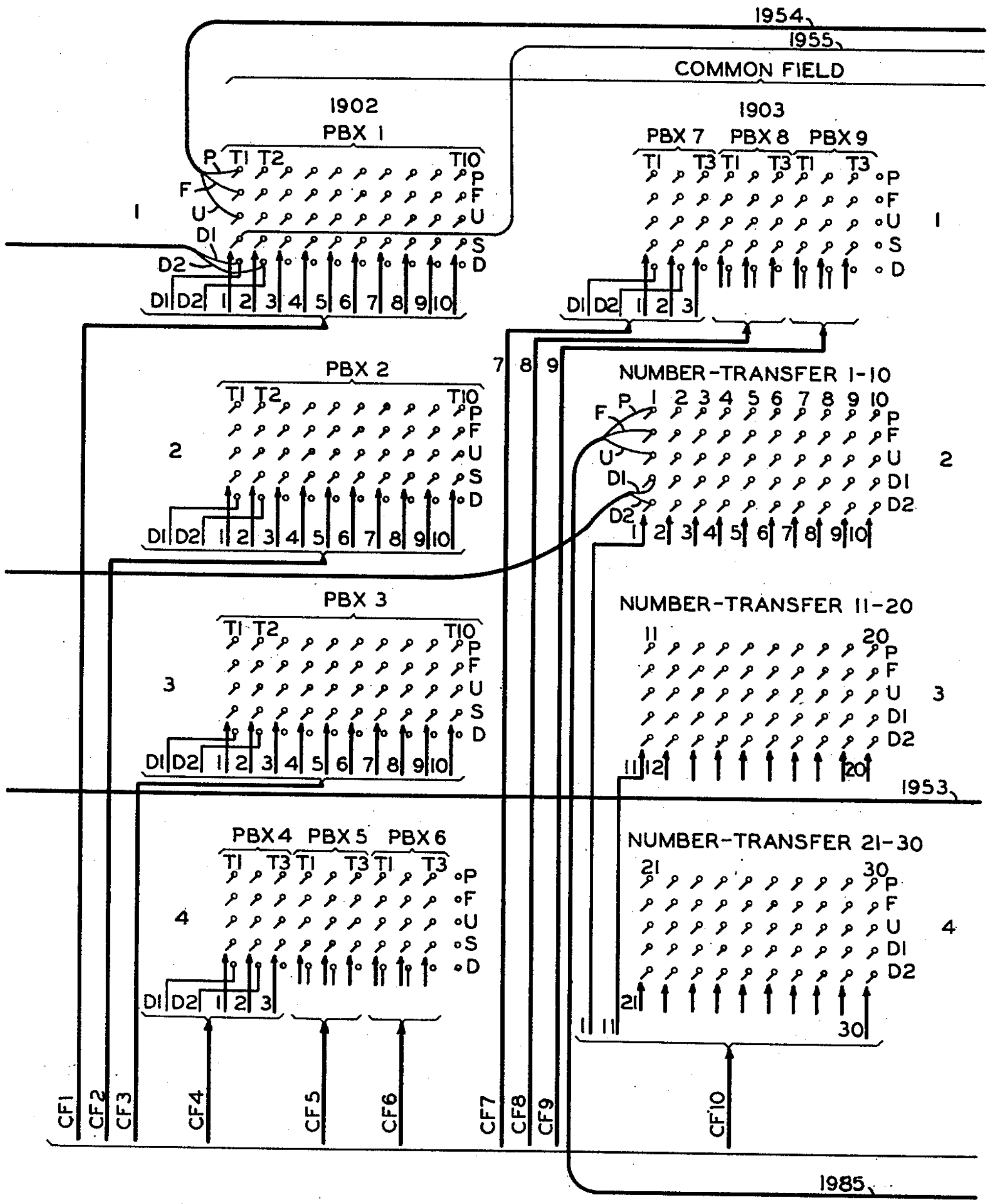
Figure 19:
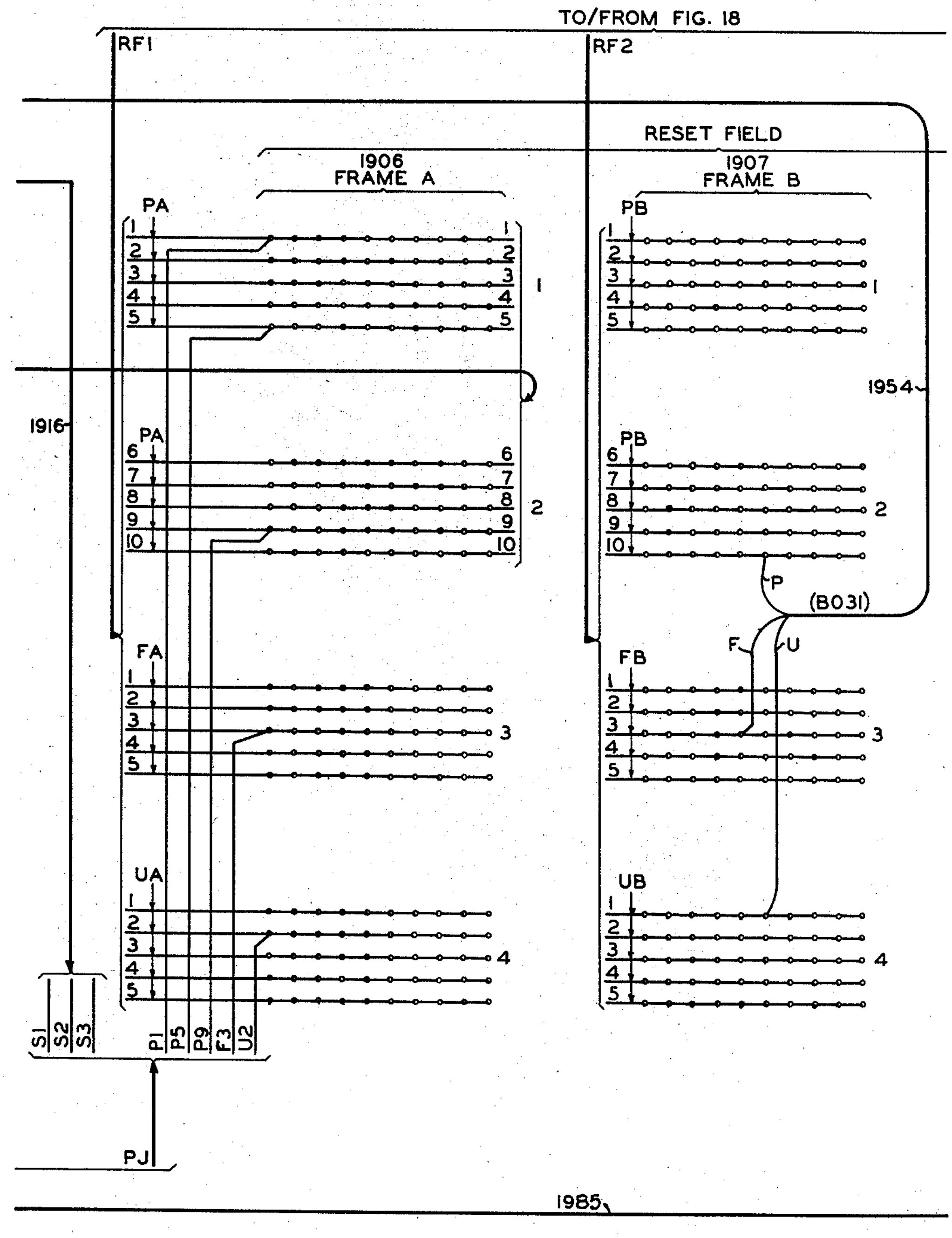
Figure 19:
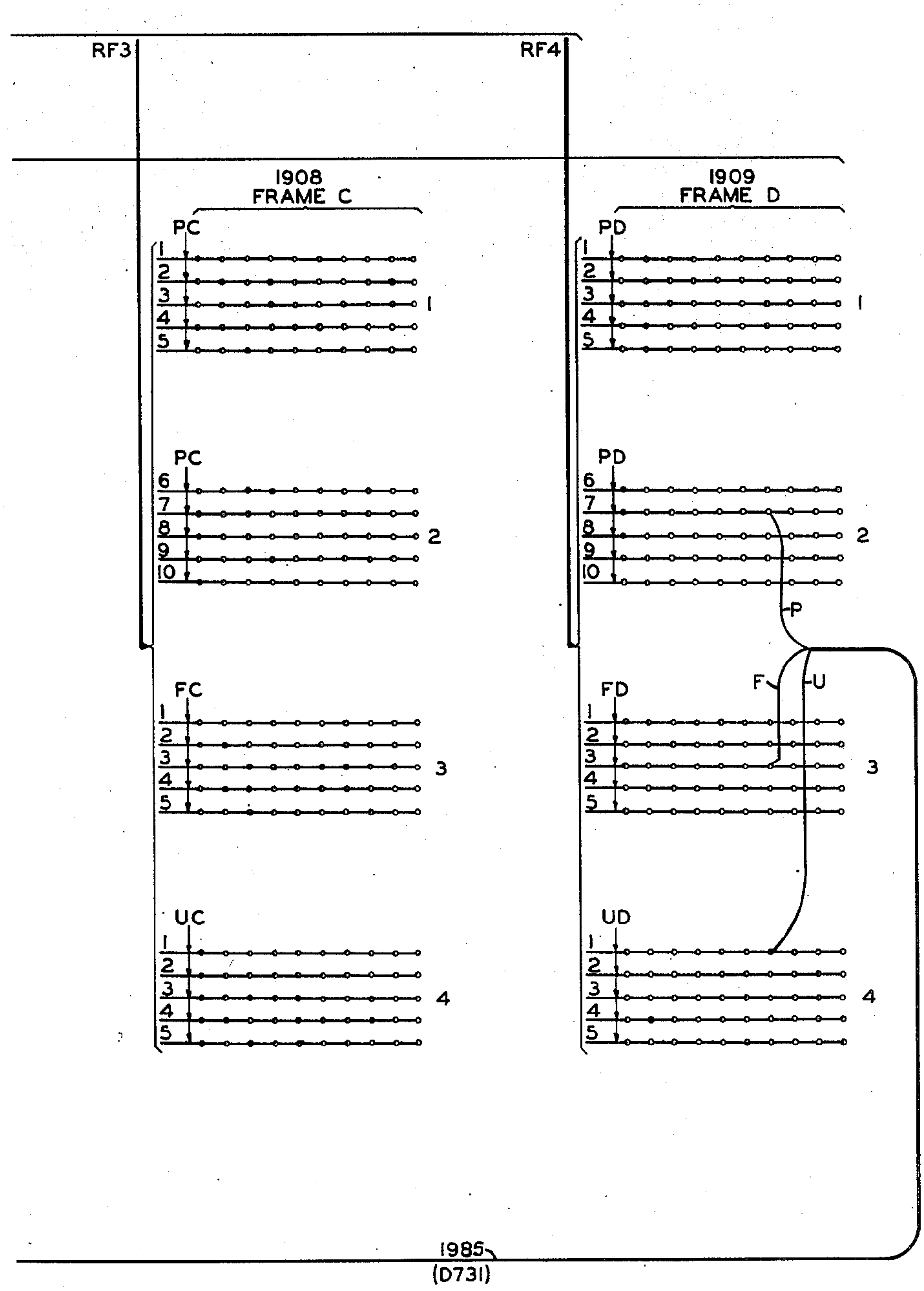
Figure 20:
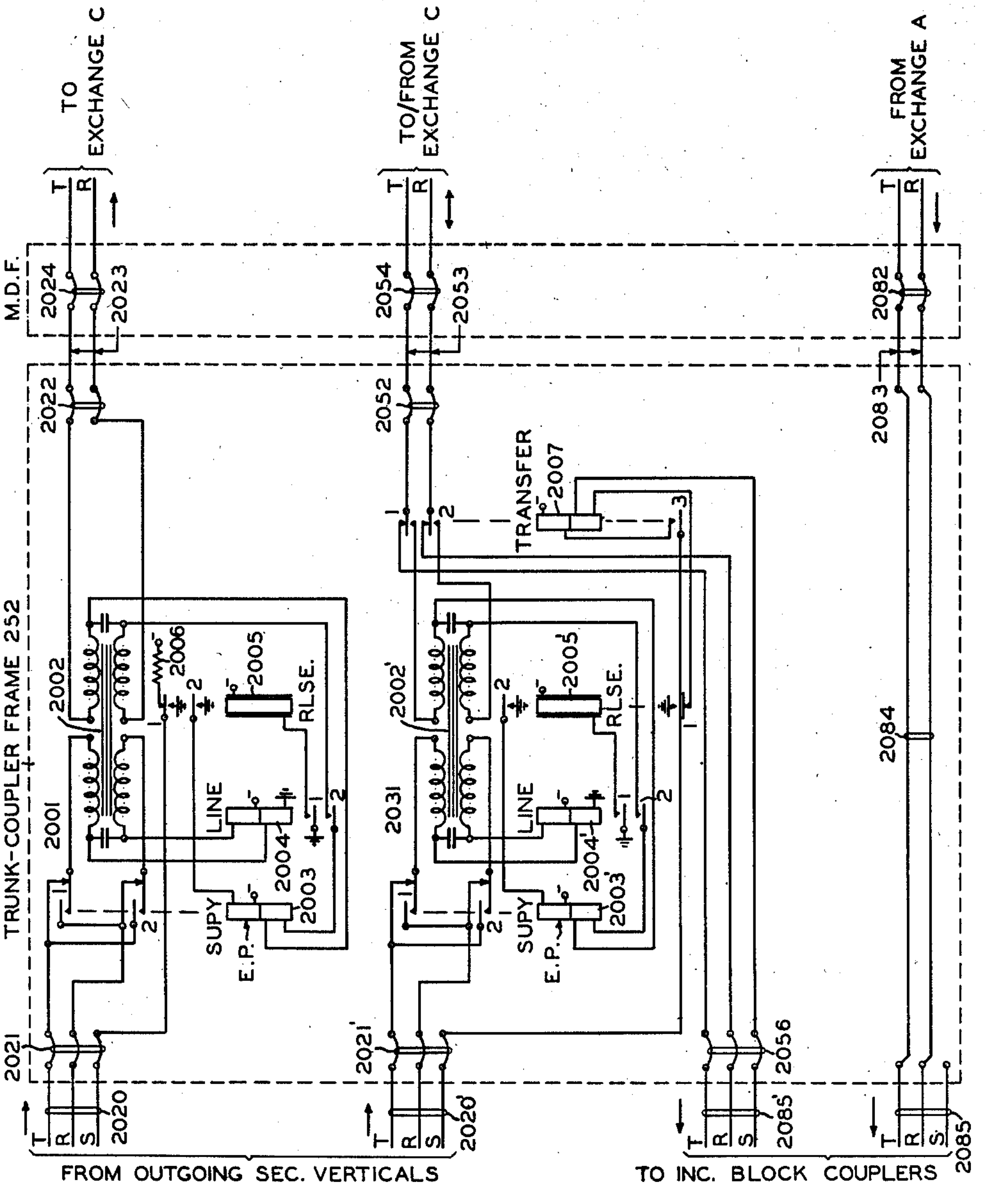
Figures 29, 30, 31, 32, 33, 34, 35, 36, 37:
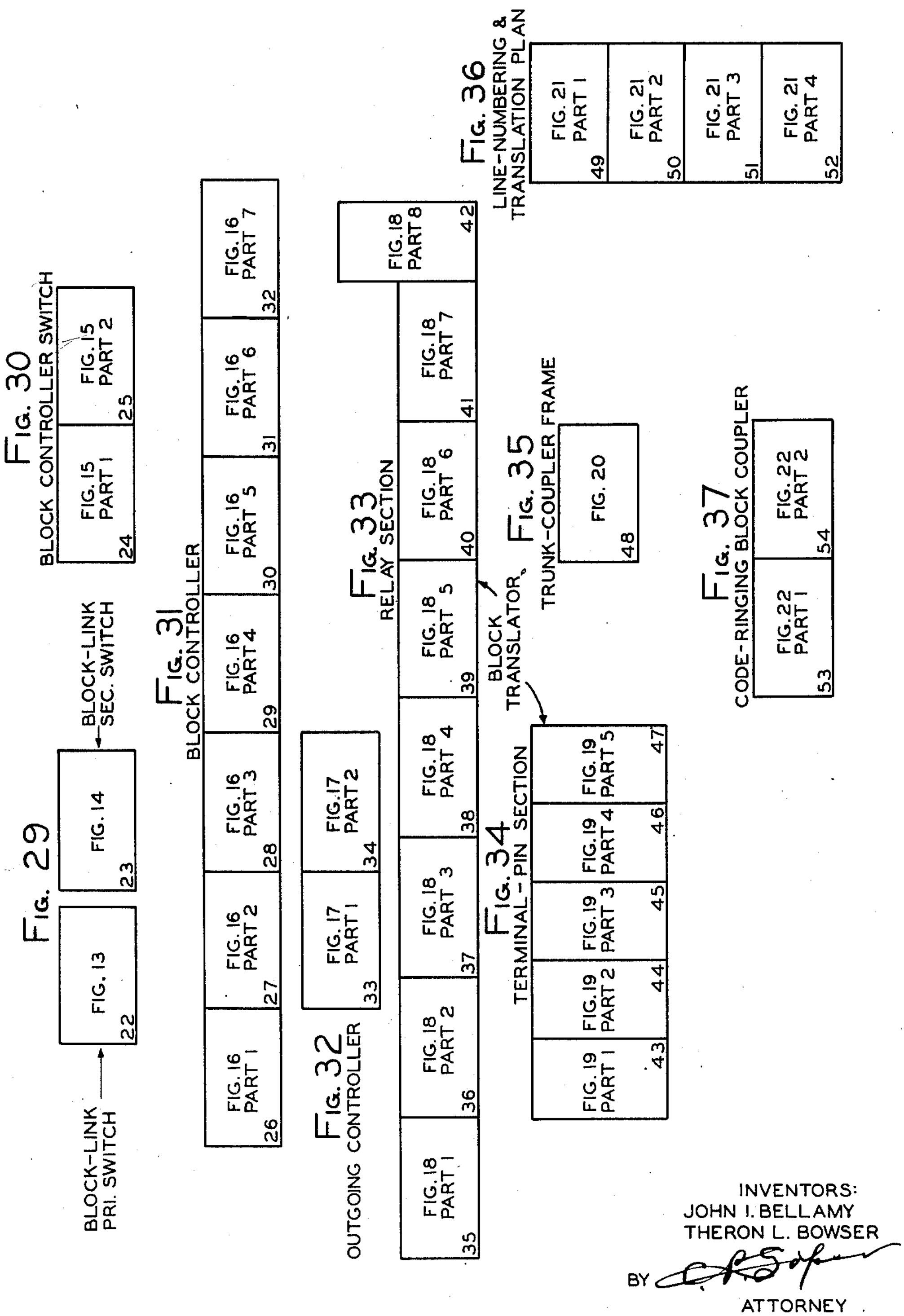

Figs. 4 to 7, taken together, comprise generally a redrawing of Fig. 2 to show in more detail the circuit paths and intimately associated electrical equipment employed in extending the talking connections indicated in Fig. 2; Fig. 4 shows apparatus on line-link frame A of Fig. 2; Fig. 5, parts 1 and 2, show the circuit details of the block couplers on the block-link frame of Fig. 2; Fig. 6 shows, with some amplification, the remaining apparatus of the block-link frame as shown in Fig. 2; and Fig. 7 shows in more circuit detail the apparatus on line-link frame B of Fig. 2;

Fig. 8 is a wiring diagram of any primary switch on any line-link frame;

Fig. 9 is a wiring diagram of any secondary switch on any line-link frame;

Fig. 10 (parts 1 and 2), and Fig. 11 (parts 1 and 2) are wiring diagrams of the line-controller switches on any line-link frame;

Fig. 12 (parts 1 to 5) is a circuit diagram of the line controller on any line-link frame;

Fig. 13 is a wiring diagram of any primary switch on the block-link frame;

Fig. 14 is a wiring diagram of any secondary switch on the block-link frame;

Fig. 15 (parts 1 and 2) is a wiring diagram of the block-controller switch on the block-link frame, together with a circuit diagram of associated relay apparatus;

Fig. 16 (parts 1 to 7) is a circuit diagram of the block controller on the block-link frame;

Fig. 17 (parts 1 and 2) is a circuit diagram of the outgoing controller on the block-link frame;

Fig. 18 (parts 1 to 8) is a circuit diagram of the relay section of the block translator on the block-link frame, and Fig. 19 (parts 1 to 5) is a circuit and wiring diagram of the pin-terminal section of the block translator;

Fig. 20 is a circuit diagram of the trunk-coupler frame and trunk-coupler apparatus thereon;

Fig. 21 (parts 1 to 4) shows the line numbering and translation plan with respect to the four line-link frames A, B, C, and D;

Fig. 22 (parts 1 and 2) shows the block coupler of Fig. 5 modified to provide code ringing rather than a combination of harmonic ringing and code ringing, and to provide for twenty stations on the line instead of a maximum of ten;

Figs. 23 to 28 (on the same sheet with Fig. 16, part 1) show the way in which the sheets of drawings on which Figs. 1 to 12 are drawn, should be arranged in order to be understood best; and Figs. 29 to 37 show the way in which the sheets of drawings on which Figs. 13 to 22 are drawn should be arranged in order to be understood best.

The devices shown at SE, IDR, HR, TR, UR, and SR (Fig. 5, part 2) are magnetic impulse counters which may be of the general type disclosed in Bellamy Patent 2,441,001, issued May 4, 1948, but are disclosed as being of the residually held type disclosed in any one of the following copending applications of John I. Bellamy:

| | Serial No. | Filed | U.S. Patent No. |
|---|---|---|---|
| 1 | 699,456 | September 26, 1946 | 2,487,015 |
| 2 | 711,111 | November 20, 1946 | 2,538,817 |
| 3 | 48,008 | September 7, 1948 | 2,538,819 |

IE. *General operation (Figs. 1 and 2)*

Fig. 1 shows three exchanges A, B, and C. As indicated, exchanges A and C are each connected with exchange B by trunk lines over which connections in each direction can be established. The apparatus indicated in Fig. 2 is all located in exchange B of Fig. 1.

In Fig. 2, the apparatus of exchange B includes the main distributing frame M. D. F., through which the subscriber lines and the trunks are interconnected with the switchboard apparatus; four line-link frames A, B, C, and D, of which line-link frames A and B are shown at 250A and 250B; a block-link frame shown at 251; and a trunk-coupler frame shown at 252.

The general purpose of the switching apparatus of exchange B is to interconnect the subscriber lines of the exchange with each other, and with the inter-exchange trunk lines, as desired, as well as to interconnect inter-exchange trunk lines as desired.

In the chosen embodiment of the invention, each of the four line-link frames A to D terminates 250 lines, providing a capacity of 1000 lines for the exchange.

Considering line-link frame A, for example, its function is to connect any calling one of the 250 subscriber lines which it serves with an idle one of a group of originating trunks, such as trunk 203A, and to interconnect any of its terminating trunks, such as 207A, with any called one of the subscriber lines connected with the frame. For this purpose line-link frame A is provided with a number of line-link primary switches 800A and a number of line-link secondary switches 900A. The subscriber lines are brought into the primary switches in the manner shown for calling line 200, which is brought in through jumper 201 on the main distributing frame M. D. F. to its own individual vertical location on line-link primary switch 800A.

The originating trunks extend from respective vertical locations on the line-link secondary switches, such as is shown for originating trunk 203A. The terminating trunks are connected to their own respective vertical locations on the line-link secondary switches, such as is shown for terminating trunk 207A. The line-link primary and secondary switches are interconnected by a suitable number of line links, one of which is shown at 202A.

A line-link primary switch such as 800A is shown in complete circuit diagram in Fig. 8, and a line-link secondary switch such as 900A is shown in complete circuit diagram in Fig. 9. The specific interrelation between the link-link primary and secondary switches via the line links is shown in Fig. 3, part 1.

The apparatus on line-link frame A further includes line-controller apparatus comprising line-controller switches 1000A and 1100A, and line controller 1200A, which are shown in complete circuit diagram in Figs. 10, 11, and 12. The line-controller switches are 1000A and 1100A, and are interconnected with line controller 1200A by a group of control wires 240A.

The general purpose of the noted line-controller apparatus is to control the interconnection of lines with trunks through switches 800A and 900A over two-way line links 202A. This general control resides primarily in line controller 1200A.

The purpose of the line-controller switches is to interconnect line controller 1200A with any concerned line-link primary switch such as 800A over conductors such as 211A and 212A. Line-link frame B (shown at 250B) contains apparatus similar to that of line-link frame A. The correspondence is shown by employing the letter B as a suffix for each reference character applied at line-link frame B, whereas the letter A is used as a suffix for each reference character applied at line-link frame A.

The purpose of the block-link frame, shown at 251, is to extend connections received over incoming trunks such as 2085, and over originating trunks such as 203A, to an idle outgoing trunk such as 2020 in a called group, or over an idle terminating trunk such as 207B to the line-link frame terminating the called line. For this purpose, the block-link frame is provided with a number of block-link primary switches such as 1300 and with a number of block-link secondary switches such as 1400, interconnected by block links 206. Complete circuit diagrams of switches 1300 and 1400 are shown in Figs. 13 and 14, respectively.

The incoming and originating trunks such as 2085 and 203A are required to be suitably coupled to the switchboard apparatus at the block-link frame in order that the necessary digit information as to call destination be recorded and acted upon. This general function is assigned to block couplers 500 individual to the respective incoming and originating trunks. Incoming block coupler 500–I is connected individually with incoming trunk 2085 by jumper 204′, while local block coupler 500–L is connected individually with originating trunk 203A through jumper 204. Conductor sets 232 and 205 extend the incoming and originating trunks 2085 and 203A beyond the block couplers to respective vertical locations on block-link primary switches 1300.

The outgoing and terminating trunks (such as 2020 and 207B) extend from respective vertical locations on block-link secondary switches 1400. The specific inter-relation between the block-link primary and secondary switches via the block links is shown in the general trunking diagram, Fig. 3, parts 3 and 4.

General control over the primary and secondary switches on the block-link frame is exercised by block controller 1600, shown in complete circuit diagram in Fig. 16. When any connection which has reached a block coupler is ready to be extended, block-controller switch 1500 (shown in complete circuit diagram in Fig. 15) operates to connect block controller 1600 to the concerned block-link primary switch such as 1300. The calling block coupler is thereupon connected directly with block controller 1600 through conductors in group 221.

If the call being handled is an outgoing call (one to be completed over an outgoing trunk such as 2020) outgoing controller 1700 is called into play over an initial digit wire in group ID. It is interconnected with the outgoing trunks over respective conductors 227, and is interconnected with the block controller over the conductors in group 241. Its function is to determine which trunks in the called group are idle and to appropriately relay that information to the block controller.

When the connection being handled by the block coupler associated with the block controller is for a called line of the local exchange, hundreds, tens, units, and stations digit information has been stored in the block coupler, and is forwarded to the block translator 1800 over conductor groups H, T, U, and ST.

Block translator 1800 is shown in complete circuit diagram in Fig. 18, which shows the relay section thereof, and in Fig. 19, which shows the pin-terminal section thereof. The general purpose of the block translator is to determine from the dialed digit information which of the four line-link frames A to D terminates the called line, as well as the specific location of the called line on such frame, and to transmit appropriate translated information to the line-controller apparatus on the called line-link frame, according to the location of the called line thereon. This information is transmitted over conductors in the concerned one of groups 223A to 223D.

The line-controller apparatus on the called line-link frame acts according to the information received from the block translator to prepare for the extension of the connection to the specific called line. Among other things, this line-controller apparatus identifies the called line-link frame at block controller 1600, following which the block controller and the line-controller apparatus cooperate in extending a connection to the called line over an idle path. The cooperation between the block controller and the line-controller apparatus on the line-link frames is controlled over respective conductor groups 222A to 222D.

IE1. *Station S1 calls station S2*

The subscriber at station S1 on line 200, to call the subscriber at station S2 on line 210, removes his receiver, waits for dial tone from a local block coupler; and then dials the directory number of station S2, containing five digits, termed initial, hundreds, tens, units, and stations.

When the receiver is removed at calling station S1, calling line 200 is thereby bridged in the usual manner to operate the usual line relay thereof in exchange B. This results in the operation of line-controller switches 1000A and 1100A to associate line controller 1200A with line-link primary switch 800A at which the calling line terminates. The line links (such as 202A) serving primary switch 800A are thereupon tested by the line controller 1200A over respective conductors 212A, and the associated originating trunks, such as 203A, are tested over respective conductors 213A. From these tests, the line controller matches an idle path for extending the calling line to an idle block coupler, the path over line-link 202A and originating trunk 203A, for example. When this occurs, the line controller causes primary and secondary switches 800A and 900A to effect a mechanical selection of the matched line link 202A, and energizes conductors 211A and 213A to close the appropriate stackups of contact elements in the primary and secondary switches 800A and 900A to extend the calling line over line link 202A to the local block coupler 500-L, to which originating trunk 203A is connected by jumper 204. Line-controller switches 1000A and 1100A, and line controller 1200A are now returned to common use, leaving the calling line 200 connected to local block coupler 500-L by way of line link 202A and originating trunk 203A.

Upon receiving a dial-tone signal over the established connection, from the block coupler 500-L, the subscriber at calling station S1 operates his usual calling device to transmit impulses representing the fives digits in the directory number of called station S2. They comprise an initial digit indexing exchange B, and hundreds, tens, units, and stations digits indexing the called line and the called station S2 thereon. These digits are recorded on respective registers in the block coupler 500-L before any external switchboard action occurs. As soon as the stations digit has been dialed, block-controller switch 1500 associates block controller 1600 with the primary switch 1300 which serves block coupler 500-L. At the same time, block coupler 500-L is associated with block controller 1600 over the conductors in group 221. Also, at the same time, the dialed hundreds, tens, units, and stations digit information is transmitted to block translator 1800 over the respective conductor groups H, T, U, and ST.

The block translator thereupon determines the line-link frame which serves the called line (line-link frame 250B), and transmits thereto (over conductors in group 223B) translated digit information indicating the primary switch (800B) which serves the called line, and indicating the specific vertical appearance of the called line on that primary switch. When this occurs, line controller 1200B identifies itself at block controller 1600, and exercises a control over conductors in group 240B to cause line-controller switches 1000B and 1100B to position themselves according to the switchboard location of the called line. The line links (such as 202B) serving primary switch 800B are now tested over respective conductors 212B, and the testing information is imparted to block controller 1600 over respective conductors in group 222B. The sleeve conductor 211B of the called line 210, is now extended to block controller 1600 over a conductor in group 222B, enabling the block controller to test the called line to determine its busy or idle condition.

If the called line tests idle, the block controller matches an idle path thereto over a block link such as 206, a terminating trunk such as 207B, and a line link such as 202B. The block links and terminating trunks are tested over respective conductors 225 and 226.

When this available idle path between block coupler 500-L and the called line has been determined, block controller 1600 closes appropriate select-magnet circuits to effect mechanical selection of block link 206 at primary and secondary switches 1300 and 1400, and to effect mechanical selection of line link 202B at switches 900B and 800B. When these selections have been made, block controller 1600 operates through a conductor in group 221 to close the appropriate circuit path through primary switch 1300 to extend the connection to the selected block-link 206; operates over conductor 226 to cause the appropriate connection to be closed in secondary switch 1400 to extend block link 206 to terminating trunk 207B, and to cause that trunk to be extended to the selected line link 202B by switch 900B, and operates, over a conductor in group 222B, and over sleeve conductor 211B, to cause the appropriate connection to be closed in primary switch 800B to interconnect line link 202B with the called line 210.

Upon the foregoing operations having been completed, local block coupler 500-L begins to apply ringing current to the called line to signal the called station S2 thereon over the established connection across the block-link frame and across the called line-link frame, and the items of common apparatus (block-controller switch 1500, block-controller 1600, block translator 1800, and line-controller apparatus 1000B to 1200B) are promptly returned to common use, leaving the connection intact between the calling and called lines.

When the call has been answered, the subscribers at stations S1 and S2 may converse as described. When both subscribers have replaced their receivers, block coupler 500-L opens front and rear holding circuits which it had previously held closed, whereupon the existing connection is broken at each of the switches 800A, 900A, 1300, 1400, 900B, and 800B.

IE2. *Station S1 calls exchange C*

When the subscriber at station S1 on line 200 desires to call a subscriber of exchange C, he removes his receiver; waits for dial tone; and then dials the directory number of the subscriber in exchange C. This directory number includes an initial digit having a value assigned specifically to lines of exchange C.

When the receiver is removed at calling station S1, the previously described operations occur on line-link frame A to extend the calling line to an idle block coupler. It may be assumed again that the calling line is extended to block coupler 500-L over line link 202A and originating trunk 203A.

When the initial digit assigned specifically to exchange C is dialed and recorded in block coupler 500-L, a connection is immediately thereupon completed over a wire in initial digit group ID for calling in outgoing controller 1700 and for setting it with specific regard to the trunks in the group leading to the called exchange C. This occurs coincidentally with the association of block coupler 500–L with block controller 1600 over conductors 221, and with the operation of block-controller switch 1500 to associate block controller 1600 with primary switch 1300. When the block controller and outgoing controller are both thus called in together, the block controller is adapted specifically to extend the connection to an idle trunk in the called outgoing group. The circuit arrangements are such that the operations necessary to cause the extension to be made occur with sufficient rapidity that the calling subscriber is not required to introduce an additional delay before proceeding to call the remaining digits in the desired telephone number.

If block link 206 and outgoing trunk 2020 are both idle (as shown by tests made over respective conductors 225 and 227) block controller 1600, taking into account information imparted thereto over conductors in group 241, may select that path and condition switches 1300 and 1400 to select block link 206 mechanically. Thereupon, block controller 1600 causes appropriate cross points to be closed in switches 1300 and 1400 to interconnect block-coupler extension conductors 205 with outgoing-trunk conductor 2020 by way of block link 206, thereby extending the calling line through block coupler 500–L, to trunk coupler 2001 on frame 252, and thence through trunk-extension 2023 and jumper 2024 to the trunk conductors outgoing to exchange C. When this occurs, block coupler 500–L "switches through" as will be hereinafter explained, and the connection from the calling line to the outgoing trunk is thereafter held by trunk coupler 2001, which coupler includes apparatus for repeating the succeeding digit impulses over the trunk line to apparatus in exchange C, which may be similar to the switchboard apparatus of exchange B. Coincidental with the "switching through" operation noted for the block coupler, the items of common equipment on the block-link frame (block-controller switch 1500, block controller 1600, and outgoing controller 1700) are disassociated from the established connection and are returned to common use.

The connection established from the calling line to the outgoing trunk is released responsive to operations occurring in trunk coupler 2001 when the receiver is subsequently replaced at the calling station S1.

IE3. *Calls from exchange A*

When exchange B is called from exchange A, the call from exchange A reaches exchange B over an incoming trunk such as that illustrated. This trunk is extended through parts 2082 to 2095 and jumper 204' to incoming block coupler 500–I, similar to the local block coupler except that it preferably does not apply dial tone upon being taken for use. The trunk line in question may be seized in exchange A by operations previously described in connection with the seizure of a trunk line extending from exchange B to exchange C.

Following seizure of the incoming block coupler, the call may be extended to exchange C by the dialing of the appropriate initial digit at block coupler 500–I or may be extended to any desired called line of exchange B by dialing the appropriate initial digit, followed by the hundreds, tens, units, and stations digits in the directory number of the called line and station thereon. The connection may be extended from the block coupler 500–I to line 210 over conductor group 232 and associated vertical location on primary switch 1300, and thence as hereinbefore described for a call originated at local station S1.

II. *General trunking diagram (Fig. 3)*

The general trunking diagram shown in Fig. 3, parts 1 to 4, will now be explained.

In Fig. 3, the switching and trunking plan for the line-link frames and block-link frame of Fig. 2 are shown more completely.

IIA. *The line-link frames*

Referring now to part 1 of Fig. 3, there are ten primary switches 800A on line-link frame A, of which the first two and the tenth are shown. Each switch 800A has twenty-five vertical locations, or cross paths, to which twenty-five subscriber lines are respectively connected as indicated. Each such switch has ten horizontal locations, or longitudinal paths, to which ten line links 202A are respectively connected. Each switch 800A may be described as a 25 x 10 three-wire switch, which is one having 250 three-wire cross points. The twenty-five subscriber lines which may be connected to any such switch are served in common by the ten associated two-way line links 202A.

Line-link frame A has five line-link secondary switches 900A. These five switches, in effect, serve as ten separate secondary switches in that each has its "horizontals" or longitudinal paths, severed at the midpoint to provide two separate groups of ten horizontals each. That is, each of the five secondary switches comprises a left section L and a right section R, each section having its own crossing vertical and horizontal paths. Five two-section secondary switches 900A are more economical to produce, and require less mounting space on the switchboard, than ten entirely separate secondary switches.

The left and right sections of secondary switches 900A, considered in regular order from #1 to #10, are referred to as the ten secondary sections. Each secondary section has eight vertical locations thereon, the first four of which serve as attachment points for respective terminating trunks 207A, while the last four serve as attachment points for respective originating trunks 203A. The ten secondary sections thus provide for forty terminating trunks, and forty originating trunks, for line-link frame A.

There are one hundred two-way line links 202A interconnecting the ten primary switches 800A with the ten secondary sections provided by secondary switches 900A. These line links are, for convenience, numbered 1 to 100 at their primary-switch terminals. The line links interconnect the primary switches with the secondary sections in a so-called standard spread, wherein the ten line links of any primary switch extend to respectively corresponding secondary sections, and the ten line links at any secondary section extend thereto from respectively corresponding primary switches. More particularly, the links 1 to 10 extend from the respective horizontals of the first primary switch 800A to horizontals 1 of the respective secondary sections; the links 11 to 20 extend from the second primary switch 800A to horizontals 2 at the respective secondary sections; and so forth to the tenth primary switch 800A, from which line links 91 to 100 extend respectively to horizontal locations 10 at the respective secondary sections 1 to 10.

The forty originating trunks 203A which extend from verticals 5 to 8 of the ten secondary sections on line-link frame A are considered, for numbering and testing purposes, as comprising four groups of ten. Originating trunks 1 to 10 (group 1) extend from verticals 5 of the respective secondary sections; trunks 11 to 20 (group 2) extend from verticals 6 of the respective secondary sections; trunks 21 to 30 (group 3) extend from verticals 7 of the respective secondary sections; and originating trunks 31 to 40 (group 4) extend from verticals 8 of the respective secondary sections.

Similarly, the forty terminating trunks 207A incoming to line-link frame A from the block-link frame are considered as comprising four groups of ten. The trunks in the four groups extend respectively to verticals 1, 2, 3, and 4, on the ten secondary sections. The first ten terminating trunks extend to the respective secondary sections in regular order, the terminating trunks in groups 2, 3, and 4 connect to the secondary section with a progressive slip of one. That is, any terminating trunk in group 2, 3, or 4 is connected to the secondary section next succeeding the one to which the corresponding trunk of the immediately preceding group is connected. This slip in the connections of the four groups of terminating trunks to the secondary sections is for the purpose of enhancing matching possibilities over the terminating trunks as will hereinafter appear.

At line-link frame A, terminal groups 321A and 322A are provided for the terminating and originating trunks respectively, to serve as junction points between the conductors local to the line-link frame and the cable conductors between the line-link frame and the block-link frame. Similar terminals for line-link frames B, C, and D are shown at 321B and 322B, to 321D and 322D. The originating and terminating trunks 203B and 207B to 203D and 207D are connected to these terminals.

IIB. *The block-link frame*

Referring to Fig. 3, parts 3 and 4, the crossbar switching apparatus on the block-link frame comprises ten primary switches 1300 and ten secondary switches 1400. Each such switch is described as a 20 x 20 three-wire switch. It has twenty vertical locations or cross paths and ten pairs of horizontal locations or longitudinal paths. Each pair of horizontal paths contains a lower path L and an upper path U, each representing a separate block link 206. Each switch 1300 or 1400 terminates twenty trunks of its verticals and ten pairs of block links 206 on its horizontals. There are two hundred block links 206, comprising 100 pairs which are spread by pairs between the block-link primary and block-link secondary switches 1300 and 1400 as pointed out for the spreading of the one hundred single line links 202A between the line-link primary switches 800A and the secondary sections provided by line-link secondary switches 900A. That is, from any block-link primary switch 1300, the ten pairs of block links extend respectively and in regular order to the secondary switches 1400. The block links are used in pairs, rather than singly as for the line links, because of the greater traffic across the block-link frame.

Each primary switch 1300 has a group of twenty block couplers associated therewith, such as the block couplers 500–I and 500–L of Fig. 2. These groups of block couplers are indicated in Fig. 3 as 500–1 to 500–10. Each such group of block couplers is hereinafter referred to as a section of block couplers, or a block-coupler section, a separate section for each primary switch 1300.

The originating trunks from line-link frames A, B, C, and D are carried from the line-link frames to the block-link frames over originating trunk cables OA, OB, OC, and OD. These cables terminate at terminal groups 323A to 323D. Forty incoming trunks are contained in incoming-trunk cable ITC, extending from trunk-coupler frame 252 to the block-link frame and terminating at terminals 323I. The three-wire trunk sets incoming to the block couplers of sections 500–1 to 500–10 extend thereto from respective terminal sets 324–1 to 324–10. Three-wire jumpers 204 are extended from originating-trunk and incoming-trunk terminals, as required, to respective terminals in groups 324–1 to 324–10. The indicated terminal groups 323A to 323D, 323I, and 324–1 to 324–10, are so located on the block link frame as to constitute an intermediate distributing frame on which jumpers 204 can be run to connect desired available originating-trunk and incoming-trunk sets of conductors to respective block couplers only as required for the actual handling of the traffic and to enable such trunks to be diversified among the several sections of block couplers in any manner which may from time to time prove to be advantageous.

The first 16 vertical locations on the ten secondary switches 1400 serve as respective origin points for the 160 terminating trunks, forty to each of the line-link frames A, B, C, and D. Verticals 1 of the ten secondary switches 1400 serve as origin points for terminating trunks A1 to A10, verticals 2 for trunks A11 to A20, verticals 3 for trunks A21 to A30, and verticals 4 serve as origin points for terminating trunks A31 to A40. The forty terminating trunks B1 to B40 for line-link frame B extend similarly from verticals 5 to 8 of switches 1400; the forty terminating trunks for line-link frame C extend from verticals 9 to 12; and the forty terminating trunks for line-link frame D extend from verticals 13 to 16 of secondary switches 1400.

Terminating-trunk cables TA, TB, TC, and TD extend from terminals on the block-link frame to the terminating-trunk terminals on the respective line-link frames A, B, C, and D.

Verticals 17 to 20 of secondary switches 1400 serve as origin points for the outgoing trunks and outgoing branches of two-way trunks (such as 2020, Fig. 2) contained in outgoing-trunk cable OTC.

IIC. *Capacity variations*

The capacity of the trunking plan shown in Fig. 3, is capable of variations according to (1) the number of lines required to be served, and according to (2) the traffic demands of these lines, such as the number of them demanding simultaneous service during the so-called busy hour.

If, for example, only 250 lines are required initially for an installation, only line-link frame A need be installed initially, along with minimum equipment on the block-link frame. Line-link frames B, C, and D may be subsequently added, all at the same time, or one at a time as required. The initial minimum equipment on the block-link frame may be added to as required incident to the addition of line-link frames to the full number illustrated.

At any line-link frame, line-link primary switches may be omitted when the full frame capacity (250 lines) is not required. Omitting any such line-link primary switch reduces the capacity of the line-link frame by twenty-five lines. It is contemplated that all five secondary switches 900A will always be provided on a line-link frame irrespective of any reduction in the number of primary switches. By this arrangement, all ten line-links are maintained available for use, at each installed primary switch 800A, and all originating and terminating trunks remain available for use, which would not be the case if one or more of the secondary switches 900A were omitted.

Since there is no expensive item of apparatus (such as a block coupler) individually associated with any terminating trunk, it is contemplated that the entire forty terminating trunks will be provided for each line-link frame irrespective of any light terminating traffic which may be experienced. In this manner the calls lost due to non-availability of terminating trunks is held to a minimum value, permitting the originating trunks required to be equipped with the comparatively expensive couplers to be kept down to a number which will just suffice to maintain the total lost calls during the busy hour at a percentage figure not in excess of that specified for the installation.

In the usual case, the total number of primary switches 1300 required on the block-link frame is simply one-twentieth of the total number of block couplers required to handle the originating and incoming traffic. That is, for each section of twenty block couplers required, a separate primary switch 1300 is required to be installed. Experience with telephone traffic indicates that the entire ten primary switches 1300 will be required only very rarely, even when the four line-link frames A to D are provided and are fully equipped.

When an unrequired primary switch 1300 is omitted, along with its associated section of block couplers 500, the jumpers 204 are simply arranged to connect the originating and incoming trunks in use to block couplers associated with the installed primary switches 1300.

Preferably, all ten secondary switches 1400 are installed on the block-link frame irrespective of the number of primary switches 1300 in use. Then, each installed primary switch 1300 has full use of its ten pairs of block links 206, and the number of terminating trunks per line-link frame is not reduced, nor is the number of outgoing trunks reduced.

III. *Completing calls—block-coupler action (Figs. 4 to 7)*

The operation of the system in completing calls will now be described with particular reference to Figs. 4 to 7, which show in more circuit detail the apparatus indicated on Fig. 2, Fig. 5 showing the circuit of block coupler 500–L in complete detail. This part of the description covers in complete detail the operation of the portions of the apparatus directly included in the talking paths through the line-link frames and the block-link frame. Subsequent parts of the description cover the detailed operation of (1) the crossbar switches as separate items, (2) the items of common control apparatus, and (3) the apparatus on the trunk-coupler frame.

IIIA. *Block coupler 500–L*

As shown in Fig. 5, local block coupler 500–L includes a test jack TJ, relays 501 to 515, condensers 516 to 518, and magnetic impulse counters SE, IDR, HR, TR, UR, and SR.

IIIA1. *Circuit functions of coupler 500–L*

Local block coupler 500–L handles only locally originated calls, which are received over its assigned originating trunk 203A, incoming from line-link frame A. According to its destination, any such call is handled as (1) an outgoing call, (2) a locally terminated call, or (3) a reverting call. Block coupler 500–L performs the following principal circuit functions:

1. Normally, it supplies idle-indicating battery potential to the sleeve conductor of its attached originating trunk.

2. On all calls:

2*a*. Upon seizure, it (1) applies dial tone to the calling line until the first digit is dialed, and (2) removes the idle-indicating battery potential from the sleeve conductor of the attached originating trunk and substitutes a holding ground potential.

2*b*. If the start of dialing is delayed for the normal time-out period (about two to four minutes), it "times out" by removing holding ground from the sleeve of the attached originating trunk to permit release and lockout to occur on the line-link frame.

2*c*. It absorbs the initial digit 1 as many times as dialed or otherwise produced.

3. On an outgoing call:

3*a*. It receives and stores a single digit for transfer to the outgoing controller.

3*b*. It temporarily seizes the outgoing chain of its local block-coupler section, subject to such chain being idle, and thereafter guards the seized chain against seizure by another block coupler.

3*c*. It transfers the single stored digit to the outgoing controller incident to seizure of the outgoing chain.

3*d*. On a signal from the block controller that no idle path can be matched to an outgoing trunk in the called group, it (1) applies an outgoing-busy tone to calling line, and (2) frees the seized outgoing chain.

3*e*. On a hold-pilot signal from the block controller that the connection has been extended over a matched path to an idle outgoing trunk in the called group, it (1) switches through to the matched path, and (2) frees the seized outgoing chain.

3*f*. It is subsequently held by ground received over the sleeve wire of the extended connection, and clears out when such ground is removed.

4. On a locally terminated call:

4*a*. It receives and stores five digits (an initial digit ID, a hundreds digit H, a tens digit T, a units digit U, and a stations digit ST) of which four are for transfer to the block translator.

4*b*. If the next digit to be dialed is delayed for the normal time-out period, it times out as previously noted.

4*c*. It temporarily seizes the terminating chain of its local block-coupler section, subject to such chain being idle, and guards the seized chain against seizure by other block couplers.

4*d*. It transfers the stored digit information to the block translator while it has the terminating chain seized.

4*e*. On a signal from the block controller that the called line is busy, or that no idle path thereto can be matched, it (1) applies a terminating-busy tone to the calling line, and (2) frees the seized terminating chain.

4*f*. On a hold-pilot signal from the associated vertical of the block-link primary switch that the connection has been extended over a matched path to the called line, it (1) applies ringing current to the called line, (2) applies ringing tone to the calling line, and (3) frees the seized terminating chain.

4*g*. If the call is not answered during the normal time-out period, it times out as previously noted.

4*h*. When the call is answered, it (1) trips the ringing circuit; (2) completes the talking connection; and (3) reverses the current flow over the tip and ring conductors of the attached originating trunk, subject to hookswitch control from the called line.

4*i*. It supplies transmitter current to both lines.

4*j*. If the connection is still held by both lines at the end of the timed conversation period (about six to eight minutes), it times out as previously noted, but applies a warning-tone pulse of terminating-busy tone current to the connection about half a minute earlier.

4*k*. If the connection is still held by the calling line after the called line is opened, it times out at the end of the normal time-out period.

4*l*. Whether the called line is still closed or not when the calling line is opened, it clears out and releases the entire connection, by removing holding ground from the incoming sleeve and from the sleeve of the forward connection.

5. On a reverting call (wherein the calling subscriber dials the regular directory number of the called subscriber):

5*a*. It functions as stated in the foregoing items 4*a* to 4*d* for a normal locally terminated call.

5*b*. On a signal from the block controller that the call is a reverting call (a call going back to the calling line), it (1) applies a reverting-call tone to the calling line, and (2) frees the seized terminating chain.

5*c*. When the receiver is replaced on the calling line in obedience to the reverting-call signal, it (1) locks itself to hold the connection, and (2) sends ringing current back over its associated originating trunk to the calling line.

5*d*. When the reverting call is answered, it unlocks itself and clears out, removing holding ground from sleeve of its associated originating trunk to permit release and lockout to occur on the associated line-link frame.

IIIA2. *Relay functions at coupler 500–L*

The fifteen relays (501 to 515) of block coupler 500–L have principal functions assigned thereto as follows:

Relay 501 (switch-through) switches the incoming trunk conductors through metallically to the outgoing ones on outgoing calls and reverting calls.

Relay 502 (back-bridge) operates over the called line, when a locally terminated call is answered, to reverse the incoming tip and ring conductors, under control of the hookswitch on the called line.

Relay 503 (line) operates when the coupler is seized, and restores thereafter, under control of the calling device or hookswitch, whenever the calling line is opened.

Relay 504 (series) is operated by the line relay; it restores at the beginning of a series of dial pulses, to operate sequence counter SE; and it reoperates only after the line relay has again come to rest operated, as it is slow-operating because of a heavy spring adjustment.

Relay 505 (release) is slow-releasing by virtue of a copper sleeve under its winding; it is operated by the line relay; it remains operated during pulsing, but releases when the line relay remains restored for a substantial fraction of a second.

Relay 506 (ring-reverse) is operated from the block translator, on any stations digit 5 to 9, to cause ringing current to be applied to the other side of the line, for divided ringing.

Relay 507 (ring-cutoff) is slow-operating by virtue of a copper collar surrounding the armature end of its core, and is operated by D. C. flow in the ringing circuit when the call is answered, to open the ringing circuit and to close the talking circuit.

Relay 508 (reverting-call) is operated by the block controller to condition the block coupler for a reverting call.

Relay 509 (switching) is operated, when a locally terminating connection is extended to the called line, to free the seized terminating chain, to close the ringing circuit, and the like.

Relay 510 (busy) is operated from the block controller to apply appropriate busy-tone signals to the calling line.

Relay 511 (outgoing-chain) is operated on an outgoing call when the single outgoing digit has been dialed; it seizes the outgoing chain of the local block-coupler section for the exclusive use of this block coupler.

Relay 512 (terminating-chain) is operated on a locally terminated call when the stations digit has been dialed; it seizes the terminating chain of the local block-coupler section for the exclusive use of this block coupler.

Relay 513 (time-pickup) is operated as required, to start the final portion of the normal time-out period or of the conversation-time period to render the connection subject to release by the common timing apparatus.

Relay 514 (release-pulse) is a slow-release relay which is operated to close a neutralizing release circuit long enough to clear out the impulse counters SE to SR.

Relay 515 (transfer) is operated during the ringing period to transfer the ten leads controlled by stations register SR, from the station leads associated with the block translator, to the ten interrupted-generator leads.

IIIA3. *Impulse-counter functions at coupler 500–L*

The six impulse counters (SE, IDR, HR, TR, UR, and SR) of block coupler 500–L have principal functions assigned thereto as follows:

Impulse counter SE (sequence device) responds to the reoperation of series relay 504 at the end of each digit series of pulses to distribute the series of digit impulses to registers IDR to SR.

Impulse counter IDR (initial-digit register) registers the number of impulses in the first digit dialed, the initial digit.

Impulse counter HR (hundreds register) registers the number of impulses in the hundreds digit.

Impulse counter TR (tens register) registers the number of impulses in the tens digit.

Impulse counter UR (units register) registers the number of impulses in the units digit.

Impulse counter SR (stations register) registers the number of impulses in the stations digit.

The following additional functions are assigned to impulse counters SE to TR:

Sequence device SE, which actuates its contact sets 1A and 1B on receipt of its first operating pulse, disconnects resistor 532 as a sleeve-guarding measure; controls release-pulse relay 514; and it takes timed steps 6 to 9 incident to conversation timing;

Initial-digit register IDR opens the dial-tone lead; controls the absorption of the initial digit 1; and prepares a stepping circuit for SE;

Hundreds register HR selects between outgoing-busy tone and terminating-busy tone; and Tens register TR selects between switch-through relay 501 for outgoing calls and switching relay 509 for terminating calls.

IIIB. *Locally-originated calls*

The operations involved in making locally-originated calls from station S1 on line 200 will now be described with reference to Figs. 4 to 7.

IIIB1. *Initiation of call*

When the receiver (not shown) is removed at calling station S1 of Fig. 4, the usual direct current bridge is closed across tip and ring conductors T and R of line 200, thereby operating line relay 401 through hold pilot contacts HP of the associated hold magnet 403 on line-link primary switch 800A. Line relay 401 applies ground through contacts of lockout relay 402 to mark conductor M individual to the calling line, and to mark the fives conductor F which is common to the five lines constituting the fives group in which the calling line is located.

Grounding fives conductor F applies a ground potential through fives resistor FR–1 to primary conductor P which is common to the twenty-five lines served by primary switch 800A. There are ten such wires P on line-link frame A, a separate one for each line-link primary switch.

Grounding the conductor P illustrated in Fig. 4 causes line controller 1200A to set line-controller switches 1000A and 1100A upon the calling primary switch 800A and with specific reference to the group of five lines including the calling line. Upon being so set, the line-controller switches close the indicated open points therein. Line controller 1200A now matches an idle path from calling line 200 to an originating trunk. This path may be assumed to be over line link 202A to originating trunk 203A. The test circuit for line link 202A from line controller 1200A is from line-test conductor LT through contacts of one of the line-controller switches to link-sleeve wire LS, connected to the sleeve of 202A. The test is for an idle indicating battery potential on the sleeve of the link, which is supplied through the illustrated resistor in the line controller, link-battery wire LB, and contacts of one of the line-controller switches. If line link 202A is busy, holding ground potential thereon masks the resistance-supplied battery potential, causing the link to test busy, but the idle indicating battery potential is effectively received by the line controller when the line link is idle.

When originating trunk 203A (being connected to block coupler 500–L through jumper 204) is idle the line controller 1200A receives an idle indicating battery potential over match-test conductor MT–213A through the left-hand winding of hold magnet 406, sleeve conductor S of originating trunk 203A, contacts 1 of release relay 505, contacts of test jack TJ, contacts 1 of release-pulse relay 514, break contacts of stack 1A in sequence device SE, and resistor 532. On the other hand, when originating trunk 203A is in use, the idle indicating battery potential on its sleeve conductor S is replaced by ground potential.

Upon matching a path over line link 202A to originating trunk 203A, line controller 1200A grounds link-select magnet wire LSM closing a circuit through contacts of one of the line-controller switches and over select-magnet wire SM for primary and secondary select magnets 404 and 405 which are associated with the primary end and with the secondary end respectively of line link 202A. Select magnets 404 and 405 thereupon operate to effect mechanical selection of link 202A at primary switch 800A and at secondary switch 900A. When select magnets 404 and 405 have both operated to effect the noted selection, battery potential from resistor CR in line controller 1200A is extended through contacts of magnets 405 and 404 and contacts of one of the line-controller switches to the primary-secondary off-normal wire PS–ON leading to the line controller.

Upon receiving battery potential over wire PS–ON, line controller 1200A operates hold magnets 403 and 406 to extend the calling line over the selected line link 202A to the matched originating trunk 203A. Hold magnet 403 is operated by the line controller upon the application of ground potential to the illustrated sleeve-units conductor SU, which is extended through contacts of one of the line-controller switches to sleeve conductor S–211A (an extension of sleeve conductor S of the calling line), and thence to battery through hold magnet 403 and lockout relay 402 in series. Upon operating, hold magnet 403 closes the illustrated stackup of contacts of primary switch 800A to extend calling line 200 to line link 202A. Additionally, it opens its illustrated hold-pilot contacts HP to disconnect line relay 401 (in the manner of the usual cutoff relay), whereupon line relay 401 restores.

Lockout relay 402, upon operating in series with hold magnet 403, prepares for placing the associated line in lockout condition if called upon so to do.

Line controller 1200A operates hold magnet 406 by applying ground potential directly to match-test conductor MT–213A, closing a circuit through the left-hand winding of hold magnet HM and thence to battery through the resistor 532 in block coupler 500–L over the previously traced path. Upon operating, hold magnet 406 connects conductors T, R, and S of line link 202A respectively to the corresponding conductors of originating trunk 203A, completing the extension of the calling line to the calling trunk. At the same time, hold magnet 406 locks itself to ground on its right-hand winding to sleeve conductor S of trunk 203A. Initially the locking ground on the sleeve wire is maintained on the left-hand winding of hold magnet 406 and over the sleeve conductor controlling the line. The line controller 1200A maintains the operate circuits of magnets 403 and 406 closed for an interval sufficient to permit the seized block coupler 500–L to return holding ground over the sleeve conductor of the seized originating trunk 203A. Shortly thereafter, line controller 1200A clears out and permits line-controller switches 1100A and 1000A to clear out, leaving the extended connection held by ground applied to the sleeve conductor thereof by the seized block coupler.

IIIB2. *Seizure of block coupler 500–L*

When block coupler 500–L is seized by the described extension of a connection thereto from calling line 200, over line link 202A, originating trunk 203A, and jumper 204, line relay 503 operates over the calling line, through contacts 1 and 2 of relays 501 and 502. Line relay 503, at its front contact 1, operates release relay 505 through contacts 3 of relay 501. At its contacts 1, release relay 505 transfers the sleeve conductor of originating trunk 203A from battery through resistor 532 to holding ground through closed contacts 2 of relays 512 and 513. The established connection, from the calling line to the block coupler, is thereby maintained after the line-controller apparatus of Fig. 4 has cleared out.

At its contacts 2, release relay 505 grounds the local locking conductor 519, thereby establishing a self-aiding circuit for relay 505 through its associated resistor 531. Relay 505, at its contacts 3, opens a point in the circuit of release-pulse relay 514 and prepares the local impulse circuit for the digit registers IDR to SR, through contacts of sequence device SE.

Line relay 503, at its contacts 2, closes a circuit for series relay 504 through contacts 8 of relay 507. Relay 504 operates after a momentary interval and, at its contacts 1, places dial tone on the calling line from the common dial-tone lead DT, through the small-capacity tone-coupling condenser 518; at its contacts 4, grounds the common tone-start lead to start the tone apparatus if it is not already operating; at its contacts 2, it connects time-pickup relay 513 to the common time-pulse lead TP to start the normal time-out period; and at its contacts 5, it extends ground to contacts of IDR preparatory to an advance of SE.

IIIB3. *Receipt of digit-pulses*

On hearing the noted dial-tone signal, the calling subscriber dials the digits in the directory number of the called line or station.

Each time the calling device is operated to transmit a series of circuit-interruption impulses, line relay 503 is restored momentarily for each such interruption impulse in a series, comprising from one to ten impulses, depending on the digit dialed.

Reelase relay 505 remains operated throughout any series of impulse-induced restorations of line relay 503, being slow restoring because of its indicated copper sleeve, and also because of the holding effect of the aiding current flow through the associated resistor 531. This resistor has such a value that the release relay cannot remain operated indefinitely in series with it, but can hold its spring-contact load longer without normal winding current than it otherwise could.

Series relay 504 restores promptly upon the first restoration of line relay 503. Being slow operating because of a comparatively inductive winding and a comparatively heavy biasing-spring adjustment, relay 504 remains restored throughout the digit series of momentary restorations of the line relay.

With release relay 505 maintained continuously operated, each restoration of line relay 503 delivers an impulse at its break contact 1, through make contact 3 of relay 505, and break contact 5 of relay 510, to wire 550. The digit-sequence contacts, sets 1B, and 2 to 5 of sequence device SE, are so interconnected that the first series of impulses over wire 550 is transmitted to the lower, or operating, windings of the electromagnets of the initial-digit register IDR..

When line relay 503 comes to rest operated at the end of any digit series of impulses, series relay 504 shortly reoperates, responsive to the continued closure of its circuit, and closes a stepping circuit for sequence device SE. This circuit is through make contacts 1 of register IDR (closed as later described), and through back contact 5 of relay 507 and contacts 3 of relay 514.

The first stepping impulse, which is delivered (as noted) to device SE at the end of the receipt and registration of the initial digit, causes both its contact sets 1A to 1B to shift to their alternate position. Make contacts 1A prepare the normal clearout circuit for release-pulse relay 514; break contacts 1A disconnect resistor 532 to prevent reapplication of idle-indicating potential to the incoming sleeve conductor of the coupler before SE is cleared out; and contacts 1B disconnect the incoming impulse wire 550 from the first register IDR and transfers it to the second register HR, through break contacts 2 and make contacts 1B.

On subsequent steps of sequence device SE (which occur during reverting or terminating calls), its contacts 2 operate to transfer the impulse wire 550 to tens register TR; its contacts 3 operate to transfer wire 550 to units register UR; its contacts 4 operate to transfer wire 550 to station register SR; and its contacts 5 operate, following registration of the station digit, to open impulse wire 550 and to close a point in the circuit of terminating-chain relay 512.

IIIB4. *Initial-digit registration*

When the impulses of the initial digit are delivered over wire 550 to the operating windings of the initial-digit register IDR as described, the contact sets (1 to 10) of this register are actuated successively responsive respectively to the impulses of the digit.

On receipt of the first impulse at IDR, its break contacts 1 disconnect dial-tone lead DT to prevent reapplication of dial tone upon any subsequent reoperation of series relay 504, and make contacts 1 prepare the previously traced stepping circuit of sequence device SE.

IIIB5. *Absorbing the initial digit 1*

Block coupler 500–L is arranged to absorb the initial digit 1 as many times as dialed or otherwise produced, as by improper hookswitch operation or by line trouble. Accordingly, the digit 1 is unassignable as an effective initial digit.

When the initial digit received contains only a single impulse, the first contact set is the only one operated in the initial-digit register IDR. Then, when series relay 504 reoperates as described at the end of the initial-digit registration, release-pulse relay 514 is operated from ground through make contacts 5 of the reoperated series relay 504, and through make contacts 1 and break contacts 2 of initial-digit register IDR. Relay 514 thereupon at make contacts 2, closes a series circuit for the upper (release) windings of all six impulse counters to release counters SE and IDR by neutralizing the residual holding flux in each. Release-pulse relay 514, at contacts 3, opens the closed operating circuit of counter SE to render the flow of release current effective thereat.

The release of counter SE transfers pulse lead 550 back to initial-digit register IDR. The release of register IDR open-circuits release-pulse relay 514, which restores after a slight interval, being slow restoring to insure a sufficient length of release pulse to fully release all operated counting devices. Relay 514 opens the release circuit of the counters and reconnects the operate windings of counter SE. These windings are not immediately reenergized, as a point in their operating circuit has been opened by the release of register IDR. The release of IDR also reapplies dial tone to the calling line as a signal that the calling subscriber should start dialing from the beginning.

IIIBA. *Outgoing calls*

On the dialing of any initial digit 2 to 0, register IDR makes connection with the corresponding one of the nine initial digit leads ID2 to ID10, which extend to the outgoing controlled 1700. One of these leads (ID6 in the illustrated embodiment) corresponds to the initial digit assigned to the 1000-line block of local line numbers, and is rendered ineffective at the outgoing controller, as shown in Fig. 17. The remaining ID leads may correspond to respective groups of outgoing trunks, and extend to the block controller through respective initial-digit relays of the outgoing controller.

IIIBA1. *Outgoing call-in of block controller and marking at group controller*

When the initial digit dialed is one assigned to a group of outgoing trunks, such as those outgoing to exchange C, the reoperation of series relay 504 at the end of the digit closes the outgoing chain to extend marking ground to the outgoing controller 1700 over the corresponding one of leads ID2 to ID10. This operation is subject to the outgoing chain being idle, in which case a ground potential is present on the outgoing-chain-in conductor of the first coupler in the section containing the calling block coupler 500–L. For this block-coupler section, the conductor referred to is OTG-CH-IN in cable 224 incoming from the block-controller switch 1500 of Figs. 2, 6, and 15. This wire originates at one of the section-preference relays of Fig. 15, part 1. As indicated in Fig. 5, part 1, this conductor extends through chain contacts of all of the block couplers of the section to the outgoing-chain-end conductor OTG-CH-END, multipled to all couplers of the section. Ground potential on conductor OTG-CH-END now passes through closed contacts 3 of relay 511, the winding of relay 511, and through contacts 6, 4, and 3 of relays 510, 501, and 504, to wire 520 which leads to IDR. With register IDR set according to an outgoing group (such as to exchange C) wire 520 is thereby extended to the selected one of the initial-digit leads ID2 to ID10, the one which corresponds to the called group of trunks. The outgoing chain circuit is thus extended through a series marking relay in the outgoing controller 1700, to battery through the outgoing-start relay of the block controller 1600.

The last-mentioned relays operate (1) to mark the called group in the outgoing controller and (2) to inform the block controller that an outgoing call has been received. The outgoing controller thereupon informs the block controller as to the busy or idle condition of each of the outgoing trunks in the called group, while the block controller proceeds to match a path across the block link frame to an idle one of them.

IIIBA2. *Chain seizure and guarding*

In the outgoing-chain relays (Fig. 15) associated with block-controller switch 1500, the concerned section-preference relay operates to open the outgoing chain to all other block-coupler sections, and to position block-controller switch 1500 to select the block-link primary switch 1300 which serves the block-coupler section containing the calling block coupler.

In the calling block coupler 500–L outgoing-chain relay 511 operates in the traced circuit to lock itself to outgoing-chain-in conductor OTG-CH-IN (at its make contacts 2), and (at its break contacts 2 and 3) it isolates the associated chain-end conductor OTG-CH-END from the chain to guard the outgoing chain from seizure by any other block coupler in the same section, whereby the common control apparatus on the block-link frame is rendered temporarily individual to block coupler 500–L.

Outgoing-chain relay 511, at its contacts 1 and 4, connects up the common outgoing busy and switching wires (OTG-BU and OTG-SW) to the local wires of this coupler, and at its contacts 5 it closes a non-operating priming circuit for switch-through relay 501.

IIIBA3. *Outgoing busy condition*

If no outgoing trunk in the called group is available (as when all trunks in the called group are busy, or when no match is possible to any idle one of them), or if an unassigned initial digit has been dialed, the block controller grounds the common wire OTG-BU (shown as in cable 222A), operating busy relay 510 in the block coupler through contacts 4 of relay 511. Relay 510 locks itself to grounded conductor 519; opens the outgoing chain at its contacts 6 to release outgoing-chain relay 511, freeing the seized outgoing chain, the outgoing controller, and the block controller; opens impulse wire 550 at its contacts 5 to prevent further registration if further digits are dialed; at its contacts 2, it shunts the contacts of series relay 504 which connect up time-pickup relay 513, thereby avoiding release of relay 513 (if operated) to start a new time-out period in the event of further dialing; and it applies an outgoing-busy tone to the calling line from common busy-tone wire OTG-BT, through contacts of the unoperated register HR, contacts 1 of busy relay 510 and through the tone-coupling condenser 518.

The calling subscriber is expected to replace his receiver upon hearing the distinctive outgoing-busy tone, to thereby initiate the normal release of the connection. Otherwise, the connection times out as is later described.

IIIBA4. *Outgoing matching and path selection*

Normally, there is an available idle trunk in the called outgoing group, such as trunk 2020 in which event an idle path is matched to such trunk over a block link such as 206U of the pair illustrated in Fig. 6. The idle condition of trunk 2020 is indicated in the outgoing controller 1700 by idle-indicating battery potential normally applied to sleeve conductor S of trunk 2020 by trunk coupler 2001 and reaching the outgoing controller through the left-hand winding of hold magnet HM17 and match-test conductor MT-227. The busy or idle condition of block links such as 206U and 206L is determined by the block controller over respective sleeve conductors 225 extended thereto through contacts of the block-controller switch 1500. Sleeve resistors RU and RL are connected respectively to conductors 225 by the block-controller switch, thereby applying idle-indicating battery potential to each of them subject to being masked by ground potential thereon at any block link which is actually in use.

When the path over items 206U and 2020 has been determined by the matching operation of controllers 1600 and 1700, block controller 1600 closes a circuit through contacts of block-controller switch 1500 and over select-magnet wire SM of principal select magnets 605 and 606 in series. In order to effect selection of the matched upper link 206U of the illustrated pair, as distinct from the lower link 206L thereof, block controller 1600 closes a circuit from ground through the upper auxiliary select magnet SMU–604 of primary switch 1300 over the associated wire SMU and contacts of the block-controller switch, conductors and contacts in the block controller, wire SMU leading to switch 1400, and thence to battery through the upper auxiliary select magnet SMU–607. Auxiliary magnets 604 and 607 thereupon operate to complete the mechanical selection of link 206U.

An off-normal or pilot circuit now extends from ground through off-normal contacts controlled in common by auxiliary select magnets 603 and 604 of switch 1300, contacts of any one of the ten principal magnets 605, primary off-normal conductor PON, contacts controlled by any one of the ten principal select magnets 606, contacts controlled in common by auxiliary select magnets 607 and 608, and thence over secondary off-normal conductor SON to block controller 1600.

IIIBA5. *Trunk seizure and switch-through*

Upon receiving ground as noted over the associated conductor SON, block controller 1600 closes circuits to effect the extension of the connection through switches 1300 and 1400. Closure of the switch 1400 is responsive to the application of ground potential to match-test conductor MT–227 by the block controller thereby closing a circuit through the left-hand winding of hold magnet 609 and thence over sleeve conductor S of outgoing trunk 2020 to battery in trunk coupler 2001. Hold magnet 609 thereupon locks its right-hand winding to the associated sleeve conductor S, at the same time closing its principal stackup (vertically aligned with magnet 606) which partially extends both block links of the illustrated pair, and closing its upper auxiliary stackup U (aligned with select magnet 607) to extend the conductors T, R, and S, of block link 206U respectively to conductors T, R, and S of the matched outgoing trunk 2020.

The circuit closed by block controller 1600 for effecting closure of the matched connection at primary switch 1300 is over outgoing switching conductor OTG-SW (shown in cable 222A), and thence through contacts 1 of outgoing-chain relay 511, switching conductor SW, and thence to battery through the right-hand winding of hold magnet HM2–602. Magnet 602 locks its left-hand winding to ground on the associated sleeve conductor S of extension group 205, and at the same time closes its associated principal and auxiliary stackups selected respectively by magnets 605 and 604. Conductors T, R, and S in group 205 are thereby extended respectively to conductors T, R, and S in block link 206U, and thence through secondary switch 1400 as stated to the corresponding conductors in outgoing trunk 2020.

Hold magnet 602 also grounds hold-pilot wire HP in group 205, thereby closing an operate circuit through break contacts 1 of tens register TR for switch-through relay 501 of block coupler 500–L.

Switch-through relay 501 operates promptly because of its pre-existing partial energization, through the priming resistor controlled by contacts 5 of relay 511. On operating, switch-through relay 501 opens the closed outgoing chain at its contacts 4, thereby initiating the clearing out of the common apparatus 1500, 1600, and 1700, and restoring outgoing-chain relay 511.

At its contacts 1 and 2, relay 501 switches the tip and ring conductors of the attached originating trunk through metallically to conductors T and R of extension group 205, now extended across the block-link frame to the trunk coupler 2001 (Fig. 7) associated with the seized outgoing trunk. The line and release relays (not shown in Fig. 7) thereupon operate in the seized trunk coupler, whereby holding ground is applied to the sleeve wire at that point to maintain the extended connection.

Line relay 503 of the block coupler is disconnected and restored by the described switch-through operation, relay 504 promptly restoring. After a slight interval release relay 505 restores and removes the local holding-ground connection from the sleeve conductor, leaving the established connection held by the seized trunk coupler. Relay 501 is the only relay now held operated in block coupler 500–L.

The impulses constituting the remaining digits in the called number are repeated at trunk coupler 2001 of Fig. 7 as hereinafter described for trunk coupler 2001 as shown in Fig. 20.

IIIBA6. *Outgoing-call clearout*

When trunk coupler 2001 on the seized outgoing trunk clears out, responsive to the receiver being replaced on the calling line, it removes ground potential from the sleeve conductor of the established connection, thereby breaking down the connection by releasing the primary and secondary hold magnets 602 and 609 on the block-link frame and lockout relay 402 and hold magnets 403 and 406 (Fig. 4) on the line-link frame. The release of primary hold magnet 602 on the block-link frame ungrounds the associated conductor HP to release switch-through relay 501 of coupler 500–L.

Release-pulse relay 514 is now operated (through contacts 3, 1, and 3 of relays 501, 503, and 505, through make contacts 1 of SE) to energize the series-connected residual-flux neutralizing windings of SE to SR, releasing the operated counter SE and IDR. Counter SE open-circuits relay 514 which shortly restores, completing the clearing out of block coupler 500–L.

IIIBB. *Terminating calls*

When following the described seizure of block coupler 500–L, the initial digit dialed is the digit 6, serving as a thousands digit to index the local block of one thousand line numbers, the corresponding initial digit lead ID6 (not shown in Fig. 5) is selected by initial digit register IDR by being connected to conductor 520 through make contacts 6 and break contacts 7 (not shown) of IDR. Lead ID6 stands open in the outgoing controller, wherefore outgoing chain relay 511 is not operated, and none of the common equipment is taken for use at this time.

IIIBB1. *Registering digits H, T, U, and ST*

The dialing of the initial digit is followed by the dialing of the hundreds, tens, units, and stations digits in the called number. They are registered respectively on registers HR, TR, UR, and SR, being transmitted from conductor 550 to these registers through make contacts 1B, 2, 3, and 4 respectively, of device SE. Device SE advances to position 5 (operates its contacts 5) at the end of the registration of the stations digit to disconnect the operating circuit of station register SR and to call in the block controller.

IIIBB2. *Terminating call-in of block controller*

When sequence device SE takes its fifth step, at the end of the dialing of the stations digit, its break contacts 5 open the impulse circuit of register SR to guard against the possibility of further dialing, and its make contacts 5 connect up the common terminating-start wire TER-ST of the block controller. If the terminating chain is closed at the section-preference relays (Figs. 15, part 1), and is closed at this block coupler section, ground potential through a relay and contacts of the section preference relays is extended to the terminating chain-in TER-CH-IN conductor, in cable 224, to the first coupler of this section, and extends thence (through the chain contacts 4 of relay 512 of each) to the end conductor of the chain, TER-CH-END, which is common to all couplers of the section. The ground on the latter conductor is now extended, through the closed contacts 3 and the winding of relay 512, contacts 3 and 5 of relays 510 and 509, and make contacts 5 of SE, to terminating-start wire TER-ST, shown as a conductor of cable 222A. Wire TER-ST extends to battery through the terminating-start relay in the block controller, which now operates to prepare the block controller for handling a locally terminated call.

IIIBB3. *Chain seizure and guarding*

Over the above-traced circuit, the concerned section-preference relay is operated to set block-controller switch 1500 on block-link primary switch 1300, and to guard the common terminating chain against seizure at any other block coupler section. Terminating-chain relay 512 is operated in the traced circuit in this block coupler to seize the terminating chain and to guard it against seizure by any other coupler in the same section, by locking itself (at its make-first contacts 3) to the associated chain-in wire, and isolating TER-CH-END from the chain at break contacts 3 and 4.

Terminating-chain relay 512, at its break contacts 2, disconnects the sleeve conductor S of the attached originating trunk from ground at closed contacts 2 of relay 513, and at its make contacts 2 transfers it to ground on sleeve-ground conductor SG of the block controller, pursuant to the reverting-call test; at its contacts 5, 1, 10, and 11, respectively, it connects up reverting-call wire RC, the terminating-switch wire TER-SW, and the terminating-busy wire TER-BU of the block controller, and ring-reverse wire RR of the block translator.

IIIBB4. *Digit-setting of block translator*

Relay 512 further effects the setting of the block translator in accordance with the registered hundreds, tens, units, and stations digits, by grounding the common leads 521 to 524 of the registers HR, TR, UR, and SR at its contacts 6 to 9, thereby grounding the previously selected one of the leads in each of the groups H, T, U, and ST extending to the block translator and shown as wires in the cable 223A.

IIIBB5. *Divided-ringing control*

If any station digit 0, 1, 2, 3, or 4 has been dialed, ring-reverse relay 506 does not operate, but it is operated by the block translator (over ring-reverse wire RR) if the station digit information received thereby shows that any stations digit 5 to 9 has been dialed. When it is thus operated, relay 506 reverses the ringing leads at its contacts 1 and 2, and at its contacts 3 it prepares to lock itself to ground through contacts of relays 509 and 507.

IIIBB6. *Testing the called line*

Upon receiving the extended digit information, the block translator transmits a suitably translated version of the hundreds, tens, and units digits to the line controller on the line-link frame at which the called line terminates, using the station-digit information only for the noted ringing-control purpose, and station-intercept purposes to be explained subsequently.

If the illustrated station S2 is the one called, it is served by the line-link frame B which includes apparatus shown in Fig. 7. In this event, the translated digit information is sent to line controller 1200B over conductors in cable 223B.

On receiving the translated digit information indicating which primary switch (primary switch 800B, Fig. 7) serves the line being called, and indicating the fives and units location of the called line thereon, line controller 1200B identifies itself at block controller 1600 by a signal transmitted over a conductor in group 222B and positions line-controller switches 1000B and 1100B in accordance with line-link primary switch 800B and in accordance with the fives group thereon in which called line 210 is located.

When switches 1000B and 1100B have been set, one of them extends the sleeve conductor S–211B of the called line over sleeve-units wire SU–240B to line controller 1200B, whence it is extended over a conductor in cable 222B to the block controller 1600 to enable the called line to be tested as to its busy or idle condition. At the same time, each of the ten link sleeves associated with the called primary switch 800B is connected to the line controller through one of the line-controller switches. For example, the sleeve of the illustrated link is connected through link-sleeve wire LS–212B and link-test wire LT. Link resistor LR is connected to this sleeve conductor over conductor LB and other contacts of the line-controller switches to provide an idle-indicating test potential on the sleeve of the link unless the link is in use. The busy or idle condition of the line link serving primary switch 800B is separately indicated to block controller 1600 over respective conductors in cable 222B.

IIIBB7. *Terminating-busy operation*

On testing the called line, if block controller 1600 finds it busy, or finds that no idle path can be matched thereto, the block controller grounds its terminating-busy lead TER-BU (shown in cable 222A), thereby operating busy relay 510 in block coupler 500–L through contacts 10 of relay 512. Relay 510, at its contacts 4, locks itself to ground on wire 519, through break contacts 6 of SE; opens its contacts 3 to release relay 512 and to free the terminating chain; closes its contacts 2 to shunt the make contacts 2 of relay 504 which controls time-pickup relay 513, to avoid starting a new time-out period in the event of subsequent dialing; and closes its contacts 1 to apply busy-tone current to the calling line from terminating-busy-tone wire TER-BT through make contacts 1 of hundreds register HR.

If the calling subscriber does not replace his receiver in response to the returned terminating busy-tone signal to thereby cause the connection to be cleared out normally, the connection is cleared out under the control of the common timing apparatus at the end of the normal time-out period measured from the dialing of the stations digit, as will hereinafter appear.

IIIBB8. *Called-line seizure*

If the called line is idle, and if an idle path can be matched thereto, the block controller matches such a path, such as over block link 206U (Fig. 6), terminating trunk 207B, and line link 202B.

Block link 206U is selected mechanically at switches 1300 and 1400 by the operation of select magnets 604 to 607 as described, whereupon they cooperate to ground conductor SON as described to signal the block controller 1600.

Line link 202B is selected mechanically by the operation of select magnets SM–705 and SM–704. Their circuit is closed at the block controller over a wire in cable 222B, through line controller 1200B, wire LSM, a contact pair of one of the line-controller switches, the associated select-magnet wire SM, and thence to battery through magnets 704 and 705 in series.

With magnets 705 and 704 operated, a signal is transmitted to block controller over a circuit path from battery at control resistor CR of the line controller 1200B, series contacts of magnets 705 and 704, contacts of a line-controller switch, associated wire PS-ON, and thence to the block controller over a wire in cable 222B.

Upon receiving the noted signals that the select magnets have operated on the block-link and line-link frames, block controller 1600 grounds the sleeve of the called line 210 (Fig. 7) over the noted test extensions thereof, thereby operating hold magnet HM–703 in series with lockout relay 702. Magnet 703 disconnects line relay 701 and connects the called line to the selected line link 202B. Block controller 1600 also grounds the sleeve wire of the matched terminating trunk 207B (by way of wire MT–226, thereby operating magnet HM1–610 on the block-link frame and secondary hold magnet HM–706 on the line-link frame. Block link 206U is thereby extended over conductors T, R, and S of trunk 207B to line link 202B. Block controller 1600 also grounds its switching wire TER-SW (shown in cable 222A), closing a circuit through contacts 1 of relay 512 of block coupler 500–L, and over conductor SW extending therefrom, to operate the associated primary hold magnet HM2–602 to complete the connection over the matched path to the called line. Hold magnet HM2–602 also closes its local contacts to ground hold-pilot conductor HP, which operates switching relay 509 through make contacts 1 of tens register TR.

Upon operating, switching relay 509 opens its contacts 5 to restore relay 512 and free the terminating chain and the common apparatus. Contacts 4 of relay 509 shunt contacts 2 of relay 504 to prevent the starting of a new time-out period in the event of further dialing; its contacts 6 ground the common generator-start lead GEN-ST to start the ringing-interrupter and generator apparatus if it is not already in operation; its contacts 7 complete the locking circuit of relay 506, if operated; its contacts 8 operate transfer relay 515 to disconnect the ten output leads of station register SR from station leads ST of the block translator and transfer them respectively to the ten interrupted-generator leads INT-GEN 1 to 9 and INT-GEN 0, contacts 2 and 3 of relay 509 close the ringing circuit to the called line; and its contacts 1 apply ringing tone to the calling line from common lead RT, through contacts 1 of relays 508 and 507, and through the tone coupling condenser 518. Intermittent tone is sent back to the calling line from lead RT to inform the calling subscriber that the ringing operation has begun.

IIIBB9. *Ringing the called station*

The block couplers and their associated common ringing apparatus provide for accommodating up to ten harmonic-ringing stations, either bridged or divided ringing, on any party line by (1) employing a one-ring code and a two-ring code for each of five frequencies of ringing current, and by (2) ringing over one line wire or the other according to the station called, as shown in the following ringing chart:

IIIBB9a. *Ringing chart*

| Stations Digit | Frequency | |
|---|---|---|
| 0 | 1 | 1 short on tip wire. |
| 1 | 2 | |
| 2 | 3 | |
| 3 | 4 | |
| 4 | 5 | |
| 5 | 1 | 2 shorts on ring wire. |
| 6 | 2 | |
| 7 | 3 | |
| 8 | 4 | |
| 9 | 5 | |

The foregoing ringing arrangement provides:

(1) Semi-selective (one-ring and two-ring) service for ten bridged stations (ringers bridged across the line); and (2) Full selective service for ten divided-ringing stations (the ringers of 1-ring stations 0 to 4 connected between the tip conductor and ground, and the ringers of 2-ring stations 5 to 9 connected between the ring conductor and ground).

In order to provide the foregoing party-line ringing service, ten interrupted-generator leads INT-GEN 0 to 9 are so controlled by the usual common ringing apparatus (not shown) that Nos. 0, 1, 2, 3, and 4 have respective frequencies 1 to 5 applied thereto once during each ringing cycle, and interrupted-generator leads Nos. 5 to 9 have the respective frequencies 1 to 5 applied thereto twice during each ringing cycle.

The ringing circuit is from the selected one of the generator leads INT-GEN 0 to INT-GEN 9, through the associated make contacts of transfer relay 515, the associated contacts of station register SR, conductor 524, line winding of ring-cutoff relay 507, make contacts 3 of switching relay 509, whence it passes (1) to the tip conductor T of the called line (if stations digit 0 to 4 has been dialed, and ring-reverse relay 506 is therefore not operated) through break contacts 2 of relays 506 and 607, or (2) to the ring conductor R of the called line (if stations digit 5 to 9 has been dialed and ring-reverse relay 506 is consequently operated), through make contact 2 of relay 506 and break contact 3 of relay 507.

A return path to ground for the transmitted ringing current is provided (1) over the ring conductor R (when relay 560 is not operated), through break contacts 3 and 1 of relays 507 and 506, and make contacts 2 of relay 509, to generator-ground conductor GEN-GRD, or (2) over the tip conductor T (when relay 506 is operated), through break contact 2 of relay 507, and make contacts 1 and 2 of relays 506 and 509, to conductor GEN-GRD.

Ring-cutoff relay 507, whose line winding is included in the ringing circuit does not operate before the call is answered, for each ringer (not shown) on the called line has the usual condenser in series therewith to block D. C. flow, and because the shading collar surrounding the armature end of the core of relay 507 keeps it from responding to the alternating ringing current.

In order to permit ring-cutoff relay 507 to be operated by direct-current flow during the application of ringing current (if the call is then answered), any applied frequency of ringing current is in series with (superimposed on) the free pole of the usual grounded exchange battery. Preferably, during the silent period, battery alone is applied to each of the generator leads (INT-GEN 0 to INT-GEN 9) rather than generator current in series with the exchange battery.

IIIBB10. *Ring-cutoff operation*

When the call is answered at the called station S2 on line 210, the closure of the usual talking bridge across the called line causes direct current to flow thereover from the generator lead in use, operating ring-cutoff relay 507 through its line winding sufficiently to close its make-first self-locking contacts 4. These contacts close a local self-locking circuit for operating relay 507 fully. At its contacts 2 and 3, relay 507 opens the ringing circuit and completes the talking circuit; as a current-saving measure its contacts 8 open-circuit and restore relays 504 and 515 (and also relay 506, if operated); its contacts 7 remove the local ground connection from wire GEN-ST; its contacts 1 disconnect ringing-tone lead RT; and its contacts 5 transfer the operate winding of sequence device SE to time-pulse lead TP, incidental to conversation timing.

IIIBB11. *Answered supervision*

Back-bridge relay 502 now operates over the called line. It interchanges the incoming tip and ring conductors to reverse the current flow over the calling line to serve any required supervisory function, and at break contacts 3, it open-circuits and restores time-pickup relay 513 (if operated) to cancel the normal time-out period, which has been running since the completion of dialing.

During conversation, the following five relays of block coupler 500-L are energized:

1. Back-bridge relay 502.
2. Line relay 503.
3. Release relay 505.
4. Ring-cutoff relay 507.
5. Switching relay 509.

IIIBB12. *Terminating-call clearout*

If the called subscriber (at station S2, Fig. 7) is the first to replace his receiver at the end of the conversation, back-bridge relay 502 thereupon restores, reversing current flow over the calling line back to normal direction, and reconnecting relay 513 to start a new unormal time-out period.

When the receiver is replaced on the calling line, line relay 503 restores and (at its make contact 1) open-circuits release relay 505, which restores a moment later, removing ground potential (at its make contact 1) from the sleeve conductor S of the established connection. The established connection is thereby cleared out, by the release of the primary and secondary hold magnets 403 and 405 on the calling line-link frame, the primary and secondary hold magnets 602 and 610 on the block-link frame, and the secondary and primary hold magnets 706 and 703 on the called line-link frame. The release of primary hold magnet 602 on the block-link frame ungrounds conductor HP, restoring switching relay 509.

Release relay 505 also ungrounds wire 519 to restore ring-cutoff relay 507, and it operates release-pulse relay 514 over its previously described path. Relay 514 closes the described series release circuit for the counters SE to SR, restoring all of them. Counter SE restores relay 514; completing the clearing out of the block coupler.

IIIBC. *Reverting call*

To make a reverting call (call another station on the same line with the calling station), the calling subscriber removes his receiver; responds to dial tone by dialing the regular directory number of the called station; replaces his receiver upon hearing a distinctive reverting-call tone prompting him so to do; waits a reasonable time for ringing current to be applied to the line to signal the called station; and then again removes his receiver for conversation. It may be assumed, for the purpose of this description, that the subscriber at station S1 has become connected to block coupler 500-L as described, and has dialed the number of another station on calling line 200.

When block coupler 500-L is used for a reverting call, its operation is as described for a terminating call, up to the point when the common apparatus on the block-link frame has been called in, after the complete number has been dialed and registered on registers IDR to SR. This includes the operation of terminating-chain relay 512 which, among other things, makes the described substitution (at its contacts 2) of the grounded sleeve-ground conductor SG of the block controller for the local source of holding ground normally applied to the sleeve conductor S incoming to the block coupler 500-L.

In the present example, since the number dialed is that of a line (200) served by line-link frame A as shown in Fig. 4, block translator 1800 sends the translated equivalent of the hundreds, tens, and units digits of the called number over wires in cable 223A to line controller 1200A, which responds as described for line controller 1200B to set line controller switches 1100A and 1100B appropriately, thereby closing a test extension of sleeve conductor S of the called (and calling) line 200 to the block controller 1600 over conductor S-211A, line-controller contacts, conductor 240A, and a wire in cable 222A.

IIIBC1. *Conditioning the block coupler for the reverting call*

The holding ground maintained on the sleeve of calling line 200 by block coupler 500-L causes that line to test busy when the block controller 1600 tests it over the described extended sleeve connection. Before treating the called line as normally busy when it tests busy as stated, the block controller inserts a resistor in series with its sleeve-ground wire SG (shown in cable 222A). Since ground is now being held on the sleeve conductor S of the connection over wire SG, through make contact 2 of relay 512, a partial battery potential is thereby caused to appear on the sleeve conductor S of the calling line. The appearance of this potential on the line being tested characterizes the call as a reverting call.

Reverting-call ringing is a ring-back process not requiring a connection forward from the block coupler. Therefore, the block controller now performs no matching operation, but forthwith grounds its switching conductor SW and reverting-call conductor RC (shown in cable 222A), thereby operating reverting-call relay 508 along with primary hold magnet 602 on the block-link frame. Since matching has not occurred, no select magnet is operated at switch 1300. Therefore, hold magnet 602 operates only its hold-pilot contacts (shown immediately to the left thereof), grounding wire HP to operate switching relay 509.

Relay 509 restores relay 512 to free the terminating chain; closes the ringing circuit to the unextended outgoing tip and ring conductors T and R of the coupler; and performs its other previously-noted functions. Reverting-call relay 508, at its contacts 2, locks itself to the operating ground of relay 509; at its contacts 3, it closes a holding circuit for relay 505 through contacts 6 of ring-cutoff relay 507, to lock the connection against release during reverting-call ringing; and at its make contacts 1, it places reverting-call tone on the called line from tone conductor RCT to prompt the calling subscriber to replace his receiver to initiate the reverting-call ringing.

IIIBC2. *Inverting the block coupler*

When the receiver is replaced on the calling line, line relay 503 and series relay 504 restore, but release relay 505 is held operated through contacts 6 and 3 of relays 507 and 508.

Relay 504, at its closed contacts 6, operates switch-through relay 501 through make contacts 4 of relay 508. Relay 501, at its contacts 1 and 2, inverts the block coupler for operation as a ring-back source, by disconnecting the incoming tip and ring conductors from their normal input connection and transferring them to the unextended outgoing tip and ring conductors. The ringing current applied to such unextended outgoing conductors as previously described (through contacts of the operated switching relay 509) is now extended back to the calling line to signal the called station thereon.

The relays now operated in the block coupler (during reverting-call ringing) are Nos. 501, 505, 508, 509, 515, and (if the registered stations digit is 5 to 9) 506.

IIIBC3. *Answering clearout*

When the receiver is removed at the called station on line 200, or when it is removed at the calling station S1 after the elapse of sufficient time for reverting-call-ringing to have occurred, ring-cutoff relay 507 is operated over the subscriber line. It locks itself to ground on conductor 519; at its contacts 8, it restores transfer relay 515 and relay 506, if operated; at its contacts 2 and 3 it disconnects the ringing circuit and substitutes back-bridge relay 502, which operates but only momentarily, as will appear.

Relay 507 also opens the holding circuit of release relay 505, which restores after a slight interval to remove holding ground from the associated sleeve conductors. This operation clears out the connection by opening the holding circuit of hold magnets 403, 406 and 602. Magnet 602 ungrounds the associated conductor HP, releasing relays 508 and 509.

Relay 503 releases relay 501 whereupon release-pulse relay 514 is operated as previously described to deliver a neutralizing impulse to release the counters SE to SR, and is restored by the release of counter SE.

Block coupler 500-L is again in its normal idle condition.

IIIBC4. *Reverting-call lockout*

At the line-link primary switch 300A, Fig. 4, when ground is removed from the sleeve conductor S of the established connection, slow restoring lockout relay 402 is still operated when hold magnet 403 restores and reconnects line relay 401. Ordinarily, this operation occurs with the associated line unbridged, wherefore line relay 401 does not respond, and relay 402 restores after its momentary delay interval. But, line 200 is now bridged at one or both of the calling and called stations thereon, wherefore line relay 401 immediately reoperates upon being reconnected.

At its inner contacts, line relay 401 locks relay 402 operated, and the locking ground passes through the winding of hold magnet 403 to the associated sleeve conductor S to mark the line busy during the reverting-call conversation. At the lower front contacts of relays 401 and 402, ground is placed on the common permanent-alarm conductor PA as a signal that at least one line is bridged or grounded, and stands thereby locked out of normal service.

When the reverting-call conversation is terminated, and receivers have been replaced at both stations, relays 401 and 402 restore successively, terminating the locked-out condition of line 200.

IIIBD. *Timing-out provisions*

The previously referred to timing-out provisions of block coupler 500-L comprise:

1. Permanent timing which comprises releasing the connection to free the block coupler when seized from a line which is "permanent" (has a trouble condition simulating a call) or which becomes permanent before the connection is released; and 2. Conversation timing which comprises releasing the connection to free the block coupler when the conversation period exceeds a predetermined time interval.

A line may become "permanent" (acquire a relatively permanent calling or holding condition) because of substation or line trouble (a short, a cross, or a ground), or because the receiver is not replaced after use, or is accidentally dislodged. A line is treated as permanent whenever the next operation to be performed (dialing a digit, answering, or hanging up), is delayed for a period longer than the assigned normal time-out period.

The timing-out provisions are controlled by a common time-out timer (not shown) from which common conductors TP, TH, and TW (time-pulse, time-hold, and time-warn) are connected. Time-hold conductor TH is normally grounded at the timer, and conductors TP and TW are normally ungrounded.

The time-out timer is arranged to pass through a cycle of operations in one-quarter of the timed conversation period. During any such cycle it (1) reaches clearout position wherein it momentarily ungrounds TH, (2) almost immediately reaches pickup position wherein it momentarily grounds TP, and (3), near the end of its cycle, it momentarily grounds conductor TW.

For clarity, it will be assumed that the time-out timer has a two-minute cycle. Then, as will hereinafter appear, (1) the normal time-out period (for permanent timing) is two minutes, plus a pre-pickup interval ranging from 0 to 2 minutes, and (2) the conversation time-out period is eight minutes, plus a pre-pickup period of from 0 to 2 minutes.

IIIBD1. *Permanent timing*

Permanent timing starts at block coupler 500–L when series relay 504 is first operated by line relay 503, upon seizure of the coupler. Contacts 2 of relay 504 (to which relay 513 is normally connected by contacts 3 of relay 502) connect relay 513 to conductor TP through contacts 3 of relay 513.

1a. *Pre-pickup period*

A variable pre-pickup interval starts with the noted operation of relay 504, and lasts until the time-out timer next reaches its pickup (or starting) position. This pre-pickup interval, for a two-minute timer, ranges from 0 to 2 minutes, depending on where the timer is within its cycle when relay 504 operates. The variable pre-pick-up period begins with the operation of relay 504 and lasts until relay 513 operates.

1b. *Two-minute time-out interval*

If relay 504 is still operated when the timer reaches its pickup position, the consequent grounding of lead TP (by the timer) operates time-pickup relay 513 (through break contacts 3 of relay 513, make contacts 2 of relay 504, and break contacts 3 of relay 502). At its make contacts 3, relay 513 locks to ground locally and disconnects its winding from the temporarily grounded lead TP, and at its contacts 2, it transfers the incoming sleeve conductor S from its local source of holding ground to the normally grounded time-hold conductor TH.

1c. *Timing out*

If series relay 504 remains operated continuously (for lack of dialing), time-pickup relay 513 is still held locked operated when the timer next reaches its time-out position. Then the noted temporary ungrounding of conductor TH by the timer removes holding ground from the sleeve conductor S of block coupler 500–L. The connection is thereby cleared out; the calling line is locked out of normal service until cleared (as described under "Reverting-call Lockout"); and the block coupler is released and returned to common use.

If relay 504 is restored (as previously described, by the dialing of a digit) before the common timer reaches its time-out position, time-pickup relay 513 is thereby released, and a new normal time-out period starts upon the next reoperation of relay 504, at the end of the dialed digit.

On a locally terminated call, a similar normal time-out period runs following the dialing of any succeeding digit in the called number, starting upon the consequent reoperation of relay 504.

When a busy condition is encountered, on either a locally-terminated or an outgoing call, busy relay 510 shunts the time-pickup contacts 2 of relay 504 (in the circut of relay 513), whereby the connection is released thereafter at the end of the current normal time-out period even though the calling subscriber should temporarily restore relay 504 by dialing while the busy tone signal is being applied.

When switching relay 509 operates to start the ringing period, (on a normal terminating call, or on a reverting call), it similarly shunts the last-named contacts of relay 504 to cause the invariable release of the connection if ringing is still in progress at the end of the normal time-out period.

When a normal terminating call is answered, back-bridge relay 502, at its contacts 3, disconnects relay 513 to cancel permanent timing during conversation. But, when the called subscriber replaces his receiver ahead of the calling subscriber, relay 502 restores and recloses its contacts 3 to start a new normal time-out period, provided the connection is still held by the calling line.

IIIBD2. *Conversation timing*

When a normal terminating call is answered, and the conversation period starts (relays 507 and 502 operating), contacts 3 of back-bridge relay 502 disconnects the permanent-timing circuit of time-pickup relay 513 (as above noted) to cancel permanent timing during conversation. At its contacts 5, relay 507 starts the conversation-timing period by transferring the operating lower windings of counter SE to time pulse lead TP. This transfer occurs with counter SE in its fifth position, contact sets 1A, 1B, and 2 to 5 operated.

The conversation-timing time-out period comprises a variable pickup interval, followed by four cycles of the common timer. If a two-minute timer is used, the pickup interval ranges from 0 to 2 minutes, and the following four-cycle interval is eight minutes.

When the common timer next reaches its pickup position, it transmits an impulse over lead TP to the operate windings of SE (through make contacts 5 of relay 507, and contacts 3 of relay 514). This pickup pulse advances device SE to its sixth position (operates its contact set 6), thereby beginning the fixed four-cycle conversation-time interval. Break contacts 6 of SE open a point in the locking circuit of busy relay 510, and make contacts 6 of SE prepare to operate relay 510 from conductor TW during the final cycle of the period.

The next three pulses on lead TP advance device SE to its seventh, eighth, and ninth positions respectively.

When device SE is driven to its ninth (final) position, it shunts the time-disconnect contacts 3 of the operated back-bridge relay 502, whereupon time-pickup relay 513 operates on the same time pulse, and locks as described. At its make contacts 2, relay 513 renders time-hold conductor TH the source of holding ground on the sleeve conductor of the connection, thereby starting the fourth and final one-cycle interval of the fixed conversation-time period.

If the connection is still maintained during this final one-cycle interval, then when the common timer reaches its warning position (say half a minute before its cutoff position), a short application of ground to time-warn conductor TW operates busy relay 510 (through make contacts 1 of relay 513, and make contacts 6 of device SE) to make a temporary application of busy-tone current to the talking path from busy-tone lead TER-BT, through make contacts 1 of HR and 510, and condenser 518. The conversing subscribers are thereby warned that the connection is shortly to be released. Busy relay 510 does not lock itself operated at this time because break contacts 6 of SE are open.

If the conversation is still in progress when the common timer next reaches its time-out position, the resulting momentary ungrounding of conductor TH removes ground potential from the sleeve conductor of the connection, thereby clearing out the connection and causing both involved lines to be locked out, as described for line 200, until the receivers are replaced thereon.

IIIBE. *Test jack TJ*

Test jack TJ is adapted to receive a three-conductor test plug (not shown) when a test connection is desired to the incoming tip, ring, and sleeve conductors of block coupler 500–L. When such a plug is inserted, the break contacts thereof open the connection through which battery-supply resistor 532 normally applies idle-indicating battery potential to the sleeve conductor S of the connected originating trunk 203A, thereby causing the block coupler and this trunk to test busy to line controller 1200A for the duration of the test connection. When desired, a dummy plug may be inserted into jack TJ to cause the coupler 500–L and trunk 203A to test busy.

IV. *Line-link switches (Figs. 8 and 9)*

Figs. 8 and 9 are schematic wiring diagrams of a line-link primary switch 800 and a line-link secondary switch 900, respectively. Line-link primary switch 800 represents any one of the ten line-link primary switches on any one of the four line-link frames A, B, C, and D of Figs. 2, 3, 4, and 7.

In Figs. 8 and 9 the respective parts are illustrated in substantially the relative locations they occupy in the crossbar-switch structure disclosed in the previously noted patent application of Arthur.

IVA. *Line-link primary switch 800*

Line-link primary switch 800 (Fig. 8) is termed a 25 x 10 three-wire switch. It accordingly has twenty-five vertical rows of three-wire stackups of contact elements. These rows are termed verticals V1 to V25, respectively. The first and last verticals (V1 and V25) are illustrated, the intervening ones being omitted.

The verticals V1 to V25 are aligned to provide ten horizontal rows, termed horizontals 1 to 10. The first, second, and tenth of the horizontal rows are shown, the intermediate ones being omitted.

The 250 selective stackups of the switch 800 comprise a unitary structure which is termed a contact bank in the noted Arthur application. Each such stackup comprises three flexible, traveling contact members 801 and three stationary contact members 802, into connection with which they are respectively flexed upon selection and operation of the stackup. The indicated horizontal bank strips 803 (ten sets of three) connect the flexible members of the stackups as shown to provide ten three-wire horizontal paths through the switch. These strips have terminal members (shown to the left of the bank) to which the conductors comprising the line links 202 are connected.

The indicated twenty-five sets of vertical bank strips 805 connect the fixed contact members of the stackups as shown to provide twenty-five three-wire vertical paths through the switch. These strips have terminal members (shown above the bank) to which conductors comprising twenty-five subscriber lines (incoming from the main distributing frame M. D. F.) are connected as shown at 200 (Fig. 4) or at 210 (Fig. 7).

Primary switch 800 has ten select magnets SM1 to SM10, six of which are located at the left end of the switch and four at the right end of the switch, as shown. These select magnets correspond respectively to the ten horizontals of the switch bank. The select magnets, considered in five pairs (1 and 2, 3 and 4, 5 and 6, 7 and 8, 9 and 10) control the five armatures 806, shown in dotted outline. Select shafts (not shown) attached to the armatures extend across the contact bank of the switch in association with the corresponding pairs of horizontals thereof. Each armature 806 controls a pair of off-normal contacts 807 as a pilot indication when a desired selecting operation has been accomplished.

Primary switch 800 has twenty-five hold magnets HM1 to HM25 controlling the respective vertical rows of selective stackups V1 to V25. Hold-pilot stackups HP are associated respectively with the hold magnets. Any stackup HP is operated by any energization of the associated hold magnet, irrespective of the selecting operation. On the other hand, a stackup 1 to 10 in any vertical V1 to V25 is closed upon energization of the associated hold magnet HM1 to HM25, subject to the corresponding select magnet having been energized to rotate the associated select shaft (not shown) to effect mechanical selection of the corresponding horizontal row of stackups.

Mounted on the line-link primary switch 800 of Fig. 8, there are twenty-five line relays LR1 to LR25, and twenty-five lockout relays LO1 to LO25, which serve to couple the associated lines to the switchboard apparatus. The line and lockout relays for any line are as shown at 401 and 402 of Fig. 4 or at 701 and 702 of Fig. 7.

Each line relay LR, through contacts of its associated relay LO controls a marking conductor M and a fives conductor F. There are twenty-five marking conductors M at each line-link primary switch (a separate one for each line served thereby), but there are only five fives conductors F, a separate one for each five lines. From each primary switch 800, one primary off-normal wire PON, twenty-five individual mark wires M1 to M25, and five wires F1 to F5 extend to line-controller switch No. 2 (Fig. 11), and one primary wire P extends to the line controller (Fig. 12). Wire P is connected to fives wires F1 to F5 through respective fives resistors FR1 to FR5. As a result, the grounding of any fives wire places a derived ground on conductor P through the associated fives resistor to notfy the line controller of the call without requiring a third make contact on the concerned line relay.

IVB. *Line-link secondary switch 900*

The line-link secondary switch 900 (Fig. 9) is one of the five secondary switches employed on any line-link frame A, B, C, or D of Figs. 2, 3, 4, and 7. It is generally similar to the line-link primary switch 800 except that its contact bank comprises two sections, a left section 950 and a right section 951. For this purpose the horizontal bank strips 903 are severed between the final vertical V8L of the left section and the first vertical V1R of the right section. This arrangement provides twenty locations for line links 202 to be attached to terminals shown to the left of the respective sections 950 and 951.

The parts 901 to 907 and select magnets SM1 to SM10 correspond respectively to the parts 801 to 807 and SM1 to SM10 of switch 800.

Hold magnets HM–1L to HM–8L are associated with the respective verticals of the left section of the secondary switch, while hold magnets HM-1R to HM-8R are associated respectively with the verticals of the right section 951. Hold-pilot stackups HP are associated with the hold magnets at the verticals 4 to 8 of each section, but are not required to be associated with the hold magnets of the first four verticals of either section. At each section of switch 900, terminating trunks 207 are connected to the first four verticals respectively, and originating trunks 203 are connected to the last four verticals respectively. The terminating trunks extend to terminals on the block-link frame and are there jumpered to block couplers as required, as explained in connection with Figs. 3 and 4 to 7. The terminating trunks extend between the line-link secondary switches of Fig. 9 and the block-link secondary switches as shown in Figs. 2, 3, and 7, hereinbefore described. Match-test wires MT are associated respectively with the originating trunks 203 and extend between the line-link secondary switches and the associated line controller 1200 (Fig. 12).

Ten link-sleeve wires LS1 to LS10, connected to the respective sleeve leads of the line links 202, extend between any switch 800 and the associated line-controller switch No. 1 (Fig. 10). These are the wires over which the line links 202 are tested by the line controller to determine their busy or idle condition.

Select magnets SM1 to SM10 of primary switch 800 receive operating ground potential over respective ones of the associated select magnet wires SM1 to SM10 extending between this primary switch and line-controller switch No. 2 (Fig. 11). The five consecutive pairs of select magnets of any switch 800 receive operating battery respectively over the five select-magnet wires SM1 to SM5 which extend between this primary switch and the five secondary switches (Fig. 9) on the same line-link frame. The ten select magnets SM1 to SM10 of any secondary switch 900 receives operating ground potential over the associated select magnet wires SM1 to SM10, incoming from the ten primary switches 800, respectively. That is, the select magnets on the secondary switches are serially related with those on the primary switches as illustrated for magnets 404 and 405 in Fig. 4. The arrangement is such that two primary select magnets are operable alternatively in series with the same secondary select magnet, as each secondary select magnet corresponds to two consecutively numbered line links, as will appear. The fifty select magnet wires SM interconnecting the primary and secondary select magnets SM of Figs. 8 and 9 are spread in accordance with the spread of the line links from the primary switches to the secondary switches which is explained hereinbefore in connection with Fig. 3. It may be observed that only fifty seelct-magnet wires are required for the one hundred line links since each select magnet SM at a secondary switch 900 represents two consecutive line links, the one connected to the corresponding horizontal of the left section 950, and the other one connected, to the corresponding horizontal of the right section 951.

Conductors SC, SON, and PON of Figs 9 and 8 are interrelated as shown in Fig. 4 or Fig. 7.

V. *Line-controller switches* (*Figs. 10 and 11*)

Referring to Figs. 10 and 11, the line-controller switches 1000 and 1100, shown therein will be described.

As shown in Figs. 2, 4, and 7, each line-link frame A, B, C, or D has a pair of line controller switches 1000 and 1100 interposed between the associated line controller 1200 and the primary switches 800. On a call from, or a call to, any associated line, switches 1000 and 1100 serve to interconnect the line controller 1200 with the specific one of the ten primary switches 800 which serves the concerned calling or called line, and to interconnect them according to which group of five lines on the connected primary switch contains the concerned calling or called line.

The fulfillment of the foregoing purpose requires the selective switching of 760 wires leading from the line-controller switches to the line-link primary switches and associated line links. One hundred of these wires (the one hundred link sleeves LS1 to LS10 of the ten primary switches 800, Fig. 8) require double switching, bringing the total number of switching points required up to 860. As illustrated, the two line-controller switches 1000 and 1100 have a total of eighteen fifty-point verticals (V1 to V9 at each switch). The eighteen verticals, at fifty contact pairs each, provide a total of 900 contact pairs. The forty unused contact pairs are located in vertical V4 of line-controller switch No. 2 (1100).

Having nine verticals, each with ten selective stackups of five contact pairs in each stackup, each of the line-controller switches is described as a 9 x 10 five-wire switch. Because of the specific circuit-closing function of each line-controller switch, no horizontal multiple is employed. Accordingly, each switch 1000 and 1100 may be more fully described as a 9 x 10 five-wire switch having no horizontal multiple.

Each line-controller switch has nine hold magnets HM (one for each vertical), and ten select magnets (one for each selective stackup within a vertical). In either switch, the ten select magnets SM1 to SM10, and the corresponding horizontal rows of stackups, correspond respectively to the ten associated line-link primary switches 800.

VA. *Originating-call operation*

On originating calls, line-controller switches 1000 and 1100 operate as follows:

VA1. *Units, fives, and primary marking*

When a call is originated on any one of the 250 lines served by the concerned line-link frame, the associated line relay LR (Fig. 8) operates on the concerned primary switch 800. Such line relay (1) grounds the mark conductor M individual to the calling line, and (2) grounds the fives wire (F1 to F5) assigned to the fives group in which the calling line is located.

The concerned primary switch is identified in the line controller 1200 by a resistance-ground potential on the primary lead P of such primary switch, derived from ground on any one of the fives leads F1 to F5 through the concerned resistor FR1 to FR5 (see Fig. 4). The line controller thereupon selects the noted primary switch 800 (making a preference selection if lines are calling at two or more primary switches at the same time), and grounds the corresponding select-magnet wire (SM1 to SM10) extending between the line controller and line-controller switch 1100.

VA2. *Mechanical selection of the primary switch*

The select-magnet wires SM1 to SM10 at line-controller switch 1100 are extended over the illustrated wires in cable 1010 to line-controller switch 1000. The grounding of any one of these leads accordingly operates the corresponding select magnet SM in each line-controller switch, to effect mechanical selection of the noted calling primary switch 800 by rotating the associated one of the five select shafts (not shown) in the proper direction. If, for example, select magnet SM1 is energized in each line-controller switch, the first horizontal row of selective stackups (associated with the first primary switch 800) is mechanically selected in each line-controller switch responsive to operation of associated armatures 1006 and 1106 and the noted select shafts which are attached thereto.

VA3. *Electrical selection of the calling primary switch*

The off-normal contacts 1007 and 1107 associated with the operated armatures 1006 and 1106 apply a series ground connection, at switch 1100 to common off-normal lead CON (extending to line controller 1200) and to the connected hold-magnet wire HM1 extending between the line-controller switches through cable 1010. The grounding of lead HM1 operates eight hold magnets, HM1 to HM4 in each line-controller switch. Operation of these hold magnets constitutes electrical selection of the calling primary switch 800.

VA3*a*. *Link sleeves connected*

In line-controller switch 1000, the operation of hold magnets HM1 to HM4 closes the selected five-wire stackup of each of the first four verticals V1 to V4 connecting the link-sleeve leads LS1 to LS10 of the selected primary switch 800 respectively to the link-battery leads LB1 to LB10 of the line controller, and respectively to the link-test leads LT1 to LT10 of the line controller, pursuant to the testing (by the line controller) of the ten line links serving the selected primary switch.

VA3*b*. *Link select-magnet wires connected*

In line-controller switch 1100, when hold magnets HM1 to HM4 are operated to close their selected five-wire stackups, hold magnets HM1 and HM2 connect the select-magnet wires SM1 to SM10 of the selected primary switch respectively to the link select-magnet wires LSM1 to LSM10 of the line controller 1200 to enable the desired select magnet in the selected primary switch to be operated (in series with the secondary select magnet associated therewith across the primary-secondary spread) by the line controller following the matching operation.

VA3*c*. *Fives wires connected*

The noted operation of hold magnet HM3 of line-controller switch 1100 connects the fives leads F1 to F5 of the selected primary switch respectively to the fives leads F1 to F5 of the line controller.

VA3*d*. *Primary off-normal wire connected*

The noted operation of hold magnet HM4 of line-controller switch 1100 connects the primary off-normal wire PON of the selected primary switch to primary-secondary off-normal wire PS-ON of the line controller in preparation for the subsequent transmission of a signal thereover.

VA4. *Fives selection*

The line controller 1200 now operates over the connected fives leads (F1 to F5) to select the marked fives group of lines on the connected switch 800, exercising a preference selection between fives groups in case two or more contain calling lines. It thereby grounds the corresponding one of the hold-magnet leads HM5 to HM9 of the line-controller switch 1100, and the corresponding multipled wire, in cable 1010. The corresponding hold magnet HM responsively operates in each switch to select the fives group of lines containing the calling line.

VA4*a*. *Fives-group sleeve wires connected*

In line-controller switch 1000, the operation of the selected one of hold magnets HM5 to HM9 connects the group of five sleeve wires (S1 to S5, S6 to S10, etc.) of the selected fives group of lines respectively to sleeve-units wires SU1 to SU5 of the line controller.

VA4*b*. *Fives-group mark wires connected*

In line-controller switch 1100 the operation of the selected one of hold magnets HM5 to HM9 connects the individual mark leads (M1 to M5, M6 to M10, etc.) of the selected fives group of lines respectively to the mark-units leads MU1 to MU5 of the line controller.

VA5. *Units selection*

The line controller 1200 now operates over the connected mark-units leads MU1 to MU5 to select the calling line within the selected group of five, exercising a preference selection when more than one line is calling in the same fives group. This action selects the sleeve wire of the calling line by selecting the corresponding one of the sleeve-units wires SU1 to SU5, as will hereinafter appear.

VA6. *Matching hold-pilot ground*

With hold magnets HM1 to HM4, and one of the hold magnets HM5 to HM9, operated in each of the two line-controller switches, a series ground connection is made (at line-controller switch 1000) to hold-pilot wire HP extending to the line controller. This connection is from ground through contacts HP of the first four verticals of switch 1000, contacts HP of any one of the last five verticals of switch 1000, wire HP in cable 1010, and through similar contacts of switch 1100 to wire HP extending to the line controller. Ground on this wire thereby starts the matching operation (hereinafter described) which selects an idle line link over which the calling line can be extended through a secondary switch 900 to an idle originating trunk 203.

VA7. *Link selection*

The line controller now grounds the one of its link select-magnet wires LSM1 to LSM10 which corresponds to the matched line link, thereby closing a circuit through contacts of one or another of the verticals V1 and V2 of line-controller switch 1100 for the concerned primary and secondary select magnets (Figs. 8 and 9) in series.

VA8. *Primary-secondary off-normal signal*

The operated primary and secondary select magnets of Figs. 8 and 9 make a series connection (from secondary wire SC, through contacts 907, wire SON, and contacts 807) to the primary off-normal wire PON of the selected primary switch, thereby extending battery to primary-secondary off-normal wire PS-ON of the line controller through contacts in the closed stack-up of vertical V4 of switch 1100. This potential serves as a selection-complete signal to the line controller.

VA9. *Circuit extension*

Responsive to the last-noted signal, the line controller grounds a wire MT (Fig. 9) to operate the secondary hold magnet HM associated with the matched originating trunk 203, and it grounds the sleeve wire S of the called line, over the previously selected one of sleeve-units wires SU1 to SU5 of the line controller, and through contacts of the stackup closed by the operated one of hold magnets HM5 to HM9 of line-controller switch 1000 to operate the hold magnet HM associated with the calling line on switch 800. The noted primary and secondary hold magnets now operate to extend the calling line over the matched line link 202 to the matched idle originating trunk 203.

VA10. *Clearing out*

Line controller 1200 now clears out, thereby deenergizing the operated select magnet in each of the line-controller switches. The operated hold magnets in the line-controller switches deenergize responsive to the opening of the off-normal contacts 1007 and 1107 upon the deenergization of the select magnets. The two line-controller switches are thereby again returned to their illustrated normal condition.

VB. *Terminating-call operation*

On terminating calls, line-controller switches 1000 and 1100 operate as follows:

VB1. *Primary, fives, and units marking*

When a terminating call is to be handled through a line-link frame, the associated line controller 1200 is set by the block translator 1800 in accordance with the primary, fives, and units digits of the translated line number, thereby determining the involved primary switch 800, the fives group of lines thereon containing the called line, and the called line in the fives group.

VB2. *Mechanical selection of the called primary switch*

The line controller, on being set, grounds the one of the associated select-magnet wires SM1 to SM10 which corresponds to the primary information received. Ground on this wire operates the corresponding select magnet SM in each line-controller switch 1000 and 1100 to effect mechanical selection of the corresponding horizontal row of selective stackups in each, as noted under "Originating-Call Operation."

VB3. *Electrical selection of the primary switch*

The off-normal contacts 1007 and 1107 associated with the operated select magnets apply a series ground connection, to common off-normal wire CON, and to the connected hold-magnet wire HM1 of the two line-controller switches, operating the first four hold magnets HM in each, as described.

VB3*a*. *Link sleeves connected*

In line-controller switch 1000, the operation of hold magnets 1 to 4 connects the link sleeves of the selected primary switch respectively to the link-battery leads LB1 to LB10 of the line controller, and respectively to the link-test wires LT1 to LT10 of the line controller (as pointed out under "Originating-Call Operation") preparatory to the testing by the line controller of the ten line links serving the selected called primary switch 800.

VB3*b*. *Link select-magnet wires connected*

In line-controller switch 1100 hold magnets HM1 and HM2 connect the select-magnet wires SM1 to SM10 of the selected primary switch 800 respectively to the link select-magnet wires LSM1 to LSM10 of the line controller, to enable the primary and secondary select magnets to be operated in accordance with the line link which is subsequently matched.

VB3*c*. *Fives wires connected*

Hold magnet 3 of switch 1100 connects the fives leads F1 to F5 of the selected primary switch respectively to the fives leads of the line controller, but this connection is of no utility in terminating-call operation.

VB3*d*. *Primary-off-normal wire connected*

Hold magnet HM4 of switch 1100 connects wire PON of the selected primary switch to wire PS-ON of the line controller, preparatory to the subsequent transmission of a signal thereover.

VB4. *Fives selection*

The noted grounding of common off-normal wire CON by the joint select-magnet operation of the two line-controller switches closes a prepared circuit through line controller 1200 to ground the selected one of its hold-magnet leads HM5 to HM9 of the two line-controller switches. The corresponding, connected hold magnet HM5 to HM9 therefore operates in each switch 1000 and 1100 currently with the described operation of their hold magnets HM1 to HM4.

VB4*a*. *Fives-group sleeve wires connected*

In switch 1000, the operation of the selected one of its hold magnets HM5 to HM9 connects the group of five sleeve wires (S1 to S5, S6 to S10, etc.) of the five lines in the selected fives group respectively to the sleeve-units wires SU1 to SU5 of the line controller.

VB4*b*. *Fives-group mark wires connected*

In switch 1100, the operation of the selected one of its hold magnets HM5 to HM9 connects the individual mark leads of the selected fives group respectively to the mark-units leads of the line controller, but this connection is of no utility in terminating-call operation.

VB5. *Testing called line*

In terminating-call operation, now being described, units selection has already been accomplished by the described digit setting of the line controller by the block translator. Accordingly, the above-described connection of the sleeve wires of the selected fives group connects the sleeve leads S of the then completely selected called line through line controller 1200 to block controller 1600 to enable the called line to be tested and to enable its associated hold magnet to be subsequently operated.

With hold magnets operated in the two line-controller switches as set forth, the previously described series ground connection is made to hold-pilot wire HP extending from switch 1100 to the line controller, thereby closing a circuit through the line controller to the block controller to start the testing of the called line.

VB6. *Matching*

If the called line tests idle, the line-testing operation if followed by a matching operation (jointly by the block controller and the line controller) to match an idle path across the block-link frame, thence over a terminating trunk 207 and across the line-link frame, to the called line.

VB7. *Line-link selection*

Block controller 1600, operating through the line controller 1200, now grounds one of the line-link select-magnet wires LSM1 to LSM10 of the line controller (the one which corresponds to the matched line link), thereby closing a circuit through contacts of vertical V1 or V2 of switch 1100 for the concerned line-link primary and secondary select magnets in series (Figs. 8 and 9).

VB8. *Primary-secondary off-normal signal*

The operated primary and secondary select magnets on the line-link frame make the previously described series battery connection to the primary off-normal wire Pon of the selected primary switch, thereby extending a potential to the primary-secondary off-normal wire PS-ON of the line controller, through contacts of vertical V4 of switch 1100. This gives a signal through the line controller to the block controller that link selection has been effected mechanically at the primary and secondary switches on the line-link frame.

VB9. *Circuit extension*

When the block controller receives signals indicating that selection has been completed on the block-link frame and on the line-link frame, it grounds leads to operate hold magnets on the primary and secondary switches of the block-link frame to seize the matched block link, including a circuit for operating a secondary hold magnet HM (Fig. 9) on the line-link frame to seize the matched line link. At the same time, the block controller, operating through the line controller, grounds the previously tested sleeve wire of the called line to operate the primary hold magnet HM (Fig. 8) associated therewith to seize the matched line link. The noted primary and secondary hold-magnet operation on the two frames extends the connection to the called line over the matched block link, terminating trunk, and line link.

VB10. *Clearing out*

Block controller 1600, block translator 1300 and the line controller 1200 now clear out. The operated select magnets and hold magnets of line-controller switches 1000 and 1100 thereupon deenergize, again returning the line-controller switches to normal condition.

VI. *Line controller (Fig. 12)*

Line controller 1200 of Fig. 12 will now be described. It represents any one of four line controllers, a separate one for each of the four 250-line line-link frames A to D of Figs. 2, 3, and 4 to 7.

VIA. *Purpose and arrangement*

The purpose of line controller 1200 is (1) to control the previously described extension of connections from calling lines, across the associated line-link frame to available idle originating trunks, and (2) to cooperate with the block controller in extending connections as described across the block-link frame and the called line-link frame to idle called lines thereof.

In the fulfillment of the foregoing purposes, the two associated line-controller switches of Figs. 10 and 11 are employed as described to select and connect with the concerned line-link primary switch 800 and with the concerned five-line group served thereby.

Line controller 1200 comprises more than one hundred relays (such as 12A1) and associated circuit apparatus. These parts are suitably interconnected with each other and with the illustrated external leads of the line controller to perform all control and testing operations required of the line controller. It may be noted that all calls to and from lines of the associated line-link frame are handled through its assigned line controller 1200, one call at a time.

VIB. *General originating-call operation*

On originating calls, starting from normal cleared-out condition, the general operation of line controller 1200 is as follows:

VIB1. *Primary selection*

It responds to resistance ground placed on the P lead of any associated line-link primary switch 800 by a calling line, by selecting that primary switch, exercising an order of preference if two or more P leads are grounded; locks in the selection; and opens all such P leads to prevent subsequent interference thereover.

VIB2. *Starting*

It operates its originating-start relay 12B10 to disable its terminating-start relay 12B8, thereby preventing interference, by terminating calls; it starts a cycle-timing operation preparatory to clearing itself out shortly if the originating operation is blocked from normal completion in any manner; and it grounds the line-controller switch select-magnet wire SM which corresponds to the selected line-link primary switch, causing both line-controller switches 1000 and 1100 to select the selected calling primary switch and to connect therewith as described.

VIB3. *Line-link test*

On the noted operation of the line-controller switches, the line controller makes a continuing test of all the line links of the selected primary switch for idle-indicating battery on the sleeve, in preparation for matching.

VIB4. *Fives selection*

On receiving ground (from contacts of an operated line relay) over a fives lead F of the selected primary switch 800, the line controller selects the corresponding fives group of lines, exercising an order of preference if two or more fives wires are grounded; it locks in the fives selection locally and disconnects the fives wires to preclude subsequent interference thereover; and it operates one of hold magnets 5 to 9 in each line-controller switch to cause switch 1000 to connect up the sleeve leads of the lines in the selected fives group, and to cause switch 1100 to connect up the individual mark leads of the lines in the selected fives group as described.

VIB5. *Units selection*

On receiving ground (from another contact of the operated line relay) over an individual mark wire M in the selected fives group, the line controller selects the corresponding line as the calling line (by connecting with the sleeve wire S thereof), exercising an order of preference if two or more lines are calling in the selected fives group; and it locks in the units selection locally and opens its units chain circuit to preclude subsequent interference with the established units selection.

VIB6. *Line test*

The line controller now tests the sleeve of the calling line for battery thereon through the associated hold magnet HM.

VIB7. *Matching; first call-in*

Subject to the receipt of a hold-pilot signal showing that all required hold magnets have been operated in both line-controller switches, the line controller starts the matching operation by connecting up the match-test wires (MT) of the call-in group of originating trunks next succeeding the one last called in (on the preceding originating operation) and tests the MT wires in combination with the line-link sleeve wires for an idle matching path. Since the ten line links from any primary switch extend respectively to the ten secondary sections, there are ten originating trunks in any call-in group, extending respectively from the ten secondary sections. An idle test of an originating trunk requires that it be jumpered to a block coupler 506–L which supplies idle-indicating battery to the sleeve wire thereof.

VIB8. *Matching; succeeding call-ins*

If no idle path can be matched from the calling line to an originating trunk of the group first called in, the line controller calls in the next succeeding call-in group of ten originating trunks, and repeats the matching attempt with respect thereto, continuing to call in the groups one after another until all four have been called in. If no idle path can be matched on the fourth call-in, the line controller immediately clears out and returns to normal condition, clearing out the associated line-controller switches.

VIB9. *Matching; path preference*

The matching of an idle path requires that the line link and the originating trunk of such path both test idle. If two or more paths test idle on the same call-in of originating trunks, the line controller exercises an order of preference to select one as the matched path.

VIB10. *Select-magnet operation*

Upon the selection of the matched path, the line controller closes a series primary and secondary select-magnet circuit as described (through contacts of line-controller switch 1100) for causing the matched line link to be selected mechanically at switches 800 and 900.

VIB11. *Hold-magnet operation*

Upon a signal over wire PS-ON that the matched line link has been selected mechanically at the primary switch and at the secondary switch, the line controller simultaneously closes a circuit for the secondary hold magnet associated with the matched originating trunk and for the primary hold magnet associated with the calling line. These hold magnets operate as described to extend the calling line to the matched originating trunk, by connecting it with the primary end of the matched line link, and by connecting the matched originating trunk with the secondary end of such line link.

VIB12. *Clearing out*

At the end of a time interval sufficient to allow holding ground to be returned over the sleeve wire of the seized originating trunk, to hold the operated primary and secondary hold magnets, the line controller clears out, permitting the line-controller switches to clear out as described.

VIB13. *Preference-shift*

After every originating operation, the line controller operates to change the preference as to primary switches and as to secondary sections. First choice shifts from 1 to 2 to 3, and so forth, to 10, and then back to 1 again. On each shift, the preceding first choice becomes last choice. On each even-numbered step, first choice is advanced to the next fives group of lines on a primary switch.

VIB14. *Cycle-timing*

If the cycle of originating operations is not completed within a cycle-timing interval long enough for a matching attempt on each of four call-ins of originating trunks, the cycle timer clears out the line controller and returns it to normal condition for a new start.

VIB15. *Taking time out*

When a line controller has made ten successive unsuccessful attempts to extend a calling line over an idle line link to an idle originating trunk, it places itself in a temporary quiescent condition wherein it will not respond to calling lines. It resumes its normal active condition responsive to the lapse of a substantial fraction of a minute.

VIB16. *Peg count*

On the successful completion of each originating operation, the line controller grounds its originating-call-completed wire OCC to operate a corresponding peg-count meter. Each time it takes time out (by entering its temporary quiescent condition), it grounds its originating-calls-lost wire OCL to operate a corresponding meter.

VIC. *General terminating-call operation*

On terminating calls, starting from normal cleared-out condition, the general operation of line controller 1200 is as follows:

VIC1. *Receiving translated digits P, F, and U*

On the receipt from block translator 1800 (over one of ten P leads, one of five F leads, and one of five U leads) of translated digit information identifying a primary switch 800 containing a called line, the fives group of lines thereon, and the called line of the five, the line controller records the information on respective relay chains.

VIC2. *Starting*

It operates its terminating-start relay 12B8 to disable its originating-start relay 12B10, thereby preventing interference by originating calls.

VIC3. *Terminating-frame identification*

The line controller grounds its terminating-frame wire TF to identify the called line-link frame at block controller 1600.

VIC4. *Primary selection*

It grounds the line-controller switch select-magnet wire SM corresponding to the recorded primary digit, causing both line-controller switches to select the corresponding primary switch and to connect therewith as described.

VIC5. *Line-link test*

On the noted operation of the line-controller switches, the line controller makes a continuing test of all the line links of the selected primary switch for idle-indicating battery on the sleeve.

For each line link testing idle, the line controller closes the corresponding link-select-magnet wire LSM through to its corresponding link wire LK, thus notifying the block controller that the corresponding line link is idle, as well as preparing for select-magnet operation over one of the LK wires when the matched path has been selected by the block controller.

VIC6. *Fives selection*

The receipt of ground over common-off-normal conductor CON, showing that both line-controller switches have selected, completes a prepared circuit through the line controller for the hold magnet 5 to 9 of each line-controller switch which corresponds to the recorded fives digit, causing line-controller switch 1000 to connect up the sleeve leads S of the lines in the selected fives group.

VIC7. *Units selection*

With the units digit recorded, the one of the five sleeve leads connected up which corresponds to the called line is thereupon extended through the line controller and over called-line-sleeve conductor CLS to the block controller, for test.

VIC8. *Clearing out*

Following the noted operations, the line controller remains quiescent while the block controller completes its operation, including matching a path to the called line and operating the switches to complete it. Thereupon the block translator withdraws the translated digit information, whereupon the line controller clears out, along with the two associated line-controller switches.

VIC9. *Digit alarm*

If a fault causes block translator 1800 to ground two or more digit wires in the primary, the fives, or the units group, the line controller gives a lamp indication of the digit involved and grounds line-controller-alarm conductor LC-AL until alarm release key 1207 is actuated.

VID. *Functional relay groups*

The relays of line controller 1200 comprise the following functional groups:

1. Relays 12A1 to 12A11, originating-primary chain. (O)
2. Relays 12A12 to 12A22, terminating-primary chain. (T)
3. Relays 12A23 to 12A30, fives chain. (O) (T)
4. Relays 12B1 to 12B7, units chain. (O) (T)
5. Relays 12B8 and 12B9, "terminating-control" group. (T)
6. Relays 12B10 to 12B18, "originating-control" group. (O)
   - 6*a*. Relays 12B11 to 12B15, cycletimer. (O)
7. Relays 12B19 to 12B24, time-out group. (O)
   - 7*a*. Relays 12B22 to 12B24, time-out pulser. (O)
8. Relays 12C1 to 12C13, choice allotter. (O)
9. Relays 12C14 to 12C29, trunk-call-in group. (O)
   - 9*a*. Relays 12C14 to 12C16, call-in pulser. (O)
   - 9*b*. Relays 12C17 to 12C21, call-in allotter. (O)
   - 9*c*. Relays 12C22 to 12C25, call-in totalizer. (O)
   - 9*d*. Relays 12C26 to 12C29, trunk call-in. (O)
10. Relays 12D1 to 12D10, link-test group. (O) (T)
11. Relays 12D11 and 12D12, match-pilot group. (O)
12. Relays 12D13 to 12D22, trunk-test group. (O)

NOTE.—(O) signifies use in originating operation; (T) signifies use in terminating operation.

VIE. *Detailed originating-call operation*

On originating calls, the detailed operation of line controller 1200 is as follows:

VIE1. *Units, fives, and primary marking*

When a call is originated on any one of the 250 lines served by the associated line-link frame, the line relay LR thereof (or 401, Fig. 4) operates on the concerned primary switch 800 of Fig. 8. As described, such line relay (1) grounds its individual mark conductor M, and (2) grounds the fives wire (F1 to F5) assigned to the fives group in which the calling line is located.

VIE2. *Primary selection*

The grounding of any F wire of a line-link primary switch places a resistance-derived ground on the primary wire lead of that primary switch, being one of the ten wires P1 to P10 (Fig. 12) extending between the ten primary switches 800 and the line controller. With line controller 1200 in its illustrated normal condition, the grounding of any such lead P closes a circuit through a back contact of cutoff relay A1 for the corresponding primary relay 12A2 to 12A11.

VIE2*a*. *Exercise of preference*

Battery potential from supply resistor 1209 normally stands on the lower winding terminal of each relay 12A2 to 12A11. The choice allotter (Fig. 12, part 3) supplies this potential directly over one or another of the wires 1 to 10 in group 1251 to the associated relay, and thence through the endless back-contact chain (contacts 2) of relays 12A2 to 12A11 to the other relays of the chain. If, for example, the choice allotter is in its illustrated position 1 (all of its relays in restored condition except relay 12C4), battery potential stands on wire 1 of group 1251 (through break contacts 1 of relays 12B18 and 12C2, and make contact 1 of relay 12C4) to give first choice to relay 12A2.

If two or more of the associated wires P1 to P10 incoming from the primary switches 800 are grounded at the same time, each corresponding one of the relays 12A2 to 12A11 starts to operate, but the first such relay in the current order of preference opens the preference chain (at its break contact 2) to prevent effective operation of any succeeding one.

Upon operating effectively, any primary relay 12A2 to 12A11 first opens (at its break contacts 2) the forward extension of the endless preference chain, and then closes its make contacts 1, 3, and 4. At its make contacts 1, it locks ground on its upper winding terminal through break contact 2 of clearout relay 12B18.

Cutoff relay 12A1 is operated by contacts 3 of any relay 12A2 to 12A11 to disconnect all leads P1 to P10. This leaves effectively operated and locked the first relay 12A2 to 12A11 (in the current order of preference) which had an operating circuit closed over its associated P wire, which is now disconnected by relay 12A1.

VIE3. *Seizing the originating control group*

In a circuit through contacts 3 of the operated relay 12A2 to 12A11, and contacts 11 of relay 12A1, cutoff relay 12A1 starts the originating control group of the line controller into operation by operating originating-start relay 12B10, through break contact 5 of terminating-start relay 12B8 and break contact 6 of start relay 12B20 of the time-out group. Relay 12B10, at its break contact 9, disconnects terminating-start relay 12B8 to preclude interference with the initiated originating operation by a subsequent call for terminating operation, and it prepares a number of circuits for subsequent use.

VIE4. *Starting the cycle timer*

Relay 12B10 at its contacts 6 starts the cycle timer (relays 12B11 to 12B15) into operation by applying operating ground to relay 12B11 through closed contact 2 of relay 12B15. Relays 12B11 to 12B15 now operate in succession, and relay 12B15 closes a short circuit around relay 12B11 to cause relays 12B11 to 12B14 to restore in succession. Each of the relays 12B11 to 12B13, on restoring, short-circuits the next succeeding relay. The time required for the cycle timer to pass through its indicated cycle of operation is in excess of the maximum time required for the line controller to complete originating-call operation and clear out. The principal portion of this time is accounted for by the restoring time of the successively short-circuited relays 12B11 to 12B14.

VIE5. *Primary selection at line-controller switches*

Upon its described operation, originating-start relay 12B10 applies ground (at its contacts 8) through break contacts 3 of terminating-start relay 12B8, and through make contacts 4 of the locked one of the primary-chain relays 12A2 to 12A11, to the corresponding one of the select-magnet leads SM1 to SM10 extending to the line-controller switches 1000 and 1100. The grounding of this lead causes the corresponding select magnet to operate in each line-controller switch, whereupon hold magnets 1 to 4 operate in each switch as hereinbefore described to effect electrical selection of the control wires associated with the selected calling primary switch 800.

VIE6. *Line-link test*

Line-controller switch 1000, as a part of its described primary-switch selection, connects the link-battery leads LB1 to LB10 (Fig. 12, part 4) of the line controller respectively to the link-sleeve wires LS of the line links 202 serving the selected primary switch. At the same time, this line-controller switch connects these wires LS respectively to the link-test wires LT1 to LT10 of the line controller, and consequently to the upper winding terminal of link-test relays 12D1 to 12D10. The lower winding terminal of each link-test relay is grounded, wherefore each such link-test relay now operates in series with its corresponding one of the battery-supply link resistors LR1 to LR10, and over its wire LB1 to LB10 (Fig. 12, part 4) unless the corresponding line link is busy. In that event, ground on the sleeve of the line link short-circuits the connected link-test relay. The link-test relays 12D1 to 12D10 now await matching.

VIE7. *Fives selection*

Line-controller switch 1100 as a further part of the described primary selection, connects the fives wires F1 to F5 of the selected primary switch respectively to the associated wires F1 to F5 (Fig. 12, part 1, upper margin) of the line controller, thereby closing a circuit from any grounded one of such leads, through contacts of cutoff relay 12A23, and through the upper winding of the corresponding fives relay 12A25 to 12A29, to battery through the associated preference chain and contacts of the choice allotter. If the choice allotter is in its assumed first position (wherein only relay 12C4 is operated) wire 1 in group 1252 between the choice allotter and the fives chain is connected to battery through front contact 2 of the first allotting relay 12C4, break contact 2 of relay 12C2, and make contact 5 of originating-start relay 12B10. This gives first choice to the first fives relay 12A25.

If two or more fives wires are grounded, two or more of the fives chain relays 12A25 to 12A29 attempt to operate, but only one fives relay operates effectively, the first one in the order of preference counting from the one currently having first choice. This arrangement is similar to the preference lockout arrangement described for the primary chain.

Upon its effective operation, the selected fives relay 12A25 to 12A29, at its contacts 2, locks operating ground on its upper winding terminal, and at its contacts 5, it operates cutoff relay 12A23 to disconnect the fives wires at contacts 1 to 5. Thereupon, any ineffectively operated fives relay restores.

VIE8. *Fives selection at line-controller switches*

Cutoff relay 12A23, at its contacts 6, operates its auxiliary relay 12A24 to connect common-off-normal wire CON to the hold-magnet lead (HM5 to HM9) selected by the locked fives-chain relay. The operate time of relay 12A24 provides a delay sufficient to insure that any ineffectively operated fives-chain relay is completely restored.

If, for example, the first fives relay 12A25 is the one operated and locked, the ground on the common-off-normal conductor CON (appearing responsive to the described select-magnet operation in the line-controller switches) is now extended through contacts 1 of relays 12A24 and 12A25, to hold-magnet lead HM5 extending to the two line-controller switches, thereby operating the corresponding hold magnet HM5 in each switch to select the first fives group of lines served by the selected primary switch.

VIE9. *Units selection*

In line-controller switch 1100 the noted fives selection connects the individual mark leads of the lines in the selected fives group respectively to the mark-units leads MU1 to MU5 of the line controller, as previously described. Marking ground on any one of these leads closes a circuit for the upper winding of the associated one of the units-chain relays 12B2 to 12B6, through normally closed make-before-break contacts 4 of the relay, the common chain-end conductor 1210, chained back contacts 3 of relays 12B6 to 12B2, to battery through closed contact 4 of originating-start relay 12B10, and resistor 1208. On operating, any one of the relays 12B2 to 12B6, at make contact 4, locks itself to battery on the input wire of the chain (directly in the case of relay 12B2, and through the contact-3 chain the case of any succeeding one); at break contact 4 disconnects its upper winding from chain-end wire 1210; and at contact 3 opens the chain to restore any succeeding one of the relays which may have operated. At its contact 2, any effectively operated relay 12B2 to 12B6 locks its upper winding terminal to ground at make contact 2 of originating-start relay 12B10 to maintain the units selection independent of the continued energization of the calling line relay.

After a slight interval, sufficient to permit the clearing out of any transient condition resulting from two or more relays of the units chain attempting to operate, auxiliary relay 12B1 operates, through contact 6 of the effectively operated relay 12B2 to 12B6, to extend the sleeve lead of the selected calling line into the line controller. This extension is prepared by the described fives-selecting action of line-controller switch 1000, which connects the sleeve leads of the lines in the selected fives groups respectively to sleeve-units wires SU1 to SU5 of the line controller. The one of such wires which corresponds to the selected calling line is now extended (through contact 1 of the operated units-chain relay (12B2 to 12B6), and through the associated contact 2 to 6 of the operated auxiliary relay 12B1) to sleeve wire 1221 of the line controller. With relay 12B10 operated, wire 1221 is connected through contacts 10 thereof to ground through the winding of line-test relay 12B16.

VIE10. *Calling-line test*

When the sleeve wire of the calling line is thus extended to line-test relay 12B16, if there is battery on the sleeve wire of the calling line (through the winding of the associated hold magnet on the primary switch 800), line-test relay 12B16 operates as an indication that the calling line has been selected and is capable of extension. Because of the relatively high resistance of line-test relay 12B16, neither the primary hold magnet HM associated with the calling line, nor the lockout relay LO, is prematurely operated, but the test current flowing through relay 12B16 sufficiently primes the hold magnet that it operates promptly when its operate circuit is later closed.

VIE11. *Match-start*

As a further result of units selection, auxiliary relay 12B1, at its contact 1, extends ground from the associated hold-pilot wire HP (grounded as described by line-controller switches 1000 and 1100 incident to the completion of fives selection thereat) through contact 1 of originating-start relay 12B10 to match-start wire 1222 leading to the call-in totalizer, the call-in allotter, and the call-in pulser (Fig. 12, part 5). Ground on match-start wire 1222 starts the call-in pulser (relays 12C14 to 12C16) into operation to control the step-by-step advance of the call-in allotter during matching, if required.

VIE12. *First call-in*

The call-in allotter (relays 12C17 to 12C21) is a four-position counting chain so arranged that one or another of its counting relays 12C18 to 12C21 is in operated condition at any time. If the call-in allotter is in its illustrated first position (relay 12C18 operated and all other relays thereof restored), the noted extension of ground to match-start wire 1222 closes two relay circuits therethrough. One such circuit is through break contact 2 of relay 12C17 and make contact 3 of relay 12C18, to battery through the first relay 12C22 of the call-in totalizer (relays 12C22 to 12C25). At its contacts 1, relay 12C22 locks to ground on match-start wire 1222. The other such circuit is through break contact 3 of relay 12C17 and make contact 4 of relay 12C18, to battery through the first trunk call-in relay 12C26. Relay 12C22 now operates and locks to record the first call-in of originating trunks, and relay 12C26 operates to effect the first call-in of originating trunks 203 by connecting the match-test wires (MT1 to MT10) of the ten originating trunks of the first call-in group to contacts 2 of link-test relays 12D1 to 12D10 respectively.

As previously described, the ten originating trunks of any call-in group extend respectively from the ten secondary sections on the line-link frame. The ten line links at any primary switch 800 on the same line-link frame extend respectively to these secondary sections. The successful extension of a calling line over an originating trunk depends upon that trunk being idle and upon the line link over which it is reached being idle.

As will later appear, when a match occurs on any call-in of originating trunks, match-pilot relay 12D11 operates, followed by its auxiliary relay 12D12. Among other things, relay 12D12 opens the operate circuit of relay 12C16 of the call-in pulser to prevent further advance of the call-in allotter until the line controller is cleared out.

VIE13. *Succeeding call-ins*

If no match occurs on the first call-in of originating trunks, match-pilot relay 12D11 and its auxiliary relay 12D12 fail to operate, permitting the call-in pulser to advance the call-in allotter by operating the next succeeding counting relay (12C19) thereof and restoring the previously operated one (12C18). This advance results in the restoration of the operated trunk-call-in relay (12C26) and in the operation of the next succeeding one (12C27) accompanied by the operation and locking of the next succeeding relay (12C23) of the call-in totalizer. The match-test wires (MT11 to MT20) of the new call-in group are thus substituted for the match-test wires (MT1 to MT10) of the initial call-in group.

If no match results on the third call-in, the originating trunks, the call-in allotter is again advanced by the call-in pulser, causing the operated trunk-call-in relay to restore and the next succeeding one to operate, along with the third totalizer relay.

If no match results on the third call-in, the operated call-in relay is restored and the remaining one is operated to call in the fourth and final group of originating trunks for test.

Since the corresponding call-in totalizer relays 12C22 to 12C25 are operated along with the trunk call-in relays 12C26 to 12C29, and are held locked following their operation, if matching does not occur on the fourth call-in, the next succeeding operation of relay 12C16 of the call-in pulser closes a circuit through series contacts 2 of call-in totalizer relays 12C22 to 12C25 for clearout relay 12B18, to clear out the line controller and return it and the line-controller switches to normal condition, as is hereinafter described.

VIE14. *Matching*

As previously stated, the line links serving the selected primary switch are tested respectively by link-test relays 12D1 to 12D10, over wires LT1 to LT10. Any link-test relay now stands operated subject to the corersponding line link being idle (having no ground on its sleeve wire to shunt the link-test relay).

Since the ten line links serving any line-link primary switch extend each to a different one of the ten secondary sections, the ten originating trunks of any call-in group each extend from a different secondary section. Each, therefore, is capable of use with only its corresponding line link, and then only if both the line link and the originating trunk are idle.

On any call-in of originating trunks, the match-test wires of the ten trunks of the group called in (by any relay 12C26 to 12C29) are extended through contacts 1 to 10 of such relay to the armatures 2 of link-test relays 12D1 to 12D10, respectively. The make contacts of these armatures are connected through break contacts 1 to 10 of match-pilot relay 12D11 to ground through the high-resistance upper windings of trunk-test relays 12D13 to 12D22. The energization of the test winding of any such relay, from idle-indicating battery potential on the connected MT wire, shows that the corresponding path (through a line-link 202 extending to a secondary section and over an originating trunk 203 extending therefrom) is available, in that both the line link and the matched originating trunk of the path are idle.

If, for example, the first line link extending from the selected primary switch is idle, link-test relay 12D1 is operated as previously described. Accordingly, the match-test wire MT extended to armature 2 of this relay by the call-in operation is further extended through the make contact thereof, and through break contact 1 of relay 12D11, to ground through the upper winding (the test winding) of trunk-test relay 12D13. If the first originating trunk of the call-in group is idle, and is provided with a block coupler 500 (by jumper 204 on the block-link fame), an idle-indicating battery potential is supplied to the match-test wire MT thereof from the sleeve wire S of the connected block coupler 500, sleeve wire S of the originating trunk 203, and through the operate winding of the hold magnet HM (Fig. 9) serving the originating trunk on the secondary switch. This battery potential serves to effectively energize the test winding of relay 12D13, fully operating the relay.

For each matching path over an idle line link and corresponding originating trunk, the trunk-test relay 12D14 to 12D22 is similarly operated.

VIE14a. *Matching-path preference*

When two or more idle matching paths are available on a call-in of originating trunks, and two or more trunk-test relays 12D13 to 12D22 operate as described, one such path must be selected as the matched path to the exclusion of any other available one. For this purpose, an endless-chain locking circuit is provided through contacts 3 of the trunk-test relays. Locking ground is supplied to this locking chain and one or another of the wires in group 1254. The choice allotter (relays 12C1 to 12C13) shifts the preference each time it advances a step, by advancing the point in the locking chain at which locking ground is applied.

With the choice allotter in its illustrated first position (relay 12C4 operated and all other relays restored), locking ground is extended through front contact 11 of originating-start relay 12B10, back contact 4 of relay 12C2, front contact 4 of the operated relay 12C4, and conductor 1 in group 1254, directly to the locking armature 3 of relay 12D13, giving first choice to relay 12D13, and consequently to secondary section 1, which it and link-test relay 12D1 represent. If trunk-test relay 12D13 is then in operated condition, it is thereby effectively locked irrespective of the operated condition of any other trunk-test relay, and it holds open the locking chain with respect to them. If relay 12D13 is not then operated, then the first succeeding operated trunk-test relay is thereby locked operated over the chain through back contacts 3 of the preceding trunk-test relays.

VIE14b. *Match-pilot operation*

Upon the closure of a locking circuit through any operated trunk-test relay, match-pilot relay 12D11 operates in series with the locking winding thereof, disconnecting the trunk-test windings of all relays 12D13 to 12D22, whereupon any operated one of these relays restores except the effectively locked one. Relay 12D11 also operates its auxiliary relay 12D12, the operate time of which allows any operated ones of the trunk-test relays other than the locked one to restore.

Upon operating, auxiliary relay 12D12, at its contacts 1, disconnects conductor 1223 from the grounded match-start wire 1222, thereby temporarily halting the operation of the call-in pulser by preventing operation of relay 12C16. The currently operated trunk call-in relay (12C26 to 12C29) accordingly remains operated to permit the calling line to be extended over the selected matched path.

VIE15. *Primary and secondary select-magnet operation*

At its contacts 2, auxiliary relay 12D12 of the match-pilot group grounds the associated front contacts 1 of the trunk-test relays 12D13 to 12D22, thereby extending ground through front contact 1 of the locked one of these relays to the corresponding one of link-select-magnet leads LSM1 to LSM10, thereby closing a circuit (through contacts closed as described by line-controller switch 1100) for the primary select magnet SM (Fig. 8) associated with the matched line link, in series with the associated secondary select magnet SM (Fig. 9). These two select magnets operate in series to select the matched line link 202 mechanically at the primary end and at the secondary end.

VIE16. *Primary and secondary hold-magnet operation*

Series-connected off-normal contacts 807 and 907 associated with the operated primary and secondary select magnets extend battery potential (obtained from control resistor CR, Fig. 12, part 5, and secondary-control wire SC) through contacts of line-controller switch 1100 to the primary-secondary off-normal conductor PS-ON between the line-controller switches and the line controller (Fig. 12, part 2). Battery on wire PS-ON completes a circuit for operate relay 12B17, to ground through the make contact of the operated line-test relay 12B16. Operate relay 12B17 thereupon locks itself to ground at its make contacts, and closes independent circuits for operating the primary hold magnet associated with the calling line and for operating the secondary hold magnet associated with the matched originating trunk.

The primary hold magnet is operated by the closure of contacts 4 of relay 12B17 to ground the sleeve wire S of the calling line by shunting the line-test relay 12B16 previously held operated thereover as described. The tip, ring, and sleeve conductors T, R, and S of the calling line (such as 200, Fig. 4) are thereby extended respectively to the primary end of the corresponding conductors of the matched line link 202.

The secondary hold magnet associated with the matched originating trunk is operated by the closure of contacts 5 of relay 12B17 to ground the associated make contact 2 of each trunk-test relay 12D13 to 12D22, thereby extending ground, through the front contact 2 of the operated and locked trunk-test relay, through the associated front contact of the operated one of the trunk call-in relays 12C26 to 12C29, to the match-test conductor MT (see Fig. 9) of the matched originating trunk. The operate winding of the associated hold magnet (such as HM8R) is thereby energized in a circuit over the sleeve wire S of the associated originating trunk to battery in the associated block coupler 500, as previously traced. By the operation of this hold magnet, the tip, ring, and sleeve conductors T, R, and S of the matched originating trunk 203 are thereby connected respectively to the corresponding conductors of the line link 202, and therethrough, with the corresponding conductors of the calling line.

The foregoing extension of the calling line, over the matched line link to the matched originating trunk, constitutes seizure of the block coupler 500 serving the originating trunk. This block coupler responds to seizure by placing holding ground on its incoming sleeve (as hereinbefore described) in substitution for the idle-indicating battery potential formerly appearing thereon, thereby providing a holding circuit for the primary and secondary hold magnets effective to hold them after the line-controller apparatus has cleared out.

VIE17. *Clearing out*

Line-test relay 12B16 restores responsive to being short-circuited by the noted grounding of the sleeve wire of the calling line incidental to the operation of the associated primary hold magnet. The appreciable interval of time required for relay 12B16 to restore responsive to being short-circuited is sufficient to permit the seized block coupler to return holding ground over the sleeve wire of the established connection before the line controller clears out.

With operate relay 12B17 operated and locked, the restoration of relay 12B16 operates clearout relay 12B18, which at its contacts 3 locks to ground on common-off-normal wire CON, and at its contacts 2 and 1, removes locking ground and preference-chain battery from relays 12A2 to 12A11 of the originating primary chain, restoring the operated one thereof.

Cutoff relay 12A1 and originating-start relay 12B10 restore responsive to the opening of contacts 3 of the primary chain relay. Originating-start relay 12B10 at its contacts 3 and 5 removes locking ground and preference-chain battery from the upper windings of relay 12A25 to 12A29 of the fives chain, restoring the operated one thereof, followed consequently by the restoration of cutoff relay 12A23 and its auxiliary relay 12A24; at its contacts 4 and 2, it removes preference-chain battery and locking ground from the upper windings of units-chain relays 12B2 to 12B6, restoring the operated one thereof, followed by the restoration of their auxiliary relay 12B1; at its contact 6, it removes starting ground from the cycle timer (relays 12B11 to 12B15), causing immediate restoration of all operated relays thereof; and at its contact 11 it removes locking-chain ground from the trunk-test relays 12D13 to 12D22, thereby restoring the operated one thereof, followed by the consequent restoration of match-pilot relay 12D11 and its auxiliary relay 12D12.

The restoration of the operated trunk-test relay 12D13 to 12D22 ungrounds the previously grounded link-select-magnet wire LSM1 to LSM10, permitting the operated primary and secondary select magnets to restore, and the restoration of the operated fives-chain relay 12A25 to 12A29 releases the corresponding pair of hold magnets in the line-controller switches. Responsive to either operation, signal battery is removed from conductor PS-ON, releasing operate relay 12B17 to open the initial circuit of clearout relay 12B18, leaving that relay locked to common-off-normal conductor CON if it is still grounded.

Upon the noted release of the locked primary-chain relay 12A2 to 12A11, ground is removed from the associated select-magnet wire SM, permitting both line-controller switches (1000 and 1100) to clear out. The restoration of the select magnets SM in such switches opens contacts 1007 and 1107, which ungrounds wire CON to open the locking circuit of clearout relay 12B18. The restoration of relay 12B18 completes the clearing out of the line controller, except for a partial operation of the call-in pulser to cause an interim advance of the call-in allotter.

Clearout relay 12B18, at its contacts 1 and 2, replaces locking ground and preference-chain battery on the relays of the originating primary chain, thereby rendering the line controller again receptive to an originating call. Its contacts 5 reground armature spring 2 of terminating-start relay 12B8, thereby rendering the line controller again receptive to a terminating call.

VIE18. *Interim advance of call-in allotter*

As a further result of its described restoration, originating-start relay 12B10, at its contacts 1, removes the ground connection originally applied to match-start wire 1222, but that wire remains grounded temporarily by the call-in pulser, wherein relays 12C14 and 12C15 are operated (as will be later described), and relay 12C16 is unoperated because its operating wire 1223 was disconnected by relay 12D12.

Upon its described restoration following the restoration of relay 12B10, relay 12D12 reconnects wire 1223 to the grounded match-start wire 1222, whereupon relay 12C16 operates preparatory to advancing the call-in allotter another step. Relays 12C14 to 12C16 are thereby restored successively. The operation is terminated at that point, for the driving ground is removed from the match-start wire by contacts 1 of relay 12C14. Upon restoring, relay 12C16, at its back contact, causes the next succeeding relay (such as 12C19) of the call-in allotter to operate (as will be hereinafter described), thereby preparing for calling in the next succeeding call-in group of originating trunks when the line controller is again taken for use for originating-call operation.

VIE19. *Operation of call-in allotter*

The call-in allotter, comprising control relay 12C17 and allotting relay 12C18 to 12C21, is shown in the first of its four allotting positions, the position which it assumes automatically when current is first applied to the line controller. At this time, the odd branch 1233 of its control conductor 1231 is grounded, through break contact 2 of relay 12C16 and break contact 1 of relay 12C17, operating the first allotting relay 12C18 through the chain contacts 3, 4, and 2 of relays 12C19 to 12C21, to battery through resistor 1224.

At its contacts 1, relay 12C18 locks itself operated by connecting the grounded lower winding of control relay 12C17 to the odd branch 1233 of the grounded control wire 1231, but relay 12C17 does not operate for the time being, as it is short-circuited by the ground on the control wire 1231 through break contact 2 of relay 12C16.

At its contacts 2, relay 12C18 prepares a circuit for later operating the second allotting relay 12C19 over the even branch 1232 of the control wire 1231; and at its contacts 3 and 4 it connects the first relay 12C26 of the trunk-call-in group, and the first relay 12C22 of the call-in totalizer to the match-start wire 1222. The call-in allotter is thus in "position 1."

When the match-start wire 1222 is next grounded, the connected relays 12C22 and 12C26 operate as described, relay 12C22 locking directly to conductor 1222.

Relay 12C14 of the call-in pulser now operates through contacts 1 of relay 12C16 and, at its contacts 1, grounds match-start wire 1222 at a new point to insure the eventual completion of the started cycle of operations of the call-in pulser, after matching has occurred, to bring about the described interim advance of the call-in allotter.

Relay 12C14, at its contacts 2, operates relay 12C15, and relay 12C15 operates relay 12C16 over branch wire 1223, and through break contact 1 of match-pilot relay 12D12, to ground on wire 1222. Relays 12C14 to 12C16 are so adjusted that the time required for them to operate in succession is somewhat in excess of the time required for matching to occur and for match-pilot relay 12D12 to operate, if matching can occur on the first call-in.

When relay 12C16 next operates (during, or following, the current matching attempt), it disconnects relay 12C14 to restore relays 12C14 to 12C16, in succession, and it removes ground from control wire 1231 and from its connected branch 1233, thereby removing the short circuit from around the lower winding of relay 12C17. Control relay 12C17 now energizes in series with relay 12C18, which remains locked operated at its contact 1. The wires 1231 and 1222 incoming to the allotter are thereby transferred respectively from their odd branches 1233, 1235, and 1237 to their even branches 1232, 1234, and 1236. The call-in allotter is thus in "position 1.5."

When relay 12C16 is next restored to reapply ground to control conductor 1231, ground is thereby applied to the even branch 1232 of the control conductor, energizing the holding winding (the upper winding) of control relay 12C17, and closing an operate circuit for the second allotting relay 12C19, through make contact 2 of relay 12C18 to battery through contacts 4 and 2 of relays 12C20 and 12C21. Relay 12C19 responsively operates and, at its contacts 2, locks itself directly to ground; at its contacts 1, it prepares a circuit over the odd branch 1233 for relay 12C20; at its contacts 5 and 4, it connects the second call-in-totalizer relay 12C23 and the second trunk call-in relay 12C27 to the match-start wire 1222, through make contacts 3 and 2 of control relay 12C17; and at its contacts 3, relay 12C19 removes chain battery from relay 12C18, thereby restoring it. Control relay 12C17 remains operated by its upper winding so long as the control wire 1231 remains grounded. The call-in allotter is now in "position 2."

The next succeeding operation of call-in pulser relay 12C16 ungrounds conductor 1231 to restore control relay 12C17, leaving only relay 12C19 operated in the allotter. The allotter is thus in "position 2.5."

Upon the next succeeding restoration of relay 12C16, the third allotting relay 12C20 operates over the odd branch of the control conductor, through contacts of the operated relay 12C19. Upon so doing, it locks itself to the odd branch of the control wire and to ground through the lower winding of the control relay 12C17; connects the fourth allotting relay 12C21 to the even branch of the control wire; connects up the third relay in the call-in totalizer and in the trunk-call-in group; and it opens its chain contacts 4 to restore the second counting relay 12C19. The call-in allotter is now in "position 3."

When relay 12C16 is next operated to unground the control wire 1231, the lower winding of relay 12C17 is again unshorted and energized, this time in series with relay 12C20. Relay 12C20 remains operated, and relay 12C17 reoperates. The allotter is now in "position 3.5."

When relay 12C16 again restores to ground the control conductor, the final allotter relay 12C21 is operated over the even branch of the control conductor, in parallel with the upper winding of relay 12C17, and through contacts 3 of the operated relay 12C20. Relay 12C21 locks itself to the even branch of the control conductor, and opens its chain contacts 2 to disconnect and restore relay 12C20. The call-in allotter is thus in "position 4."

When relay 12C16 of the call-in pulser again operates to remove ground from the control conductor, relays 12C17 and 12C21 both restore. All relays of the call-in allotter are consequently now in restored condition. The allotter is thus in "position 4.5."

When relay 12C16 again restores to ground the control wire, the first allotter relay 12C18 is reoperated to place the call-in allotter again in its illustrated "position 1," at the start of a new cycle of operations.

In summary, it may be noted that, when relay 12C16 operates to end a control pulse to the call-in allotter, the allotter advances to a half-step position, in that control relay 12C17 restores if operated and operates if restored. This action prepares for the next step of the allotter, and effectively disconnects the currently connected pair of relays in the call-in totalizer group and trunk call-in group in preparation for connection of the next succeeding pair without overlap.

The overall result of the operation of the call-in allotter as controlled by the call-in pulser is: (1) it calls in the call-in groups of originating trunks successively until a match has occurred, or until all four have been called in with no match having occurred and (2) considering the four groups arranged in a continuous chain, or circle, the first trunk group called in on an operation of the line controller is the one next following the group last called in on the preceding operation of the line controller. The effect is to offer an equal number of calls to the four call-in groups of originating trunks 203. As a result, each call-in group should contain substantially the same number of equipped originating trunks as any of the others, keeping in mind that the full number (40) of originating trunks 203 will seldom be equipped (jumpered to respective block couplers) for that number will seldom be required. The unequipped originating trunks are preferably non-corresponding trunks in the several call-in groups to the end that the line links of any group of ten serving a line-link primary switch 800 are equally loaded. That is to say that the total number of equipped originating trunks should be apportioned approximately evenly among the ten secondary sections on the line-link frame.

VIE20. *Operation of the choice allotter*

The choice allotter (Fig. 12, part 3), comprising the thirteen relays 12C1 to 12C13, is a specialized counting chain arranged to assume allotting positions 1 to 10 successively in a cycle. Its purpose is to shift first choice successively among the ten associated primary switches 800, among the ten secondary sections (sections of five switches 900), and among the five fives groups of lines served by any primary switch 800.

The allotting relays are 12C4 to 12C13. They are controlled by relays 12C1 and 12C2 over odd and even control wires. Relay 12C3 is employed to disconnect relay 12C4 when relay 12C5 operates, and to hold it disconnected until a new cycle of operations is about to begin, thereby avoiding the necessity for a back-contact chain such as that of relays 12C19 to 12C21 of the call-in allotter.

The choice allotter is illustrated in position 1. In that position, the first allotting relay 12C4 stands operated through closed contacts of relays 12C2 and 12C3, and all other relays of the allotter are restored.

VIE20a. *Residual-stick control relays*

Control relays 12C1 and 12C2 are referred to as residual-stick relays. Such a relay, upon being open-circuited after operation, retains sufficient residual magnetism to hold its armature operated against its spring load until the residual magnetism is neutralized. Each such relay has tandem windings, differentially connected.

Control relays 12C1 and 12C2 are controlled primarily by relay 12B15 of the cycle timer, which is operated at the initiation of each originating operation and is restored when the line controller is cleared out. The arrangement is such that the advance of the choice allotter (from one position to the next) occurs incidental to the clearing-out operation of the line controller, between successive originating uses thereof.

With cycle-timer relay 12B15 restored, and with both of the control relays 12C1 and 12C2 in their illustrated restored condition, both windings of relay 12C1 stand open, but both windings of relay 12C2 stand closed. The lower (heel-end) winding of relay 12C2 is energized through break contacts (2 and 4) of relays 12B23 and 12B15, and its upper (armature-end) winding is energized in parallel therewith through the break contacts of relay 12C1. With the two windings energized in opposition, as indicated, relay 12C2 remains unoperated. Control relays 12C1 and 12C2 are now in "position 1," both restored.

When relay 12B15 next operates, upon a seizure of the line controller for originating operation, its contacts 4 disconnect ground from both windings of relay 12C2 (leaving it unoperated) and transfer ground to the circuit of relay 12C1. With relay 12C2 unoperated, only the lower winding of relay 12C1 is energized, the upper winding thereof being disconnected. Relay 12C1 is now operated by its lower winding, energized alone. Upon operating, it disconnects the upper winding of relay 12C2 from in parallel with the lower winding thereof. Relays 12C1 and 12C2 are now in "position 1.5," relay 12C1 being operated alone.

When the line controller next clears out, contacts 4 of relay 12B15 transfer ground back from the circuit of relay 12C1 to the circuit of relay 12C2. Relay 12C1 remains operated by residual magnetism, and relay 12C2 is operated by its lower winding, energized alone. The control relays 12C1 and 12C2 are now in "position 2," both relays operated.

When relay 12B15 operates the next time, on the line controller being again taken into originating use, it again removes ground from the circuit of relay 12C2 (leaving that relay held operated by residual magnetism), and again applies ground to the circuit of relay 12C1, energizing both its windings. The upper (armature-end) winding acts to reverse the flow of flux through the armature end of the core (not shown) and through the armature (not shown) causing the relay to release when the flux therethrough approaches zero value. Having released, the relay does not reoperate so long as the two differentially connected windings are both energized. Relays 12C1 and 12C2 are now in "position 2.5," relay 12C2 being operated alone.

When relay 12B15 next restores, incident to the clearing out operation of the line controller, the upper (armature-end) winding of relay 12C2 is energized in parallel with the lower winding thereof (through the contacts of the restored relay 12C1) causing relay 12C2 to restore and remain restored for reasons given in connection with relay 12C1. Relays 12C1 and 12C2 are now again in position 1 (being both restored), at the beginning point of a new cycle.

In summary, considering relays 12C1 and 12C2 in position 1 (both restored), (1) relay 12C1 first operates to bring them into position 1.5; (2) relay 12C2 later operates to bring them into position 2 (both operated); (3) relay 12C1 restores to bring them into position 2.5 (relay 12C2 operated alone); and (4) relay 12C2 restores to bring them back into position 1 (both restored).

VIE20b. *Allotting-relay action*

With the allotter in its illustrated first position, all relays thereof are restored except the first allotting relay 12C4. Relay 12C4 is operated from ground, closed contacts 3 of relay 12C2, odd control conductor 1241, the closed contacts of relay 12C3, and through the upper winding of relay 12C4 to battery. The input wires of the allotter (control ground at contacts 3 of relay 12C2, and wires 1243 to 1246) are thus connected to their respective odd branches through break contacts 3, 1, 2, 5, and 6 of control relay 12C2, and the odd branches of wires 1243, 1244, and 1246 are connected to their respective output wires 1 through make contacts 1, 2, and 4 of relay 12C4.

The choice allotter remains in its illustrated position 1 until the second control relay 12C2 operates to bring relay 12C1 and 12C2 into position 2 (both operated) at the end of the next ensuing originating-call operation. Relay 12C2, on operating, switches the input wires 1243 to 1246 from their odd branches to their even branches, thus advancing the allotter to "position 1.5."

Through its make-before-break contacts 3, relay 12C2 transfers control ground from the odd control conductor 1241 to the even control conductor 1242, thereby opening the initial circuit of relay 12C4 and energizing three windings in series through make contacts 3 of relay 12C4. They are the upper winding of relay 12C5, the lower winding of 12C4, and the winding of cutoff relay 12C3. The holding winding of relay 12C4 is employed to hold that relay operated after ground is removed from the odd wire 1241, whereby the operate circuit of relay 12C5 (through contacts 3 of relay 12C4) is maintained intact. Relay 12C3 is operated to disconnect the upper winding of relay 12C4 from the odd wire 1241, and is arranged to be held operated through the holding windings of succeeding allotting relays until the point is reached in the operation of the choice allotter at which it should be restored to reconnect the No. 1 allotting relay 12C4.

The second allotting relay 12C5 is operated by the energization of its upper winding. It prepares a circuit at its contacts 3 for operating relay 12C6; at its contacts 1 and 4, it connects the associated No. 2 output wires to the currently effective even branches of input wires 1243, and 1246; and at its contacts 2 it connects wire 1 of group 1252 to the even branch of conductor 1244. The allotter is now in "position 2" (relays 12C1 to 12C5 operated).

The next ensuing originating use of the line controller restores relays 12C1 and 12C2 as described. Relay 12C2 disconnects the even branches of the input wires and substitutes the odd branches. The allotter is thus advanced to "position 2.5" (relays 12C3 to 12C5 operated).

The transfer of control ground from the even control conductor 1242 back to the odd conductor 1241 opens the noted operate circuit (upper winding) of the second allotting relay 12C5 and closes the operate circuit (upper winding) of the third allotting relay 12C6, in series with the lower winding of relay 12C5 and the winding of 12C3. Relay 12C6 accordingly operates and relays 12C5 and 12C3 remain operated in series therewith. The noted opening of the operate circuit of relay 12C5 deprives relay 12C4 of holding current (through its lower winding) causing it to restore. The allotter is now in "position 3" (relays 12C3, 12C5, and 12C6 operated).

From this point, the choice-allotter action proceeds in a progressive wave-like motion wherein the last preceding allotting relay is held operated in the operating circuit of the newly operated one, but the second preceding allotting relay is open-circuited and restored. Accordingly, except for a momentary half-step (transition) interval, only two allotting relays (12C4 to 12C13) are in operated condition at any one time, but only the last-operated one closes effective allotting circuits because of the action of control relay 12C2 in shifting the allotter input wires 1243 to 1246 back and forth between their odd and even branches.

When the allotter reaches its ninth position, the ninth allotting relay 12C12 stands operated from ground on odd control conductor 1241, contacts 3 of the operated eighth allotting relay 12C11, lower winding of relay 12C11, and relay 12C3, to battery. Relays 12C3, 12C11 and 12C12 are held operated over this circuit, and all other relays of the allotter are in restored condition.

When control relay 12C2 is next operated, the tenth (and final) allotting relay 12C13 is operated through contacts 3 of relay 12C12, in series with the holding winding of relay 12C12, but this circuit does not include cutoff relay 12C3. As a result, 12C3 restores along with relay 12C11, leaving relays 12C12 and 12C13 operated.

When control relay 12C2 next restores, the consequent removal of ground from the even control conductors 1242 restores relay 12C12 and 12C13, and the reconnection of ground to the odd-control conductor 1241 reoperates relay 12C4, through the contacts of the restored cutoff relay 12C3 to bring the choice allotter again into its illustrated first position to start a new cycle of operations.

VIE20c. *Effect of choice-allotter action*

From the foregoing, it is clear that battery on wire 1241 is applied successively to the ten choice wires 1 to 10 of group 1251 leading to the originating primary chain of relays 12A2 to 12A11, thereby shifting first choice progressively from the first to the tenth of the line-link primary switches which these relays respectively represent.

Since each of the five wires 1 to 5 in group 1252 (extending from the choice allotter to the chain of preference contacts associated with the upper windings of fives-chain relays 12A25 to 12A29), are connected to the contacts 2 of two adjacent allotting relays (12C4 and 12C5, 12C6 and 12C7, etc. to 12C12 and 12C13) in the choice allotter, the first choice to locking battery on wire 1244 is shifted successively through the fives groups which these relays respectively represent. These five shifts occur on the respective odd-numbered steps of the allotter.

Locking ground potential (represented by wire 1245) is applied successively to the ten choice wires 1 to 10 in group 1254, leading to the trunk-test relays 12D13 to 12D22, thereby shifting first choice progressively from the first to the tenth of the line-link secondary sections, which are represented respectively by the trunk-test relays.

The shifting of the preference among the primary switches insures that a call from any given primary switch will eventually be afforded access to the line controller, irrespective of circuit conditions and matching conditions relating to the other primary switches; the shifting of the preference among the five groups of lines on a primary switch similarly acts to insure the eventual access to the line controller of a line in any fives group, irrespective of conditions surrounding the lines in the other fives group served by the same primary switch; and the shifting of the preference among the ten secondary sections on the line-link frame acts to spread the originating calls evenly among them.

Giving first choice to the secondary sections in regular order, combined with the previously described operation of the call-in allotter, serves to randomize the originating trunks 203 almost completely (provided care is taken as previously indicated with respect to which are equipped and which are unequipped in any call-in group) to the end that (1) the block couplers 503 have uniform traffic loads and (2) any tendency toward unbalanced load distribution which might result in unnecessary originating-action match failures is greatly minimized.

VIE21. *Cycle-timer operation*

The cycle timer (relays 12B11 to 12B15) is provided primarily to clear out the line controller and return it to normal condition when the clearing-out operation does not occur normally. As noted hereinbefore, the cycle timer must defer its initiation of the clearing-out operation for an interval long enough to permit the line controller to function normally when four successive trunk-call-in operations are required. The waiting time afforded by the cycle timer is principally the time required for relays 12B11 to 12B14 to restore successively under short-circuited slow-restoring conditions.

When originating-start relay 12B10 operates, its contacts 6 apply starting ground to the cycle timer as noted hereinbefore, operating relays 12B11 to 12B15 in succession. Relay 12B11 is operated through closed contacts 2 of relay 12B15, and each of the relays 12B11 to 12B14, at its contacts 2, closes an operate circuit for the next succeeding relay. Relay 12B15, at its make-before-break contacts 2, locks itself and the preceding relays to the incoming grounded operate wire (in preparation for the restoration of relays 12B11 to 12B14 in succession) at the same time opening the initial operating path to prevent interference with the intended prompt restoration of all the relays whenever relay 12B10 restores.

Relay 12B15, at its contacts 1, grounds the restoring wire for relays 12B11 to 12B14, thereby directly short-circuiting the winding of relay 12B11. The additional time required for relays 12B12 to 12B15 to operate after 12B11 operates insures that the current through the winding of relay 12B11 has reached substantially its full value by the time the restoring short-circuit is applied.

Relays 12B11 to 12B14 now restore in succession, each of the relays 12B11 to 12B13, on restoring, extending ground at its contacts 1 to short-circuit the winding of the next relay.

When the line controller completes its normal operation and clears out before the action of the cycle timer has reached the point at which relay 12B14 restores, the removal of control ground from the cycle timer, at contacts 6 of relay 12B10, causes a quick restoration of relay 12B15 and any still-operated ones of the relays 12B11 to 12B14. If, for example, relays 12B11 to 12B13 have restored as described, and relay 12B14 is still operated when contacts 6 of relay 12B10 open, a local self-locking series circuit exists, for relays 12B14 and 12B15. This circuit is from ground through contacts 1 of relays 12B15 and 12B13, the winding of relay 12B14, contacts 2 of the same relay, and through the winding of relay 12B15 to battery. When this circuit becomes effective (upon the opening of the previously closed contacts 6 of relay 12B10), the current flow through the winding of relay 12B14 reverses, causing a reversal of flux through the magnetic structure (not shown). During this reversal, relay 12B14 restores, opening the noted incidental local locking circuit at its contacts 2. Relay 12B15 responsively restores. The action is similar when any preceding relay of the cycle timer is still operated when relay 12B10 restores. Since the noted current reversal results in a prompt and satisfactory clearing out of the cycle timer, the circuit has been left in its illustrated simple form rather than providing sufficient contact pairs on relay 12B10 or on relay 12B15 to isolate the several circuits.

When the line controller has not cleared out by the time relay 12B14 of the cycle timer restores responsive to being short-circuited upon the restoration of relay 12B13, clearout relay 12B18 is operated through break contact 3 of relay 12B14 and make contact 3 of relay 12B15 to initiate the clearing-out operation.

VIE22. *Time-out group*

The time-out group (relays 12B19 to 12B24) is provided to halt the originating action of the line controller for a short period (say, from 9 to 18 seconds) when at least ten successive attempts to extend a calling line have all been unsuccessful. The minimum number of unsuccessful operations has been set at ten to give each of the line-link primary switches first-choice access to the originating primary chain.

The purpose of the time-out feature is to minimize useless relay operations in the line controller and useless operations of the line-controller switches 1000 and 1100.

Two conditions other than circuit failure within the line controller or in the line-controller switches can cause the line controller to execute a series of unsuccessful originating operations.

First, the traffic load on the line links and on the originating trunks may be sufficiently heavy that, for a period of time, no match is possible to an idle originating trunk from any primary switch.

Second, if the sleeve circuit of a calling line (between its sleeve wire S and battery) is open, the hold magnet thereof cannot be operated to extend that line. This condition is detected in the line controller by the failure of line-test relay 12B16 to operate.

When an originating operation of the line controller is successful, operate relay 12B17 operates as described (to effect operation of the concerned primary and secondary hold magnets) prior to the operation of clearout relay 12B18, but when the originating operation is not successful, relay 12B17 does not operate. Clearout relay 12B18 is then operated, either through the chain contacts 2 of the call-in totalizer (relays 12C22 to 12C25), or contacts 3 of relays 12B14 and 12B15 of the cycle timer. It is only when clearout relay 12B18 operates with operate relay 12B17 still unoperated that ground is placed effectively on input wire 1245 of the choice allotter, which is the wire thereof associated with the time-out group. Such ground is through break contact 2 of operate relay 12B17, make contacts 7 and 4 of relays 12B10 and 12B18, to wire 1245. Subject to the choice allotter being in position 10, the ground on input wire 1245 is extended through make contacts 5 of relays 12C2 and 12C13 to wire 10 of the time-out group 1253, operating pickup relay 12B19. Relay 12B19 locks itself to ground through break contacts 2 of relays 12B17 and 12B19, and the break contacts of stop relay 12B21.

If a successful originating operation occurs on any one of the next nine tries by the line controller, pickup relay 12B19 is unlocked and restored by operate relay 12B17. But, if each of the next nine originating operations of the line controller are unsuccessful, pickup relay 12B19 remains locked operated to cause the line controller to time out after the choice allotter has advanced from position 10, and through positions 1 to 8, to reach position 9. In this event, ground on input wire 1245 of the choice allotter is extended through break contact 5 of relay 12C2, make contact 5 of relay 12C12. Conductor 9 in group 1253, and make contact 1 of pickup relay 12B19, to start relay 12B20. Start relay 12B20 operates and locks operated (at its contacts 5) through contacts 1 of pickup relay 12B19; at contacts 4, prepares a circuit for stop relay 12B21; at contacts 3, places ground directly on the associated input wire 1245 of the choice allotter; at contacts 6, disconnects originating-start relay 12B10 to disable originating operation of the line controller during the time-out period; and at contacts 2, places starting ground on the time-out pulser (relays 12B22 to 12B24). The line controller is now at the beginning of its time-out period wherein it is unresponsive to calls originated on its associated line-link frame, as originating-start relay 12B10 is disconnected at contacts 6 of start relay 12B20.

Responsive to the closure of contacts 2 of start relay 12B20, relays 12B22 to 12B24, comprising the time-out pulser, operate in succession and to restore in succession to generate driving pulses for the choice allotter during the time-out period of the line controller. These relays are slow-restoring sleeved relays, adjusted to transmit driving impulses to the choice allotter at a relatively low frequency, such as one impulse every second or two. The arrangement is such that nine steps of the choice allotter are required to return the line controller to active condition with respect to originating calls, giving a delay ranging from, say nine to eighteen seconds, depending upon the adjustment of the relays of the time-out pulser.

On each operation and restoration of the relays of the time-out pulser, relay 12B23, at its contacts 2, transmits a driving impulse to control relays 12C1 and 12C2 of the choice allotter as previously described for contacts 4 of the cycle-timer relay 12B15, causing the choice allotter to advance one step for each operation of the time-out pulser.

Nothing further occurs within the time-out group of relays until the choice allotter has advanced nine steps following the operation of start relay 12B20, at which time it arrives in position 8. The choice allotter arrives in any new position with pulser relays 12B22 and 12B23 restored and with relay 12B24 still operated.

With start relay 12B20 operated, and with the choice allotter in position 8, operating ground on wire 1245 is extended to stop relay 12B21, through make contact 5 of relay 12C2 and 12C11, and over conductor 8 in group 1253. Upon operating, stop relay 12B20 opens its contacts to restore pickup relay 12B19, which at its contacts 1, restores start relay 12B20. Relay 12B20 restores and removes start ground from the time-out pulser before the next cycle thereof starts. At its contacts 6, relay 12B20 terminates the time-out period by reconnecting the originating-start relay 12B10.

VIE23. *Traffic metering*

The line controller is arranged to operate two meters (not shown) indicative of the disposition of originated calls handled by the line controller. These meters are operated over originated-calls-completed wire OCC and originated-calls-lost wire OCL (Fig. 12, part 2).

Each time operate relay 12B7 operates (incidental to the closure of the hold-magnet circuits in the normal course of events following matching), it grounds wire OCC as an indication that an originating call has been completed; that is, extended successfully through the line-link frame.

The metering of lost originating calls is not so readily accomplished, as an operation of the line controller which finds all matching paths unavailable does not necessarily mean that a call is lost, for a calling subscriber often has only to wait a short time for a path to become available. It is considered, however, that any condition causing the time-out group to function as described to retire the line controller from originating operation (after at least ten unsuccessful originating-call attempts) causes a delay amounting to a lost call. Accordingly, each time start relay 12B20 operates to begin a time-out period, it grounds originating-calls-lost wire OCL to record a lost originating call. The reading of the originating-calls-lost meter, however, is not intended to show the precise number of lost originating calls. In this regard, note that a calling line with an open sleeve wire S will cause repeated groundings of wire OCL until the condition is remedied.

VIF. *Detailed terminating-call operation*

VIF1. *Primary, fives, and units marking*

When the block translator 1800 receives digit information from a calling block coupler 500 identifying a line terminated on the line-link frame served by a specific line controller 1200, it translates that information into a primary digit, a fives digit, and a units digit, and transmits the translated digit information to the concerned line controller by simultaneously grounding one of ten P leads, one of five F leads, and one of five U leads extending between the block translator and the line controller. These three sets of leads are shown at the lower margin of Fig. 12, part 1. These sets correspond respectively to the primary, fives and units digits of translated information.

The grounding of an F lead or a U lead by the block translator causes no immediate response, for operating battery is withheld from the associated lower windings of the fives-chain and units-chain relays until auxiliary relay 12B9 of the terminating-control group has operated to close its contacts 1 and 2. Interference is thereby avoided with originating control action, if it is in progress.

VIF2. *Primary selection*

The grounding of the selected P lead incoming from the block translator causes the immediate operation of the associated one of the ten relays 12A12 to 12A21 in the terminating primary chain to select the corresponding line-link primary switch. Upon operating, any relay 12A12 to 12A21, at its contacts 3, prepares to ground the associated select-magnet wire SM leading to the line-controller switches, and at its contacts 2, it grounds the operate wire for the terminating-start relay 12B8. The circuit of relay 12B8 includes break contact 9 of originating-start relay 12B10, whereby relay 12B8 does not operate for the time being if originating operation is in progress.

VIF3. *Seizing the terminating-control group*

Upon operating, terminating-start relay 12B8, at its contacts 3, opens the input ground wire to the selecting contacts of the originating primary chain, and at its contacts 4, it locks operated independent of contacts 9 of relay 12B10, to give terminating operation undisputed preference in the event of a close race between relays 12B8 and 12B10; at contacts 6, it grounds its associated terminating-frame wire TF to identify the called line-link frame in the block controller 1600; at its contacts 5, it transfers the associated control wire from the circuit of originating-start relay 12B10 to the circuit of terminating-start-auxiliary relay 12B9; and at its contacts 2, it operates cutoff relay 12A1 through break contacts 5 of clearout relay 12B18.

Cutoff relay 12A1 disconnects the associated leads P1 to P10 incoming from the line-link primary switches 800 to insure that no more than one relay 12A2 to 12A11 is operated in the originating primary chain, thereby avoiding crossed-wire interference with the selection at the terminating primary chain. Relay 12A1 at its contacts 11, extends its operating ground to the associated control wire, operating relay 12B9 through make contact 5 of relay 12B8.

VIF4. *Fives and units selection*

Auxiliary terminating-start relay 12B9, at contacts 4, connects up the called-line-sleeve wire CLS as a preparatory measure; at contacts 2 and 1, it applies operating battery to the lower windings of the fives and units relays (12A25 to 12A29, and 12B2 to 12B6), whereupon the selected relay in each chain operates, followed by relays 12A23, 12A24, and 12B1, as hereinbefore described; at contacts 3 it grounds the multipled make contacts 3 in the terminating primary chain (relays 12A12 to 12A21) which are associated with the select-magnet wires SM1 to SM10 of the line-controller switches 1000 and 1100, thereby grounding the select-magnet wire SM corresponding to the selected primary switch.

VIF5. *Primary selection at the line-controller switches*

The two line-controller switches 1000 and 1100 now operate as described to set themselves according to the selected primary switch 800.

VIF6. *Link test*

Incidental to their primary-switch selecting operation, line-controller switch 1000 connects the link-test relays 12D1 to 12D10 (over wires LT1 to LT10) respectively to the sleeve wire S of the line links 202 extending from the selected primary switch, causing any such relay to operate subject to its corresponding line link being idle, as described for originating action. On operating, any link-test relay 12D1 to 12D10, at contacts 1, connects battery (on wires LSM1 to LSM10) to the associated one of link wires LK1 to LK10, through the corresponding series-connected primary and secondary select magnets. Battery so placed on any wire LK informs the block controller 1600 that the corresponding connected line link is idle. Moreover, the closure of the noted contact 1 of any link-test relay prefaces a circuit for operating the corresponding primary and secondary select magnets on the line-link frame if a path is matched over the corresponding line link.

VIF7. *Fives selection at the line-controller switches*

As a part of their primary selection, the line-controller switches jointly ground common-off-normal wire CON (Fig. 12, part 1) as described. At this time, ground on wire CON locks relay 12B8 thereover through its contacts 1, and completes a circuit through contacts 1 of auxiliary relay 12A24 and make contact 1 of the operated fives relay (12B25 to 12B29), over the associated wire HM5 to HM9, for operating the hold magnet HM5 to HM9 in the two line-controller switches which corresponds to the selected fives group of lines on the selected primary switch 800. As previously described, the sleeve wires S of the fives lines in the selected fives group are thereby connected respectively to the five sleeve-units wires SU incoming to the line controller.

VIF8. *Sleeve of called line extended back*

With units selection having been made in the line controller, by the described operation of one of the units relays 12B2 to 12B6, the wire SU which represents the sleeve of the called line is now extended through contacts 1 of the operated units relay (12B2 to 12B6), a contact 2 to 6 of the operated auxiliary relay 12B1, local sleeve conductor 1221, and contact 4 of relay 12B9, to the called-line-sleeve wire CLS leading to the block controller 1600, enabling the block controller to test the called line thereover, and to later operate the hold magnet of the called line thereover.

VIF9. *Line-test start*

The last noted hold-magnet operation in the line-controller switches 1000 and 1100 causes hold-pilot wire HP incoming to the line controller to become grounded as hereinbefore described. The local branch of this wire stands open in the line controller at contacts 1 of originating-start relay 12B10, but a multiple of this wire is extended to the block controller as the test-start wire TS. With wire TF of this line controller grounded as described, the grounding of this wire acts in the block controller to start the testing of the called line.

VIF10. *Matching and connection extension*

If the called line tests idle, and if an idle path can be matched thereto (over an idle block link 206, terminating trunk 207, and line link 202), the block controller 1600 first causes the elements of the matched path to be selected, and then operates the appropriate hold magnets to cause the connection to be extended thereover to the called line.

To cause the matched line link to be selected, the block controller grounds the corresponding link wire LK, operating the concerned primary and secondary select magnets on the line-link frame through make contact 1 of the associated link-test relay (12D1 to 12D10) of the line controller, and over the associated link-select-magnet wire LSM. Operation of these select magnets extends battery to wire PS-ON as hereinbefore described. Off-normal wire ON (Fig. 12, part 2, lower margin) is multipled thereto, extending battery to the block controller as a signal that line-link selection has occurred.

The primary and secondary hold magnets on the block-link frame, and the secondary hold magnet on the line-link frame are operated as described. The hold magnet individual to the called line is operated (to connect the called line to the primary end of the matched line link) by ground placed on wire CLS by the block controller, such wire having been connected to the sleeve of the called line as described.

VIF11. *Clearing out*

When their operation has been completed, the block controller 1600 and block translator 1800 clear out. The clearing out of the block translator open-circuits and restores the operated digit relay in the terminating primary chain, in the fives chain, and in the units chain of the line controller. This permits the associated relays 12A23, 12A24, and 12B1 of the five and units chains to restore. The restoration of the digit relay (12A12 to 12A21) in the terminating primary chain opens the previously grounded SM wire to clear out the line-controller switches, and it opens the upper winding of terminating-start relay 12B8, leaving that relay locked to wire CON.

When the line-controller switches clear out, they restore any operated ones of link-test relays 12D1 to 12D10, and they unground controller-off-normal conductor CON. This opens the locking circuit of terminating-start relay 12B8, whereupon relays 12B8, 12B9, and 12A1 restore, completing the clearing out of the line controller.

VIF12. *Control and supervision of digit wires*

Circuit difficulties within the block translator 1600, or at the terminals of the cable conductors interconnecting the block translator with a line controller 1200 may cause two of the primary wires P, two of the fives wires F, or two of the units wires U extending between them to become shorted together. Unless prevented, this would cause operation of two or more relays in the concerned digit chain of the line controller, and that would mark one or more other lines in addition to the called line. But, operation by the block translator of two or more relays in the same digit chain is prevented by chaining the operating battery for each concerned digit chain in the line controller.

As an alarm-supervisory measure, each digit chain is provided with an alarm relay which operates when a crossed-wire condition attempts to operate two relays in the same digit chain. In the terminating primary chain, for example, any relay 12A12 to 12A21 on operating, opens its chain contact 1 to remove operating battery from any succeeding digit relay of the chain. As a result, when ground appears on the P wires incoming to two or more of these relays, the lowest-numbered relay in the chain operates normally, while any succeeding relay in the chain either fails to operate or restores promptly upon having its operating battery disconnected by the preferred relay in the chain. The relay attempting unsuccessfully to operate now finds high-resistance battery through the lower winding of the alarm relay 12A22 and the associated high-resistance resistor 1204. No relay 12A13 to 12A21 will operate in series with resistor 1204 but alarm relay 12A22 is sensitive enough to operate through it and through any relay 12A13 to 12A21 which is attempting to draw operating battery from the disconnected end of the chain. On operating, relay 12A22, at contacts 1, locks its upper winding to ground through the alarm-release key 1207. The associated primary-alarm lamp 1201 becomes lighted in parallel with the upper winding of relay 12A22. At its contacts 2, relay 12A22 grounds line-controller-alarm wire LC-AL extending to alarm-supervisory equipment (not shown), to signal a trouble condition in the line controller.

It will be observed that the circuit arrangement still permits a call to go through under the discussed abnormal condition. Such a call has an even chance of reaching the desired called line, since the lower-numbered one of two crossed wires P1 to P10 should represent the correct translation about half the time.

The chain and alarm arrangement is similar at the fives chain and at the units chain of relays, whereat alarm relays 12A30 and 12B7 are provided, along with their associated alarm lamps 1202 and 1203, and resistors 1205 and 1206.

VII. *Block-link switches* (*Figs. 13 and 14*)

Figs. 13 and 14 are schematic wiring diagrams of a block-link primary switch 1300 and a block-link secondary switch 1400 respectively. Switch 1300 represents any one of the ten block-link primary switches 1300 of Figs. 2, 3, and 6.

As pointed out for Figs. 8 and 9, the respective parts of the switches in Figs. 13 and 14 are illustrated in substantially the relative locations they occupy in the crossbar-switch structure disclosed in the previously noted patent application of Arthur.

Each switch 1300 and 1400 has twenty verticals of which the first and last (V1 and V20) are illustrated in full, the intermediate verticals (V2 to V19) being omitted. Any vertical of either switch 1300 or 1400 includes ten principal stackups 1 to 10, of which stackups 3 to 9 are omitted from the drawing, and an eleventh and a twelfth stackup respectively designated U and L. Each vertical V1 to V20 or either switch further includes a thirteenth stackup, designated as hold-pilot stackup HP.

Each of the switches 1300 and 1400 has twenty hold magnets HM, associated respectively with the twenty verticals V. Only the first and last hold magnets (HM1 and HM20) are illustrated for either switch. Any hold magnet HM, upon being energized invariably actuates its hold-pilot stackup HP but actuates any other stackup in the associated vertical V subject to such stackup having been selected.

Each switch 1300 and 1400 has ten principal select magnets SM1 to SM10 corresponding respectively to principal stackups 1 to 10 in the several verticals V of the switch, and has extension-select magnets SMU and SML corresponding respectively to the extension stackups U and L in any vertical V.

Corresponding stackups 1 to 10 in either switch are interconnected in horizontal rows by ten sets (six strips to a set) of horizontal bank strips shown at 1303 in Fig. 13 and at 1403 in Fig. 14. Each set of six horizontal bank strips comprises three upper strips U and three lower strips L. Each set of three contains members T, R, and S corresponding respectively to the tip, ring, and sleeve conductors of the telephone connection.

In any vertical V on either switch 1300 or 1400, six vertical bank strips are employed. They are shown at 1305 in Fig. 13 and at 1405 in Fig. 14. Three of these vertical bank strips in any vertical V interconnect contacts of extension stackup U with contacts of the upper three pairs of contacts in each of the principal stackups 1 to 10 of the vertical, while the remaining three vertical bank strips interconnect contacts of extension stackup L with contacts of the lower three pairs in principal stackups 1 to 10 of the verticals, as illustrated. The indicated flexible contacts in stackups U and L of any vertical V are connected together as shown to provide a common inlet path for three associated trunk conductors T, R, and S.

At each of the switches 1300 and 1400, ten pairs of block links 206 are connected as shown to the terminals at the left-hand end of the horizontal bank strips 1303 or 1403. The two block links 206 in any pair are designated U and L respectively, according to whether they are connected to contacts of the upper three pairs of any stackup or to contacts of the lower three pairs thereof. Block links 206 are spread between the ten primary switches 1300 and the ten secondary switches 1400 as described best hereinbefore in connection with Fig. 3. That is, from any primary switch 1300, the pairs of block links 206 extend respectively to the ten block-link secondary switches 1400.

At any primary switch 1300, there are twenty sleeve wires connected to the sleeve wires S of the twenty block links 206 thereat and extended to/from the block-controller switch 1500 of Fig. 15. At any switch 1300 they are termed sleeve, upper and sleeve, lower wires, and are identified as SU-1 to SU-10, and SL-1 to SL-10, according to the block links which they respectively represent. They are the wires over which the block controller 1600 tests the block links. Two such wires are shown at SU-225 and SL-225 in Fig. 6.

The ten principal select magnets SM1 to SM10 of any block-link primary switch are operated respectively by ground placed on the corresponding one of the ten select-magnet wires SM1 to SM10 illustrated as extending between switch 1300 and the block-controller switch of Fig. 15. Each such select magnet SM1 to SM10 of switch 1300 receives its battery supply over the associated one of the select-magnet wires SM1 to SM10 shown as extending between the switches 1300 and the switches 1400. For any principal select magnet on a primary switch 1300, the battery supply is through a principal select magnet SM1 to SM10 of the one of the ten secondary switches 1400 to which the corresponding pair of block links 206 extends. For this purpose, the select-magnet wires SM1 to SM10 between the ten primary switches 1300 and the ten secondary switches 1400 are spread in accordance with the spreading of the 100 pairs of block links 206 as explained best in connection with Fig. 3. The series relationship between the principal select magnets of switches 1300 and 1400 in pairs is shown in Fig. 6 for the select magnets associated with the pair of block links 206 there illustrated.

Each of the extension select magnets SMU and SML of any primary switch 1300 is ground-connected, and is operated upon the receipt of a battery potential over the associated one of the wires SMU and SML, shown in Figs. 13 and 6 as extending between a primary switch 1300 and the block-controller switch 1500 (Fig. 15). Any such extension-select magnet SMU, SML of a primary switch is operated in series with the corresponding extension magnet SMU or SML of any secondary switch 1400 over the corresponding one of the two wires SMU and SML shown extending between switch 1400 and the block controller 1600 of Fig. 16. These conductors are shown also in Fig. 6 for the switch 1400 there illustrated.

Keeping in mind that any selection of a path through a switch 1300 and a switch 1400 requires the operation of one or another of the auxiliary select magnets SMU and SML in each and the operation of one or another of the principal select magnets SM1 to SM10 in each, the off-normal contacts controlled by the select magnets of the switches 1300 and 1400 are connected accordingly. At any primary switch 1300, off-normal contacts 1307′ extend ground potential to one contact of each off-normal pair 1307. The closure of pair 1307 extends ground potential to primary off-normal conductor PON which is multipled to all primary switches 1300, and which extends to the secondary switches 1400 and is multipled to each of them. At any secondary switch 1400, the closure of any contact pair 1407 extends the ground potential on wire PON to contact pair 1407′. Operation of this contact pair extends the ground potential to secondary off-normal conductor SON, which is multipled to all secondary switches 1400 and which extends to the block controller 1600 to provide a pilot indication that complete selection has been accomplished at the concerned primary and secondary switches 1300 and 1400.

At each primary switch 1300, there are twenty conductor sets 205-1 to 205-20 coming from respective block couplers 500, as shown in Figs. 5 and 6 for the block couplers 500-I and 500-L.

At each secondary switch 1400, respective terminating trunks 207 extend from terminals associated with verticals V1 to V16 as illustrated for vertical V1 and indicated for vertical V16. Respective outgoing trunks 2020 extend from terminals associated with verticals V17 to V20 as indicated for vertical V17 and illustrated for vertical V20.

On each secondary switch 1400 the first sixteen match-test wires MT extend to/from the block controller 1600 of Fig. 16 to enable the corresponding terminating trunks 207 to be tested and controlled. The final four match-test wires MT extend to/from the outgoing controller 1700 of Fig. 17 to enable the corresponding outgoing trunks 2020 to be tested and controlled.

In Fig. 14, each match-test wire MT passes through normally closed make-busy contacts MB. Such contacts comprise the uppermost pair in the associated hold-pilot stackup HP, where they are mounted for convenience only, as their operation is manual and is not affected by energization or deenergization of the associated hold magnet HM. Opening any contact pair MB operates to mark the associated terminating trunk 207, or outgoing trunk 2020, busy by depriving its associated match-test wire MT of idle-indicating battery potential.

VIII. *Block-controller switch and section-preference relays (Fig. 15)*

Referring to Fig. 15 (parts 1 and 2) the block-controller switch 1500 shown thereon will be described, together with the section-preference relays 1550 through which block-controller switch 1500 is controlled.

VIIIA. *Block-controller switch 1500*

As shown in Figs. 2 and 6, the block-link frame has a block-controller switch 1500 interposed between the associated block controller 1600 and the block-link primary switches 1300. On any call across the block-link frame, block-controller switch 1500 is set under the control of section-preference relays 1550 to connect block controller 1600 with the specific one of the ten primary switches 1300 through which calls from the calling block-coupler section are handled.

The fulfillment of the foregoing purpose requires the selective switching of twenty link-sleeve wires and twelve select-magnet wires of each of the ten primary switches 1300. The twenty sleeve wires of any primary switch each require two contact pairs in the block-controller switch, bringing the number of contact pairs per primary switch to fifty-two, or a total of 520 for the ten primary switches. This requirement is met by providing the block-controller switch 1500 with eleven verticals V1 to V11, each of which includes ten five-wire stackups 1 to 10. Of the 550 contact pairs thus provided, thirty contact pairs are unused in the final vertical V11.

Of the eleven verticals V1 to V11, verticals V3 to V6 have been omitted to conserve drawing space. The omitted verticals are similar to verticals V1, V2, V7 and V8.

Verticals V1 to V8 comprise four pairs, each of which has its own local horizontal multiple.

The horizontal multiple is otherwise omitted from the switch 1500.

The verticals of switch 1500 serve wires of the several primary switches 1300 as follows:

1. Verticals V1 and V2 serve the sleeve wires SU1 to SU3, SL1, and SL2, of the block links 205 extending from the primary switches;

2. Verticals V3 and V4 (not shown) serve sleeve wires SU4, SU5, and SL3 to SL5;

3. Verticals V5 and V6 serve sleeve wires SU6 to SU8, SL6, and SL7;

4. Verticals V7 and V8 serve sleeve wires SU9, SU10, and SL8 to SL10;

5. Vertical V9 serves select-magnet wires SM1 to SM5 of the switches 1300;

6. Vertical V10 serves select-magnet wires SM6 to SM10; and

7. Vertical V11 serves select-magnet wires SMU and SML.

Verticals V1 to V11 are controlled respectively by hold magnets HM1 to HM11, all connected in multiple to control wire HM in cable 1559, and to branch control wire HM extending between the block-controller switch 1500 and the block controller 1600.

The ten select magnets SM1 to SM10 of switch 1500, and the corresponding horizontal rows of stackups 1 to 10, correspond respectively to the ten associated block-link primary switches 1300, as well as the respectively associated sections 1 to 10 of the block couplers 500, shown most clearly in Fig. 3.

VIIIB. *Section-preference relays 1550*

The section-preference relays 1550 include ten outgoing chain relays 15C11 to 15C20 which correspond respectively to the ten block-coupler sections to which they are respectively connected by outgoing-chain-in conductors OTG-CH-IN 1 to OTG-CH-IN 10. Ten terminating chain relays 15C21 to 15C30 are also associated respectively with the block-coupler sections, to which they are respectively connected by terminating-chain-in wires TER-CH-IN 1 to TER-CH-IN 10.

Normally closed contacts 1 of relays 15C11 to 15C20 are serially related to comprise the main outgoing chain through which ground is normally extended to chain-end conductor 1554, which is normally connected to each of the block-coupler sections through contacts 2 of the associated relays, through the windings thereof, and over the outgoing-chain-in conductors. The outgoing chain is supervised by alarm relay 15D14, normally energized by ground on conductor 1554 to maintain the associated alarm conductor AL disconnected.

Normally closed contacts 1 of relays 15C21 to 15C30 are serially related to comprise the main terminating chain, extending ground normally to its chain-end conductor 1551 from which ground normally extends through contacts 2 of the chain relays and the windings thereof to the respective block-coupler sections over the terminating-chain-in wires. Alarm relay 15D15 supervises the main terminating chain by being normally operated from ground on conductor 1551 to maintain alarm wire AL disconnected.

Relays 15D11 to 15D13 are auxiliary control relays, the purpose of which will appear in the course of the description.

VIIIC. *Outgoing operation*

With the section-preference relays 1550 and the block-controller switch 1500 in their normal condition illustrated in Fig. 15, their operation in an outgoing call proceeds as follows:

VIIIC1. *Localizing the outgoing chain with the seizing section*

Upon the seizure of the outgoing chain at any block-coupler section (by the described closure of an operating circuit for an outgoing-chain relay 511, Fig. 5), the corresponding outgoing-chain-in wire (OTG-CH-IN 1 to OTG-CH-IN 10) incoming to the seizing block-coupler section from the section-preference relays is connected to battery, through the outgoing-chain relay 511 of the block coupler 500, a series relay 17B12 to 17B20 in the outgoing controller 1700, wire OTG-ST, and the outgoing-start relay 16A17 of the block controller 1600. A circuit is thereby established over the concerned outgoing-chain-in wire, through the winding of the associated one of relays 15C11 to 15C20, and break contact 2 of such relay, and over chain-end wire 1554 to ground through the main outgoing chain (break contacts 1 of relays 15C11 to 15C20). The concerned chain relay 15C11 to 15C20 operates along with the three other noted relays in the series circuit, and at its make-first contact 1 locks itself to the preceding portion of the main outgoing chain. At its break contacts 1, it opens the main outgoing chain, and at its contacts 2, it disconnects its own winding from the chain-end conductor 1554, thereby isolating each of the other section branches from the chain. By this operation, the corresponding block-coupler section is selected, along with the associated primary switch, and the closure of a circuit over any other section branch of the outgoing chain is precluded.

VIIIC2. *Section preference*

In the event that two or more of the relays 15C11 to 15C20 operate at the same time, only the lowest numbered one of them remains operated, as each of them, at its break contact 1, opens chain ground from the holding circuit of the succeeding ones. The order of preference is from relay 15C11 to relay 15C20. The preference, therefore, runs from the first primary switch (and first block-coupler section) to the tenth.

VIIIC3. *Grounding the select-magnet wire corresponding to the selected section*

Upon the effective operation of any outgoing-chain relay 15C11 to 15C20, contacts 3 thereof apply ground (through the series relay 15D11 and conductor 1555) to the associated select-magnet wire (SM1 to SM10) of the block-controller switch 1500, operating relay 15D11 and the chosen select magnet in series.

VIIIC4. *Chain preference*

At its contacts 1, relay 15D11, disconnects ground from relay 15D12 (and consequently from the associated contacts 3 of the terminating-chain relays 15C21 to 15C30) to prevent any terminating-chain relay from grounding a select-magnet wire of the block-controller switch in the event that a terminating call makes a demand on the section-preference relays before the outgoing call is cleared therefrom.

VIIIC5. *Select-magnet operation*

In the block-controller switch, the noted grounding of any select-magnet wire SM1 to SM10 (corresponding to the selected calling block-coupler section and associated block-link primary switch) energizes its connected select magnet to effect the mechanical selection of the corresponding horizontal row of stackups.

VIIIC6. *Hold-magnet operation*

The operation of any select magnet closes the associated off-normal contacts 1507, to ground off-normal wire ON in cable 1560. With hold-pilot relay 15D13 in restored condition, and with relay 15D11 operated, the noted ground on wire ON is extended through break contacts 3 of relay 15D13, and make contacts 2 of relay 15D11 to hold-magnet wire HM in cable 1560, thereby operating hold magnets HM1 to HM11 in multiple to close all stackups in the horizontal row selected by the energized select magnet SM1 to SM10.

VIIIC6a. *Connecting the block controller to the selected primary switch*

At verticals V1 to V8, the twenty sleeve wires SU1 to SL10 of the block controller (those associated with the omitted verticals V3 to V6 are not shown) are connected to the corresponding wires of the selected primary switch 1300 and idle-indicating battery potential is applied to these sleeve wires through respective resistors 1561. At verticals V9 and V10, select-magnet wires SM1 to SM10 from the block controller are connected to the corresponding select-magnet wires of the selected primary switch 1. At vertical V11, select-magnet wires SMU and SML from the block controller are connected to the corresponding wires of the selected primary switch 1300.

VIIIC6b. *Applying outgoing matching ground*

Upon the operation of the hold magnets HM1 to HM11 of switch 1500, their hold-pilot stackups HP are shifted to alternate position, thereby removing ground from hold-pilot wire HP2 at all points and applying ground to hold-pilot wire HP1. Ground on wire HP1 passes through break contact 2 of hold-pilot relay 15D13 to outgoing-matching-ground wire OTG-MG of the block controller 1600.

VIIIC7. *Matching*

The noted wire OTG-MG having been grounded, the block controller and the outgoing controller, acting together, match a path to an idle trunk in the called outgoing group. This operation includes testing the twenty block links 206 (ten pairs) extending from the connected block-link primary switch 1300 to the block-link secondary switches 1400. This testing is carried out by the block controller over its twenty sleeve wires S1U to S10L, connected through verticals V1 to V8 of the block-controller switch 1500 to the corresponding sleeve wires of connected primary switch 1300. Idle-indicating battery, through the associated resistor 1561, appears on the sleeve of each of the block links unless the link is busy, in which case it is masked by the holding ground on the sleeve wire of the link.

VIIIC8. *Selecting the matched path*

When a path has been matched as described in connection with Figs. 4 to 7, block controller 1600 closes the necessary select-magnet circuits to cause mechanical selection of the matched block link to occur at the concerned block-link primary switch 1300 and secondary switch 1400. One part of this operation comprises grounding the concerned one of the ten select-magnet wires SM1 to SM10 incoming to the block-controller switch from the block controller, thereby grounding the corresponding wire of the connected primary switch. This operates the corresponding principal select magnet SM1 to SM10 on the primary switch 1300, in series with the principal secondary select magnet serving the pair of block links which includes the matched one.

The second part of this operation comprises connecting the required one of the two battery-connected auxiliary select magnets SMU and SML of the concerned secondary switch 1400 to the corresponding one of the wires SMU and SML (extending between the block controller 1600 and the block-controller switch 1500), thereby operating such auxiliary secondary select magnet in series with the corresponding ground-connected auxiliary select magnet (SMU or SML) of the connected primary switch 1300.

VIIIC9. *Closing the matched path*

Upon the completion of the mechanical selection of the matched path at the primary and secondary switches, circuits are closed through the block controller for operating the required hold magnet on the primary switch and on the secondary switch, to extend the connection across the block-link frame, over the matched block link 206, to the selected outgoing trunk 2020.

VIIIC10. *Clearing out*

Upon the connection being closed over the matched path, the block coupler 500 in use opens the outgoing chain at its section (at contacts 4 of relay 501 of block coupler 500–L), thereby restoring all the relays being held operated thereover, including the operated one of the outgoing-chain relays 15C11 to 15C20 in the section-preference relays 1550. The restoration of this relay restores the main outgoing chain to its normal closed condition, and opens the closed one of the associated select-magnet wires SM1 to SM10, restoring relay 15D11 and the operated select magnet of the block-controller switch. The hold magnets HM of the block-controller switch are thereby restored to remove ground from hold-pilot wire HP1, and wire OTG-MG.

The section-preference relays 1550 and the block-controller switch 1500 are thus completely cleared out, and stand again in their illustrated normal condition.

VIIID. *Terminating operation*

With the section-preference relays 1550 and the block-controller switch 1500 in their illustrated normal condition, their operation in a terminating call proceeds as follows:

VIIID1. *Localizing the terminating chain with the seizing section*

Upon the seizure of the terminating chain at any block-coupler section, the corresponding terminating-chain-in wire (TER-CH-IN 1 to TER-CH-IN 10) extending between the seizing block-coupler section and the section-preference relays 1550 is connected to battery, through the terminating-chain relay (512, Fig. 5) of the seizing block coupler 500 and terminating-start relay 16A6 of the block controller 1600. A circuit is thereby established over the concerned terminating-chain-in wire, through the winding of the associated one of relays 15C21 to 15C30, break contact 2 of such relay, and chain-end wire 1551, to ground through the main terminating chain (break contacts 1 of relays 15C21 to 15C30). The concerned chain relay 15C21 to 15C30 operates along with the two other noted relays in the series circuit, and at its make-first contact 1, locks itself to the associated portion of the main terminating chain. At its break contacts 1 and 2, it opens the main chain and disconnects its own winding from the end conductor thereof (1551), thereby isolating each of the other section branches from terminating-chain ground. By this operation, the corresponding block-coupler section is selected, along with the associated primary switch, and the other block-coupler sections are precluded from seizing the terminating chain.

VIIID2. *Section preference*

In the event that two or more of the relays 15C21 to 15C30 operate at the same time, only the lowest numbered one of them remains operated, as each of them opens the chain ground from the holding circuit of the succeeding ones. The order of preference is from relay 15C21 to 15C30, as pointed out for relays 15C11 to 15C20 in the main outgoing chain.

VIIID3. *Grounding the select-magnet wire corresponding to the selected section*

Upon the effective operation of any relay 15C21 to 15C30, ground through break contact 1 of relay 15D11, the winding of relay 15D12 and break contact 1 of relay 15D13, conductor 1552, and contacts 3 of the operated relay 15C2 to 15C30, is applied to the associated select-magnet wire (SM1 to SM10) of the block-controller switch, operating relay 15D12 and the chosen select magnet in series.

VIIID4. *Chain preference*

Since the select-magnet ground applied by any one of relays 15C21 to 15C30 is through the noted back contact 1 of chain-outgoing relay 15D11, any select magnet of switch 1500 which is operated over the terminating chain is subject to summary restoration, upon the opening of its circuit by series relay 15D11 in the event that a demand for outgoing operation is received.

VIIID5. *Select-magnet operation*

In the block-controller switch 1500, the noted select-magnet operation effects the mechanical selection of the corresponding horizontal row of stackups.

VIIID6. *Hold-magnet operation*

The operation of any select magnet closes the associated off-normal contacts 1507 to ground off-normal wire ON in cable 1560. With relay 15D12 operated, and relay 15D11 restored, the ground on off-normal wire ON is extended through make contact 2 of relay 15D12 and break contact 2 of relay 15D11 to hold-magnet wire HM, operating the hold magnets 1 to 11 of the block-controller switch in multiple to close all stackups in the selected horizontal row.

VIIID6*a*. *Connecting the block controller to the selected primary switch*

As pointed out under outgoing operation, verticals V1 to V8 of block-controller switch 1500 operates to connect the twenty sleeve wires SU1 to SL10 of the block controller, together with idle-indicating battery through respective resistors 1561 to the sleeve wires of the respective block links 206 serving the connected primary switch 1300; verticals V9 and V10 connect the select-magnet wires (SM1 to SM10) incoming from the block controller to the corresponding select-magnet wires of the selected primary switch 1300, and vertical V11 connects select-magnet wires SMU and SML of the block controller to the corresponding wires of the selected primary switch 1300.

VIIID6*b*. *Hold-pilot operation*

With relay 15D12 operated, the grounding of hold-pilot wire HP1 by stackups HP of the block-controller switch 1500 energizes the winding of the hold-pilot relay 15D13. Relay 15D13 promptly operates and locks itself at make contacts 2 thereof to conductor HP1 independent of the contacts of relay 15D12, at the same time disconnecting the grounded wire HP1 from wire OTG-MG, after a momentary incidental application of ground thereto.

At its break contact 3, relay 15D13 opens a point in the previously traced circuit for the hold magnets HM of the block-controller switch during outgoing operation, and at break contact 1, it inserts a resistor 1553 in series with relay 15D12 and the operated select magnet, reducing the current flow therethrough from operating value to a lower holding value.

The principal purpose of hold-pilot relay 15D13 is to control the switching-over of the setting of the block-controller switch 1500 together with the changing over of the block controller 1600 from terminating operation to outgoing operation if the outgoing chain becomes active before the terminating operation in progress has been completed. This operation is described in detail hereinafter.

VIIID7. *Matching*

Block controller 1600, acting together with the line controller 1200 on the called line-link frame, now matches a path to the called line. This operation includes testing the block links 206 extending from the connected block-link primary switch 1300 to the block-link secondary switches 1400, as described for outgoing operation.

VIIID8. *Selecting the matched path*

When a path has been matched across the block-link frame and across the called line-link frame, the block controller grounds the necessary select-magnet wires to cause mechanical selection of the matched line link and block link to occur. As described for outgoing operation, this includes closing a circuit over one of the ten select leads SM1 to SM10, and over one of the leads SMU and SML, extending between the block controller 1600 and the block-controller switch 1500.

VIIID9. *Closing the matched path*

When the mechanical selection of the block link and of the line link have been completed, block controller 1600 closes circuits as described for operating the required primary and secondary hold magnets on the block-link frame and on the called line-link frame. The connection is thereby extended from the calling block coupler to the called line.

VIIID10. *Clearing out*

Upon the connection being closed over the matched path, the block coupler 500 in use opens the terminating chain at its section (at contacts 5 of relay 509 in coupler 500–L), thereby restoring the three relays being held operated thereover, including the operated one of the terminating-chain relays 15C21 to 15C30 in the section-preference relays. The restoration of the latter relay restores the main terminating-chain to its normal closed condition and opens the closed one of the select-magnet wires SM1 to SM10 of the block-controller switch. This restores relay 15D12, along with the operated select magnet of the block-controller switch. The hold magnets of the block-controller switch are thereby restored, ungrounding hold-pilot wire HP1 to restore hold-pilot relay 15D13.

Section-preference relays 1550 and block-controller switch 1500 are thus completely cleared out, and stand again in normal condition.

VIIIE. *Overlapping seizure of the outgoing and terminating chains*

The operation of the section-preference relays 1550 and of the block-controller switch 1500 incident to overlapping seizure of the outgoing chain and of the terminating chain will now be described.

VIIIE1. *Seizure of both chains at once*

When seizure of the two chains occurs so nearly at the same time that an outgoing-chain relay (15C11 to 15C20) and a terminating-chain relay (15C21 to 15C30) operate at about the same instant, series relays 15D11 and 15D12 both operate, each in series with a select magnet of switch 1500 corresponding to the operated chain relay in its associated main chain. Having no select shaft to rotate, series relays 15D11 and 15D12 operate before a select magnet of the block-controller switch can rotate its comparatively heavy shaft. In this event, relay 15D11 open-circuits relay 15D12 and the associated select magnet, preventing the selected magnet from operating, and promptly restoring relay 15D12. The select-magnet circuit which it closed having been opened as described, the seized terminating chain must wait until the action occurring as a result of the seizure of the outgoing chain has been concluded before it gains access to the block-controller switch. When that occurs, the operation proceeds as described.

VIIIE2. *Outgoing chain seized first*

If the outgoing chain is seized ahead of the terminating chain, series relay 15D11 is already operated when one or another of the terminating-chain relays 15C21 to 15C30 operates, wherefore the partially prepared select-magnet circuit is held open at contacts 1 of relay 15D11 until the apparatus is cleared of the outgoing call. Thereupon, the terminating operation may proceed as described.

VIIIE3. *Terminating chain seized first*

When seizure of the terminating chain occurs substantially ahead of the seizure of the outgoing chain, one or another of the terminating-chain relays 15C21 to 15C30 stands operated in the section-preference relays, along with series relay 15D12 and hold-pilot relay 15D13, as described. In the block-controller switch, a select magnet SM1 to SM10 and the hold magnets HM1 to HM11 are operated, and hold-pilot relay 15D13 stands operated as described. Under this condition, the outgoing call cannot be permitted to proceed until the hold magnets of the block-controller switch have been restored and have been reset under the control of the select magnet corresponding to the operated outgoing-chain relay 15C11 to 15C20, for the newly arriving outgoing call may be, and most probably is, from a block-coupler section other than the one for which switch 1500 is set.

VIIIE3a. *Calls from different block-coupler sections*

When the seizure of the outgoing chain under the assumed condition occurs at a different section from the one at which seizure of the terminating chain occurred, the consequent operation of the corresponding one of outgoing-chain relays 15C11 to 15C20 closes a circuit for the associated select magnet of the block-controller switch, through series relay 15D11, as previously described. Upon operating, series relay 15D11, at contacts 1, opens the select-magnet circuit previously established through series relay 15D12; at break contacts 2 it opens the previously traced established circuit of the hold magnets of the block-controller switch and at make contact 2, prepares a new circuit for these hold magnets through break contact 3 of hold-pilot relay 15D13.

Because resistor 1553 included in circuit by relay 15D13 has reduced the select-magnet current from its normal operating value to a lower holding value, relay 15D12 promptly restores, and the previously energized select magnet quickly deenergizes, and permits its associated select shaft to restore promptly.

The hold magnets HM1 to HM11 of the block-controller switch 1500 restore responsive to the noted operation of relay 15D11. Hold-pilot relay 15D13 thereupon restores and reconnects the hold magnets to off-normal wire ON through its break contact 3 and make contact 2 of relay 15D11. Before the hold magnets can reoperate, the previously operated select shaft has restored as noted.

When the newly energized select magnet operates and closes its associated off-normal contacts 1507, the consequent regrounding of off-normal conductor ON closes a circuit through break contact 3 of the restored hold-pilot relay 15D13 and make contact 2 of series relay 15D11 for reoperating the hold magnets HM1 to HM11 of switch 1500 in accordance with the newly effected mechanical selection.

As soon as the hold magnets of the block-controller switch reoperate, their hold-pilot contacts HP reapply ground to hold-pilot wire HP1, thereby extending ground therefrom to the outgoing-matching-ground wire OTG-MG, through break contact 2 of the restored hold-pilot relay 15D13.

The section-preference relays and the block-controller switch have now been repositioned for the handling of the outgoing call in preference to the terminating call which was in progress. Such terminating call, however, may again take over when the outgoing call clears out and relay 15D11 restores.

VIIIE3b. *Both calls from the same block-coupler section*

If the existing terminating call and the newly arriving outgoing call are from the same block-coupler section, the operation is similar to the foregoing except that the energized select magnet does not restore, being held operated from the operated one of outgoing-chain relays 15C11 to 15C20. Accordingly, off-normal wire ON does not lose ground. The hold magnets of the block-controller switch 1500, however, are restored as above described upon the operation of relay 15D11, and remains restored until hold-pilot relay 15D13 falls back responsive to the removal of ground on hold-pilot wire HP1. Thereupon the hold magnets are reoperated through break contact 3 of relay 15D13 and make contact 2 of relay 15D11 as previously described.

VIIIE4. *Terminating operation being concluded*

If the terminating operation in progress is just being concluded by the block controller at the time the outgoing chain is seized, the hold magnets of the block-controller switch are being held operated by ground placed on hold-magnet wire HM by the block controller 1600. Relay 15D11 operates and relay 15D12 restores, and the select-magnet setting is shifted as described, but hold-pilot relay 15D13 is held operated by contacts HP held closed by the hold magnets. Additionally, while the block controller normally changes over from terminating operation to outgoing operation upon energization of its outgoing-start relay 16A17 (as will be described hereinafter), it does not do so when it is maintaining ground on the associated hold-magnet wire HM of the block-controller switch 1500 while concluding its terminating operation.

Under the condition assumed, as soon as the block controller has concluded its terminating operation, it switches over to outgoing operation and removes ground from hold-magnet wire HM of the block-controller switch. The hold magnets HM1 to HM11 of the block-controller switch 1500 thereupon restore, removing ground from hold-pilot wire HP1 to restore hold-pilot relay 15D13. The hold magnets immediately reoperate through break contact 3 of hold-pilot relay 15D13 and make contact 2 of relay 15D11. When this occurs ground is applied to outgoing-matching-ground conductor OTG-MG (over conductor HP1 and back contact 2 of relay 15D13) to permit the outgoing call to be handled by the block controller.

VIIIF. *Main-chain supervision*

As previously noted, outgoing-alarm and terminating-alarm relays 15D14 and 15D15 are normally energized over their respective associated chain-end wires 1554 and 1551. When either main chain is opened, either by a fault therein, or responsive to the seizure thereof as hereinbefore described, the corresponding one of these two relays restores and connects the normally grounded hold-pilot wire HP2 to the associated alarm wire AL. When the alarm relay 15D14 or 15D15 is restored by a fault in the associated main chain, ground remains on hold-pilot wire HP2 and consequently on alarm wire AL, causing an alarm condition to be signaled. An alarm condition is also signalled if any one of the hold magnets HM1 to HM11 fails to operate, for wire HP2 is normally grounded through a break contact of each hold-pilot stackup HP of the block-controller switch.

Normally, the hold magnets all operate to unground wire HP2 and alarm wire AL before an effective alarm is given thereover.

IX. *Block controller and outgoing controller (Figs. 16 and 17)*

The block controller 1600 (Fig. 16) and the out-going controller 1700 (Fig. 17) will now be described.

On all calls across the block-link frame, shown in Figs. 2, 3, 5, and 6, the block-controller switch 1500 (Fig. 15) is controlled by the associated section-preference relays 1550 as hereinbefore described to connect the block controller 1600 to the specific block-link primary switch 1300 which handles calls from the currently involved section of block couplers 500.

The block controller 1600 is required for all calls across the block-link frame, comprising outgoing calls and terminating calls, while the outgoing controller 1700 is employed only for outgoing calls.

IXA. *General operation*

The general operation of block controller 1600 and outgoing controller 1700 is as follows.

IXA1. *Testing and matching*

1. On all the calls, the block controller 1600 tests the block links 206 extending from the concerned primary switch 1300 on the block-link frame to the secondary switches 1400 thereon, and performs a matching operation accordingly.

2. On outgoing calls, the outgoing controller 1700, through chain circuits interconnecting items 1600 and 1700 (wire group 241, Fig. 2), indicates to the block controller 1600 which trunks 2020 are idle in the called outgoing group, enabling the block controller to match an idle outgoing trunk with an idle block link.

3. On terminating calls the block translator 1800 is employed as previously noted, but gives no information directly to the block controller. Instead, the block translator transmits translated primary, fives, and units digit information to the concerned line-link frame A, B, C, or D as to the involved primary switch 800 thereon, the fives group of lines containing the called line, and the units identity of the called line within the fives group. The line-controller apparatus (items 1000 to 1200) on the line-link frame thereupon operates as described to select the indicated primary switch 800, the fives group of lines thereon, and the called line in the group of five; identifies the called line-link frame at the block controller; and indicates to the block controller which of the involved line links 202 are idle. The block controller 1600 thereupon tests the called line through a temporary test connection made to the sleeve of the called line by the line-controller apparatus.

4. If the called line tests idle, the block controller matches an idle block link 206 with an idle terminating trunk 207, and with a line-link 202 indicated as idle by the line-controller apparatus on the called line-link frame.

IXA2. *Select-magnet operation*

1. On all calls, the block controller 1600, largely through circuits prepared by the block-controller switch 1500, operates a primary and a secondary select magnet on the block-link frame (switches 1300 and 1400) in accordance with the block-link path selected by the matching operation.

2. On terminating calls, the block controller acts through the line-controller apparatus on the called line-link frame to operate a primary select magnet and a secondary select magnet on the called line-link frame (switches 800 and 900).

IXA3. *Hold-magnet operation*

1. On all calls, block controller 1600 operates the concerned primary hold magnet and secondary hold magnet HM on the block-link frame (switches 1300 and 1400).

2. On outgoing calls the block controller employs a circuit prepared by the outgoing controller in operating the secondary hold magnet on the block-link frame.

3. On terminating calls, the secondary hold magnet (switch 900) on the called line-link frame is operated by the block controller in multiple with the secondary hold magnet (switch 1400) on the block-link frame. The primary hold magnet (switch 800) on the called line-link frame is operated by the block controller over the noted temporary test connection to the sleeve of the called line.

IXA4. *Call preference*

On a terminating call, all digits have been dialed before block controller 1600 and associated common apparatus are called in. Therefore, it makes little difference in a terminating call if the normal terminating-call completion time (of a second or less) is extended somewhat when a chance coincidence requires it. With calls outgoing to another dial exchange, however, the normal outgoing-call completion time (of about one-tenth of a second) must not be materially exceeded, for (1) the calling subscriber will ordinarily continue to dial without pause, and (2) the impulses of the next digit, and of all succeeding digits of the called number, must be repeated over the outgoing trunk as they are dialed. Therefore, any such outgoing call is given preference over terminating calls, to the end that it will be extended to an idle trunk in the outgoing group during the usual inter-digit interval. For this reason, the section-preference relays 1550 (Fig. 15), the block-controller switch 1500 and the block controller 1600 are arranged to interrupt operations and progress relating to a terminating call immediately upon being seized by an outgoing call, unless the operations relating to the terminating call are just being concluded. This has been described hereinbefore as it relates to the apparatus of Fig. 15.

For the sake of uniformity and circuit simplification, all outgoing calls (whether to a dial exchange or to a manual exchange) are treated as calls outgoing to a dial exchange, and are therefore given preference over terminating calls as noted.

IXB. *Functional relay groups*

The relays of block controller 1600 (Fig. 16) and of outgoing controller 1700 (Fig. 17) are divided into separate functional groups as follows:

IXB1. *Functional relay groups of block controller 1600*

The relays 16A1 to 16E30 of block controller 1600 comprise functional groups 1 to 13 as follows:

1. 16A1 to 16A5, line-test group ........ Ter.
2. 16A6 to 16A14, terminating-control group .. Ter.
3. 16A15, 16A17 to 16A20, outgoing-control group ........ Otg.
4. 16D1 to 16D3, 16E1 to 16E10, choice allotter ........ Ter., Otg.
5. 16B1, 16C1, 16C2, call-in pulser ........ Ter.
6. 16B2 to 16B6, call-in allotter ........ Ter.
7. 16B7 to 16B10, call-in totalizer ........ Ter.
8. 16B11 to 16B30, terminating-trunk call-in group ........ Ter.
   a. 16B11 to 16B15, line-link frame A.
   b. 16B16 to 16B20, line-link frame B.
   c. 16B21 to 16B25, line-link frame C.
   d. 16B26 to 16B30, line-link frame D.
9. Odd-numbered relays 16C11 to 16C29, terminating-trunk test group ........ Ter.
10. 16C3 to 16C10, line-link call-in group ........ Ter.
    a. 16C3 to 16C6, frames A to D.
    b. 16C7 to 16C10, call-ins 1 to 4.
11. 16D9, 16E7, 16D10, match-pilot group ........ Ter., Otg.
12. 16D11 to 16D30, block-link test ........ Ter., Otg.
13. 16E11 to 16E30, matching relays ........ Ter., Otg.

NOTE.—(Ter.) signifies use in terminating calls; (Otg.) signifies use in outgoing calls.

IXB2. *Functional relay groups of outgoing controller 1700*

The relays (17A1 to 17B30) of outgoing controller 1700 comprise functional relay groups 1 to 3 as follows:

1. 17A1 to 17D10, outgoing-trunk relays, associated respectively with the forty outgoing-trunk terminations on the ten secondary switches 1400 as shown:
   (1) 17A1 to 17D1, verticals V17 to V20 of switch 1.
   (2) 17A2 to 17D2, verticals V17 to V20 of switch 2.
   (3) 17A3 to 17D3, verticals V17 to V20 of switch 3.
   (4) 17A4 to 17D4, verticals V17 to V20 of switch 4.
   (5) 17A5 to 17D5, verticals V17 to V20 of switch 5.
   (6) 17A6 to 17D6, verticals V17 to V20 of switch 6.
   (7) 17A7 to 17D7, verticals V17 to V20 of switch 7.
   (8) 17A8 to 17D8, verticals V17 to V20 of switch 8.
   (9) 17A9 to 17D9, verticals V17 to V20 of switch 9.
   (10) 17A10 to 17D10, verticals V17 to V20 of switch 10.
2. 17B12 to 17B20, initial-digit relays, controlled respectively over the initial-digit wires ID2 to ID10.
3. 17B26 to 17B30, connect relays for assigned trunk groups 7 to 0.

IXC. *Outgoing-call operation*

An outgoing-call operation covers the operations involved in guiding an outgoing-call connection across the block-link frame of Figs. 2, 3, 5 and 6 to an idle trunk 2020 in a called outgoing group, as distinct from terminating-call operation, wherein the call terminates at a local called line. As previously noted, the items of common apparatus employed in an outgoing-call operation are:

1. Section-preference relays 1550 (Fig. 15);
2. Block-controller switch 1500 (Fig. 15);
3. Outgoing controller 1700 (Fig. 17); and
4. Block controller 1600 (Fig. 16).

The block translator 1800 (Fig. 18) is not employed in an outgoing-call operation.

IXC1. *General*

As described hereinbefore, an outgoing call is made by dialing the initial digit assigned to the desired outgoing group, only eight of the ten possible initial digit values, however, can be used to index trunk groups. The initial digit 1, when dialed, is absorbed in the block coupler 500 as hreinbefore described and one of the remaining initial-digit values is employed to index the local 1000-line block of numbers.

In the specific form of outgoing controller 1700 illustrated in Fig. 17, initial digit 6 is employed to index the local 1000-line block of numbers; initial digits 2 to 5 are unassigned; and initial digits 7 to 0 are assigned to respective groups of outgoing trunks. Two of the four outgoing groups may be those from exchange B to respective exchanges A and C (Fig. 1), while the remaining two outgoing groups of trunks may extend to operator switchboards (not shown).

IXC2. *Seizure of block controller 1600 and associated common equipment*

When the initial digit dialed and registered in any block coupler 500 as hereinbefore described has any value from 7 to 0, the operation of the block coupler at the end of the dialing of such initial digit closes a circuit over the associated section of the outgoing chain which includes four relays in series as follows:

1. From ground as hereinbefore traced through one of the main outgoing-chain relays 15C11 to 15C20 (Fig. 15) which corresponds to the section in which the calling block coupler 500 is located, the associated section wire OTG-CH-IN;

2. Thence as hereinbefore traced through the outgoing-chain relay 511 (Fig. 5) in the calling block coupler, the one of the initial-digit wires ID7 to ID10 which corresponds to the initial digit dialed;

3. The corresponding initial-digit relay 17B17 to 17B20 in the outgoing controller 1700, wire OTG-ST; and 4. Through outgoing-start relay 16A17 of the block controller 1600, to battery.

The operation of the outgoing-chain relay 511 in the calling block coupler 500 acts to guard the associated section branch of the outgoing chain from seizure by another block coupler therein, and connects the seizing block coupler with the associated outgoing wires OTG of the block controller as described;

The operation of the main outgoing-chain relay 15C11 to 15C20 in the section-preference relays 1550 guards the outgoing chain from seizure at any other block-coupler section, and acts to position the block-controller switch according to the block-link primary switch serving the block-coupler section at which the call originated;

The operation of the initial-digit relay 17B17 to 17B20 in the outgoing controller 1700 acts to set the outgoing controller (as hereinafter described) in accordance with the called group of outgoing trunks; and The operation of outgoing-start relay 16A17 in block controller 1600 starts the block controller into its hereinafter-described sequence of operations necessary to establish connection with an idle trunk in the called outgoing group.

IXC3. *Setting outgoing controller 1700*

If, for example, the dialed initial digit is a 7, relay 17B17 is the initial-digit relay operated in outgoing controller 1700, over initial-digit wire ID7. Relay 17B17 thereupon operates connect relay 17B26, which closes each of its fourteen contact pairs 1 to 14. The fourteen contact pairs of relay 17B26 enable it to control up to fourteen trunks in outgoing-trunk group 7. These trunks are assigned as desired among the forty outgoing-trunk terminations, which are represented respectively by verticals V17 to V20 of the ten block-link secondary switches 1400 as hereinbefore explained. Each of these verticals is in turn represented by the corresponding one of the forty relays 17A1 to 17D10 in the outgoing controller.

Forty terminal pairs 1701 to 1740 are associated respectively with relays 17A1 to 17D10, as shown. Two-wire jumpers such as 1741 are extended from any desired ones of the contact pairs 1 to 14 of connect relay 17B26 respectively to such of the terminal pairs 1701 to 1740 as represent outgoing-trunk terminations in group 7. One such termination may be that of outgoing trunk 2020, Figs. 2 and 7.

Upon the noted operation of connect relay 17B26, each outgoing-trunk relay which is jumper connected with respective contact pairs thereof operates subject to the associated outgoing trunk 2020 being idle. For example, if the trunk 2020 associated with outgoing-trunk relay 17D10 is idle when connect relay 17B26 operates, relay 17D10 operates over the following circuit. From battery on the sleeve wire S of the outgoing trunk (normally maintained thereon by the trunk coupler to which it extends, such as 2001, Figs. 2, 7, and 20), associated normally closed make-busy contacts MB of Figs. 6 and 14, the left-hand winding of the associated hold magnet (HM609 of Fig. 6, HM20 of Fig. 14), the connected match-test wire MT (MT-227 of Fig. 6, MT-20 of Fig. 14, 10MT20 of Fig. 17), wire MT of the two-wire jumper 1741, contacts 14 of relay 17B26, wire TR of the jumper 1741, and through the high-resistance winding of trunk relay 17D10 to ground. Relay 17D10 operates in the circuit just traced, but the high-resistance of its winding holds the current through the winding of the associated secondary hold magnet below operate value.

When the above-noted trunk 2020 associated with outgoing trunk relay 17D10 is busy, the idle-indicating battery normally on the sleeve wire S of the trunk is replaced by holding ground. Relay 17D10 then remains unoperated for lack of operating current.

When the associated trunk is idle, the noted operation of relay 17D10 performs two circuit changes. Contacts 2 of relay 17D10 disconnect the associated ground-in wire G-IN-10 from ground-out wire G-OUT-10 and transfers it to matching-ground wire MG-10, as an indication to the block-controller apparatus that an idle trunk in the called group is served by the tenth secondary switch 1400 on the block-link frame. Contacts 1 of relay 17D10 disconnect operate wire OP-10 from the break-contact chain circuit through the break contacts 1 of the succeeding associated relays, and transfers it to the junction of the winding of relay 17D10 and the associated wire TR, preparatory to operating the associated secondary hold magnet if the associated outgoing trunk 2020 is the one included in the path about to be matched.

For each currently idle outgoing trunk 2020 in the called group, the associated one of the relays 17A1 to 17D10 operates as described for relay 17D10.

IXC4. *Starting the block controller for outgoing operation*

In block controller 1600 the described operation of outgoing-start relay 16A17 (over wire OTG-ST, and through contacts 3 of busy relays 16A18 and 16A19) closes a circuit for outgoing-start auxiliary relay 16A15. Relay 16A15 thereupon operates to start the sequence of operations necessary to extend the connection to an idle outgoing trunk in the called group.

Break contact 2 of relay 16A15 disconnects ground from the circuit of terminating-start auxiliary relay 16A7 to prevent that relay from operating later, or to restore it if it is operated.

Make contact 4 of relay 16A15 closes a circuit through break contact 5 of relay 16A7 for operating transfer relay 16A20 over wire 5 of group 1601, in series with match-complete relay 16E7. At its make contacts 1 and 2, transfer relay 16A20 prepares circuits for operating a primary hold magnet and a secondary hold magnet on the block-link frame, and at its make contacts 3, it extends the outgoing-matching-ground wire OTG-MG (incoming from the section-preference relays) to the associated layer of contacts on the associated choice allotter (relays 16D1 to 16D3 and 16E1 to 16E10).

IXC5. *Setting the block-link test relays*

On being positioned as hereinbefore described block-controller switch 1500 conditions the sleeve wires of the twenty block links 206 (ten pairs) serving the connected primary switch, by connecting resistance battery to each. At the same time, it connects those sleeve wires respectively to the windings of block-link test relays 16D11 to 16D30, over the twenty sleeve wires SL-1 to SU-10. Any block-link test relay 16D11 to 16D30 accordingly thereupon operates from the noted resistance battery, subject to the associated link being idle. If any one of the concerned twenty block links 206 is in use, ground on the sleeve wire S thereof short-circuits the corresponding block-link test relay.

IXC6. *Outgoing matching*

On an outgoing call, there are two requirements for matching over a possible path: (1) the block link 206 in the path must be idle, and (2) the outgoing trunk 2020 in the path must lie in the called group, and must be idle.

When the block-controller switch 1500 is completely set on the primary switch serving the connected block coupler, it grounds its wire OTG-MG as described. With transfer relay 16A20 operated as described matching ground is thereby extended over wire 1617 to the associated contact portion of the choice allotter (Fig. 16, part 3). With the choice allotter in its illustrated position 1 (relay 16E1 operated and all other relays thereof restored), first choice stands on the first secondary switch 1400. Accordingly, the ground on wires OTG-MG and 1617 is extended, through break contact 3 of relay 16D2 and make contact 3 of relay 16E1, and over wire 1 in group 1602, to point 1 in the endless chain of break contacts 3 on the twenty block-link test relays 16D11 to 16D30. This endless chain constitutes the main portion of the outgoing matching chain circuit used for outgoing calls. This chain has ten normally open branches 1 to 10 extending to the outgoing controller 1700.

Each branch includes a ground-in wire G-IN and a ground-out wire G-OUT, and has a matching-ground wire MG associated therewith.

The ten noted branches correspond respectively to the ten secondary switches 1400. Since, from any primary switch 1300, two block links 206 extend to each secondary switch 1400, the ten branches 1 to 10 of the outgoing matching chain are controlled by respective pairs of the block-link test relays 16D11 to 16D30.

In the outgoing controller 1700, if all forty of the relays of Fig. 17, part 1 were illustrated, they would comprise ten rows of four relays each. Each such row, shown vertically on the drawing, relates to a separate one of the ten block-link secondary switches 1400, as previously described.

By way of example, if both block links extending from the connected primary switch 1300 to the first secondary switch 1400 are idle, block-link test relays 16D11 and 16D12 are both operated. Consequently, the noted ground on wire 1 of group 1602 is disconnected from the succeeding portion of the chain and is transferred to ground-wire G-IN-1, extending to the outgoing controller.

In the outgoing controller 1700, if any one of the four trunks 2020 served by the first block-link secondary switch 1400 is assigned to the currently called group 7, and if it is idle, the corresponding one of trunk relays 17A1 to 17D1 has been operated as previously described for relay 17D10.

The endless matching chain consequently stands broken at this point, as it has been transferred to matching ground wire MG1. Ground on wire G-IN-1 now reaches wire MG-1 (through make contact 2 of one of the relays 17A1 to 17D1) as an indication that a match exists through the first secondary switch 1400.

On the other hand, if no idle trunk in the called group extends from the first secondary switch 1400, trunk relays 17A1 to 17D1 are all restored. Then, the ground on wire G-IN-1 is extended through break contacts 2 of these relays to the ground-out wire G-OUT-1, which goes back to the block controller and enters the main endless outgoing chain at the second point. The effect at the chain is the same as though neither of the link relays 16D11 and 16D12 had operated.

When no match occurs at the first secondary switch, matching occurs over an outgoing trunk 2020 extending from the second secondary switch if one or another of the link relays 16D13 and 16D14 is operated, and if one or another of the trunk relays 17A2 to 17D2 in the outgoing controller is operated. Otherwise, the main outgoing-chain ground extends uninterruptedly to the circuit parts associated with the third block-link switch, and so on to the tenth.

Assume that matching cannot occur through any one of the first nine secondary switches 1400, and that it occurs through the tenth secondary switch. Then if the trunk connected to vertical V20 of the tenth secondary switch is assigned to the called group and is idle, as previously assumed, the matched path includes that trunk, for relay 17D10 of the outgoing controller 1700 stands operated over its previously traced circuit. In this event, if relay 16D29 is operated, the complete outgoing matching circuit is as follows: From ground on the outgoing-matching-ground wire OTG-MG incoming to the block controller 1600 from the block-controller switch 1500, contacts 3 of relay 16A20, wire 1617, break contact 3 of driver relay 16D2 of the choice allotter, make contact 3 of allotting relay 16E1, the associated wire 1 in group 1602, break contacts 3 of relay 16D11 and 16D12 (or a make contact 3 of one or another of these relays and break contacts 2 of relays 17A1 to 17D1 of the outgoing controller) to armature spring 3 of relay 16D13 associated with the second secondary switch, similarly through the portion of the outgoing chain associated with the second to ninth secondary switches, to armature spring 3 of relay 16D29 associated with the tenth secondary switch 1400, make contact 3 of the operated link-test relay 16D29, the associated ground-in wire G-IN-10 extending to the outgoing controller 1700, make contact 2 of relay 17D10, matching-ground wire MG-10, make contact 1 of block-link test relay 16D29, the upper winding of matching relay 16E29, and through match-pilot relay 16D10 to battery. Relays 16E29 and 16D10 operate in series over this circuit.

IXC7. *Primary and secondary select-magnet operation*

At its contacts 6, matching relay 16E29 (which corresponds directly to block-link test relay 16D29) prepares a hereinafter-traced operate circuit for the secondary hold magnet associated with the matched outgoing trunk 2020, and at its contacts 1 (in series with closed contacts 1 of relay 16E7) grounds the associated tenth select-magnet wire SM–10 extending from the block controller to the block-controller switch 1500. Grounding this wire closes a circuit for the tenth principal select magnet SM10 on the connected primary switch 1300, which controls the selection of the tenth link pair, including the matched block link 206, the nineteenth. As previously described, this select magnet is operated in series with the secondary select magnet which controls selection of the same pair of block links at the secondary switch (the tenth) to which the concerned pair of links extends. For example, the tenth principal select magnet on the first primary switch is in series with the first principal select magnet of the tenth secondary switch. Operation of the two concerned principal select magnets effects mechanical selection of the pair of links including the matched one.

Since matching relay 16E29 is the first relay of the pair, it represents the upper block link in the matched pair. At its contacts 2, relay 16E29 connects conductor SMU–10 (representative of the extension select magnet SMU of the tenth secondary switch), through contacts 3 of the operated match-complete relay 16E7, to conductor SMU between the block controller and the block-controller switch 1500. Conductor SMU now extends to ground through select magnet SMU of the connected primary switch 1300, while conductor SMU–10 extends to battery through select magnet SMU of the tenth secondary switch. These two extension-select magnets are accordingly operated in series to select the upper link 206 of the selected pair.

IXC8. *Series off-normal ground*

In the connected block-link primary switch 1300, the operation of the noted principal select magnet SM and extension select magnet SMU closes series-connected off-normal contacts 1307 and 1307′ to extend off-normal ground over the associated wire PON to the secondary switches 1400. In the tenth secondary switch 1400 (through which matching has occurred) operation of the noted principal select magnet SM and extension-select magnet SMU closes series-connected off-normal contacts 1407 and 1407′ to extend the noted off-normal ground potential to secondary off-normal conductor SON extending from the secondary switches to the block controller.

IXC9. *Primary and secondary hold-magnet operation*

The placing of ground on secondary off-normal wire SON incoming to the block controller 1600 closes two circuits in parallel through respective make contacts of the operated transfer relay 16A20. One circuit is through contacts 1 of relay 16A20, over the outgoing switching conductor OTG-SW, to the concerned primary hold magnet such as HM2–602 (Fig. 6), by way of the connected block coupler such as 500–L (Fig. 5). The other circuit is as follows: From ground through a make contact 2 of transfer relay 16A20, conductor 6 of group 1601, make contact 6 of the operated matching relay 16E29, operate wire OP–10 extending to the outgoing controller 1700, and through make contact 1 of the operated outgoing-trunk relay 17D10 to the junction of the winding of relay 17D10 and the associated wire TR. The extension of ground to this point short-circuits the winding of relay 17D10, thereby increasing the previously existing test current through the winding of the associated secondary hold magnet HM20 of the tenth secondary switch 1400 to operate value. Although short-circuited, relay 17D10 remains operated as a slow-restoring relay for an interval sufficient for the purpose.

The operation of the noted secondary hold magnet results in the connection of the tip, ring, and sleeve conductors of the matched outgoing trunk respectively to the tip, ring, and sleeve conductors of the secondary end of the matched block link, which has been selected mechanically by the described secondary select-magnet operation.

At the same time, the noted operation (over outgoing switching conductor OTG-SW) of the primary hold magnet associated with the connected block coupler connects the outgoing tip, ring, and sleeve conductors of the block coupler respectively with the tip, ring, and sleeve conductors of the primary end of the matched block link, completing their extension to the tip, ring, and sleeve conductors of the matched outgoing trunk 2020.

IXC10. *Switching through*

The hold-pilot contacts of the primary hold magnet operate the switch-through relay 501 of the connected block coupler, connecting the incoming tip, ring, and sleeve conductors thereof metallically with the outgoing ones, and disconnecting the line-relay bridge as hereinbefore described. Holding ground is thereby extended forward momentarily over the sleeve conductor by the block coupler to hold the block-link primary and secondary hold magnets of the established connection. The switching-through operation of the block coupler seizes the outgoing trunk 2020 and associated trunk coupler, causing holding ground to be placed on the sleeve of the extended connection (as previously described) by the trunk coupler before it is removed at the block coupler.

IXC11. *Clearing out*

The noted operation of the switch-through relay 501 of the connected block coupler opens the outgoing chain circuit thereat, restoring the following four relays previously held operated thereover:

1. The outgoing-chain relay 511 in the concerned block coupler 500;
2. The operated outgoing-chain relay (15C11 to 15C20) in section-preference relay 1550;
3. The operated initial-digit relay 17B17 in the outgoing controller 1700; and
4. Outgoing-start relay 16A17 in block controller 1600.

The restoration of the outgoing-chain relay in the block coupler disassociates that block coupler from the common apparatus as described.

The section-preference relays 1550 and associated block-controller switch 1500 clear out as described responsive to the noted restoration of the outgoing-chain relay therein, open-circuiting and restoring the previously operated primary and secondary select magnets on the block-link frame, and disconnecting and restoring block-link test relays 16D11 to 16D30 of the block controller.

The restoration of initial-digit relay 17B17 in the outgoing controller permits the associated connect relay 17B26 to restore, restoring the ones of outgoing-trunk relays 17A1 to 17D10 which were operated through the contacts thereof.

In block controller 1600 the restoration of outgoing-start relay 16A17 permits outgoing-start auxiliary relay 16A15 to restore to return the block controller to its illustrated normal condition. This includes open-circuiting and restoring transfer relays 16A20 and match-pilot relay 16D10 (Fig. 16, part 7). The operated matching relay (such as 16E29) is thereby restored.

IXC12. *Outgoing-call progress timing*

Since all calls through the block-link frame are handled through the block controller and related common equipment on a one-at-a-time basis, if the progress of outgoing-call operations in the block controller is halted or materially delayed, the block controller must be cleared promptly to free it to handle other outgoing calls. So-called busy relays 16A18 and 16A19 in the outgoing-control group of the block controller are employed successively to time the progress of outgoing-call operations. Relay 16A18 limits the time allowed between outgoing seizure of the block controller and the completion of matching. Relay 16A19 limits the time allowed between outgoing matching and switch-through. Each of the busy relays 16A18 and 16A19 is slow-operating because of a comparatively high-impedance winding and a comparatively strong restoring-spring adjustment.

IXC12*a*. *All outgoing paths busy*

When relays 16A17 and 16A15 operate as described upon the seizure of the block controller for outgoing-call operation, make contact 2 of auxiliary relay 16A15 extends ground through contacts 2 of relay 16A7 to wire 1 of group 1601, grounding wire 2 of the group through break contact 1 of match-pilot relay 16D10. Ground on this wire, completes a circuit for the first busy relay 16A18.

If all possible matching paths to trunks in the called group are busy, matching does not occur. Therefore, match-pilot relay 16D10 remains restored until the end of the delay time of busy relay 16A18 is reached. At this point relay 16A18 operates.

At its preliminary make contacts 1, relay 16A18 grounds the outgoing-busy wire OTG-BU, thereby operating the busy relay 510 (Fig. 5) in the connected block coupler 500 to return an outgoing-busy-tone signal and to initiate the clearing-out operation of the common equipment as described.

At make contact 2, relay 16A18 locks itself to ground on conductor 1 of group 1601, and at contact 3, it disconnects outgoing-start relay 16A17 to initiate the clearing out operation of the common equipment irrespective of the noted operations in the connected block coupler. Relay 16A18 is restored by the opening of make contact 2 of outgoing-start auxiliary relay 16A15 in the ordinary course of the clearing-out operation of the block controller.

The described operation of busy relay 16A18 occurs responsive to the matching operation being delayed for any reason, such as a circuit failure in the outgoing controller 1700, in the section-preference relays 1550, in the block-controller switch 1500, or in the block controller 1600.

IXC12*b*. *Post-match progress timing*

When match-pilot relay 16D10 operates as described responsive to the occurrence of the matching operation, it disconnects operating ground from the first busy relay 16A18 and transfers it to wire 3 in group 1601, connected to the second busy relay 16A19. The pre-match phase of progress timing is thereby ended, and the post-match phase is started.

If the block controller has not caused the matched path to be seized, or if for any reason has not cleared out by the time the post-match delay period has run, the second progress-timing relay 16A19 operates. At its contacts 1, 2, and 3 it performs operations as described for relay 16A18, causing a busy signal to be transmitted to the calling line, and causing the common equipment to be returned to common use.

IXC13. *Calls to unassigned trunk groups*

The dialing of an unassigned initial digit (any initial digit 2, 3, 4, or 5 when outgoing controller 1700 is wired and equipped as shown in Fig. 17) is termed a call to an unassigned trunk group. When, for example, initial digit 2 is dialed, initial digit relay 17B12 is operated over the associated initial-digit wire ID2 and wire OTG-ST as described for relay 17B17. Relay 17B12, however, has no connect relay (such as 17B26) associated therewith, wherefore its operation is without effect. Therefore, no one of the outgoing-trunk relays 17A1 to 17D10 is operated. Block controller 1600 is, therefore, unable to close a matching circuit for any matching relay 16E1 to 16E30. Accordingly, block controller treats the call as though all trunks in the called group are busy. Busy relay 16A18 is operated as described under "Outgoing-Call Progress Timing" to cause the connected block coupler 500 to return an outgoing-busy signal and to initiate the clearing out of the common apparatus.

IXD. *Terminating-call operation*

As previously noted terminating-call operation covers the operations involved in guiding a terminating connection across the block-link frame, over an idle terminating trunk 207, and across the called line-link frame, to the called line, as distinct from outgoing-call operation wherein the call terminates at an idle trunk in a called outgoing group. The items of common apparatus employed in the block-link frame in a terminating-call operation are:

1. Section-preference relays 1550 (Fig. 15);
2. Block-controller switch 1500 (Fig. 15);
3. Block translator 1800 (Fig. 18); and
4. Block controller 1600 (Fig. 16).

The outgoing controller 1700 (Fig. 17) is not employed in a terminating-call operation.

IXD1. *General*

As described hereinbefore, a terminating call is made by dialing the initial digit assigned to the local 1000-line block of line numbers, followed by the dialing of the hundreds, tens, units, and stations digits in the number. While any desired initial digit from 2 to 0 can be employed to index the local 1000-line block of numbers, in the outgoing controller 1700 as shown in Fig. 17, the initial digit 6 is used to index the 1000-line block of local numbers. Accordingly, relay 17B16 associated with the initial-digit wire ID6 is disconnected from the outgoing-start wire OTG-ST to render the dialing of the local initial digit 6 in any block coupler 500 ineffective to call in the common apparatus.

IXD2. *Seizure of block controller and associated common equipment*

When the assigned directory number has been completely dialed (digits ID, H, T, U, and ST), the operation of the calling block coupler 500 at the end of the dialing of the station digit closes a circuit over the associated section of the terminating chain which includes three relays in series as follows:

1. From ground as hereinbefore traced through the one of the main-terminating-chain relays 15C21 to 15C30 (Fig. 15) which corresponds to the section in which the calling block coupler is located, the associated one of wires TER-CH-IN.

2. Thence, as traced, through the terminating-chain relay 512 (Fig. 5) in the calling block coupler, and 3. Thence, as traced, over wire TER-ST to battery through contacts 2 of relay 16A13 of the block controller 1600 and terminating-start relay 16A6.

The operation of the terminating-chain relay 512 in the calling block coupler acts as described to guard the associated section branch of the terminating chain from seizure by another block coupler, and connects the calling block coupler with the "terminating" wires of the block controller, at the same time grounding the selected hundreds, tens, units, and stations digit wires multipled between the block couplers and extending to the block translator.

The operation of the main-terminating-chain relay in the section-preference relays guards the main terminating chain (15C21 to 15C30) from seizure at any other block-coupler section, and acts as described to position the block-controller switch 1500 according to the block-link primary switch 1300 serving the block-coupler section at which the call originated.

The operation of terminating-start relay 16A6 in block controller 1600 starts the block controller into its hereinafter-described sequence of operations leading to the extension of the connection to the called line.

IXD3. *Starting the cycle timer*

On operating, terminating-start relay 16A6 of the block controller operates terminating-start auxiliary relay 16A7 through back contact 2 of relay 16A15. Relay 16A7 adapts the block controller for terminating-call operation by opening certain circuit points and by preparing certain circuits to be subsequently closed. It also starts the cycle timer (relays 16A8 to 16A11) into operation by extending ground at its contacts 4 through normally closed contacts 3 of relay 16A11 to the winding of relay 16A8. Relays 16A8 to 16A11 now operate in rapid succession, each of the relays 16A8 to 16A10 operating the next succeeding relay. When relay 16A11 operates, its contacts 3 lock its own winding and those of relays 16A8 to 16A10 directly to ground at the contacts 4 of relay 16A7, opening the initial operating circuit of the relays in preparation for the restoration of relays 16A8 to 16A10 in a timed sequence.

Contacts 2 of relay 16A11 apply short-circuiting ground potential to the junction of the winding of relay 16A8 and the associated battery-supply resistor, causing that relay to restore after a predetermined interval, followed by the successive restoration of relays 16A9, 16A9', and 16A10 at the end of like intervals.

It may be noted that the cycle timer (relays 16A8 to 16A11) of the block controller is similar in purpose and function to the cycle timer (relays 12B11 to 12B15) of the line controller 1200, hereinbefore described.

Normally, the block controller completes its terminating-call operations and clears out before its cycle timer has run down.

IXD4. *Setting the block-link test relays*

Block-controller switch 1500, as hereinbefore described, closes test circuits over wires SU1 to SL10 for block-link test relays 16D11 to 16D30 respectively. Each such block-link test relay thereupon operates subject to the corresponding block link being idle in the group of twenty serving the connected primary switch.

The block controller now awaits terminating-frame information which is received indirectly from the block translator 1800.

IXD5. *Translating the called number*

Responsive to the noted grounding (by the connected block coupler) of the digit wires corresponding to the dialed hundreds, tens, and units digits, block translator 1800 determines from these dialed digits which of the four 250-line line-link frames A, B, C, and D serves the called line, and transmits translated digit information thereto indicating the primary switch 600 serving the called line, the concerned fives group of lines thereon, and the units identity of the called line within the group of five.

IXD6. *Setting the line-controller apparatus*

The line-controller apparatus (the line controller 1200 and the two associated line-controller switches 1000 and 1100) responds as described to the translated digit information, by grounding its associated terminating-frame wire TF (one of the wires TFA to TFD (Fig. 16, part 5) at the block controller 1600); it selects the called line and the primary switch serving it, and, for each idle line link serving the selected primary switch, it connects battery through the corresponding select-magnet wire to the corresponding one of the ten link wires LK. These are wires LK1 to LK10 for each line-link frame A to D as they appear at the block controller, Fig. 16, part 6.

Incidental to its foregoing operations, the line-controller apparatus on the called line-link frame connects its called-line-sleeve wire CLS (extending between it and the block controller) to the sleeve conductor of the called line, and grounds the associated test-start wire TS as a signal to the block controller that the testing of the called line may begin.

IXD7. *Setting the block controller according to the called line-link frame*

The noted grounding of the terminating-frame wire TF by the line-controller apparatus sets block controller 1600 according to the line-link frame at which the called line terminates. For example, if the call is to line-link frame A, wire TFA in the frame-A group of wires (TFA to ONA, Fig. 16, part 5) is the one grounded. Ground on this wire operates frame-A connecting relay 16B11 in the terminating-trunk call-in group in parallel with relay 16C3 in the line-link call-in group. Relay 16B11 connects output wires 1621 to 1624 of the call-in allotter (Fig. 16, part 4) respectively to terminating-trunk call-in relays 16B12 to 16B15, corresponding to the four call-in groups of terminating trunks serving the called line-link frame A, and also connects frame-A wires TSA, CLSA, and ONA to the corresponding wires TS, CLS, and ON of the block controller. Relay 16C3 connects link wires LK1 to LK10 of the called line-link frame A respectively to the ten corresponding local wires 1630 in the block controller which extend to successively operable call-in relays 16C7 to 16C10.

IXD8. *Testing the called line*

When the line-controller apparatus on line-link frame A (called as assumed) connects the associated called-line-sleeve wire CLSA to the sleeve of the called line as hereinbefore described and grounds the associated test-start wire TSA, a circuit is closed from ground on wire TSA, contacts of the operated relay 16B11, wire TS in the block controller, contacts 7 of relay 16A7, and break contact 4 of relay 16A2 to battery through the lower winding of busy relay 16A3 in the line-test group of the block controller. Relay 16A3 is rendered slow operating by having a relatively strong restoring-spring adjustment, and by having its upper (armature-end) winding short-circuited through its break contact 3, to provide a retarding shading effect.

IXD8a. *Called line tests idle*

When the called line is idle, the ground-connected test relay 16A1 operates (through contacts 2 of relay 16A4 and over wires CLS and CLSA) in series with the primary hold magnet (such as HM–703, Fig. 7) connected to the sleeve of the called line, but the resistance of the winding of relay 16A1 is sufficiently high that the hold magnet does not operate in series therewith. Relay 16A1 thereupon operates idle relay 16A2 before the retarded busy relay 16A3 has had time to operate. Idle relay 16A2 disconnects busy relay 16A3 at its break contact 4 and locks to the grounded conductor TS at its make contact 4.

IXD9. *Match-start*

Contacts 5 of idle relay 16A2 operate match-start relay 16A5 through make contact 5 of relay 16A7 and break contact 5 of relay 16A3. Relay 16A5 starts the matching operation by grounding match-start wire 1610 at its contacts 2, and by grounding match-cut-through wire 1611 at its contacts 3, through break contacts 5 of outgoing-start auxiliary relay 16A15. Ground on wire 1611 passes through contacts 3 of match-pilot relay 16D10 to match-cut through relay 16D9 which operates in preparation for matching.

Ground on match-start wire 1610 starts the call-in pulser (relays 16B1, 16C1, and 16C2) into operation to control the step-by-step advance of the associated call-in allotter during matching, if such advance is required.

IXD10. *First call-in of terminating trunks*

The call-in allotter (relays 16B2 to 16B6) is a four-position counting chain so arranged that one or another of the counting relays 16B3 to 16B6 is in operated condition at any time. If the call-in allotter is in its illustrated first position (relay 16B3 operated and all other relays thereof restored), ground on match-start wire 1610 reaches the first call-in wire 1621 through break contact 2 of driver relay 16B2 and make contact 3 of the operated counting relay 16B3. Ground on the call-in wire 1621 now operates the first call-in totalizer relay 16B7, which locks to match-start wire 1610. Ground on call-in wire 1621 also operates line-link call-in relay 16C7 to connect the local link wires 1630 to the wires in groups 1605 and 1606 in specific correspondence to the first call-in group of terminating trunks.

Ground on the first call-in wire 1621 also closes a circuit through a make contact of the operated frame-A relay 16B11 for the first terminating-trunk call-in relay 16B12 associated with the called line-link frame A. Relay 16B12 connects the match-test wires MT1 to MT10 of the terminating trunks of the first call-in group of line-trunk frame A respectively to the ten odd-numbered terminating-trunk test relays 16C11 to 16C29. Any such relay 16C11 to 16C29 now operates subject to the connected terminating-trunk being idle, in which case it has an idle-indicating battery potential on the match-test wire MT thereof. As described for Fig. 14, and as described in connection with Figs. 4 to 7 for the match-test wire MT–226 of Fig. 6, the match-test wire MT of a terminating trunk 207 is an extension of the sleeve conductor S thereof, and battery potential normally stands thereon through the two associated secondary hold magnets, such as 610 on the block-link frame and 706 on the line-link frame (Figs. 6 and 7). But, when a terminating trunk 207 is busy, holding ground is on its sleeve conductor and the attached MT conductor, to prevent the concerned ground-connected trunk-test relay 16C11 to 16C29 from operating thereover.

It will be recalled that the terminating trunks of any call-in group comprise ten trunks extending from respective secondary sections on the called line-link frame.

As more fully described hereinafter, matching may now occur to select a path over any one of the terminating trunks in call-in group 1 of line-link frame A, (1) subject to such terminating trunk 207 being idle, (2) subject to a block-link 206 of the pair over which it is reached being idle, and (3) subject to the line link being idle over which the terminating trunk must be extended to the called line. As will be described, when matching occurs, match-complete relay 16E7 is operated to open the operate circuit of relay 16C2 of the call-in pulser to temporarily prevent the call-in allotter from advancing to the next call-in of terminating trunks.

IXD11. *Succeeding call-ins*

If no match occurs upon the first call-in of terminating trunks, match-complete relay 16E7 fails to operate, permitting the call-in pulser (Fig. 16, part 4) to advance the call-in allotter by operating the next succeeding counting relay 16B4 and restoring the previously operated one, relay 16B3. This results in the transfer of ground from the first call-in wire 1621 to the second call-in wire 1622. The operated pair of call-in relays, 16C7 and 16B12 are thereby restored and the next succeeding pair, 16C8 and 16B13, operate. The next succeeding relay (16B8) in the call-in totalizer now operates and locks. The match-test wires MT11 to MT20 of the second call-in group of terminating trunks 207 of frame A are thus substituted for the match-test wires MT1 to MT10 of the initial call-in group, and by the operation of relay 16C8 in place of relay 16C7, the link wires LK of the called line-link frame A are presented in the correct order of slip for the second call-in group of frame-A terminating trunks 207.

If no match results on the second call-in of terminating trunks, the call-in allotter is again advanced by the call-in pulser, causing the operated pair of call-in relays (16B13 and 16C8) to restore and the next succeeding pair (16B14 and 16C9) to operate over wire 1623, along with the operation and locking of the third totalizer relay 16B9.

If no match results on the third call-in of terminating trunks, the third pair of call-in relays (16B14 and 16C9) is restored and the fourth pair (16B15 and 16C10) is operated over wire 1624 to call in the fourth and final group of terminating trunks of line-link frame A for test, and the fourth call-in totalizer relay 16B10 operates and locks.

IXD11a. *All terminating paths busy*

If no match results on the fourth call-in of terminating trunks, the next succeeding operation of relay 16C2 of the call-in pulser closes a series circuit through contacts 1 of the locked call-in totalizer relays 16B7 to 16B10 for grounding the terminating-busy wire TER-BU, which causes the connected block 500 to return a busy tone to the calling line and to relinquish the common equipment, as well as operating clear-out relay 16A13 with hereinafter-described results.

IXD12. *Terminating matching*

The essential preparations for terminating matching may be restated briefly as follows:

1. Block-link test relays 16D11 to 16D30 are connected respectively to the sleeve wires S of the block links 206 serving the connected primary switch, and any relay 16D11 to 16D30 now stands operated subject to the corresponding block link being idle.

2. On any call-in of terminating trunks, the match-test wires MT of the ten trunks 207 of the group called in by any one of the call-in relays 16B12 to 16B15 are extended respectively to the ground-connected windings of terminating-trunk test relays 16C11 to 16C29. Any such relay operates as described subject to the corresponding terminating trunk 207 of the current call-in group being idle.

3. The link wires LK1 to LK10 of the called line-link frame A are associated respectively with the line links serving the line-link primary switch 800 on which the called line is connected. For each idle one of these line links, idle-indicating battery potential is impressed on the corresponding LK wire from the corresponding select-magnet wire on the line-link frame.

Consider, for example, the described call-in 1 of terminating trunks (relays 16C3 and 16C7 energized): (1) if both block links 206 are idle in the first pair serving the connected primary switch 1300, block-link test relays 16D11 and 16D12 are operated; (2) if the first terminating trunk 207 of the first call-in group is idle, terminating-trunk test relay 16C11 is operated; and (3) if the first line-link serving the connected line-link primary switch 800 is idle, there is battery on link wire LK1 of frame A. Subject to each of the foregoing three conditions being met, the first pair of ten possible pairs of matching circuits are closed as follows:

From battery on link wire LK1 of the frame-A group (Fig. 16 part 6), through make contacts of frame-A relay 16C3, local line-link wire 1630-1, make contacts of relay 16C7, wire 1 in group 1605, make contact 1 of relay 16C11, wire 1631-1, make contacts 1 of relay 16D9, and thence over parallel branches through make contacts 2 of relays 16D11 and 16D12, to ground through the high-resistance test windings of the first pair of matching relays 16E11 and 16E12. Matching relays 16E11 and 16E12 consequently both operate.

With the choice allotter (relays 16D1 to 16D3 and 16E1 to 16E10) in its illustrated first position, locking ground through contacts 1 of relays 16A7 and 16A15, wire 1614, break contact 1 of relay 16D2, and contact 1 of relay 16E1 stands on wire 1 in preference locking group 1603 incoming to the locking chain of contacts 5 of the matching relays 16E11 to 16E30. Relay 16E11 consequently has locking preference over all other matching relays. Upon operating, relay 16E11 closes a locking circuit from ground on wire 1 in group 1603, its make contact 5, through its upper winding, to battery through the winding of match-pilot relay 16D10, at the same time disconnecting locking ground from the locking armatures of all succeeding matching relays. Consequently, the second matching relays 16E12 cannot lock operate, nor can any subsequent relay in the matching chain.

Match-pilot relay 16D10 operates in series with matching relay 16E11. Its contacts 3 open-circuit and restore match-cut-through relay 16D9. The ten matching wires 1631 extending between the make contacts of terminating-trunk test relays 16C11 to 16C29 and the contacts 2 of the block-link test relays 16D11 to 16D29 are thereby opened, open-circuiting the ground-connected test windings of all of the matching relays 16E11 to 16E30. Relay 16E11 remains operated over its noted locking circuit, but all other operated matching relays immediately restore, not having been able to lock operated with the choice allotter in its first position, and with break contact 5 open at relay 16E11.

The terminating matching operation is now complete. The locked condition of matching relay 16E11 (with all other matching relays restored) identifies the matched path as over the first (or upper) block link 206 of the first pair serving the connected block-link primary switch, and consequently over the first terminating trunk of the currently connected call-in group (the first), and over the first one of the ten line links, serving the concerned primary switch 800 on the called line-link frame A.

Contacts 11 of match-cut-through relay 16D9 extend ground on conductor 1609 through contacts 2 of relay 16D10 to close an operating circuit for match-complete relay 16E7.

Break contact 4 of match-complete relay 16E7 ungrounds wire 1612 to stop the operation of the call-in pulser by depriving the third relay 16C2 of operating ground, thereby signaling that the current call-in of terminating trunks includes one over which a matched path has been found. The call-in apparatus is thereby prevented from advancing to the next call-in of terminating trunks.

IXD13. *Primary and secondary select-magnet operation*

At its make contacts 1, 3, and 4 match-complete relay 16E7 closes three prepared select-magnet circuits, two on the block-link frame, and one on the called line-link frame, for selecting the matched block link and the matched line link.

Selection of the first pair of block links (containing the matched one) is accomplished through contacts 1 of relays 16E7 and 16E11, which ground the first principal select-magnet wire SM1 extending between the block controller and the block-controller switch 1500. Selection of the matched upper link of the pair is accomplished through contacts 3 of relay 16E7 and contacts 2 of relay 16E11, which connect wire SMU of the block-controller switch (leading to ground through the corresponding select magnet of the connected primary switch) to wire SMU-1, which lead to battery through magnet SMU of the first secondary switch 900 on the block-link frame. The primary and secondary select magnets associated with the block link in the matched path are thereby operated to select the matched block link as described for outgoing operations.

Selection of the matched line link occurs responsive to the extension of ground, through make contacts 4 of relays 16E7 and 16E11, over the associated wire 1 in group 1606, and through make contacts 1 of relay 16C7, wire 1630-1, and through contacts 1 of relay 16C3 to link wire LK1 of line-link frame A. As previously described, the primary and secondary select magnets SM on the line-link frame which are associated with the selected line link in the matched path are operated in series over this wire to effect mechanical selection thereof.

IXD14. *Block-link off-normal ground*

When the primary and secondary select magnets have operated on the block-link frame to select the matched block link, they establish the described series ground connection across the block-link frame to secondary off-normal wire SON (Fig. 16, part 5) incoming to the block controller. Ground is thereby extended, through break contact 3 of outgoing-start auxiliary relay 16A15 and through make contact 3 of terminating-start auxiliary relay 16A7, to the upper winding terminal of operate relay 16A14.

IXD15. *Line-link off-normal battery*

When the primary and secondary select magnets have operated on the called line-link frame A to select the matched line link, they extend the described series battery connection across the line-link frame, and through the line-controller apparatus, to off-normal wire ONA of frame A (Fig. 16, part 5), thereby extending battery through a make contact of frame-A relay 16B11 to local wire ON of the block controller, and thence through break contact 1 of reset relay 16A12 to the lower winding terminal of operate relay 16A14.

IXD16. *Hold-magnet operation*

Operate relay 16A14, having been supplied with a ground potential at upper winding terminal, and with a battery potential at its lower winding terminal, now operates to close three operate circuits for four hold-magnets as follows:

1. Contacts 1 of relay 16A14 ground terminating-switch wire TER-SW to operate the block-link primary hold magnet (such as 602) associated with the connected block coupler 500, over the hereinbefore traced circuit;

2. Its contacts 5 ground wire 4 in group 1601, extending ground, through make contacts 3 of relay 16E11, wire 1 of group 1604, and contacts 1 of relays 16E11 and 16E12 to the match-test conductor MT1 of the matched terminating trunk 207 to operate the associated secondary hold magnet on the block-link frame and the one on the line-link frame in parallel, as shown in Figs. 6 and 7 for magnets 610 and 706; and 3. Its contacts 7 ground the called-line-sleeve wire CLS to close a circuit through a make contact of frame-A relay 16B11 and over the frame-A wire CLSA, for the hold magnet (such as 703, Fig. 7) associated with the called line.

The four noted hold magnets operate to extend the connection to the called line over the matched block link, the matched originating trunk, and the matched line link as hereinbefore described.

IXD17. *Clearing out*

The clearing out of the block controller 1600 and associated common apparatus is initiated from two points. First, the switching relay 509 in the connected block coupler 500, on being operated as hereinbefore described (by hold-pilot contacts HP on the connected block-link primary switch 1300), opens the associated section of the terminating chain Second, clearout relay 16A13 in the block controller is operated by contacts 6 of relay 16A14. The clearout relay is adjusted to be comparatively slow in operation to allow time for the noted hold magnets to operate.

When clearout relay 16A13 operates, its contacts 2 open the terminating-start wire TER-ST. The closed terminating-chain circuit over which the common apparatus was seized is thus opened independently at two points to insure that it is cleared out. The three relays noted (one each in the section-preference relays 1550, the connected block coupler 500, and the block controller 1600) previously held operated in the terminating chain thereupon restore.

In the connected block coupler 500, the noted restoration of the terminating-chain relay disconnects the block coupler from the several "terminating" wires extending to the block controller, and it clears out the block translator 1800 by removing ground from the previously marked digit wires. The line-controller apparatus on the called line-link frame A responsively restores.

The section-preference relays 1550 clear out as described responsive to the restoration of the main terminating-chain relay therein permitting the block-controller switch 1500 to clear out.

In the block controller, terminating-start relay 16A6 responds to the noted opening of the terminating chain by open-circuiting and restoring the associated auxiliary relay 16A7. Relay 16A7 opens its contacts 4 to clear out the associated cycle timer (relays 16A8 to 16A11); its contacts 5 restore match-start relay 16A5; and its contacts 1 remove ground from wire 1614 of the choice allotter, unlocking and restoring the locked matching relay 16E11 and match-pilot relay 16D10, followed by the restoration of match-complete relay 16E7. Contacts 2 of match-start relay 16A5 remove the initial ground connection from match-start wire 1610, but ground is held locked thereon by relay 16B1 until the call-in pulser completes its cycle of operation which was arrested by the operation of match-complete relay 16E7.

Frame-A relays 16B11 and 16C3 are restored, along with relays in the line-test group, when the line-controller apparatus on the called line-link frame clears out as noted.

Reset relay 16A12 is operated by relay 16A13 to open-circuit and restore relay 16A14, permitting relays 16A14, 16A13, and 16A12 to restore in succession.

IXD17*a*. *Interim advance of the call-in allotter*

The block controller 1600 is now cleared out and returned to its illustrated normal condition except for such relays as are held operated by ground locked on match-start wire 1610 at contacts 2 of relay 16B1 of the call-in pulser.

When match-complete relay 16E7 restores as noted, it reconnects ground to the circuit of relay 16C2 of the call-in pulser, thereby operating relay 16C2 through contacts 1 of the operated relay 16C1. Contacts 2 of relay 16C2 disconnect relay 16B1 from the match-start wire 1610, whereupon relays 16B1, 16C1, and 16C2 restore successively. The operation of the call-in pulser terminates at this point as relay 16B1 removes locking ground from match-start wire 1610. The operation and restoration of relay 16C2 causes the associated call-in allotter to advance one step. The next succeeding call-in group of terminating trunks is thus advanced to first call-in position for the next terminating-call operation.

The operation of the apparatus on part 4 of Fig. 16 (the call-in pulser, the call-in allotter, and the call-in totalizer of the block controller) is not described in detail, for these items operate as described for the corresponding equipment of Fig. 12, part 5 of the hereinbefore-described line controller 1200. The only circuit difference is that each of the call-in totalizer relays 16B7 to 16B10 has a second locking winding which enables them to be operated directly off call-in wires 1621 to 1624, rather than requiring a separate group of contacts on the call-in allotter such as contacts 3, 4, 5, and 3 of relays 12C18, 12C19, 12C20 and 12C21.

IXD18. *Called line is busy*

If the called line is in use when tested by the block controller as described, test relay 16A1 of the block controller fails to operate, being short-circuited by holding ground on the sleeve wire S individual to the called line. Under this condition, idle relay 16A2 has not been operated when slow-operated busy relay 16A3 operates at the end of the time interval for which it is adjusted. A moment later, slow-operate test-cutoff relay 16A4 operates. Its make contact 1 grounds terminating-busy wire TER-BU through a break contact 3 of relay 16A2. The busy relay 510 is thereby operated in the connected block coupler 500, and clearout relay 16A13 is operated in parallel therewith. A busy signal is thus returned to the calling line and the common apparatus is cleared out, as described.

IXD19. *A reverting call*

As previously described, reverting calls are handled through the block couplers 500 and the block controller 1600 by dialing the regular directory number of the station on the same line with the calling line. The "called" line, being also the calling line, always tests busy when a reverting call is made. Consequently, whenever busy relay 16A3 operates, block controller 1600 must make a reverting-call test before it can treat the called line in the above-described manner as normally busy.

When busy relay 16A3 operates as described, its break contact 3 opens its short-circuited upper winding to render it fast restoring, and its make contact 4 closes a circuit for test-cutoff relay 16A4. Relay 16A4 is slow-operating as pointed out for relay 16A3 to provide the time interval required for the reverting-call test.

During the interval of time occurring between the operation of busy-relay 16A3 and the operation of test-cutoff relay 16A4, direct ground is removed, at break contact 2 of relay 16A3, from the associated sleeve-ground wire SG, leaving this wire grounded only through the associated resistor 1613. As hereinbefore described, wire SG is the extended incoming sleeve conductor S of the connected block coupler 500. Consequently the holding ground supplied over this conductor to the hold magnets of the line-link primary and secondary switches on the calling line-link frame is now obtained through the resistor 1613. If the calling and called lines are the same, test relay 16A1 is now connected to the sleeve of the calling line and consequently is operated in parallel with resistor 1613. It thereupon operates idle relay 16A2. The operation of relay 16A2 following the operation of relay 16A3 signals a reverting call rather than a call to a normally busy called line. Reverting-call wire RC and terminating-switching wire TER-SW are each grounded (through make contacts 2 and 1 respectively of relays 16A2 and 16A3 in series), conditioning the connected block coupler 500 for operation as a reverting-call ringback switch as hereinbefore described. The block coupler 500 thereupon initiates the clearing out operation of the common equipment as described.

IXD20. *Terminating-call progress timing*

The progress of the block controller and associated apparatus during terminating-call operation is timed by the cycle timer, comprising relays 16A8 to 16A11, which operate sequentially, as described, responsive to the operation of terminating-start auxiliary relay 16A7. Following operation of relay 16A11, relays 16A8 to 16A10 are restored sequentially. The cycle timer is completely run down upon the restoration of relay 16A10. Relays 16A8 to 16A10 are adjusted to be sufficiently slow-restoring that the block controller has time to complete its outgoing operation and clear out before the cycle timer has run down.

When the clearing-out operation occurs before the cycle timer has run down, the restoration of relay 16A7 open-circuits the locked relay 16A11 and any one of the relays 16A8 to 16A10 which is still operated. All the relays of the cycle timer thereupon promptly restore.

This cycle timer operates in detail as described fully for the cycle timer (relays 12B11 to 12B15) of the line controller 1200, but the relays of the cycle timer of the block controller are preferably adjusted for a longer cycle to enable the block controller to wait for the concerned line controller to complete an originating operation in which it may be engaged.

If a circuit failure in the block controller or associated common apparatus, or in the concerned line-controller apparatus, halts the normal progress of terminating-call operations, the cycle timer of the block controller runs down before the block controller has cleared out. Under this condition, the cycle timer of the block controller grounds terminating-busy wire TER-BU through contacts 1 of relays 16A10 and 16A11. The busy relay 510 in the connected block coupler 500 and clearout relay 16A13 of the block controller are thereby operated to initiate the described clearing out of the block controller and associated common equipment by opening the terminating-start wire TER-ST.

IXD21. *Operation of call-in allotter*

The call-in allotter of the block controller comprises driver relay 16B2 and four allotting relays 16B3 to 16B6. As previously noted, this allotter operates as described for the call-in allotter of any line controller 1200. In its four positions, this allotter connects match-start wire 1610 to the four call-in wires 1621 to 1624.

The overall result of the operation of the call-in allotter of Fig. 16, part 4, as controlled by the associated call-in pulser is: (1) it calls in the call-in groups of connected terminating trunks successively until a match has occurred, or until all four have been called in with no match having occurred, and (2) considering the four call-in groups of terminating trunks 207 extending to any line-link frame as arranged in a continuous chain, or circle, the first call-in group called in on an operation of the block controller is the call-in group next following the call-in group (for the same or another line-link frame) last called in on the preceding terminating operation of the block controller. The effect is to randomize the calls offered to the four call-in groups of terminating trunks extending to any line-link frame.

IXD22. *Operation of the choice allotter*

The choice allotter comprising the thirteen relays 16D1 to 16D3 and 16E1 to 16E10 is a specialized counting chain arranged to assume allotting positions 1 to 10 successively in recurring cycles as described in detail for the choice allotter comprising relays 12C1 to 12C13 of line controller 1200 (Fig. 12). Its purpose is to shift first choice successively among the ten secondary switches 1400 on the block-link frame.

The allotting relays are 16E1 to 16E10. They are controlled by driver relays 16D1 and 16D2 over the associated odd and even control wires as described for the choice allotter of Fig. 12. Relay 16D3 is employed as described for relay 12C3.

Driver relays 16D1 and 16D2 are controlled by ground applied alternately to wires 1615 and 1616 by make and break contacts 4 of relay 16A11 of the cycle timer, which is operated as described at the initiation of each terminating-call operation and is restored when the block controller is next cleared out.

Ground is supplied to armature 4 of relay 16A11 through break contact 4 of relay 16A15, which operates whenever the block controller is seized for outgoing operation. By this arrangement, the advance of the choice allotter from one position to the next occurs between successive terminating-call uses of the choice allotter.

As the choice allotter of the block controller progresses through its allotting positions 1 to 10 as described in detail for the choice allotter of Fig. 12, outgoing matching-ground wire OTG-MG is applied successively to the ten choice wires in group 1602 leading to the ten points of entry to the outgoing matching chain carried through contacts 3 of block-link test relays 16D11 to 16D30, thereby shifting outgoing-call first choice progressively from the first to the tenth of the block-link secondary switches 1400, which the ten pairs of these relays respectively represent.

Additionally, the locking ground wire 1614 is applied successively to the ten choice wires in group 1603 leading to the locking chain of contacts 5 of matching relays 16E11 to 16E30, thereby shifting terminating-call first choice progressively from the first to the tenth of the block-link secondary switches 1400, which the ten pairs of these relays respectively represent.

Giving first choice to the secondary switches in regular order for outgoing calls, tends to balance the traffic load through the secondary switches and among the trunks in any called outgoing group, which also distributes the outgoing-call load more or less evenly among the block-link pairs serving any block-link primary switch 1300.

Giving first choice to the secondary switches in regular order for terminating calls combined with the previously described action of the call-in allotter to randomize the terminating trunks almost completely to the end that any tendency toward unbalanced load distribution which might result in unnecessary match failures is greatly minimized.

IXD23. *Terminating-trunk slip*

The following four tables give the trunk number and identity of each of the forty terminating trunks serving line-link frames A, B, C, and D, respectively.

A. *Terminating trunks to frame A*

| | Trk. No. | From— | To— |
|---|---|---|---|
| | 1 | SW1-V1 | SE1-V1 |
| | 2 | SW2-V1 | SE2-V1 |
| | 3 | SW3-V1 | SE3-V1 |
| | 4 | SW4-V1 | SE4-V1 |
| Call-In 1 | 5 | SW5-V1 | SE5-V1 |
| | 6 | SW6-V1 | SE6-V1 |
| | 7 | SW7-V1 | SE7-V1 |
| | 8 | SW8-V1 | SE8-V1 |
| | 9 | SW9-V1 | SE9-V1 |
| | 10 | SW10-V1 | SE10-V1 |
| | 11 | SW1-V2 | SE2-V2 |
| | 12 | SW2-V2 | SE3-V2 |
| | 13 | SW3-V2 | SE4-V2 |
| | 14 | SW4-V2 | SE5-V2 |
| Call-In 2 | 15 | SW5-V2 | SE6-V2 |
| | 16 | SW6 V2 | SE7-V2 |
| | 17 | SW7-V2 | SE8-V2 |
| | 18 | SW8-V2 | SE9-V2 |
| | 19 | SW9-V2 | SE10-V2 |
| | 20 | SW10-V2 | SE1-V2 |
| | 21 | SW1-V3 | SE3-V3 |
| | 22 | SW2-V3 | SE4-V3 |
| | 23 | SW3-V3 | SE5-V3 |
| | 24 | SW4-V3 | SE6-V3 |
| Call-In 3 | 25 | SW5-V3 | SE7-V3 |
| | 26 | SW6-V3 | SE8-V3 |
| | 27 | SW7-V3 | SE9-V3 |
| | 28 | SW8-V3 | SE10-V3 |
| | 29 | SW9-V3 | SE1-V3 |
| | 30 | SW10-V3 | SE2-V3 |
| | 31 | SW1-V4 | SE4-V4 |
| | 32 | SW2-V4 | SE5-V4 |
| | 33 | SW3-V4 | SE6-V4 |
| | 34 | SW4-V4 | SE7-V4 |
| Call-In 4 | 35 | SW5-V4 | SE8-V4 |
| | 36 | SW6-V4 | SE9-V4 |
| | 37 | SW7-V4 | SE10-V4 |
| | 38 | SW8-V4 | SE1-V4 |
| | 39 | SW9-V4 | SE2-V4 |
| | 40 | SW10-V4 | SE3-V4 |

B. *Terminating trunks to frame B*

| | Trk. No. | From— | To— |
|---|---|---|---|
| | 1 | SW1-V5 | SE1-V1 |
| | 2 | SW2-V5 | SE2-V1 |
| | 3 | SW3-V5 | SE3-V1 |
| | 4 | SW4-V5 | SE4-V1 |
| Call-In 1 | 5 | SW5-V5 | SE5-V1 |
| | 6 | SW6-V5 | SE6-V1 |
| | 7 | SW7-V5 | SE7-V1 |
| | 8 | SW8-V5 | SE8-V1 |
| | 9 | SW9-V5 | SE9-V1 |
| | 10 | SW10-V5 | SE10-V1 |
| | 11 | SW1-V6 | SE2-V2 |
| | 12 | SW2-V6 | SE3-V2 |
| | 13 | SW3-V6 | SE4-V2 |
| | 14 | SW4-V6 | SE5-V2 |
| Call-In 2 | 15 | SW5-V6 | SE6-V2 |
| | 16 | SW6-V6 | SE7-V2 |
| | 17 | SW7-V6 | SE8-V2 |
| | 18 | SW8-V6 | SE9-V2 |
| | 19 | SW9-V6 | SE10-V2 |
| | 20 | SW10-V6 | SE1-V2 |
| | 21 | SW1-V7 | SE3-V3 |
| | 22 | SW2-V7 | SE4-V3 |
| | 23 | SW3-V7 | SE5-V3 |
| | 24 | SW4-V7 | SE6-V3 |
| Call-In 3 | 25 | SW5-V7 | SE7-V3 |
| | 26 | SW6-V7 | SE8-V3 |
| | 27 | SW7-V7 | SE9-V3 |
| | 28 | SW8-V7 | SE10-V3 |
| | 29 | SW9-V7 | SE1-V3 |
| | 30 | SW10-V7 | SE2-V3 |
| | 31 | SW1-V8 | SE4-V4 |
| | 32 | SW2-V8 | SE5-V4 |
| | 33 | SW3-V8 | SE6-V4 |
| | 34 | SW4-V8 | SE7-V4 |
| Call-In 4 | 35 | SW5-V8 | SE8-V4 |
| | 36 | SW6-V8 | SE9-V4 |
| | 37 | SW7-V8 | SE10-V4 |
| | 38 | SW8-V8 | SE1-V4 |
| | 39 | SW9-V8 | SE2-V4 |
| | 40 | SW10-V8 | SE3-V4 |

C. *Terminating trunks to frame C*

| | Trk. No. | From— | To— |
|---|---|---|---|
| Call-In 1 | 1 | SW1-V9 | SE1-V1 |
| | 2 | SW2-V9 | SE2-V1 |
| | 3 | SW3-V9 | SE3-V1 |
| | 4 | SW4-V9 | SE4-V1 |
| | 5 | SW5-V9 | SE5-V1 |
| | 6 | SW6-V9 | SE6-V1 |
| | 7 | SW7-V9 | SE7-V1 |
| | 8 | SW8-V9 | SE8-V1 |
| | 9 | SW9-V9 | SE9-V1 |
| | 10 | SW10-V9 | SE10-V1 |
| Call-In 2 | 11 | SW1-V10 | SE2-V2 |
| | 12 | SW2-V10 | SE3-V2 |
| | 13 | SW3-V10 | SE4-V2 |
| | 14 | SW4-V10 | SE5-V2 |
| | 15 | SW5-V10 | SE6-V2 |
| | 16 | SW6-V10 | SE7-V2 |
| | 17 | SW7-V10 | SE8-V2 |
| | 18 | SW8-V10 | SE9-V2 |
| | 19 | SW9-V10 | SE10-V2 |
| | 20 | SW10-V10 | SE1-V2 |
| Call-In 3 | 21 | SW1-V11 | SE3-V3 |
| | 22 | SW2-V11 | SE4-V3 |
| | 23 | SW3-V11 | SE5-V3 |
| | 24 | SW4-V11 | SE6-V3 |
| | 25 | SW5-V11 | SE7-V3 |
| | 26 | SW6-V11 | SE8-V3 |
| | 27 | SW7-V11 | SE9-V3 |
| | 28 | SW8-V11 | SE10-V3 |
| | 29 | SW9-V11 | SE1-V3 |
| | 30 | SW10-V11 | SE2-V3 |
| Call-In 4 | 31 | SW1-V12 | SE4-V4 |
| | 32 | SW2-V12 | SE5-V4 |
| | 33 | SW3-V12 | SE6-V4 |
| | 34 | SW4-V12 | SE7-V4 |
| | 35 | SW5-V12 | SE8-V4 |
| | 36 | SW6-V12 | SE9-V4 |
| | 37 | SW7-V12 | SE10-V4 |
| | 38 | SW8-V12 | SE1-V4 |
| | 39 | SW9-V12 | SE2-V4 |
| | 40 | SW10-V12 | SE3-V4 |

D. *Terminating trunks to frame D*

| | Trk. No. | From— | To— |
|---|---|---|---|
| Call-In 1 | 1 | SW1-V13 | SE1-V1 |
| | 2 | SW2-V13 | SE2-V1 |
| | 3 | SW3-V13 | SE3-V1 |
| | 4 | SW4-V13 | SE4-V1 |
| | 5 | SW5-V13 | SE5-V1 |
| | 6 | SW6-V13 | SE6-V1 |
| | 7 | SW7-V13 | SE7-V1 |
| | 8 | SW8-V13 | SE8-V1 |
| | 9 | SW9-V13 | SE9-V1 |
| | 10 | SW10-V13 | SE10-V1 |
| Call-In 2 | 11 | SW1-V14 | SE2-V2 |
| | 12 | SW2-V14 | SE3-V2 |
| | 13 | SW3-V14 | E4-V2 |
| | 14 | SW4-V14 | SE5-V2 |
| | 15 | SW5-V14 | SE6-V2 |
| | 16 | SW6-V14 | SE7-V2 |
| | 17 | SW7-V14 | SE8-V2 |
| | 18 | SW8-V14 | SE9-V2 |
| | 19 | SW9-V14 | SE10-V2 |
| | 20 | SW10-V14 | SE1-V2 |
| Call-In 3 | 21 | SW1-V15 | SE3-V3 |
| | 22 | SW2-V15 | SE4-V3 |
| | 23 | SW3-V15 | SE5-V3 |
| | 24 | SW4-V15 | SE6-V3 |
| | 25 | SW5-V15 | SE7-V3 |
| | 26 | SW6-V15 | SE8-V3 |
| | 27 | SW7-V15 | SE9-V3 |
| | 28 | SW8-V15 | SE10-V3 |
| | 29 | SW9-V15 | SE1-V3 |
| | 30 | SW10-V15 | SE2-V3 |
| Call-In 4 | 31 | SW1-V16 | SE4-V4 |
| | 32 | SW2-V16 | SE5-V4 |
| | 33 | SW3-V16 | SE6-V4 |
| | 34 | SW4-V16 | SE7-V4 |
| | 35 | SW5-V16 | SE8-V4 |
| | 36 | SW6-V16 | SE9-V4 |
| | 37 | SW7-V16 | SE10-V4 |
| | 38 | SW8-V16 | SE1-V4 |
| | 39 | SW9-V16 | SE2-V4 |
| | 40 | SW10-V16 | SE3-V4 |

In the foregoing tables A to D, "SW" is an abbreviation of "switch" and refers to a secondary switch 1400 on the block-link frame; "SE" is an abbreviation of "section" and refers to a secondary section, being a section (left or right) of a secondary switch 900 on a line-link frame, as hereinbefore explained; and "V" is an abbreviation of "vertical" and refers to a vertical location on a secondary switch 1400 on the block-link frame or to a vertical location on a secondary section on a line-link frame.

The information opposite any trunk number on a table identifies the block-link secondary switch 1400 and vertical thereof from which the terminating trunk extends, and it identifies the secondary section and vertical thereof on the line-link frame to which the trunk extends.

Considering the forty terminating trunks extending to any line-link frame, the group of ten comprising call-in 1 extend "straight," or without "slip," from secondary switches 1 to 10 to the secondary sections 1 to 10, while the terminating trunks of call-in 2 extend to the secondary sections in the order of 2, 3, 4, 5, 6, 7, 8, 9, 10, 1. This shifted order at the secondary sections is referred to as a slip of 1. The trunks of call-in 3 connect to the secondary sections with a slip of 2, and the trunks of call-in 4 have a slip of 3.

The purpose of the terminating-trunk slip is to enhance the probability of matching during periods of heavy traffic by presenting the pairs of block links to the line links in a new order on each call-in.

The four call-in relays 16C7 to 16C10 of the block controller (Fig. 16, part 6) are provided to connect up the line-link wires LK of frames A to D in correct correspondence with the terminating-trunk test relays and the block-link test relays in view of the noted slip in call-ins 2 to 4 of the terminating trunks. With this slip in view, the first call-in relay 16C7 connects the link-extension wires 1630 (to which the wires LK of the called line-link frame A, B, C, or D have been connected by the concerned one of relays 16C3 to 16C6) to the corresponding local extensions (groups 1605 and 1606) without slip; the second call-in relay 16C8 connects the noted wires together with a slip of one; the third call-in relay 16C9 connects the wires together with a slip of two; and the fourth call-in relay 16C10 connects these wires together with a slip of three. In this way the matching circuits over wires LK and the wires in group 1605, and the select magnet circuits over the wires in group 1606 pass through contacts of the line-link call-in relays in the same order that paths exist from the block links over the terminating trunks to the line links.

IXE. *Overlapping terminating-call and outgoing-call operation*

Since, as described, two separate chains (an outgoing chain and a terminating chain) are provided through the block couplers 500 and the section-preference relays 1550 for the seizure of the block controller 1600 and associated apparatus, over-lapping seizure can occur, as a seizure over either chain does not preclude seizure over the other chain. As described in connection with section-preference relays 1550 and block-controller switch 1500, the two separate chains are provided (along with two separate sets of control conductors between the block couplers 500 and the block controller 1600) to permit outgoing-call operations to take precedence over terminating-call operations in all cases in which circuit confusion is unlikely; that is, in all cases except the special one in which the block controller is just concluding terminating-call operation when the outgoing-call seizure occurs. The cases under which overlapping seizure of the block controller and common apparatus can occur over the outgoing chain and the terminating chain are separately described as follows:

IXE1. *Terminating-call and outgoing-call seizures occur together*

When terminating-call and outgoing-call seizures of the control chains by respective block couplers occur together, terminating-start relay 16A6 and outgoing-start relay 16A17 of the block controller 1600 both operate at the same time, each over a separate circuit as hereinbefore traced. Terminating-start auxiliary relay 16A7 and outgoing-start auxiliary relay 16A15 thus operate at the same time. Outgoing-start auxiliary relay 16A7 usually releases before it has completely operated. Contacts 5 and 7 of relay 16A7 withhold operating current from relays 16A2 to 16A5, thereby completely holding the called-line testing and the terminating-call matching operations in abeyance while the outgoing-call operation proceeds as hereinbefore described. The described chain-preference arrangement in the section-preference relays 1550 is such that the seizure of the terminating chain is temporarily ignored when both chains are seized together, wherefore, the block-controller switch 1500 is set in accordance with the block-link primary switch through which the outgoing call is to be handled.

When the outgoing-call operation is concluded, relays 16A17 and 16A15 restore as described, whereupon terminating-start auxiliary relay 16A7 is reconnected at break contact 2 of relay 16A15, and thereupon reoperates to permit terminating-call operations to proceed in the block controller 1600.

In the meantime, the block translator 1800 has remained set and has forwarded the translated digit information for the waiting terminating call to the line-controller apparatus on the called line-link frame, which has performed its described operations preparatory to the testing of the called line by the block controller. If the line-controller apparatus is ready, the testing of the called line starts immediately upon the noted reoperation of relay 16A7 to close the test-start conductor TS at its contacts 7. In the example assumed, the completion of the terminating-call operation of the block controller thus is not materially delayed, if delayed at all, by the comparatively rapid outgoing-call operation which was given preference, for the latter took place during a short interval of normal waiting time at the block controller.

IXE2. *Outgoing-call seizure occurs first*

When the outgoing-call seizure of the block controller and related apparatus occurs before the overlapping seizure for terminating-call operation, the operation is the same as when both seizures occur at the same time, except that the momentary operation described for terminating-start relay 16A7 does not occur, as that relay has already been disconnected at break contact 2 of outgoing-start auxiliary relay 16A15.

IXE3. *Terminating-call seizure occurs first*

When the terminating-call seizure of the block controller and related apparatus occurs before the overlapping seizure for outgoing-call operation, the immediate result depends upon whether the outgoing-call seizure occurs before or after the operation of operate relay 16A14.

IXE3*a*. *Operate relay 16A14 still unoperated*

If the terminating-call operations have not proceeded to the point where matching and select-magnet operation have been followed by the described operation of operate relay 16A14 to close the hold-magnet circuits, the operation of relays 16A17 and 16A15 restores terminating-start auxiliary relay 16A7 as described, which restores any operated one of relays 16A2 to 16A5 by opening its contacts 5 and 7.

The terminating-call operations in progress are thereby halted. But, to secure a faster clearing out of the matching-relay circuits (relays 16E11 to 16E30), contact 1 of relay 16A15 disconnects the allotter-controlled locking-ground wire 1614, and contact 5 of relay 16A15 disconnects wire 1611 to open-circuit match-cut-through relay 16D9 which disconnects the ground-connected test windings (the lower windings) of the matching relays 16E11 to 16E30.

After the outgoing operations have been disposed of and relays 16A17 and 16A15 have restored, terminating-start auxiliary relay 16A7 reoperates as described to restart the interrupted terminating-call operations in the block controller.

IXE3*b*. *Operate relay 16A14 already operated*

If the terminating-call operations have so far proceeded that the desired matching and select-magnet operations have been followed by the operation of operate relay 16A14, the terminating-call operations are permitted to proceed to their conclusion notwithstanding the operation of outgoing-start relay 16A17 and its auxiliary relay 16A15. To disrupt the operations at this point would often lead to circuit confusion, as (for example) some of the concerned hold magnets may have operated, and locked, but not others.

With operate relay 16A14 operated, ground at its contacts 3 remains on the circuit of terminating-start auxiliary relay 16A7 notwithstanding the operation of relay 16A15; operate relay 16A14 remains locked operated through its own contacts 4 rather than being disconnected by break contact 3 of relay 16A15; and ground through contacts 1 and 2 of relays 16A13 and 16A14 remains on locking wire 1614 rather than being disconnected by contact 1 of relay 16A15. The opening of a point in the circuit of match-cut-through 16D9 by contact 5 of relay 16A15 does no harm, as relay 16D9 has been restored before the operation of relay 16A14.

With relay 16A7 held operated, the outgoing-call progress-timing action of relay 16A18 and 16A19 is withheld at break contact 2 thereof, break contact 6 of relay 16A7 maintains transfer relay 16A20 disconnected.

With relays 16A7 and 16A14 operated, ground through contacts 8, 4, and 8 of relays 16A7, 16A13, and 16A14 is held on hold-magnet wire HM of the block-controller switch 1500 to maintain that switch set for the terminating-call notwithstanding that its select magnets have been reset (as hereinbefore described) for the outgoing call.

When the described hold-magnet operation occurs responsive to the operation of relay 16A14, the described outgoing-call clear-out operation of the block controller is initiated at the connected block coupler 500 and also by the operation of the slightly slow-operating clear-out relay 16A13. Reset relay 16A12, operated by relay 16A13, open-circuits operate relay 16A14, which is also open-circuited at contacts 3 of relay 16A7 responsive to the opening as described of the terminating-start-wire TER-ST. Relays 16A14, 16A13, and 16A12 thereupon restore.

Upon the restoration of relay 16A7, or upon the operation of clear-out relay 16A13, ground is removed from hold-magnet wire HM to permit the block-controller switch 1500 to be reset for the outgoing call, whereupon conductor OTG-MG becomes grounded through the section-preference relays 1550 to control the outgoing matching operation.

Also, upon the restoration of relay 16A7 or upon the operation of relay 16A13, locking ground is removed from locking wire 1614 restoring the operated matching relay (16E11 to 16E30) to open the primary and secondary select-magnet circuits.

Upon the restoration of relay 16A7, its break contact 6 extends ground to the lower terminal of transfer relay 16A20 to operate that relay in series with the lower winding of match-complete relay 16E7 as previously described. Transfer relay 16A20, however, is short-circuited by ground on the associated wire SON until the primary and secondary select magnets on the block-link frame have restored to remove the ground therefrom. When ground is thus removed from conductor SON, transfer relay 16A20 operates in series with the lower winding of match-complete relay 16E7 with results as hereinbefore described.

By the foregoing operations, the terminating-call operations just being concluded are allowed to proceed to normal termination, whereupon the temporarily delayed outgoing-call operations proceed normally.

X. *Block translator 1800 (Figs. 18, 19)*

The block translator 1800, shown as a rectangle in Figs. 2 and 6, is shown in full in Figs. 18 and 19. Fig. 18 (parts 1 to 8) is termed the relay section as it illustrates the portion which includes the relays and associated circuit elements such as resistors. Fig. 19 is termed the terminal-pin section as it illustrates the section of the block translator which comprises blocks, or columns, of insulated terminal pins whereat jumpers may be installed as desired to cause the normal fixed translation for selected called lines or stations to be replaced by overriding translation to direct the concerned calls to desired other line terminals as a part of its operation in providing normal fixed translation above noted.

XA. *Purpose and function*

The block translator has the two general purposes and functions. It directs calls to respective called lines by normal fixed translation, and it provides standard services by setting up "special" translation which overrides the normal fixed translation as above indicated.

XA1. *Call direction by normal fixed translation*

Since the 1000 lines served by the disclosed apparatus through line-link frames A, B, C, and D are grouped nondecimally on the line-link frames (in groups of 250, 25, and 5), instead of a decimal grouping by hundreds and tens, translation is required to indicate the physical location of the called line on the concerned line-link frame to direct the call thereto. The preferred grouping and numbering of the lines is shown in Fig. 21, which shows the location of each line 000 to 999 on the line-link frames, together with the translated equivalent of each line number. The main purpose and function of the block translator is to effect this required translation as shown by Fig. 21. On the receipt of the hundreds, tens, and units digits of a called number, the block translator selects the concerned line-link frame and sends to it a translated equivalent number containing translated primary, fives, and units digits respectively identifying the involved primary switch on the called line-link frame, the fives group of lines on the primary switch, and the units location of the called line within the group of five. This translation according to Fig. 21 is referred to as the normal fixed translation.

In Fig. 21, parts 1, 2, 3, and 4 refer respectively to line-link frames A, B, C, and D. In each part of the drawings, there are ten horizontal double rows (1 to 10) of numbers. These rows refer respectively to the ten line-link primary switches 800 on the concerned line-link frame. The upper row of numbers of any such horizontal double row comprises the twenty-five line numbers assigned respectively to the lines connected to the verticals V1 to V25 of the primary switch, while the lower row comprises the translated equivalents of the respective line numbers of the upper row.

It will be observed that line numbers 000 to 249 are assigned to the 250 lines served by the ten primary switches 1 to 10 of line-link frame A; line numbers 250 to 499 are assigned to line-link frame B; line numbers 500 to 749 are assigned to line-link frame C; and line numbers 750 to 999 are assigned to line-link frame D; and that the line numbers are applied consecutively from the first vertical V1 of line-link primary switch 1 of line-link frame A to the last vertical V25 of line-link primary switch 10 of line-link frame D. It will be observed further that at any line-link frame the translated numbers run consecutively (by tens, fives, and units) from 111 to 055, being the same 250 translated numbers for any line-link frame. The block translator directs any such translated number to the line-link frame at which the called line terminates.

XA2. *Standard services by overriding translation*

The second purpose and function of the block translator is to direct the performance of standard services which are referred to herein as (1) number-transfer service, (2) intercept service, (3) common-number service, and (4) 20-station code-ringing service. The block translator performs any one of these standard services for an assigned called number by setting aside the normal fixed translation in favor of an overriding translation which is effective to direct the call to a preassigned different line location or to an idle line of a preassigned group.

The above standard services are more fully stated as follows:

1. Number-transfer service, when employed, transfers the call to a new location on any one of the four line-link frames when the switchboard-terminal location of the called line has been altered at the main frame M. D. F. to balance traffic amongst the primary switches, thereby avoiding changing line numbers.

2. Intercept-service, when employed, transfers the call from a given called line, or from a given station of a multi-station line, to an intercept trunk, leading to an intercept operator.

3. Common-number service is employed to extend calls for the directory number of a group of lines (such as a P. B. X group) to an idle line of the group.

4. Twenty-station code-ringing service may be used when the block couplers 500 are modified according to Fig. 22 to provide code-ringing service instead of harmonic-ringing service. It is a special case of number-transfer service, and is employed for up to fifty 20-station lines, by connecting the five lines in the fourth fives group of any primary switch on line-link frame A to 20-station service. The corresponding line number from the fifth fives group is assigned to any such line. When the second line number is called, the calling block coupler according to Fig. 22 is conditioned by the block translator to alter the ringing code to ring the corresponding station in the second group of ten on the called line.

The normal fixed translation is carried out through permanent wiring interconnecting contacts of the relays of Fig. 18. Overriding translation, when effected for any called number, is carried out through jumper connections between terminal pins shown in Fig. 19. Additional relay apparatus of Fig. 18 not used in the normal fixed translation is thereby brought into play as will be described.

XB. *Functional relay groups*

The relays of the block translator comprise separate functional groups as follows:

1. Translating relays 18D1 and 18D2 are the twenty-station code-ringing group. They have use only when block couplers such as shown in Fig. 22 are used, in which case relays 18D1 and 18D2 provide twenty-station code-ringing service for certain lines served by line-link frame A.

2. Relays 18D3 and 18D4 are the reset group, called into play only when overriding translation is required. They act to cancel the normal fixed translation and to put the indicated overriding translation into effect.

3. Relays 18E1 to 18E30 are the number-transfer group. When a line has been transferred from one terminal location to another, by a jumper change on the main frame, with no corresponding change in the number of the transferred line, an available one of the relays 18E1 to 18E30 is assigned to that line to effect overriding translation to cause the call to be directed to the new location of the called line rather than to its original location.

4. Relays 18D5 to 18D14 comprise a ten-relay group allotter. It is called in whenever the number dialed indicates that the call is for a common-number group. It acts to test up to ten lines in the called group to indicate an overriding translation which will direct the call to an idle line of the group.

5. Relays 18D15, 18D16 and 18D17 control up to ten lines or trunks in a common-number group referred to as P. B. X group 1. Any desired line number in the 1000-line block of numbers may be assigned as the call number to operate these relays to bring the lines of the group into the group allotter for test. Relays 18D18 to 18D20 (not shown) and relays 18D21 to 18D23 are similar three-relay groups assigned respectively to ten-trunk groups identified as P. B. X groups 2 and 3, "P. B. X" being the common abbreviation of private branch exchange.

6. Relay 18D24 controls up to three lines or trunks in a common-number group referred to as P. B. X group 4. This relay can be operated by any assigned line number to bring the lines of its group into the P. B. X allotter for test. Relays 18D25 to 18D28 (not shown) and relay 18D29 are similar relays respectively controlling three-trunk groups referred to as P. B. X groups 5 to 9.

7. Relays 18D30 and 18F1 to 18F20 comprise the intercept group. Relays 18F1 to 18F20 are the detector relays assignable to respective lines requiring intercept service. When desired, call-in relay 18D30 is operable directly by any detector relay 18F1 to 18F20, or when desired, its operation is further dependent on a given station on the assigned line being called. When operated, relay 18D30 calls in both relays (18D3 and 18D4) of the reset group to indicate an overriding translation to direct the call to an idle trunk leading to the intercept operator.

8. Register relays 18A1 to 18A10 and alarm relay 18B11 comprise the hundreds group. One or another of the relays 18A1 to 18A10 operates, depending upon the hundreds digit dialed.

9. Register relays 18A11 to 18A20 and alarm relay 18B12 comprise the tens group. One or another of the relays 18A11 to 18A20 operates, depending upon the tens digit dialed.

10. Register relays 18A21 to 18A30 and alarm relay 18B13 comprise the units group. One or another of the relays 18A21 to 18A30 operates, depending upon the units digit dialed.

11. Register relays 18B1 to 18B10 and alarm relay 18B14 comprise the stations group. One or another of relays 18B1 to 18B10 operates, depending upon the stations digit dialed.

12. Translating relays 18B15 to 18B16 comprise the fives group. They correspond respectively to the first five lines (0 to 4) in a group of ten, and to the last five lines (5 to 9) therein.

13. Translator relays 18B23 to 18B26 comprise the 25's group. They correspond respectively to the first, second, third, and fourth 25-line groups (00 to 24, 25 to 49, 50 to 74, and 75 to 99) in any hundreds group. They are controlled by the tens register relays 18A11 to 18A20, assisted by fives relays 18B15 and 18B16 when the tens register relay operated is 18A13 or 18A18.

14. Translating relay 18B27 to 18B30 are the 250's relays corresponding respectively to line-link frames A, B, C, and D, which in turn (see Fig. 21) correspond to the first, second, third, and fourth 250-line groups (000 to 249, 250 to 499, 500 to 749, and 750 to 999) in the 1000-line block. They are controlled by the hundreds register relays 18A1 to 18A10, assisted by the 25's relays 18B23 to 18B26 if hundreds relay 18A3 or hundreds relay 18A8 is operated.

XC. *Terminal-pin blocks*

The terminal pins of Fig. 19 are shown as small individual circles. They preferably comprise terminal pins passing through blocks or a panel-like insulating member which may be mounted on the rear face of the equipment on which the relay apparatus of Fig. 18 is mounted. These pins provide terminals through which the noted overriding translation is controlled as desired by jumpers extended between the terminals as desired. Each terminal pin preferably extends directly through the rear face of the equipment to provide an exposed inner end to which a local cable conductor or a strap is attached, and an end exposed on the rear face of the equipment to receive a jumper.

There are 1800 terminal pins shown in Fig. 19. They comprise nine sections (1901 to 1909) of 200 pins each. In any section 1901 to 1909 the pins are arranged in ten columns, with twenty pins in a column, and in twenty levels, with ten pins in a level. For ready identification the twenty levels of pins in a section are divided into four five-level groups 1 to 4. The two hundred pins of a section thus comprise four smaller groups of fifty each.

The nine sections 1901 to 1909 are grouped into the following separate fields according to function, as follows:

| | |
|---|---|
| Section 1901 | Detector field |
| Sections 1902, 1903, 1904 | Common field |
| Section 1905 | Sleeve field |
| Sections 1906, 1907, 1908, 1909 | Reset field |

XC1. *The detector field*

Section 1901 of the terminal pins comprises the detector field. The first ten levels in this field (groups 1 and 2) are assigned respectively to registered hundreds digits 0 to 9, and terminate hundreds wires H0 to H9.

The one hundred terminals in the last ten levels (groups 3 and 4) of section 1901 correspond respectively to the line numbers in any one of the ten hundreds groups, and terminate one hundred wires 00 to 99.

As hereinafter explained, the running of a two-wire detector jumper such as 1951 from the respective windings of a detector relay to terminals of the detector field corresponding to the three digits of a desired line number energizes both windings of that detector relay only when that line number is registered in the translator.

Connections to terminals in the detector field are made from any set of terminals D1 and D2 in the common field.

XC2. *The common field*

Sections 1902 to 1904 of the terminal pins are called the common field because they contain terminals which are to be jumper-connected to the terminals of each of the other fields. The terminals in the common field comprise separate functional groups as follows:

XC2*a*. *Common-number terminal groups*

The first three five-level groups 1 to 3 in section 1902 are assigned respectively to the ten-trunk common-number groups termed P. B. X groups 1 to 3. Each such five-level terminal-pin group provides terminal points for the detector wires D1 and D2 of the assigned P. B. X group, and terminal pins P, F, U, and S (primary, fives, units, and sleeve) for each of the ten lines constituting the respective trunks of the group.

Five-level group 4 in section 1902 accommodates the three-trunk common-number groups termed P. B. X groups 4 to 6 on columns 1 to 3, 4 to 6, and 7 to 9 respectively. Three-trunk groups P. B. X 7 to P. B. X 9 are similarly accommodated by the five-level group 1 of section 1903.

XC2*b*. *Number-transfer terminal groups*

The second, third, and fourth five-level groups (2, 3, and 4) in section 1903 of the common field respectively accommodate wires connected with number-transfer relays 18E1 to 18E10, 18E11 to 18E20, 18E21 to 18E30 in three groups of ten. Translated-number terminals P, F, and U, and detector terminals D1 and D2 are provided for each number-transfer relay.

XC2*c*. *Number-intercept terminal groups*

The first two five-level groups in section 1904 respectively accommodate wires connected with number-intercept relays 18F1 to 18F10 and number-intercept relays 18F11 to 18F20 in two groups of ten. Station-intercept terminals 1, 2, and 3, and detector terminals D1 and D2, are provided for each number-intercept relay. Level groups 3 and 4 in section 1904 accommodate station-digit wires ST–0 to ST–9, controlled by the stations relays of Fig. 18, part 7.

Any terminal 1 to 3 assigned to any intercept relay may be connected (as by jumper 1956) to any desired terminal level in the stations group according to the stations digit in the directory number of the station which has been disconnected from a multi-station line and placed on intercept service. If the called line on intercept service is an individual line, one of the noted terminals 1 to 3 is jumper-connected to ground (as by jumper 1957) which can be found on any terminal pin in level 20 of the sleeve field, section 1905.

XC3. *The sleeve field*

The terminal pins comprising section 1905 are referred to as the sleeve field because the first three levels in any five-level group 1 to 4 thereof serve as attachment points for thirty transfer sleeve wires S cabled between the block translator and bunching blocks (not shown) on the corresponding line-link frame A to D. Thirty transfer sleeve wires for each line-link frame make it possible to have as many as thirty lines on any line-link frame serving as trunks in common-number groups. Any such sleeve wire, before use in the translator, is jumpered (on the concerned line-link frame) to the sleeve wire of a desired line location thereon, such as to the terminal from which conductor 211A (Fig. 4) extends. In Fig. 19, this sleeve wire is jumpered to a desired sleeve terminal S of any desired group P. B. X 1 to P. B. X 9 in the common field.

The first three sleeve wires S1 to S3 from line-link frame A are permanently wired, through wires in group PJ, for the use of three lines of line-link frame A as a group of three intercept trunks leading to the switchboard of the intercept operator. These lines are number 011, 111, and 211. As shown in Fig. 21, part 1, these lines are the second line in the third fives group of primary switches 1, 5, and 9 of line-link frame A. The translated equivalents of these numbers are A132, A532, and A932. If desired, only one or two of these lines are so used, in which case the unrequired sleeve jumpers are omitted on line-link frame A.

XC3*a*. *Spare levels in sleeve field*

In the sleeve field (section 1905), the transfer sleeve wires use only three levels in any group of five, leaving the fourth and fifth levels available for other use.

In group 1 of the sleeve field, levels 4 and 5 terminate wires used in controlling 20-station relay 18D1 depending upon the number dialed and upon the presence of a strap between corresponding contacts of the two levels.

In group 4 of the sleeve field, the contacts in level five are strapped together and grounded to provide ground terminals for the previously noted jumpers relating to intercept service for individual lines.

XC4. *The reset field*

The terminal pins in sections 1906 to 1909 are termed the reset field. These sections correspond respectively to line-link frames A, B, C, and D. In the reset field, the terminals in any level are strapped together to provide ten equivalent multiple attachment points for reset jumpers.

In any reset section 1906 to 1909, the first ten levels of terminal pins terminate a multiple of the primary wires (P) outgoing to the associated line-link frame; the next five levels terminate a multiple of the fives wires (F) outgoing to the line-link frame; and the final five levels terminate a multiple of the units wires (U) outgoing to the line-link frame.

The terminals in the reset field receive three-wire reset jumpers (such as 1954) extending from any set of P, F, and U terminals in sections 1902 and 1903 of the common field.

XD. *Operation for normal fixed translation*

Referring particularly to Fig. 18, parts 4 to 8, the operation of the block translator of Figs. 18 and 19 in handling a call requiring only the normal fixed translation will now be described.

Battery normally stands on the upper terminal of each of the hundreds, tens, units, and stations register relays 18A1 to 18A10, 12A11 to 18A20, 18A21 to 18A30, and 18B1 to 18B10. The lower winding terminal of each of these relays serves as the terminatiton point for a digit wire incoming from the block couplers 500. These digit wires comprise hundreds wires H1 to H10, tens wires T1 to T10, units wires U1 to U10, and stations wires ST1 to ST10. Any one of the noted register relays accordingly stands ready to be operated by a marking ground potential on its connected hundreds, tens, units, or stations digit wire.

XD1. *Setting up the dialed number in the translator*

As described, the hundreds, tens, units, and stations digits dialed into any block coupler 500 for a terminating call are recorded on respective registers HR, TR, UR, and SR (Figs. 5, part 2) in the block coupler 500. When the stations digit has been registered, and if the terminating chain is then idle, the terminating-chain relay 512 in the block coupler in use is operated as described. It connects the block coupler to the block controller 1600 over the terminating-call wires; seizes the terminating chain; and grounds the selected wire in each of the digit groups H, T. U, and ST. The wires thus grounded correspond to the registered hundreds, tens, units, and stations digits.

At the same time, the associated main terminating-chain relay in section-preference relays 1550 and terminating-start relay 16A6 of the block controller, operate in series with the terminating-chain relay of the seizing block coupler. The block-controller switch is thereby operated to associate the block controller with the block-link primary switch serving the seizing block-coupler section, and the block controller is started into terminating operation, all as hereinbefore described.

In the block translator, the noted placing of marking ground on the four register-selected digit wires energizes the corresponding relay in the hundreds group, the tens group, the units group, and the stations group of Fig. 18, parts 4 to 7.

XD2. *Preliminary translation*

The ten wires in each of the four sets of digit wires H, T, U, and ST extending from the block couplers 500 to the block translator are considered in the order of from 1 to 10. This is according to the numbering (1 to 9, and 0) of the finger holes on the dial of the usual calling device, and is according to the order in which the impulses are received and registered. But, on the main distributing frame MDF (Figs. 2, 4, and 7) and on the line-link frames A, B, C, and D (see Fig. 21), the line numbers are grouped for digit values in the order of from 0, 1, 2, etc., to 9. As shown in Fig. 21, within a group of ten consecutive lines, the directory-number units digits are from 0 to 9; within a hundreds group, the directory-number tens and units digits are from 00 to 99; and in the thousand's group, the directory-number hundreds, ten, and units digits are from 000 to 999. Considering the lines as having ten stations each, the directory-number hundreds, tens, units, and stations digits run from 0000 to 9999.

The noted variance between the order of digits as dialed and the order of digits in the numbering plan of the lines, and statitons is taken care of in the translator 1800 by a preliminary internal translating operation within, and local to, each of the four digit groups of wires brought into the translator. For any digit group of wires (H, T, U, and ST), this preliminary translation is a mere rearrangement of the concerned ten-wire group within the translator. The digit-0 wire 10 extends to the first associated register relay (relay 18A1 for the hundreds digit), and the digit-1 to digit-9 wires extend respectively to the secondd to tenth ones of the associated register relays (18A2 to 18A10 for the hundreds digit). In view of the preliminary translation, the first five register relays in any group of ten correspond respectively to the dialed digits 0 to 4, while the last five register relays in the group correspond respectively to the dialed digits 5 to 9.

XD3. *Operation of the translator relays*

Three sets of translator relays (Fig. 18, part 8) are employed to assist the digit-register relays 18A1 to 18A30 in setting up the translated equivalents of the hundreds, tens, and units digits of line numbers registered thereon. These sets of translator relays are:

*a.* Two fives relays 18B15 and 18B16;
*b.* Four twenty-fives relays 18B23 to 18B26; and
*c.* Four 250's relays 18B27 to 18B30.

XD3*a*. *Fives translator relays*

The fives translator relays 18B15 and 18B16 are controlled by the units register relays 18A21 to 18A30. If the units digit has any value from 0 to 4, the corresponding one of the units register relays 18A21 to 18A25, through its contacts 12, operates the first fives relay 18B15. If the units digit has any value from 5 to 9, the corresponding register relay 18A26 to 18A30, through its contacts 12, operates the second fives relay 18B16. Relay 18B15 accordingly represents the first five lines (0 to 4) in a decimal group of ten, while relay 18B16 represents the second five lines (5 to 9) in a decimal group of ten.

The fives translator relays 18B15 and 18B16 enable a decimal group of ten consecutive lines to be split into two groups of five, to facilitate division of the lines of a hundreds group into four groups of twenty-five, and the division of a group of twenty-five into five groups of five, as shown in Fig. 21.

XD3*b. Twenty-fives translator relays*

The four twenty-fives relays 18B23 to 18B26 in the outgoing group respectively represent the four twenty-five line groups of consecutive numbers in any one of the ten hundreds groups of Fig. 21. The twenty-fives relays are controlled by the tens register relays 18A11 to 18A20 jointly with the fives translator relays 18B15 and 18B16.

If the tens digit is a 0 or a 1, the called line is in the first twenty lines of the hundred, and is therefore within the first twenty-five-line group. Accordingly, the operation of either of the tens register relays 18A11 or 18A12 at its contacts 4 directly operates the first 25's relay 18B23 over wire 1 in group 1835 to indicate that the called line lies in the first group of twenty-five lines within the called hundreds group to which the call is directed.

When the tens digit is a 2, contacts 4 of the third tens register relay 18A13 ground wire 2 in group 1835 as an indication that the called line is in the third ten-line group within the hundred. Half of this ten-line group lies in the first group of twenty-five and the other half lies in the second such group. If the first fives relay 18B15 is operated, its contacts 6 connect the ground wire 2 of group 1835 to the first 25's relay 18B23, operating it as an indication that the line is in the first group of twenty-five within the hundred. But, if the second fives relay 18B16 is operated, its contacts 6 connect the noted wire 2 to relay 18B24, operating it as an indication that the called line is in the second group of twenty-five within the hundred rather than in the first. The second 25's relay 18B24 is also operated (over wire 3 in group 1835) by contacts 4 of either tens register relay 18A14 or 18A15, if the tens digit is a 3 or a 4.

The third and fourth 25's relay 18B25 and 18B26 are operated by the last five tens relays 18A16 to 18A20 in the same way that relays 18B23 and 18B24 are operated by the first five tens relays 18A11 to 18A15. That is, the first pair and the last pair of these five tens relays operate 25's relays 18B25 and 18B26 respectively, while the intermediate tens relay 18A18 operates relay 18B25 or relay 18B26 depending upon whether the first fives relay 18B15 or the second fives relay 18B16 is operated to close its contacts 7.

XD3*c. 250's translator relays*

Translator relays 18B27 to 18B30 correspond respectively to the four 250-line groups into which the numbers within the 1000-line block of numbers are divided as shown in parts 1 to 4 of Fig. 21. Consequently, relays 18B27 to 18B30 correspond respectively to the four 250-line line-link frames A, B, C, and D, to which the 250-line groups are respectively assigned. Relays 18B27 to 18B30 are controlled by contacts 4 of the hundreds register relay 18A1 to 18A10, over the wires in group 1836, jointly with contacts 11 and 12 of twenty-fives relays 18B23 to 18B26.

If the hundreds digit dialed is a 0 or a 1, the corresponding register relay 18A1 or 18A2 grounds conductor 1 in group 1836 to operate the first 250's relay 18B27 as an indication that the called line is within the first 250-line group in the 1000-line block. Similarly, if the hundreds digit dialed is a 3 or a 4, register relay 18A4 or 18A5 is operated to ground conductor 3 in group 1836 to operate the second 250's relay 18B28 as an indication that the call is in the second 250-line group of numbers in the 1000-line block.

If the hundreds digit dialed is a 2, relay 18A13 grounds the associated wire 2 to index the calling of the third hundreds group, which is split between the first and second groups of 250. If the call is for one of the first fifty lines in the hundreds group, the ground on conductor 2 of group 1836 passes through contacts 11 of twenty-fives relay 18B23 or 18B24 to operate the first 250's relay 18B27, but if the line called is within the second fifty-line group within the called hundreds group, the ground on the last-noted conductor 2 passes through contacts 11 of relay 18B25 or 18B26 to operate the second 250's relay 18B28.

Similarly, hundreds register relays 18A6 to 18A10, representing the hundreds digits 5 to 9, control 250's relays 18B29 and 18B30, directly for relays 18A6, 18A7, 18A9, and 18A10, and through contacts 12 of the 25's relay 18B23 to 18B26 in the case of relay 18A8, which represents the eighth hundreds group (7) which is split between the third and fourth groups of 250.

XD4. *Translated line numbers*

As shown in Fig. 21 each called line number (000 to 999) has an equivalent translated number 111 to 055. The same 250 translated numbers, 111 to 055, appear in the same order for any one of the four line-link frames. Each translated number contains:

*a.* A primary digit from 1 to 0,
*b.* A fives digit from 1 to 5, and
*c.* A units digit from 1 to 5.

The block translator secures the effect of prefixing a line-link-frame designation A, B, C, or D to each of the 250 translated equivalent line numbers 111 to 055 shown on any one of the four parts of Fig. 21. This prefixing effect is secured by transmitting any such line number over the one of four groups of digit wires 1841 to 1844 (part 8 of Fig. 18) which leads to the concerned frame A, B, C, or D. Each such group contains ten primary wires P, five fives wires F, and five units wires U.

XD4*a. The translated primary digit (1 to 0)*

For any line-link frame A to D, the ten values 1 to 0 of the translated primary digit are represented respectively by the ten noted primary wires P1 to P10 extending to that frame.

At their respective contacts 2, (receiving ground over pin group 1831) the hundreds register relays 18A1 to 18A10 respectively ground the associated hundreds wires 0 to 9 in group 1833 leading to the contacts 1 to 10 of twenty-fives relays 18B23 to 18B26. For each hundreds wire 0 to 9, contacts 1 to 10 of relays 18B23 to 18B26 provide four branch extensions, one for each of the four groups of twenty lines within the concerned group of a hundred. These forty branch extensions comprise the forty P wires PA1 to PD10 over one or another of which the translated primary digit for any call is sent to the required line-link frame. The first ten of these P wires are the wires PA1 to PA10 in group 1841. They lead respectively to wires P1 to P10 extending to line-link frame A, while the second, third, and fourth groups of these P wires are wires PB, PC, and PD in groups 1842 to 1844, leading to line-link frames B, C, and D, respectively. The translated primary (or twenty-fives) digit for any translated number 111 to 055 for the line-link frame is thus determined jointly by hundreds register relays 18A1 to 18A10 in cooperation with the four twenty-fives relays 18B23 to 18B26.

XD4b. *The translated fives digit (1 to 5)*

As noted, each line-link frame has a separate group of fives wires F1 to F5 extending thereto. The five values (1 to 5) of the translated fives digit are transmitted to any line-link frame over these wires, which are respective extensions of wires contained in groups 1841 to 1844. Five common fives wires 18F1 to 18F5 originate at the contacts of fives relays 18B15 and 18B16. They are connected to the fives wires of line-link frame A, B, C, or D, depending upon which of the 250's relays 18B27 to 18B30 is operated. Any such relay effects the noted connection at its contacts 1 to 5.

For any translated line number, the common fives wire 18F1 to 18F5 which becomes grounded depends jointly upon the tens digit registered and upon whether fives relay 18B15 or 18B16 is operated. The variations in the value of the translated fives digit are based on the division of any 100-line group of numbers (00 to 99) into four groups of twenty-five, and the further division of each group of twenty-five into five groups of five, as shown in the following table.

*Fives-group translation table for any 100-line group*

| 25's | 1st Five | 2nd Five | 3rd Five | 4th Five | 5th Five |
|---|---|---|---|---|---|
| 1st | 00-04 | 05-09 | 10-14 | 15-19 | 20-24 |
| 2nd | 25-29 | 30-34 | 35-39 | 40-44 | 45-49 |
| 3rd | 50-54 | 55-59 | 60-64 | 65-69 | 70-74 |
| 4th | 75-79 | 80-84 | 85-89 | 90-94 | 95-99 |

The numbers in the body of the above table are the tens and units digits of the lines forming the successive fives groups within the group of 100. The first two tens group of lines (tens digits 0 and 1) furnish the first four fives groups in the first 25's group within the hundred, while the third tens group (tens digit 2) embraces the last five lines of the first 25's group and the first five lines in the second 25's group. The fourth and fifth tens groups (tens digits 3 and 4) furnish the last two fives groups in the second 25's group. Consequently, the value of the translated fives digit runs from 1 to 5 for the five five-line groups comprising lines 00 to 24, and starts over again with the value of 1 for lines 25 to 29, and progresses through 2 to 5 for lines 30 to 49. The translation required for the second fifty lines of the hundred is clearly a repetition of the translation required for the first fifty lines of the hundred. That is, the first and third 25's groups within the hundred each starts with two full ten-line groups and ends with the first half of the next succeeding ten-line group, while the second and fourth 25's groups within the hundred start with the last five lines of a ten-line group and end with the next two succeeding ten-line groups.

Contacts 2 of tens register relays 18A11 to 18A20 are supplied with ground over conductor F of group 1831, and are connected to the common fives wires 18F1 to 18F5 over wires 0 to 4 in group 1834, and through contacts 1 to 5 of fives relays 18B15 and 18B16 according to the foregoing. For the first fifty lines of a hundred, wires 0 to 4 in group 1834, which are connected to contacts 2 of the first five tens relays 18A11 to 18A20, are so interconnected, as shown, with the contacts 1 to 5 of fives relays 18B15 and 18B16, that any such wire becomes connected with one or another of two of the common fives wires 18F1 to 18F5 according to which one of the fives relays 18B15 and 18B16 is operated. These same five wires 0 to 4 are employed also for the second fifty lines in the hundred by being multipled to the contacts 2 of the last five tens register relays 18A16 to 18A20, respectively representing called tens digits 5 to 9.

XD4c. *The translated units digit (1 to 5)*

As noted, each line-link frame A to D has a separate group of units wires U1 to U5 extending thereto. The five values (1 to 5) of the translated units digit are transmitted to any line-link frame over these wires, which are respective extensions of wires in groups 1841 to 1844. Five common units wires 1837-U1 to 1837-U5 originate at the contacts 11 of units relay 18A21 to 18A30. They are connected to the units wires UA, UB, UC, or UD of line-link frame A, B, C, or D, depending upon which of the 250's relays 18B27 to 18B30 is operated.

For any translated number the common units wire grounded depends solely upon the units digit registered. The correspondence is as follows:

| Registered Units Digit | Translated Units Digit |
|---|---|
| 0 or 5 | 1 |
| 1 or 6 | 2 |
| 2 or 7 | 3 |
| 3 or 8 | 4 |
| 4 or 9 | 5 |

Registered units digits 0 to 4 or 5 to 9 correspond respectively to translated units digits 1 to 5. This is because the first five lines of a decimal group of ten comprise a complete group of five on a primary switch, and the last five lines of the decimal group comprise a separate complete group of five on that primary switch, or on the next one, as seen in the preceding fives-group translation table, or in Fig. 21.

In accordance with the foregoing, the first five units register relays 18A21 to 18A25, and the last five units register relays 18A26 to 18A30, at their contacts 11, respectively ground the common units wires 1837-U1 to 1837-U5.

XD5. *The called line is No. 111*

If, for example, the called line is No. 111, the hundreds, tens, and units digits called are 1, 1, and 1. If so, the operated hundreds, tens, and units register relays are the second hundreds relay 18A2, the second tens relay 18A12, and the second units relay 18A22. The first fives relay 18B15 is operated by contacts 12 of relay 18A22; the first 25's relay 18B23 is operated by contacts 4 of tens relay 18A12; and the first 250's relay 18B27 is operated by contacts 4 of hundreds relay 18A2.

XD5a. *Translated primary digit 5 for frame A*

Contacts 2 of the second hundreds relay 18A2 ground hundreds wire 1 in group 1833. Ground on this wire is extended through contacts 2 of the operated twenty-fives relay 18B23 to the fifth primary wire PA5 in group 1841 extending to line-link frame A.

XD5b. *Translated fives digit 3 for frame A*

With the second tens relay 18A12 and the first fives relay 18B15 operated, ground through contacts 2 of relay 18A12 is extended over wire 1 of group 1834 and thence through closed contacts 3 of relay 18B15 to the third common fives wire 18F3. With the first 250's relay 18B27 operated, ground on this wire is extended through contacts 3 of relay 18B27 to fives wire FA3 in group 1841, extending to line-link frame A.

XD5c. *Translated units digit 2 for frame A*

Contacts 11 of the second units relay 18A22 ground the second common units wire 1837–U2, thereby grounding the units wire UA2 of line-link frame A through contacts 7 of the first 250's relay 18B27.

By the foregoing operation, the assumed registration of line No. 111 in the block translator results in the transmission of translated number 532 to line-link frame A. This accords with Fig. 21, part 1, where the translated digit information appearing under line No. 111 is 532 at line-link frame A.

XD6. *Line-controller response*

The line controller 1200 on line-link frame A responds as described to the primary and fives digits 5 and 3 in the translated line number by operating the associated line-controller switches 1000 and 1100 to select the indicated primary switch 800 on the frame and the indicated fives group thereon. The units relay group in the line controller responds to the units digit of the translated number by selecting the indicated called line 1 in the group of five.

As hereinbefore described, the line controller 1200 on the called line-link frame grounds its terminating frame wire TF, which identifies the line-link frame in the block controller, which thereupon conditions itself as described for routing the call to the identified line-link frame over an idle terminating trunk extending thereto, and for routing the call to the particular called line selected by the line-controller switches and the line controller.

XD7. *Clearing out*

When the operations necessary to extend the connection to the called line, if idle, have been completed, the block controller initiates the hereinbefore described clearing-out operation, which includes the restoration of the operated terminating-chain relay 512 in the connected block coupler 500. Restoration of this relay removes ground from the marked hundreds, tens, units, and stations wires extending to the block translator 1800. When this occurs, the operated digit register relays of Fig. 18 restore. The other operated relays of the block translator responsively restore. The block translator is thereby cleared out, and marking ground is removed from the translated-digit wires P1 to U5 extending to the called line-link frame.

XE. *General operation for overriding translation*

As previously noted, the block translator provides the following standard services by substituting overriding translation for the normal fixed translation for concerned called line numbers:

1. Number-transfer service.
2. Intercept service.
3. Common-number service.
4. 20-station code-ringing service.

XE1. *Detecting specific line numbers*

Number-transfer service, intercept service, or common-number service are given depending on a specific line number being registered in the translator 1800. The setting up of that line number in the translator must be specifically detected to cause the normal fixed translation for that line number to be superseded by pre-assigned overriding translation required according to the service assigned to the specific line number.

The noted detecting operation is performed by individual detector relays separately assignable to desired line numbers. The detector relays are:

1. 18E1 to 18E30 for number-transfer service;
2. 18D15, 18D18 (not shown), 18D21, and 18D24 to 18D29 for common-number service; and
3. 18F1 to 18F20 for intercept service.

Each detector relay has two windings, as shown, and is adjusted to operate only if both windings are energized. As described, for each detector relay, these windings are wired to separate detector terminals D1 and D2 in the common field, terminal-pin sections 1902 to 1904, Fig. 19. To prepare a detector relay to detect a specific called number, a two-conductor jumper is run from its terminal pins D1 and D2 to carry the winding terminals of the detector relay to two terminal pins in the field, section 1901 of Fig. 19. One such terminal pin is a hundreds pin in group 1 or 2 of this field, while the other is a tens and units pin in group 3 or 4 of this field. Ground appears on both such terminal pins only when a specific number is called. The concerned detector relay then opeartes, for both its windings are energized, each over a separate wire of the noted detector jumper. Jumpers 1951 to 1953 are three examples of the noted two-wire detector jumpers.

Hundreds relays 18A1 to 18A10 at contacts 1 respectively ground the hundreds wires H0 to H9 in group DF1. These wires extend to the detector field section 1901 and are strapped across the first ten levels respectively. These levels thus comprise hundreds detector bus bars.

Contacts 1 of tens relays 18A11 to 18A20 and contacts 1 to 10 of units relays 18A21 to 18A30 cooperate to control one hundred tens and units wires 00 to 99 in group DF2. The one which corresponds to the registered combination of tens and units digits is grounded through contacts 1 of the operated tens register relay, over the concerned wire 0 to 9 in group 1832, and a contact 1 to 10 of the operated units relay 18A21 to 18A30. These one hundred tens and units wires extend to the respective terminals in groups 3 and 4 (levels 11 to 20) of the detector field, section 1901.

Reset relay 18D3 is controlled by the detector relays to cancel the normal fixed translation and terminals in the common field are controlled by the detector relays to supply overriding translation through jumpers extending to strapped pin levels in the reset field (sections 1906 to 1909), to which conductor groups RF1 to RF4 carry a multiple of the P, F, and U wires outgoing to the line-link frames.

XF. *Number-transfer service*

While the ten line links 202 of a line-link primary switch 800 are ample to provide a good busy-hour grade of service for twenty-five connected lines of more than average traffic, the ten line links serving a line-link primary switch can be overloaded during the busy hour if too many of the twenty-five connected lines are high-traffic lines.

The obvious remedy for an overloaded primary switch 800 is to change jumpers such as 201 and 209 on the M. D. F. (Figs. 2, 4, and 7) to transfer some of its high-traffic lines to spare line locations of other line-link primary switches. Or, if enough spare line locations do not exist, low-traffic lines are transferred back to replace the transferred high-triffic lines. Such a jumper transfer, when made, divorces the transferred line from its original directory number and associates it with the one belonging to its new line-terminal location. If nothing further were done, any transferred line would require a new directory number.

Since changes in the directory numbers of working lines are bothersome to the operating company and to the subscribers, the block translator has been arranged to provide overriding translation to perform number-transfer service which enables any transferred line to retain its original directory number. By this service, the directory number is made to follow the transferred line.

*XF1. Transfer-relay assignment*

When number-transfer service is to be applied to a transferred line (to permit the noted retention of its old directory number), an available one of the thirty transfer relays 18E1 to 18E30 is assigned to the transferred line.

Referring to Fig. 21, it may be assumed that pursuant to balancing the traffic load among the primary switches on the line-link frames, line number 512 has been transferred on the main distributing frame M. D. F. to the directory-number line location 910, and that number-transfer service is to be applied to enable the transferred line to retain its original directory number. The transferred line (512) was initially served by the first primary switch on line-link frame C, third fives group, third line. Its normal fixed translation was C133. In its new location (910), line 512 is served by the seventh primary switch on line-link frame D, third fives group, first line. Its required overriding translation is therefore D731. The registration of number 512 in the block translator must therefore result in overriding translation D731.

Number-transfer relay 18E1, if available, may be assigned to transfer calls for transferred line 512 to its new location. The first column in five-level group 2 of section 1903 is assigned to relay 18E1. A two-wire detector jumper 1952 is installed to operate relay 18E1 to cancel the normal fixed translation (C133) whenever the directory line number 512 is registered in the translator, and a three-wire reset jumper 1958 is installed to provide overriding translation (D731) corresponding to the new line-terminal location of the transferred line.

*XF1a. Detector jumper 1952*

The detector terminal pins D1 and D2 of the first number-transfer relay 18E1 are in column 1, levels 4 and 5 of group 2 in section 1903 of the common field, wires D1 and D2 of the two-wire detecting jumper 1952 are connected to these terminals. At the other end of the jumper 1952, its wires D1 and D2 are connected to the detector terminals for line number 512, the directory line number of the transferred line.

The hundreds digit 5 is detected by connecting wire D1 of jumper 1952 to any terminal pin in level H5 of section 1901.

The tens and units digit combination 12 is detected by connecting the wire D2 of jumper 1952 as shown to the terminal pin which is in tens level 1 and units column 2 of the detector field.

*XF1b. Reset jumper 1958*

The required overriding translation (D731) is assigned to number-transfer relay 18E1 by running the three-wire reset jumper 1958 as shown between its P, F, and U pins and the required reset P, F, and U pin levels in section 1909 of the reset field. Wire P is connected to level PD7, wire F is connected to level FD3, and wire U is connected to a pin in level UD1.

The foregoing preparations adapt the block translator 1800 to provide overriding translation D731 for transferred line number 512 in substitution for its normal fixed translation (C133).

*XF2. Number-transfer operation*

With the noted jumpers 1952 and 1958 installed for the first number-transfer relay 18E1, if the original directory number of transferred line 512 is called, the consequent registration of the directory-number hundreds, tens, and units digits 5, 1, and 2 in the translator causes transfer detector relay 18E1 to operate as follows:

*XF2a. Detection*

Registration of hundreds digit 5 causes ground, through contacts 1 of relay 18A6, and over wire 5 of group DF1, to appear on the hundreds bus-bar level H5 of the detector field (section 1901), closing a circuit over wire D1 of the attached jumper 1952, the concerned pin D1 in section 1903, and attached conductor in group CF10, for the lower winding of detector relay 18E1. At the same time, registration of tens and units digits 1 and 2 causes ground through contacts 1 of tens relay 18A12, wire 1 in group 1832, contacts 2 of relay 18A23, and wire 12 in group DF2 to appear on the tens and units terminal pin 12 in the detector field, closing a circuit over wire D2 of the connected jumper 1952 for the upper winding of the detecting number-transfer relay 18E1.

*XF2b. Resetting*

Relay 18E1, which will not operate when only one winding is energized, now operates because both windings are energized. Its contacts 1 to 3 connect the associated wires P, F, and U in group CF10 to the corresponding wires in group 1804, through which number-transfer overriding translation is controlled. Wires 1804 are common to the thirty number-transfer relays 18E1 to 18E30. They comprise the normal extension of wires 1803 which originate at the open front contacts of reset relay 18D3. The predetermined overriding translation is thus withheld until the normal fixed translation has been erased.

Reset relay 18D3 is operated through contacts 4 of any relay 18E1 to 18E30. It disconnects ground from wires P, F, and U in group 1831, thereby removing ground from contacts 2 of the hundreds and tens register relays and from contacts 11 of the units register relays, thereby cancelling the normal fixed translation (C133) for the called line number 512, by removing ground from the connected primary, fives, and units wires in group 1843. Reset relay 18D3 also extends ground, over wires 1803, and through break contacts 1 to 3 of the unoperated reset relay 18D4, to the overriding common wires P, F, and U in group 1804. Resetting ground is thereby extended through contacts 1 to 3 of relay 18E1, and over wires P to U in subgroup 1 of group CF10, and their connected terminal pins, to each of the conductors in the three-wire reset jumper 1958. Ground is thereby applied to wires PD7, FD3, and UD1 in group RF4, multipled to the corresponding wires in the frame-D group 1844. Overriding translation D731 is thus substituted for the normal fixed translation C133.

*XF2c. Line-controller response*

The line controller 1200 on line-link frame C, which has no more than barely started to position the associated line-controller switches for the normal fixed translation C133, is released responsive to the described cancellation of the normal fixed translation by reset relay 18D3. The line controller 1200 on line-link frame D is activated as hereinbefore described by the overriding translated number D731.

When the overriding translation is for the same line-link frame as the cancelled normal fixed translation, the relay groups comprising digit registers in the concerned line controller clear out when relay 18D3 operates as described, and are immediately reset by the overriding translated number.

When the ensuing operations have been completed as hereinbefore described, restoration of the hundreds, tens, and units register relays of block translator 1800 restores detector relay 18E1, which restores reset relay 18D3.

*XF2d. Freeing a number-transfer relay*

If a directory-number change is later made (as upon the issuance of a new directory), or if the normal turnover and reassignment of lines permits the noted transferred line 512 to be transferred back to its original switchboard location, the concerned number-transfer jumpers 1952 and 1959 are removed, freeing the associated number-transfer relay 18E1 for assignment to another transferred line.

XG. *Intercept service*

As previously pointed out, number-intercept service is provided by the block translator 1800 by providing overriding intercepting translation on calls for disconnected lines or stations, to reroute such calls to an intercept operator. Up to twenty separate lines can be placed on intercept service by assigning intercept detector relays 18F1 to 18F20 respectively to them. Intercept call-in relay 18D30 is controlled by any relay 18F1 to 18F20 to call in three intercept trunks for test by the P. B. X allotter.

XG1. *Intercept-relay assignment*

When number-intercept service is to be applied to a line, an available one of the twenty intercept detector relays 18F1 to 18F20 is assigned thereto, and a two-wire line-detecting jumper and a one-wire station-detecting jumper are installed as illustrated at 1953 and 1956 for the twentieth intercept-detector relay 18F20.

*XG1a. Detecting line number 959*

If, for example, intercept service is to be provided for line No. 959, or for a station disconnected from that line if it is a multi-station line, intercept detector relay 18F20 if available, may be assigned to this line number.

The pin-terminal location for intercept relay 18F20 lies in the common field, section 1904, column 10, the five pins under "intercept 20". The fourth and fifth of these pins (opposite D1 and D2) are the detector terminals. A two-wire detector jumper 1953 is run from these pins to the terminal pins in the detector field representing line number 959. The first wire of the jumper detects the hundreds digit 9 when connected to a terminal pin in the level H9 of the detector field, while the second wire of the jumper detects the tens and units digits 5 and 9 when connected to the detector-field pin 9 in tens level 5 opposite the tens numeral 5 and under the units numeral 9 on the drawing. With this two-wire detector jumper installed, relay 18F20 operates subject to line number 959 being registered in the translator, as explained for number relay 18E1, jumper 1952, and line number 512.

*XG1b. Line intercept for line 959*

The first three terminal pins in the group of five assigned to relay 18F20 (those in group 2 of section 1904 under the notation 20 and opposite the numeral 1, 2, and 3 on the drawing), are assignable respectively to stations which have been disconnected from a multi-station line. The wires leading to these pins are respective extensions of the wire which operates call-in relay 18D30, through respective make contacts of relay 18F20.

If line (959) to which detector relay 18F20 is assigned is an individual line, all calls thereto are to be intercepted. In this event, one of the noted terminal pins 1 to 3 is jumper-connected to ground at level 20 of the sleeve field, as shown for station jumper 1957 which is associated with set 19 of the intercept sets of terminal pins. When such a jumper is installed for intercept set 20, current flows from ground thereover to operate intercept call-in relay 18D30 whenever relay 18F20 operates, irrespective of the registered stations digit. This operation is termed line intercept.

*XG1c. Station intercept for line 959*

On the other hand, if the line (959) to which relay 18F20 has been assigned by jumper 1953 is a multi-station line from which a specific station has been disconnected, one of the station pins 1 to 3 in the said set intercept 20 is jumpered to the station bus bar corresponding to the station digit of the disconnected station. Jumper 1956 extends from terminal 1 of this set to stations bus bar ST2. The station bus bars ST0 to ST9 comprise the horizontally strapped pins in the levels terminating wires ST0 to ST9 in group CF12. These wires are grounded respectively by contacts 1 of station-register relays 18B1 to 18B10, which record stations digits 0 to 9 respectively.

With jumpers 1953 and 1956 in place, relay 18F20 operates whenever line number 959 is registered, but without effect except when stations digit 2 is registered to ground wire ST2 in group CF12. Ground then passes over jumper 1956, wire 1 in subgroup 20 of group CG11, and contacts 1 of relay 18F20 to relay 18D30.

*XG1d. Multi-station intercept service*

If two disconnected stations of the same line are on intercept service, two of the station pins 1 to 3 of the concerned group (such as intercept 20) are connected to respective station bus bars. If three disconnected stations of that line are on intercept service, all three station pins 1 to 3 are connected to respective stations bus bars.

*XG1e. More than three stations on intercept service*

If more than three stations of a line are on intercept service at the same time, two or more detector-intercept relays may be assigned to the same line number to provide the required number of station-intercept pins for connection to respective stations bus bars.

XG2. *Intercept call-in*

As above described intercept call-in relay 18D30 is operated from ground supplied through a contact 1 to 3 of any one of the intercept detector relays 18F1 to 18F20. Contacts 14 of relay 18D30, ground wire 1806, operating reset relay 18D4 and 18D3 in series. Reset relay 18D4 disconnects wires 1803 from wires 1804 and transfers them to wires P, F, and U of group 1805 extending to the group allotter, (relays 18D5 to 18D14). Contacts 4 of relay 18D4 places battery through resistor 1802 on locking-battery wire LB of the group allotter.

Reset relay 18D3 disconnects ground from the P, F, and U wires in normal fixed translation group 1831, and extends ground through make contacts 1 to 3 of relay 18D4 to wires P, F, and U extending to the group allotter. The normal fixed translation for the called line number has thus been cancelled, and circuits are prepared for transmitting overriding translation under the control of the group allotter.

At its contacts 1 to 12 (contacts 5 to 8 not shown) intercept call-in relay 18D30 also calls in the sleeve and reset wires of group PJ, representing the three lines (011, 111, and 211) of line-link frame A which are used as intercept trunks as needed.

XG2*a*. *Intercept-trunk sleeve wires*

As shown in Fig. 19, part 3, the sleeve wires S1 to S3 of group PJ, called in by relay 18D30, represent respective extensions of the first three sleeve wires (S1 to S3) of the thirty transfer sleeve wires S1 to S30 extending between the block translator and the previously noted sleeve bunching block (not shown) on line-link frame A. If all three of the pre-determined lines (011, 111, and 211) are in use for intercept service, all three of the noted sleeve wires S1 to S3 are jumpered on line-link frame A to the respective individual sleeve wires S of these lines. The individual sleeve wires of the three lines used as intercept trunks are thus now connected respectively to movable contact members 4, 8 (not shown), and 12 of relay 18D30. Through make contacts 4, 8, and 12 of relay 18D30, these wires S1 to S3 are connected over wires S in trunk groups 1811 to 1813 to the upper terminals of group-allotter relays 18D5 to 18D7 (18D6 not shown). The lower terminal of each group-allotter relay 18D5 to 18D14 is connected to ground through the preference lockout chain, which comprises a chain-end wire common to the ten relays and series chain contacts 5 on all of them.

XG*b*2. *Setting the group allotter*

If all three lines used as intercept trunks are idle, relays 18D5 to 18D7 now operate from battery normally on the sleeves of the respective lines 011, 111, and 211, through their respective primary hold magnets (such as 403–HM, Fig. 4). Each such allotter relay first closes its preliminary-make contacts 4 to lock itself to locking-battery wire LB. The resulting locking circuit gives the allotter relay ample operating current and effectively shunts the associated primary hold magnet (such as 403–HM) to prevent it from operating at this time.

XG3. *Overriding translation for first intercept trunk*

Each noted allotter relay, at its contacts 5 locks its lower winding terminal to the associated incoming ground wire of the preference lockout chain, and opens the lockout chain to the next succeeding relay. At its contacts 6, any such relay disconnects its lower winding terminal from the end of the lockout chain. As a result, when relays 18D5 to 18D7 operate, the first relay 18D5 locks effectively and remains operated, while the succeeding relays 18D6 and 18D7 immediately restore upon being deprived of operating ground by the preferred relay 18D5. Whenever any two or more relays of the group allotter operate at the same time, the one having first position in the chain operates and locks effectively, restoring the remaining ones.

Having operated and locked effectively, allotter relay 18D5 (at its contacts 1 to 3) connects wires P, F, and U of trunk group 1811 to the wires P, F, and U of common group 1805, which are grounded as noted through contacts of relays 18D3 and 18D4. P, F, and U ground is thus extended through make contacts of call-in relay 18D30 to the reset wires P1, F3, and U2 in group PJ. As shown in Fig. 19, these reset wires are wired to the corresponding frame-A reset wires of the translator. The required overriding translated number A132 for the first intercept trunk (line 011) is thus substituted for the normal fixed translation corresponding to the number called.

XG4. *Using the second and third intercept trunks*

When the first trunk of the intercept group is busy, the first group-allotter relay 18D5 fails to operate, being shunted by ground on the sleeve wire of the trunk (line 011). Then, if the second intercept trunk (line 111) is idle, relays 18D6 (not shown) operates effectively to extend P, F, and U ground over the second trunk group wires 1812 (not shown) and through contacts in group 4 to 8 (not shown) of relay 18D30 to reset wires P5, F3, and U2 in group PJ, causing overriding translated number A532 to be transmitted to extend the call to the second intercept trunk (line 111).

When the first two trunks of the intercept group are busy and the third trunk is idle, the third allotter relay 18D7 operates effectively, grounding wires P9, F3, and U2 in group PJ, through contacts 9 to 11 of relay 18D30 to send out the translated number A932 for the third intercept trunk (line 211).

XG5. *Clearing out*

When the connection has been completed to the line constituting the selected trunk indicated by the overriding translated number, ground appears on the individual sleeve wire thereof as hereinbefore described, thereby shunting the concerned relay (such as 18D5) of the group allotter. The allotter relay, however, remains operated long enough to accomplish its purpose, for a short-circuited relay is slow restoring.

When the translator clears out as described, the operated intercept relay 18F20 restores, followed by the restoration of call-in relay 18D30 to restore relays 18D3 and 18D4. Contacts 4 of relay 18D4 remove locking battery from wire LB, unlocking and restoring any operated relay in the group allotter.

XG6. *All intercept trunks busy*

When all three of the noted intercept trunks are busy when tested by the group allotter, no relay of the allotter operates, wherefore the cancelled normal fixed translation for the called number is not replaced by overriding translation. The block controller 1680 is thus unable to proceed with the call for the lack of a frame-identifying signal over a wire TF. It therefore "times out" through its cycle timer, as described, and conditions the connected block coupler 590 to return a terminating busy tone to the calling line.

XG7. *Number-transfer and intercept service for the same line*

Number-transfer service and number-intercept service may both be applied to the same line, as when a transferred multi-station line has been provided with number-transfer service to avoid a directory-number change, following which a station is disconnected from the transferred line. Thereupon, the directory number of the disconnected station is jumpered for intercept service as described. In that event, when the concerned line number is called, a number-transfer relay (such as 18E1) and an intercept relay (such as 18F20) both operate on detecting the called number.

If a working station on the line is called, intercept call-in relay 18D30 remains restored, and the operation of the number-transfer relay is effective to cause overriding translation to direct the call to its transferred line location. But, if the noted disconnected station is called, call-in relay 18D30 is operated as previously described, thereby operating reset relay 18D4 along with reset relays 18D3 to transfer the overriding P, F, and U ground from wires 1804 of the number-transfer relays to wires 1805 of the group allotter. The overriding number-transfer translation is thereby set aside in favor of the required intercept translation.

XH. *Common-number service*

A subscriber having a group of lines (rather than only one) extending to his premises commonly desires that a common directory number be assigned to the group, and that the call be completed to any idle line of the group when the common number is called. Such lines are commonly termed trunks, particularly if they terminate at the switchboard of a private branch exchange (P. B. X) on his premises, rather than at separate telephone sets as they sometimes do.

Common-number service involves the group allotter (relays 18D5 to 18D14) and one or another of the nine relay equipments PBX1 to PBX9, (Fig. 18, parts 2 and 3), which are assignable to respective common-number groups of lines. Each ten-trunk common-number group requires a three-relay equipment such as PBX1 to PBX3, and each three-trunk common-number group requires but a single-relay equipment such as PBX4 to PBX9. A ten-trunk relay equipment (PBX1 to PBX3) can of course serve a group containing any desired number of trunks less than ten, while a three-trunk relay equipment (PBX4 to PBX9) can serve a group of two trunks or of three trunks.

The group allotter is connected with each of the ten-trunk relay equipments PBX1 to PBX3 over ten four-wire trunk sets 1811 to 1820. Each trunk set includes wires P, F, U, and S. These wires represent the translated primary, fives, and units digits, and the sleeve wire for an assigned trunk, as described for trunk sets 1811 to 1813 which are employed for intercept service as described.

The assignment of the trunk sets 1811 to 1819 to the three-trunk relay equipments PBX4 to PBX9 is such that two or three three-trunk equipments combine to serve a six-trunk group or a nine-trunk group, as required. This combining is performed by connecting the detector terminals D1 and D2 of two or three three-trunk relay equipments to detect the same line number. For this purpose the trunk sets 1811 to 1819 are connected to the three-trunk relay equipments PBX4 to PBX9 progressively as given in the following table:

*Trunk-set progression*

| Relay Equipment | PBX4 | PBX5 | PBX6 | PBX7 | PBX8 | PBX9 |
|---|---|---|---|---|---|---|
| Relay No. | 18D24 | 18D25 | 18D26 | 18D27 | 18D28 | 18D29 |
| Trunk Sets | 1811 | 1814 | 1817 | 1811 | 1814 | 1817 |
| | 1812 | 1815 | 1818 | 1812 | 1815 | 1818 |
| | 1813 | 1816 | 1819 | 1813 | 1816 | 1819 |

XH1. *Making up a P. B. X group*

When a P. B. X group (or a similar common-number group) is to be made up, a call number is assigned to the group, along with the specific lines which are to serve as trunks, and an available relay equipment PBX1 to PBX9 is assigned to the group.

Then, from pins in the concerned group in section 1901 or group 1 of section 1902, a two-wire detector jumper is run to identify the assigned relay equipment with the assigned called number, and a sleeve jumper and a three-wire reset jumper are run for each line which is to form a trunk of the group.

XH1a. *Using ten-trunk equipment PBX1 for group 000*

If, for example, the call number containing hundreds, tens, and units digits 0, 0, and 0 is to be assigned to a ten-trunk group to be made up, the ten-trunk relay equipment comprising relays 18D15 to 18D17 may be used if available. The terminal pins PBX1 assigned to this relay equipment comprise the first five levels (group 1) of section 1902 in the common field. The first four of these levels represent the primary, fives, units, and sleeve wires (P, F, U, and S) of the respective trunks T1 to T10 to be assigned to the group. The first two terminal pins in the fifth level of this section are the detector pins D1 and D2 for the group. A two-wire jumper 1951 is run from these terminals D1 and D2 to detect line number 000 in the detector field. The hundreds digit 0 is detected on the hundreds level H0, while the tens and units digit 0 and 0 are detected on pin 0 in level 0.

Ordinarily (though not necessarily) the specific line bearing the directory number of the common-number group forms a trunk of the group, and may, or may not, be assigned to the group as trunk 1 thereof. If, for example, line 485 is assigned as trunk 1 of the group, a three-wire reset jumper 1954 is run from the P, F, and U pins of set T1 of the group to the tenth primary, the third fives, and the first units levels in the frame-B (1907) section to predetermine translated number B031 to direct the call to line 485 when the first trunk of the group is selected.

The sleeve pin S for pin set T1 of the group is connected by a jumper 1955 to an available one of the thirty sleeve pins for frame B, such as sleeve pin S10 in the frame-B group. The corresponding sleeve pin on the sleeve bunching block (not shown) on line-link B is jumpered to the sleeve wire of the concerned line 485. In a similar manner, sleeve and reset jumpers are installed for each of the other lines which are to serve as trunks in the group.

XH2. *Calling common-number group 000*

With jumpers installed as noted, the registration of the common-line number 000 in the translator results in the energization of both windings of detector relay 18D15 over wires D1 and D2 of jumper 1951. Relay 18D15 thereupon operates. Its contacts 13 operate relays 18D16 and 18D17, and its contacts 14 operate reset relays 18D3 and 18D4 over wire 1806.

Contacts 1 to 12 of relay 18D15 and contacts 1 to 14 of relays 18D16 and 18D17 connect the P, F, U, and S wires of the trunk groups 1 to 10 in wire group CF1 respectively to the ten conductor sets 1811 to 1820 associated with relays 18D5 to 18D14 of the group allotter. The jumper pairs including jumpers 1954 and 1955 are thereby connected to the respective relays of the group allotter. The first relay in the group allotter which corresponds to a currently idle trunk in the connected group effectively operates and locks to battery placed on wire LB by relay 18D4 as described for number-intercept service. Any succeeding operated relays of the allotter are thereby open-circuited and restored.

With reset relays 18D4 and 18D3 operated, the normal fixed translation for the called number is cancelled, and over-riding translation is effected (over a jumper such as 1954) according to the switchboard location of the first idle trunk of the group, causing the call to be directed thereto as explained for number-intercept service.

XH2*a*. *All common-number trunks busy*

If all trunks of a called common group are busy, the allotter relay 18D5 to 18D14 all remain restored, wherefore no overriding translation is provided, although the normal fixed translation is cancelled by relay 18D4. The block controller 1600 therefore "times out" for lack of a frame identifying signal, setting the connected block coupler 500 to return a busy signal as described.

XH3. *Making up three-trunk groups*

The three-trunk relay equipments (relays 18D24 to 18D29) are represented by columns of terminal pins in the last five levels of (group 4) section 1902, and in the first five levels (group 1) of section 1903. When the directory-number and the make up of the lines of a three-trunk common-number group are assigned, the detector terminals D1 and D2 of an available terminal-pin group PBX4 to PBX9 are jumpered to the required points in the detector field (section 1901) to secure operation of the associated three-trunk relay (18D24 to 18D29) and the three sets of P, F, U, and S wires are jumper-connected to the required reset and sleeve terminals as described for the ten-trunk group.

XH4. *Making up six-trunk and nine-trunk groups*

When a six-trunk group is to be made up, two adjacent three-trunk relays (such as 18D24 and 18D25) may be used. Both sets of associated detector pins D1 and D2 (Fig. 19) are wired to the same pins in the detector field, causing both three-trunk relays to operate when the assigned group number is registered in the translator. The six trunks of the combined group are thereupon tested as a single group of six, employing six of the trunk sets 1811 to 1819 as shown in the preceding table "Trunk-Set Progression." Similarly, a third one of the three-trunk relays 18D24 to 18D29 can be added to increase the trunk-group capacity to nine, provided the third relay selected is one which does not cause an overlap in the use of trunk sets 1811 to 1819 and corresponding relays of the group allotter.

XJ. *Twenty-station code-ringing service*

As noted, when the block couplers 500 are replaced by code-ringing block couplers as shown at 2200, Fig. 22, the block translator 1800 provides for twenty-station code-ringing service. In the illustrated embodiment, this service is limited to the lines in the fourth fives group of any primary switch 800 on line-link frame A. When this service is applied, the block translator 1800 grounds code-control wire CC (extending therefrom to the block couplers 2200) whenever the station called on a twenty-station line is one of the second ten stations thereon.

As described in detail hereinafter, the block couplers 2200 are arranged normally to provide a code in accordance with the dialed stations digit for any one of the first ten stations on a line. When the translator grounds code-control wire CC, code-control relay 2251 in the connected block coupler 2200 is operated and locked to cause a preliminary ringing signal to be sent out just before the transmission of the selected code, thereby identifying the corresponding station in the second group of ten. That is, the second ten codes are the same as the first ten codes except that each code of the second ten includes a preliminary ring.

Each twenty-station line requires two line numbers: (1) the normal line number, to which the station digit is suffixed for the first ten station codes, and (2) a second line number, to which the station digit is suffixed for the second ten stations codes on the twenty-station line. The five first line numbers and the five second line numbers for five twenty-station lines served by a primary switch 800 on line-link frame A are those normally assigned to the fourth and fifth fives group of lines on the switch. For example, referring to Fig. 21, part 1, if the first primary switch 1 on line-link frame A is assigned to twenty-station code-ringing service, the lines in the fourth fives group on this switch are the twenty-station lines. Their respective first line numbers are 015 to 019, and their respective second line numbers are 020 to 024, being the numbers normally assigned to lines occupying the fifth fives group on the primary switch.

Assigning this primary switch to twenty-station service thus effectively abolishes the five lines (020 to 024) forming the fifth fives group. Their terminals must be left vacant on the main distributing frame M. D. F. The line capacity of any line-link primary switch assigned to twenty-station service is thus reduced from twenty-five lines to twenty. Arrangements are accordingly provided to assign the primary switches of line-link frame A to twenty-station code-ringing service only as needed, thereby minimizing the reduction in line capacity to no more than the current requirements for the installation.

XJ1. *Assigning a primary switch to twenty-station service*

Primary relay 18D1 of the twenty-station pair is arranged to be operated from any one of the primary wires PA1 to PA10 of line-link frame A. Wire group SF2 contains branch wires 1 to 10 corresponding to wires PA1 to PA10, and a separate isolating resistor 1801 is included in each to avoid connecting two or more wires PA1 to PA10 together when two or more primary switches are assigned to twenty-station service. The ten wires in group SF2 are extended to the respective terminal pins of level 4 of group 1 in the sleeve field, section 1905. A multiple of the wires PA1 to PA10, the primary wires for line-link frame A, comprises group 1915 extending to the respective pins in level 5 of the last-noted group in the sleeve field.

When any primary switch on line-link frame A is assigned to twenty-station service, a vertical strap 1960 is connected between the corresponding pins in the noted levels 4 and 5 of the sleeve field. The illustrated vertical straps 1960 assign primary switches 2, 3, and 4 to twenty-station service.

XJ2. *Twenty-station primary detection*

With straps 1960 installed as illustrated, when a call is directed to one of the associated primary switches 2, 3, and 4 on line-link frame A, the consequent translation ground on primary wire PA2 to PA4, closes a circuit over the corresponding wire in 1915, concerned strap 1960, wire 2, 3, or 4 in group SF2, and through a resistor 1801 to primary relay 18D1. Primary relay 18D1 thereupon operates as an indication that the called line is served by a primary switch which has been assigned to twenty-station service.

XJ3. *Twenty-station fives detection*

When relay 18D1 operates, it connects fives relay 18D2 of the twenty-station pair to conductor 1822, an extension of the fifth common fives wire 18F5. If the called number is one of the first twenty line numbers assigned to the concerned primary switch, one or another of the common fives wires 18F1 to 18F4 is grounded, but without any special effect in the translator. But, if the called number is any one of the last five line numbers assigned to the primary switch, the fifth common fives wire 18F5 becomes grounded, operating the connected relay 18D2 over wire 1822, contacts 3 of relay 18D2, and contacts 1 of relay 18D1. The operation of relay 18D2 is an indication that the second line number of a twenty-station line has been called.

At its contacts 3, relay 18D2 locks itself to ground through contacts 1 of relay 18D1, and opens its initial operating circuit. At its break contacts 1 and 2, relay 18D2 disconnects ground from the associated wire F in group 1831, thereby cancelling the normal fixed fives translation. Front contact 2 of relay 18D2 places ground on the fourth common fives wire F4 by way of wire 1821.

By the foregoing circuit changes, relay 1802 cancels the translated fives digit 5 and substitutes the overriding fives digit 4, to transfer the call from the called line location in the fifth fives group of the primary switch to the corresponding line in the fourth fives group. For example, with the straps 1960 in place numbers A251 to A255 are changed to translated numbers A241 to A245; translated numbers A351 to A355 are changed to translated numbers A341 to A345; and translated numbers A451 to A455 are changed to translated numbers A441 to A445.

At its contacts 4, relay 18D2 grounds code-control wire CC to notify the connected block coupler 2200, Fig. 22, that a twenty-station line has been called by the use of the second line number assigned thereto. This block coupler responsively operates as hereinafter described to cause a preliminary ring to be added to the station code to signal the corresponding station in the second group of ten instead of a station in the first group of ten on the called line.

XJ4. *Station-intercept service for twenty station lines*

When the number of a station disconnected from a twenty-station line is to be placed on intercept service, the twenty-station line is treated as two separate lines, and an available intercept detector relay (18F1 to 18F20) is jumpered to detect one or the other of the line numbers of the line, as required, and a station terminal thereof is jumpered to the required station bus bar as hereinbefore described.

XK. *Divided-ringing service*

Divided-ringing service, which is afforded by the block couplers 500 or 2200 is controlled by ringing-reverse wire RR extending between the block translator 1800 and the block couplers. In the illustrated example, ring-reverse wire RR is grounded by one or another of the five stations register relay 18B6 to 18B10 when any stations digit 5 to 9 is dialed, remaining ungrounded when any stations digit 0 to 4 is dialed. The ringing-reverse relay (506 or 2206) in the connected block coupler is operated by ground on wire RR, and locks as hereinbefore described to cause ringing current to be sent out over the ring side R of the called line rather than over the tip side T.

XL. *Control and supervision of digit wires*

Circuit difficulties within a block coupler, or at any point along the digit-wire multiple between the block couplers and the block translator 1800 may cause two of the hundreds wires H, two of the tens wires T, two of the units wires U, or two of the stations wires ST to become connected together. Unless prevented, this would cause operation of two or more relays in the concerned digit group of the block translator, and that would set up translation for another line or station in addition to the called line or called station. But, operation of two or more relays in the same digit group in the block translator is prevented by chaining the operating battery for each digit group as explained hereinbefore for the line controller 1200.

In the hundreds relay 18A1 to 18A10, for example, contacts 3 of any relay 18A1 to 18A10, opens the associated chain, to remove operating battery from any succeeding relay of the chain. When ground appears on two or more of the associated hundreds wires H, the hundreds relay connected to the lowest numbered H wire operates normally, while the hundreds relay connected to any succeeding grounded H wire either fails to operate, or restores promptly upon having its operating battery disconnected by contacts 3 of the preferred relay in the chain.

It will be observed that the circuit arrangement still permits a call to go through, with about an even change of reaching the desired called line, since the lower numbered one of two crossed hundreds wires should represent the correct dialed hundreds digit about half the time.

As an alarm-supervisory measure, each digit group is provided with an alarm relay (relays 18B11 to 18B14) which operates when a crossed-wire condition attempts to operate two relays in the same digit group. In the hundreds group, for example, the register relay attempting unsuccessfully to operate, finds battery through the high-resistance upper winding of alarm relay 18B11. No register relay 18A1 to 18A10 will operate, or remain operated, in series with the high-resistance upper winding of alarm relay 18B11, but relay 18B11 operates whenever a register relay attempts to draw operating battery from the disconnected end of the chain. Relay 18B11 at its contacts 1 locks its lower winding to ground through contacts of the alarm-release key 1891, part 7 of Fig. 18. The associated hundreds-alarm lamp HA becomes lighted in parallel with the locked lower winding of relay 18B11.

Contacts 2 of alarm relay 18B11 grounds translator-alarm wire TR-AL (part 7 of Fig. 18) to sound an alarm by a suitable device (not shown) indicating an abnormal condition in the block translator.

The chain and alarm arrangement is similar at the tens, units, and stations relays, for which alarm relays 18B12 to 18B14 are provided, along with their associated alarm lamps TA, UA, and SA.

XI. *Trunk-coupler frame 252 (Fig. 20)*

Fig. 20 shows details of the circuit apparatus employed at the trunk-coupler frame 252 of Figs. 2, 3, and 7.

As hereinbefore described in connection with Fig. 3, the external connections to the trunk-coupler frame 252 include (1) a desired number of conductor pairs cabled between the trunk-coupler frame and the main distributing frame M. D. F.; (2) forty three-wire incoming-trunk sets contained in incoming-trunk cable ITC extending to terminals 323I on the block-link frame, and forty three-wire outgoing-trunk sets contained in outgoing-trunk cable OTC extending from the secondary-switch side of the block-link frame to the trunk-coupler frame. Three of the noted two-wire sets are shown in Fig. 20 at 2023, 2053, and 2083; two of the three-wire outgoing-trunk sets are shown in Fig. 20 at 2020 and 2020'; and two of the incoming three-wire sets are shown in Fig. 20 at 2085 and 2085'.

XIA. *One-way outgoing trunk*

Outgoing-trunk set 2020 is extended to trunk coupler 2001 through the three-wire jumper 2021, and the two-wire jumper 2022 connects the outgoing portion of trunk coupler 2021 to conductor pair 2023 extending to frame M. D. F., whereat jumper 2024 extends the coductor pair to the illustrated pair of wires comprising the outgoing two-wire trunk extending to exchange C of Fig. 1.

The general operation of the system in completing calls through trunk-coupler 2001 to exchange C over the associated one-way outgoing trunk has been described hereinbefore in connection with Figs. 4 to 7.

Sleeve conductor S of trunk set 2020 is normally supplied with idle-indicating battery potential through break contact 1 of relay 2005 and resistor 2006, enabling coupler 2001 to be seized over trunk set 2020 as hereinbefore described.

When conductor set 2020 is seized, the conductors of the calling line are extended to conductors T and R of set 2020, operating line relay 2004 of trunk coupler 2001 through conductors of jumper 2021, normally closed contacts 1 and 2 of relay 2003 and the left-hand windings of repeating coil 2002. Contacts 2 of line relay 2004 bridge the lower winding of the electropolarized supervisory relay 2003 across the conductors of the associated inter-exchange trunk through the right-hand windings of repeating coil 2002, the conductors of jumper 2022, wires 2023, and the wires of jumper 2024. An incoming block coupler in exchange C is thereby prepared for operation as described for block coupler 500–I.

Contacts 1 of line relay 2004 operate release relay 2005. Contacts 2 of relay 2005 energize the local winding of supervisory relay 2003. Relay 2003 does not operate at this time, as it requires that both windings be energized in aiding relationship, whereas they are so connected as to be energized in opposing relationship until the call is answered.

Contact set 1 of relay 2005 disconnects resistor 2006 and substitutes ground potential on sleeve wire S of trunk set 2020 to establish a holding circuit for the connection.

When the remaining digits in the called number are dialed, line relay 2004 responds to repeat impulses at its contacts 2, whereat the bridge across the outgoing conductors is momentarily interrupted for each impulse. The slow-restoring release relay 2005 remains operated during the repeating of the impulses.

When the connection has been extended to the called line, current flow over is reversed over the inter-exchange trunk conductors, thereby reversing the current flow through the lower winding of supervisory relay 2003. Relay 2003 thereupon operates, reversing the current flow over the tip and ring conductors of trunk set 2020, and consequently over the calling line, or over the conductors of the calling incoming trunk, as the case may be.

When the receiver is again replaced on the called line, relay 2003 restores as the consequent current reversal causes the windings thereof to again oppose each other. The current flow over the tip and ring conductors of set 2020 is thereby restored to normal direction.

When the receiver is replaced on the calling line, line relay 2004 restores and opens the bridge across the outgoing trunk at its contacts 2, open-circuiting release relay 2005 at its contacts 1. Release relay 2005 restores shortly thereafter. Its contacts 2 open the local winding of supervisory relay 2003, and its contacts 1 remove holding ground from the associated sleeve conductor permitting the established connection to clear out.

XIB. *One-way incoming trunk*

The conductors shown along the lower edge of Fig. 20 illustrate the connections at frame M. D. F. and 252 for a one-way incoming trunk. The one shown is incoming from exchange A, being the one shown in Fig. 2 and in Figs. 4 and 5. This path is from the illustrated conductor pair incoming from exchange A to the distributing frame M. D. F. and thence through jumper 2082 on frame M. D. F., conductor pair 2083 in the cable between frames M. D. F. and 252, two-wire jumper 2084 on frame 252, and over conductors T and R in incoming set 2085.

XIC. *Two-way trunk*

Trunk coupler 2031 is similar to trunk coupler 2001 except that it is provided with transfer relay 2007 and with the additional set of terminals to which jumper 2056 is connected.

With jumpers 2021' and 2056 installed, the outgoing trunk set 2020' is extended to the outgoing branch of trunk coupler 2031, and the incoming-trunk set 2085' is connected with the incoming branch of trunk coupler 2031. Jumpers 2052 and 2054 connect the two-way branch of coupler 2031 to the illustrated pair of wires comprising a two-way trunk between exchanges B and C.

Normally, the two wires of the two-way trunk are connected through items 2054, 2053, and 2052, break contacts 1 and 2 of transfer relay 2007, and conductors of jumper 2056 to conductors T and R of incoming-trunk set 2085'. Conductor set 2085' is connected to an incoming block coupler such as is indicated at 500–I, Fig. 5, through a three-wire jumper such as 204' on the block-coupler frame. The sleeve wire S of this block coupler normally has an idle-indicating battery potential impressed thereon through a resistor 532 as shown for the sleeve wire of coupler 500–L. This potential normally passes over sleeve conductor S of set 2085', Fig. 20, a conductor in jumper 2056, the low-resistance lower winding of transfer relay 2007, break contact 1 of release relay 2005', and a wire in jumper 2021' to sleeve conductor S in incoming trunk set 2020', thereby normally supplying this set with an idle-indicating battery potential to enable it to be seized in the manner hereinbefore described for an idle outgoing trunk.

XIC1. *Incoming operation*

If the two-way trunk with which trunk coupler 2031 is associated is seized in the distant exchange C, the resultant bridging of the conductors of this trunk causes the line and release relays 503 and 505 of the connected incoming block coupler in exchange B to operate through break contacts 1 and 2 of transfer relay 2007, and over the tip and ring conductors in set 2085' thereby preparing the incoming block coupler for operation as hereinbefore described. As a consequence the block coupler removes the idle-indicating battery potential from the associated sleeve conductor S and substitutes ground potential, thereby causing the idle-indicating battery potential, normally on the sleeve wire S of outgoing-trunk set 2020' to be replaced by a ground potential. The two-way trunk is thereby guarded against seizure in exchange B.

On dialing of the remaining digits in the desired number the last-mentioned block coupler operates as hereinbefore described to cause the connection to be completed.

The established connection is cleared out as hereinbefore described responsive to the opening of the holding bridge across the conductors of the inter-exchange trunk, whereupon the associated incoming block coupler in exchange B is cleared out and returned to its normal condition, again supplying an idle-indicating battery potential to sleeve conductor S of outgoing-trunk set 2020'.

XIC2. *Outgoing operation*

When the two-way trunk line associated with trunk coupler 2031 is seized therethrough in exchange B (over conductor set 2020') ground potential is thereby applied temporarily to sleeve conductor S of set 2020' (through a hold-magnet winding such as 609, Fig. 6), closing a series circuit through break contact 1 of relay 2005' for the low-resistance lower winding of transfer winding 2007, through a wire in jumper 2056, and over sleeve conductor S of set 2085' to battery in the connected incoming block coupler. Transfer relay 2007 is thereby energized sufficiently to close its lightly adjusted make contacts 3, thereby closing a local locking circuit through the upper winding of relay 2007 to ground on the associated sleeve conductor S. Through the energization of this latter winding, relay 2007 promptly operates fully. Its contact sets 1, 2 transfer the associated inter-exchange trunk conductors from outgoing branch 2085' to the right-hand windings of repeating coil 2002'.

As a further result of the seizure of trunk coupler 2031 over conductor set 2020', line relay 2004' is operated as described for line relay 2004, operating release relay 2005' at its contacts 1. Contacts 2 of relay 2005' energize the local winding of supervisory relay 2003' and contacts 1 of relay 2005' disconnect the idle-indicating battery potential normally applied to the sleeve wire through the lower winding of transfer relay 2007 and substitutes ground potential on the sleeve wire to act as a holding ground potential for the established connection.

The inter-exchange trunk conductors are now bridged through contacts 2 of relay 2004', the lower winding of relay 2003', the right-hand windings of repeating coil 2002', and make contacts 1 and 2 of the operated and locked transfer relay 2007. Responsive to the closure of this bridge, the apparatus in the distant exchange C is prepared for operation and the two-way trunk line is guarded thereat.

Line relay 2004' operates to repeat impulses as described for relay 2004, and electro-polarized relay 2003' operates as described for relay 2003.

When the connection is to be cleared out, line relay 2004' opens the outgoing loop at its contacts 2, and at its contacts 1 restores release relay 2005' which removes holding ground from the associated sleeve conductor to permit the established connection to release, as well as to unlock and restore transfer relay 2007.

The illustrated cabling arrangement wherein the outgoing-trunk cable OTC of Fig. 3 carries outgoing-conductor sets 2020 to terminal sets on frame 252; incoming-trunk cable ITC of Fig. 3 carries incoming-conductor sets from terminal sets on frame 252 to the block-coupler frame, and wherein conductor pairs 2023, 2053, 2083 are extended between terminal sets on frames 252 and M. D. F., permits any noted conductor set to be connected by jumpers to serve as a part of a one-way trunk and as a part of a two-way trunk. This arrangement includes wiring each trunk coupler to terminal sets on frame 252 which can be jumper-connected to the other terminal sets as desired within the described fixed cabling arrangement.

As an example of the flexibility of the arrangement at trunk coupler frame 252, an incoming trunk coupler (impulse repeater or the like, not shown) may be provided if desired and may be inserted in the illustrated one-way trunk by removing jumper 2084 and replacing it by two jumpers connecting wire sets 2085 and 2083 to the incoming trunk coupler.

XII. *Code-ringing block coupler 2200 (Fig. 22)*

In Fig. 22, the code-ringing block coupler 2200 is shown connected in substitution for block coupler 500–L of Fig. 5 to provide ten-station and twenty-station code-ringing service in place of the ten-station harmonic-ringing service provided by the block coupler 500–L. When code ringing is employed, each of the block couplers 500 is similarly replaced by a block coupler 2200.

In block-coupler 2200, the parts similar to those of block coupler 500–L are given similar reference characters, but in the 2200 series rather than in the 500 series. The impulse counting devices SE to SR of block coupler 500–L appear in Fig. 22 as devices SE–22 to SR–22. Relays 2251 to 2253 are added relays which have no counterparts in Fig. 5, but relays 2201 to 2215 are similar respectively to relays 501 to 515 except that contacts 9 are added to relays 2207 and 2209 and contacts 12 are added to relay 2212, to control the circuits of added relays 2252 and 2251. Of the added relays, relay 2253 is a code relay which is operated to apply ringing current in accordance with the code assigned to the called station; relay 2252 is a pickup relay which operates to start the ringing operation only between the transmission of codes by the common code-ringing equipment (not shown); and relay 2251 is a code-control relay operable over wire CC by the block translator 1800 to cause pickup relay 2252 to be operated in an earlier portion of the code-ringing cycle to thereby cause a preliminary ring to be transmitted when the station being called is one of the second ten stations on a called twenty-station line.

Common wires L, PU1, PU2, and CC are common wires employed for block coupler 2200 in addition to the wires employed for block couplers 500, and code wires CODE–0 to CODE–9 replace wires INT-GEN-0 to INT-GEN-9 of Fig. 5.

XIIA. *Unequipped block-coupler locations*

Block coupler 2200 is shown provided with a chain-bypass key CBC individual thereto. Preferably, each block coupler 500 has such a key, but it could not be shown properly in Fig. 5 for the lack of drawing space. Key CBP has two inner pairs of break contacts for opening wires 2261 which are in series with the incoming sleeve wire S of the block coupler. The upper and lower make contacts of key CBP are connected over conductors 2262 and 2263 to shunt chain contacts 4 of terminating-chain relay 2212 and chain contacts 3 of outgoing-chain relay 2211 respectively when key CBP is operated.

A separate key CBP is provided at each of the twenty block-coupler locations in a section. When a block coupler is installed in the associated location, its key CBP is placed in its illustrated restored condition to place the associated block coupler in use. At any block-coupler location from which the block coupler is about to be removed, the key CBP thereat is actuated. The outer contacts of the key close its chain-bypass conductors 2262 and 2263. The outgoing chain and the terminating chain at the concerned section are thus bypassed around the vacant block-coupler location. The inner contacts of key CBP open sleeve wires 2261 to mark the coupler busy, as it cannot guard either chain with key CBP operated.

The key CBP is operated at each unequipped block-coupler location, avoiding the use of temporary strap wires which would have to be removed upon the installation of a block coupler.

XIIB. *Normal code-ringing operation*

When block coupler 22 is employed to call a line having not more than ten stations thereon, the common code-control conductor CC incoming from block translator 1800 is not grounded, wherefore code-control relay 2251 remains unoperated. At the time the ringing operation is ready to commence, the block coupler 2200 has been seized over incoming conductors 203, and operations have occurred as hereinbefore described for coupler 500–L to cause the outgoing conductors 205 to be extended through a primary switch 1300 to a called line. At that time, line relay 2203, series relay 2204, release relay 2205, and switching relay 2209 are in operated condition. Contacts 2 and 3 of switching relay 2209 extend generator ground to contacts 1 of ring-reverse relay 2206, and extend the battery-connected trip winding of relay 2207 through contacts 1 of relay 2253 to contacts 2 of relay 2206. From contacts 1 and 2 of relay 2206 these conductors extend through break contacts 2 and 3 of relay 2207 to conductors T and R in outgoing group 205, and consequently to the called line.

Contacts 8 of relay 2209 operate transfer relay 2215 to transfer the output wires of station register SR–22 from station leads ST1 to ST10 to the common code wires CODE–0 to CODE–9. Wires CODE–0 to CODE–9 are controlled by the code-ringing apparatus (not shown) which controls the wires L, PU1, and PU2 which are associated with relays 2251 and 2252. Wire 2224 is thereby connected to one or another of the wires CODE–0 to CODE–9, depending upon the setting which has been imparted to stations register SR–22.

With code-control relay 2251 restored as assumed, the second pickup wire PU2 is connected through closed contacts 1, 2 and 9 of relays 2251, 2252, and 2207, and through make contacts 9 of switching relay 2209 to pickup relay 2252. Consequently, when wire PU2 is next grounded, just prior to the beginning of the normal code-sending operation of the common apparatus, pickup relay 2252 is operated thereover. Contacts 2 thereof lock the relay to locking wire L and disconnect pickup wire PU2. Contacts 1 of pickup relay 2252 connect common wire 2224 of register SR–22 to code relay 2253. As a result, each time a code signal is placed on the selected one of the wires CODE–0 to CODE–9, code relay 2253 operates for the duration of the signal. At its contacts 1 relay 2253 disconnects the trip winding of relay 2207 and substitutes the common generator wire GEN over which the common source of ringing current is supplied. Ringing current is thereby transmitted to the called line for the duration of any operation of code relay 2253. The one or more consequent operations of code relay 2253 during the current cycle of the common ringing machine transmits ringing current over the called line in accordance with the code assigned to the called station thereon. This code signal is repeated as many times as desired, but each time the common ringing equipment reaches the silent interval, it opens wire L, unlocking and restoring any operated pickup relay 2252, which subsequently reoperates if the call has not been answered when pickup position is again reached.

Ringing-reverse relay 2206 operates as described for relay 506 to cause ringing current to be sent over the ring conductor R (rather than tip conductor T) for the last five stations, 5 to 9, of a ten-station line, permitting divided ringing to be used if desired.

When the call is answered, or as soon thereafter as code relay 2252 restores if it is then operated, the upper winding of ring-cutoff relay 2207 is energized over the called line, through contacts 3 and 2 of relays 2209 and 2206, and to ground through contacts 1 and 2 of relays 2206 and 2209. At its contacts 4, relay 2207 thereupon locks its lower winding to ground on conductor 2219 with results as hereinbefore described, which include the opening of the ringing circuit and the closing of the talking circuit. Additionally, contacts 9 of relay 2207 restore pickup relay 2252 (if then operated), thereby disconnecting code relay 2253. The remaining operation of block coupler 2200 and the clearing out thereof are as hereinbefore described for block coupler 500-L.

XIIC. *Twenty-station ringing*

When a twenty-station line is called, the described normal code-ringing operation of block coupler 2200 occurs if the called station is one of the first ten stations on the called line; that is, one of the stations indexed by a suffix to the directory line number normally assigned to the concerned line as hereinbefore described in connection with the operation of block translator 1800.

When the called station on a called twenty-station line is one indexed by a station suffix to the second line number assigned to the line, block translator 1800 operates as hereinbefore described, to apply ground potential to the common code-control conductor CC. This operation occurs while terminating-chain relay 2212 is in operated condition, thereby closing a circuit through contacts 12 thereof for code-control relay 2251. Relay 2251 thereupon operates. At its contacts 2, relay 2251 prepares a locking circuit which is closed in due course at contacts 7 of switching relay 2209 to ground through contacts 8 of ring cutoff relay 2207. At its contacts 1, code-control relay 2251 disconnects the second pickup wire PU2 and substitutes the first pickup wire PU1.

When switching relay 2209 operates, contacts 9 thereof connect pickup relay 2252 through contacts 9 of relay 2207, normally closed contacts 2 of relay 2252, and make contact 1 of relay 2251, to pickup wire PU1. Relay 2251 is therefore operated to start the code ringing operation as soon as wire PU1 is next grounded.

The previously mentioned common ringing equipment is of the well-known type which first momentarily grounds pickup wire PU1, and later grounds pickup wire PU2. In the interval between the two pickup pulses, the common ringing equipment transmits a preliminary code signal over each of the wires CODE-0 to CODE-9. Having been operated over wire PU1, pickup relay 2252 is now in operated condition when the preliminary ringing signal is transmitted by the common ringing equipment. As a result, code relay 2252 receives the distinguishing preliminary signal over the one of the code wires selected by register SR-22, and transmits a corresponding preliminary ringing signal, followed by the station code indicated by the current setting of station register SR-22. The transmission of the preliminary ringing signal identifies the called station as being one in the second group of ten on the called line rather than one in the first group of ten thereon.

The remainder of the operation on the block coupler 2200 is as hereinbefore described.

XIII. *Unequipped line groups*

As previously discussed under the heading "IIC. Capacity Variations," when the exchange at which the disclosed switchboard apparatus is installed has less than one thousand lines in service initially, one or more of the line-link frames A to D may be only partially equipped with line-link primary switches 800, and one or more of the line-link frames B to D may be omitted when not required.

Any twenty-five lines for which no line-link primary switch has been installed is termed an unequipped group. Calls made inadvertently to unequipped lines may be handled in either of two ways as desired; that is, (1) through the block controller 1600 as to busy lines, or (2) through the block translator as calls to be intercepted.

First, if the calls to unequipped lines are to be handled through the block controller as calls to busy lines, the operation depends upon whether the concerned line-link frames (B, C, or D) has been installed or not. If it has not been installed, there is no line-controller to supply ground to the concerned terminating-frame wire TF-B, TF-C, or TF-D (Fig. 16, part 5). In this event, the line-testing operation cannot proceed, and the cycle timer (Fig. 16, part 2) runs down as hereinbefore described, causing a terminating-busy tone to be applied to the calling line by the connected block coupler as described. If the call is to a line of an unequipped group of twenty-five on an installed line-link frame, the block controller starts the line-testing operation as described on receiving terminating-frame information, but test relay 16A1 of the block controller fails to operate, over the open sleeve wire S of the unequipped called line. The line-test group of relays (Fig. 16, part 1) of the block controller thereupon operates as described to cause the connected block coupler to return a terminating-busy tone to the calling line.

Second, if calls to unequipped lines are to be handled through the block translator as calls to be intercepted, an available one of the twenty sets of intercept terminals (five-level groups 1 and 2 of section 1904, Fig. 19, part 3) is suitably jumper-connected for the purpose. Intercept-terminal set 18 has been arbitrarily selected for this service. Terminal 1 in this set is grounded by jumper 1958 to cause intercept call-in relay 18D30 (Fig. 18, part 3) to respond to any operation of the concerned detector relay 18F18 (not shown). Jumper 1959 is strapped to terminals D1 and D2 of the noted set to operate the last-named detector relay (by energizing both windings thereof) whenever jumper 1959 receives ground. As indicated by the note associated therewith, jumper 1959 is extended to and connected with the "P" wire of each unequipped group of twenty-five lines. These wires are PA-1 to PD-10, connected to the ten strapped levels in five-level groups 1 and 2 of sections 1906 to 1909. With jumper 1959 so installed, the calling of any unequipped group causes its corresponding "P" wire (such as PA-1 to PD-10 to become grounded as hereinbefore described. The resulting grounding of jumper 1959 causes the last noted detector relay to operate, operating call-in relay 18D30 through its contacts 1 and over jumper 1958. The call is thereupon intercepted and transferred to the intercept operator as hereinbefore described.

We claim:

1. In a switching system, an automatic switchboard for serving a definite number of lines equal to ten raised to a whole-number power greater than one, said switchboard including similar line sections serving respective groups of said lines, the number of lines served by a section being the sum of two numbers comprising respectively a multiple of ten which is greater than ten and a submultiple of ten which is greater than one and less than ten, the product of the said number of lines served by a section and the number of sections being said definite number, said switchboard further including a section common to said line sections, said lines having call numbers assigned respectively thereto out of a block of consecutive decimal numbers consisting of said definite number of numbers, with the lines of any section having consecutive numbers assigned thereto, a translator responsive to the calling of said call numbers to transmit respectively corresponding translated numbers each indicating the line section serving the called line and indicating which of the lines served by that section is the line called, a plurality of section-indicating means in said translator for causing the translated number to indicate the called section of the switchboard and first control means for selectively operating them directly according to the value of the tens digit in the called number and independent of the value of the units digit thereof, subject to the ten lines indexed by the tens digit of the called number being all served by the same line section, second control means for operating the section-indicating means selectively according to the value of the tens digit jointly with the value of the units digit, subject to only a portion of the ten lines indexed by the tens digit of the called number being served by one line section wtih the remainder being served by another line section, and means responsive to the transmission of said translated numbers for operating switching apparatus in said common section and in respectively concerned ones of said line sections to extend connections to the lines to which such translated numbers respectively correspond.

2. A switching system according to claim 1, with the said line sections divided equally among respective line-terminating frames each of which is accessible to the said common section, the number of line sections allotted to a line-terminating frame being so chosen that the number of lines served by a line-terminating frame is a sub-multiple of one thousand which is greater than one hundred but is a non-multiple thereof, said plurality of section-indicating means in the translator consisting of relays and means for operating them selectively, the number of said relays being less than the number of said line sections and being a submultiple thereof, hundreds relays included in the translator and means for operating them selectively according to the value of the hundreds digit in any called number, selection-indicating paths for the line sections respectively, and means including combinations of serially related contacts of the hundreds and section-indicating relays for closing said paths selectively.

3. A switching system according to claim 1, with each line section serving twenty five lines, the line sections being divided among four line-terminating frames each accessible to the common section, with ten line sections to a line-terminating frame, whereby the total number of lines served is one thousand, and the number of lines served by a line-terminating frame is the specific number two hundred fifty, being a submultiple of one thousand which is greater than one hundred but is a non-multiple thereof.

4. In combination, a block coupler for use in a crossbar switching system employing control apparatus for the common use of said block coupler and similar other ones, a trunk incoming to the block coupler, digit registers in the block coupler controllable over said trunk to register a number indicating a desired called line and called station thereon, means for appropriating the control apparatus for the temporary exclusive use of the said block coupler and for subsequently returning it to common use, means for transferring the registered number to said control apparatus, crossbar switching apparatus and means for operating it under the control of said control apparatus to extend a connection from the block coupler to the called line, a ringing circuit excluding said control apparatus and extending over said connection from the block coupler, means in the block coupler controlled from said control apparatus in accordance with the said registered number for conditioning the ringing circuit to signal one station or another on the called line, and means for maintaining the ringing circuit conditioned after the control apparatus has been returned to common use.

5. In an automatic crossbar switching system including a group of line-link frames serving respective divisions of a group of lines, each said frame having line-link primary and secondary crossbar switches thereon interconnected by line links spread between them, a block-link frame common to the line-link frames and having block-link primary and secondary crossbar switches thereon interconnected by block links spread between them, the lines served by a line-link frame terminating at its line-link primary switches, each line-link frame having a separate group of originating trunks extending from respective originating locations on the line-link secondary switches thereof to a separate group of respective locations on the block-link primary switches, separate groups of terminating trunks each extending from a separate group of respective locations on the block-link secondary switches to respective terminating locations on the line-link secondary switches of a separate line-link frame, means responsive to a calling condition on any said line for extending a connection therefrom to an idle originating trunk in the associated group by way of an idle line link and the concerned line-link primary and secondary switches, and means responsive to the transmission over a connected originating trunk of digit information indexing a called one of said lines for initiating an extending operation which thereupon proceeds automatically to extend a connection from the connected originating trunk to the called line by way of (1) an idle block link, (2) an idle terminating trunk in the concerned group, and (3) an idle line link on the concerned line-link frame, through the concerned block-link primary and secondary switches and the concerned secondary and primary line-link switches.

6. In an automatic switching system according to claim 5, trunks incoming from at least one other exchange to respective other locations on the block-link primary switches, trunks outgoing from respective other locations on the block-link secondary switches to at least one other exchange, means also responsive to the transmission over an incoming trunk of digit information indexing a called one of said lines for initiating an extending operation which thereupon proceeds automatically to extend a connection from the concerned trunk to the called line as set forth for an originating trunk, and means responsive to the transmission over either an incoming trunk or a connected originating trunk of digit information indexing another exchange for initiating an extending operation which thereupon proceeds automatically to extend a connection from the concerned trunk to the indexed exchange by way of an idle block link, an idle outgoing trunk, and the concerned block-link primary and secondary switches.

7. In an automatic switching system according to claim 5, trunks incoming from at least one other exchange to respective other locations on the block-link primary switches, trunks outgoing from respective other locations on the block-link secondary switches to at least one other exchange, means also responsive to the transmission over an incoming trunk of digit information indexing a called one of said lines for initiating an extending operation which thereupon proceeds automatically to extend a connection from the concerned trunk to the called line as set forth for an originating trunk, and means responsive to the transmission over a connected originating trunk of digit information indexing another exchange for initiating an extending operation which thereupon proceeds automatically to extend a connection from the connected trunk to the indexed exchange by way of an idle block link, an idle outgoing trunk, and the concerned block-link primary and secondary switches.

8. In a crossbar switching system, a group of primary switches and a group of secondary switches interconnected by links extending between the horizontals of the primary switches and the horizontals of the secondary switches, select magnets corresponding respectively to the horizontals of the several switches, the horizontals being divided at each secondary switch to provide two sections of horizontals thereat, the said links including pairs of links extending from respective pairs of horizontals of any primary switch to the respective secondary switches, the links of any such pair terminating at the respective sections of the same horizontal of the concerned secondary switch, respective pairs of primary select-magnet wires extending to the pairs of primary select magnets associated with said pairs of horizontals, secondary select-magnet wires extending between the primary and secondary select magnets in specific correspondence with said pairs of links, the two wires of any said pair of primary select-magnet wires extending through the windings of the concerned primary select magnets to the same secondary select-magnet wire.

9. In a switching system, a group of crossbar switches including primary switches and secondary switches interconnected by links spread between them, first-order circuit paths terminating at the primary switches, second-order circuit paths terminating at the secondary switches, a controller for the group, a controller switch comprising a further crossbar switch, means for selecting a first-order path for interconnection with an idle second-order path over an idle link, means for operating the controller switch to connect the controller with the ones of said links which extend from the primary switch at which the selected first-order path terminates, and means in the controller including means controlled through the said connection established by said controller switch for selecting an idle second-order path and an idle link over which it may be reached, and means for operating the concerned primary and secondary switches to interconnect the selected first-order and second-order paths over the selected link.

10. In a switching system, a group of first crossbar switches each having select magnets and hold magnets, a controller for the group, and a second crossbar switch and means for operating it to connect the controller with each of the select magnets and with selected ones of the hold magnets of any one of said first crossbar switches.

11. In a switching system, a group of first crossbar switches, each terminating a separate group of circuit paths and a separate group of links, and having select magnets corresponding respectively to said links, a controller for the group, a second crossbar switch and means for operating it to connect said controller individually to each of said circuit paths, select magnets, and links of any said first crossbar switch.

12. In an exchange switching system including a block-link frame tandem-related to each of a number of line-link frames, each frame including switching apparatus for extending connections therethrough, trunks outgoing to at least one other exchange extending from the block-link frame, lines terminated at the line-link frames, call-receiving trunks incoming to the block-link frame, control apparatus at the block-link frame including a block controller, an outgoing controller, and a block translator, respective line controllers for the line-link frames, call-in means responsive to digit information received over a said incoming trunk for calling in said items of control apparatus to control the extension of a connection through the system to the destination indicated thereby, means in said call-in means for calling in the block controller irrespective of the destination indicated, means in said call-in means for calling in the outgoing controller and means for operating such means subject to a trunk outgoing to another exchange being indicated, and means in said call-in means for calling in the block translator and a line controller and means for operating such means subject to a line terminated at a line-link frame being indicated.

13. In an exchange switching system including a block-link frame tandem-related to each of a number of line-link frames, each frame including switching apparatus for extending connections therethrough, trunks outgoing to at least one other exchange extending from the block-link frame, lines terminated at the line-link frames, call-receiving trunks incoming to the block-link frame, control apparatus for the block-link frame including an outgoing controller, respective line controllers for the line-link frames, call-in means responsive to digit information received over a said incoming trunk for calling in one or another of said items of control apparatus to control the extension of a connection through the system to the indicated destination, means in said call-in means for calling in said outgoing controller and means for operating such means subject to a trunk outgoing to another exchange being indicated, and means in said call-in means for calling in a line controller and means for operating such means subject to a line terminated at its line-link frame being indicated.

14. In an exchange switching system switching apparatus for extending connections to locally terminated lines and to trunks outgoing to at least one other exchange, call-receiving trunks incoming to the switching apparatus, an outgoing controller, a line controller, call-in means responsive to digit information received over a said incoming trunk for calling in said items of control apparatus selectively to control the extension of a connection through the switching apparatus to the indicated destination, said call-in means including means for calling in said outgoing controller subject to a trunk outgoing to another exchange being indicated, and for calling in the line controller subject to a locally terminated line being indicated.

15. In an automatic switching system, switching apparatus serving local lines and outgoing trunks, a controller for controlling the operation of said switching apparatus in extending connections to said lines when called in for terminating operation and to said trunks when called in for outgoing operation, means for registering digits of called telephone numbers, means controlled thereby for calling in said controller for either terminating operation or for outgoing operation depending upon the setting of the registering means, a relay and means for operating it responsive to an indicated outgoing call-in of the controller, and means dependent upon the operation of said relay for giving the concerned outgoing call-in of the controller preference over a terminating call-in thereof when both are concurrently indicated.

16. In an automatic switching system, switching apparatus serving local lines and outgoing trunks, a controller for controlling the operation of said switching apparatus in extending connections to said lines when called in for terminating operation and to said trunks when called in for outgoing operation, means for registering digits of called telephone numbers, means controlled thereby for calling in said controller for either terminating operation or for outgoing operation depending upon the setting of the registering means, a relay and means for operating it responsive to an indicated outgoing call-in of the controller, and means dependent upon the operation of said relay for cancelling an existing terminating call-in of the controller in favor of the indicated outgoing call-in thereof.

17. In an automatic switching system, switching apparatus serving local lines and outgoing trunks, a controller for controlling the operation of said switching apparatus in extending connections to said lines when called in for terminating operation and to said trunks when called in for outgoing operation, means for registering digits of called telephone numbers, means controlled thereby for calling in said controller for either terminating operation or for outgoing operation depending upon the setting of the registering means, means for cancelling an existing terminating call-in of the controller in favor of an indicated outgoing call-in thereof, and means for nullifying said cancelling means dependent upon the controller having reached the condition of substantial completion of the directing operation in which it is engaged.

18. In a switching system, a group of crossbar switches for extending incoming trunks toward called lines, control means common to the trunks and switches, the trunks terminating at the switches in sections corresponding respectively to the switches, each trunk having a separate trunk relay operable to connect it to the control means when the trunk is ready for extension toward a called line, section relays corresponding respectively to the sections of trunks, means for operating any trunk relay of any section in circuit with the corresponding section relay, means controlled by any trunk relay on operating for precluding operation of any further trunk relay in the same section, and means controlled by any section relay on operating for precluding operation of any trunk relay in any other section.

19. In a switching system, a group of crossbar switches for extending incoming trunks toward called lines, control means common to the trunks and switches, the trunks terminating at the switches in sections corresponding respectively to the switches, each trunk having a separate trunk relay operable to connect it to the control means when the trunk is ready for extension toward a called line, section relays corresponding respectively to the sections of trunks and to the switches, means for operating any trunk relay of any section in circuit with the corresponding section relay, and means controlled by the section relay for connecting said control means to the corresponding crossbar switch.

20. In a switching system, a group of crossbar switches for extending incoming trunks toward called lines, control means common to the trunks and switches, the trunks terminating at the switches in sections corresponding respectively to the switches, each trunk having a separate trunk relay operable to connect it to the control means when the trunk is ready for extension toward a called line, section relays corresponding respectively to the sections of trunks and to the switches, means for operating any trunk relay of any section in circuit with the corresponding section relay, means controlled by the section relay for connecting said control means to the corresponding crossbar switch, means controlled by any trunk relay on operating for precluding operation of any further trunk relay in the same section, and means controlled by any section relay on operating for precluding operation of any trunk relay in any other section and of any other section relay.

21. In a switching system, a group of crossbar switches for extending incoming trunks toward called lines and toward called trunk groups, control means common to the trunks and switches, the incoming trunks terminating at the switches in sections corresponding respectively to the switches, each incoming trunk having a separate pair of trunk relays including a first relay operable to connect it to the control means when the incoming trunk is ready for extension toward a called line and a second relay operable to connect it over another path to the control means when the incoming trunk is ready for extension toward a called group of trunks, pairs of section relays corresponding respectively to the sections of trunks and to the switches, each pair comprising a first relay and a second relay, means for operating any trunk relay of any section in circuit with the corresponding section relay in the corresponding pair, means controlled by any first or second trunk relay on operating for precluding operation of any further corresponding trunk relay in the same section while permitting operation of any non-corresponding trunk relay therein, and means controlled by any section relay on operating for precluding operation of any corresponding trunk relay in any other section while permitting operation of any non-corresponding trunk relay in any section.

22. In a crossbar switching system, a group of primary switches and a group of secondary switches interconnected by pairs of links, the pairs extending between respective horizontals of the primary switches and respective horizontals of the secondary switches, principal select magnets corresponding respectively to the horizontals of the several switches, the two principal select magnets corresponding to the horizontals between which any pair of links extends being connected in a common operate circuit specific thereto, each switch having two extension select magnets corresponding respectively to the two links of any pair, means for connecting the extension select magnets of any primary switch respectively to the extension select magnets of any secondary switch, means for predetermining the selection of any link, and means responsive thereto for operating the corresponding principal select magnets in one circuit and for operating the corresponding extension select magnets in another circuit.

23. In a crossbar switching system, a group of primary switches and a group of secondary switches interconnected by links extending between respective horizontals of the primary switches and respective horizontals of the secondary switches, each horizontal having two of said links connected thereto, principal select magnets corresponding respectively to the horizontals of the several switches, each switch having two extension select magnets corresponding respectively to the two links connected to any horizontal thereof, means for predetermining the selection of any link, and means responsive thereto for operating the corresponding principal select magnets over one circuit and for operating the corresponding extension select magnets over another circuit.

24. In a crossbar switching system, a block-link frame and a line-link frame serially related for the extension of connections therethrough, each frame including (1) primary switches, (2) secondary switches, and (3) links spread between them to interconect them in serial relationship for the extension of said connections, each said switch including select magnets operable to select respective first elements of said connections, off-normal contacts closed by the respective select magnets, the off-normal contacts of any primary select magnet being connected in a series circuit path with the off-normal contacts of the secondary select magnets on the same frame, each switch including hold magnets for connecting respective second elements of said connections to selected first elements thereof, means for predetermining the first and second elements of a connection and for operating the concerned select magnets on the two frames, and means depending jointly on the closure of a said series circuit path at each frame for operating the concerned hold magnets.

25. In a crossbar switching system, a block-link frame and a line-link frame serially related for the extension of connections therethrough, each frame including (1) primary switches, (2) secondary switches, and (3) links spread between them to interconnect them in serial relationship for the extension of said connections, each said switch including select magnets operable to select respective first elements of said connections, off-normal contacts closed by the respective select magnets, the off-normal contacts of any primary select magnet being connected in a series circuit path with the off-normal contacts of the secondary select magnets on the same frame, each switch including hold magnets for connecting respective second elements of said connections to selected first elements thereof, means for predetermining the first and second elements of a connection and for operating the concerned select magnets on the two frames, and means controlled by a relay operable over a said series circuit path at one frame in series with a said series circuit path at the other frame for operating the concerned hold magnets.

26. In a crossbar switching system, a block-link frame, line-link frames each serially related with the block-link frame for the extension of connections therethrough, each frame including (1) primary switches, (2) secondary switches, and (3) links extending between them for the extension of said connections serially therethrough, each switch including select magnets operable to select respective first elements of said connections, each switch including hold magnets for connecting respective second elements of said connections to selected first elements thereof, means on each frame providing a series circuit path through primary and secondary off-normal contacts of the select magnets of the switches thereon, means for predetermining the first and second elements of a connection through the block-link frame and any line-link frame and for operating the concerned select magnets on the two frames, an operate relay and means for operating it over the said series circuit path of the block-link frame in series with the said series circuit path of the said any line-link frame, and means controlled by the said operate relay for operating the concerned select magnets on the two frames.

27. In a crossbar switching system, primary switches, first trunks terminating thereat, secondary switches, groups of second trunks terminating thereat, links extending between the primary and secondary switches for the extension of connections serially therethrough from said first trunks toward called lines over the said second trunks, register groups individual respectively to said first trunks, each group including registers operable successively over its individual trunk to register successive digits of numbers indicative of called lines and the groups of second trunks over which they are reached, control apparatus common to said register groups and controllable from any one of them for operating the concerned primary and secondary switches to extend a connection from the individual trunk of the controlling register group to an idle trunk in the indicated group of second trunks, means responsive to the registration in any register group of a given predetermined value of a given digit for thereupon placing said control apparatus under the control of such register group, and means responsive to the registration of a predetermined other value of said given digit for delaying the placing of said control apparatus under the control of the register group until additional digits have been registered therein.

28. In combination, a block coupler for use in a crossbar switching system employing control apparatus for the common use of said block coupler and similar other ones, a trunk incoming to the block coupler, digit registers in the block coupler controllable over said trunk to register a number indicating a desired called line and called station thereon, means for transferring the registered number to said control apparatus, crossbar switching apparatus and means for operating it under the control of said control apparatus to extend a connection from the block coupler to the called line, a ringing circuit extending over said connection from the block coupler, and means in the block coupler controlled from said control apparatus in accordance with the said registered number for conditioning the ringing circuit to signal one station or another on the called line.

29. In combination, a block coupler for use in a crossbar switching system employing control apparatus for the common use of said block coupler and similar other ones, a trunk incoming to the block coupler, digit registers in the block coupler controllable over said trunk to register a number indicating a desired called line and called station thereon, means for transferring the registered number to said control apparatus, crossbar switching apparatus operable under the control of said control apparatus to extend a connection from the block coupler to the called line, a ringing circuit extending over said connection from the block coupler, and means in the block coupler controlled from said control apparatus in accordance with the said registered number for conditioning the ringing circuit to signal a station in one group or a station in another group on the called line.

30. In combination, a block coupler for use in a crossbar switching system employing control apparatus for the common use of said block coupler and similar other ones, a trunk incoming to the block coupler, digit registers in the block coupler controllable over said trunk to register a number indicating a desired called line and called station thereon, means for transferring the registered number to said control apparatus, a crossbar switching apparatus operable under the control of said control apparatus to extend a connection from the block coupler to the called line, a ringing circuit extending over said connection from the block coupler, and means in the block coupler controlled from said control apparatus in accordance with the said registered number for conditioning the ringing circuit to signal a station connected to one conductor or a station connected to the other conductor of the called line.

31. In a block coupler for use in a crossbar switching system employing a block controller common to said coupler and other similar ones, two sets of control wires for the controller, chain relays in said coupler corresponding to said sets of control wires respectively, registering apparatus in said coupler for registering digits of called numbers, and means for operating one chain relay or the other responsive to respective settings of the registering apparatus, and means responsive to the operation of either chain relay for connecting the coupler to the controller over the corresponding set of control wires.

32. In a block coupler for handling calls of two classes, a control wire, two digit registers, a switching relay for calls of the first class, a switch-through relay for calls of the second class, means for setting said registers successively to record respective digit values pertaining to a call being handled, the setting of the first register indicating whether the call is of the first class or is of the second class, means responsive to the first register being set to indicate a call of the second class for preventing the second register from being set, contacts on the second register for transferring said control wire from one said relay to the other, means for actuating said contacts responsive to the setting of the second register, and means for energizing said control wire to operate the connected relay.

33. In a block coupler for handling calls of two classes, means for indicating the class of any call being handled by the block coupler, a busy relay having contacts for applying busy tone to a talking conductor of the coupler, a first busy-tone-supply wire, a second busy-tone-supply wire, a digit register and means for setting it, means included in said indicating means for preventing setting of said register responsive to a call of the second class being indicated, contacts on the digit register for transferring said contacts of the busy relay from one said supply wire to the other, and means for actuating said contacts responsive to the setting of the digit register.

34. In combination, a block coupler, first switching apparatus for extending incoming connections thereto, second switching apparatus for extending outgoing connections therefrom to called lines in accordance with the numbers thereof, a holding circuit through the block coupler for holding said first switching apparatus operated to maintain a said incoming connection, digit registers for registering respective series of impulses corresponding to digits of a called number when received successively over said incoming connection, a sequence device and means for advancing it step-by-step to distribute the received series of impulses successively to said digit registers, means controlled by said digit registers for operating said other switching apparatus to extend a connection from said block coupler to a called line, a timer relay in said block coupler and timer means for operating it to open said holding circuit upon the expiration of a predetermined time interval, means for connecting said timer relay in circuit with said timer means upon completion of said incoming connection, means for disconnecting said timer relay during the receipt of any said series of impulses, means responsive to the call being answered for disconnecting said relay, other means responsive to the call being answered for further advancing said sequence device step-by-step under control of said timer means, and means responsive to said sequence device reaching a predetermined position for reconnecting said timer relay.

35. In combination, a block coupler, first switching apparatus for extending incoming connections thereto, second switching apparatus for further extending outgoing connections therefrom in accordance with called numbers, a holding circuit through the block coupler for holding said first switching apparatus operated to maintain an incoming connection established to the block coupler, digit registers for registering respective series of impulses received over said incoming connections, a sequence device and means for advancing it step-by-step to distribute the received series of impulses successively to said digit registers, means controlled by said digit registers for operating said other switching apparatus to extend a connection from said block coupler to a called line, timing means controlled from the called line for further advancing said sequence device step-by-step, and means responsive to said sequence device reaching a predetermined position for first applying a warning signal to the established connection and thereafter opening said holding circuit.

36. In combination, a block coupler, first switching apparatus for extending incoming connections thereto, a second switching apparatus for further extending outgoing connections therefrom in accordance with called numbers, a holding circuit through the block coupler for holding said first switching apparatus operated to maintain an incoming connection established to the block coupler, digit registers for registering respective digit series of impulses received over said incoming connection, a sequence device and means for advancing it step-by-step to distribute the received series of impulses successively to said digit registers, means controlled by said digit registers for operating said other switching apparatus to extend a connection from said block coupler to a called line, timing means controlled for the called line for further advancing said sequence device step-by-step, and means responsive to said sequence device reaching a predetermined position for opening said holding circuit.

37. In a block coupler arranged to project ringing current forwardly to the called line when it is not the same line as the calling line and to project ringing current rearwardly to the called line when it is the same line as the calling line, a busy relay for applying busy-tone current to the calling line, a switching relay for applying ringing current to the called line, a reverting-call relay for conditioning the block coupler to project ringing current rearwardly, means responsive to the called line being idle for operating said switching relay, means responsive to the called line being in use and being not the calling line for operating said busy relay, and means responsive to the called line being in use and being the calling line for operating said switching and reverting-call relays.

38. In combination, lines and groups of trunks, a block coupler having incoming and outgoing conductors, means bridging the incoming conductors for controlling the extension of said outgoing conductors to called lines and to idle trunks in a called group, a switch-through relay for disconnecting said bridging means and for connecting the incoming conductors metallically to said outgoing conductors, a switching relay for applying ringing current to said outgoing conductors, means for operating said switching relay responsive to a line being called, means for operating said switch-through relay instead of said switching relay responsive to a trunk-group being called, means for determining whether or not the called line is the calling line, and means controlled thereby for operating said switch-through relay along with the switching relay.

39. In a reverting call telephone system employing a crossbar switch having select magnets and hold magnets each hold magnet having hold-pilot contacts, trunks incoming to said switch associated with said hold magnets respectively, each trunk having ringing means, means for extending respective calling lines to said trunks, means controlled over any said calling line for operating any select magnet and the associated hold magnet of said switch to close a connection which extends to a called line other than the calling line, means thereupon controlled by the hold-pilot contacts of such hold magnet for activating the associated ringing means to supply ringing current to the called line, test means for determining whether the line called over any said trunk is the calling line, and means controlled thereby for operating the associated hold magnet without operating any one of said select magnets, and means thereupon controlled by the hold-pilot contacts of such hold magnet for conditioning the associated ringing means to supply ringing current back over the associated trunk to the calling line.

40. In a switching system, groups of first trunks, groups of second trunks, input wires corresponding respectively to the groups of first trunks, output wires corresponding respectively to the groups of second trunks, each first trunk having a call register operable thereover to connect the input wire of its group to the output wire corresponding to any desired group of second trunks, group-identifying relays connected serially in said wires respectively, and means controlled jointly by a relay in an input wire and a relay in an output wire for connecting a calling first trunk with an idle trunk in a called group of second trunks.

41. In a switching system as set forth in claim 40, each said input wire having separate branches for the respective first trunks of its group, and trunk-identifying relays connected serially in said branches respectively, said connecting means being further controlled by the concerned one of said trunk-identifying relays.

42. In a block coupler, an initial-digit register and other registers for respective succeeding digits of called numbers, means for setting said registers successively in accordance with the respective values of the successive digits of a called number, and means responsive to the setting of said initial-digit register in accordance with any one of a number of initial-digit values for preventing the remaining registers from responding to the succeeding digits of the called number, while permittting them to respond provided the initial digit has a selected value, means common to said block coupler and a number of other block couplers for fixing the said selected value for each of them, means in each block coupler for making connection with said common means, if idle, responsive to the setting of said initial-digit register, and means for precluding an overlapping connection of any other block coupler with said common means.

43. In a switching system, groups of lines, groups of trunks, switching apparatus for connecting any calling one of the lines in any group to any idle one of the trunks in any group, a single choice allotter, means including a first group of contacts on the choice allotter for giving preference to the respective groups of lines in sequence, and means including a second group of contacts on the choice allotter for giving preference to the respective groups of trunks in sequence.

44. In a switching system as set forth in claim 43, each group of lines comprising subgroups of lines, and means including a third group of contacts on said choice allotter for giving preference to the respective subgroups of any group of lines in sequence.

45. In a switching system as set forth in claim 43, said choice allotter including a series of relays and means for operating and restoring them sequentially in a progressive wave-like motion wherein the relays are in effective operated condition only one at a time and in succession, first contacts on said relays assigned to the groups of lines, and second contacts on said relays assigned to the trunks.

46. In a crossbar system, lines, trunks, means including a group of first crossbar switches for interconnecting selected ones of the lines with respective selected ones of the trunks, a line controller for controlling the said operation of said switches, a line-controller crossbar switch having select magnets corresponding respectively to said first crossbar switches and having a number of hold magnets, means for operating any one of said select magnets of the line-controller switch and for thereupon operating a plurality of the hold magnets thereof to close selected connections between the line controller and the one of the first switches which corresponds to the operated select magnet, and means controlled through certain of said closed connections for operating one or another additional hold magnet of the line-controller switch to close additional selected connections between the line controller and the selected first switch.

47. In a crossbar system, lines, trunks, means including a group of first crossbar switches for interconnecting selected ones of the lines with respective selected ones of the trunks, a line controller for controlling the said operation of said switches, a pair of line-controller crossbar switches each having select magnets corresponding respectively to said first crossbar switches and each having a number of hold magnets, means for operating the select magnets of the line-controller switches corresponding to any said first switch and for thereupon operating a plurality of the hold magnets of each line-controller switch to close selected connections between the line controller and the first switch corresponding to the operated select magnet, and means controlled through certain of said closed connections for operating one or another additional hold magnet of each line-controller switch to close additional selected connections between the line controller and the selected first switch.

48. In a crossbar switching system, a controller for the crossbar switches of the system, a controller crossbar switch for connecting said controller with the first said crossbar switches, said controller switch having select magnets and first and second groups of hold magnets, separate operate circuits for the respective select magnets and means in the controller for closing them selectively, a common operate circuit for the hold magnets of the first group and means in the controller for closing it, and separate operate circuits for the respective hold magnets of the second group, and means in the controller for closing them selectively.

49. In a crossbar switching system as set forth in claim 48, means controlled by any said select magnet included in said means for closing said common operate circuit, and means controlled by one of the hold magnets of the first group included in the means for closing an operate circuit of a hold magnet of the second group.

50. In a crossbar switching system as set forth in claim 48, a hold-pilot circuit path closed subject to the operation of each hold magnet in the first group jointly with any hold magnet of the second group, and means controlled over said circuit path for causing said controller to exercise its control over the first said switches.

51. In a crossbar switching system, crossbar switches serving respective groups of lines, each group comprising subgroups, identifying wires for said lines including corresponding group wires, subgroup wires and individual line wires, means responsive to a calling condition on any line for energizing its individual line wire and for energizing the corresponding subgroup wire, each subgroup wire having a separate resistor connecting it to the associated group wire to energize the group wire consequent upon the energization of any associated subgroup wire, control apparatus common to said switches, means responsive to the energization of any said group wire through a said resistor for associating the control apparatus with the said switch serving the corresponding group of lines, means thereupon controlled according to the energized subgroup wire of the group for associating the control apparatus with the corresponding subgroup of lines, and means thereupon controlled according to the energized individual line wire of the subgroup for associating the control apparatus with the calling line of the subgroup.

52. In a switching system including a line controller for operating primary and secondary switching apparatus to extend calling lines one at a time and to extend connections to called lines one at a time, an originating start relay and circuit means for operating it to start the line controller to extend a calling line, a terminating start relay and circuit means for operating it to start the line controller to extend a connection to a called line, and circuit means controlled by the operation of either said relay for preventing operation of the other.

53. In a line controller for controlling the operation of switching apparatus to complete connections to calling and to called ones of lines divided into groups and subgroups, separate relay groups for identifying the line group containing the called line and the line group containing the calling line, operating circuits for said groups respectively, two other groups of relays for identifying respectively the subgroup and the line in the subgroup, and circuits for operating the last said relays both when a line in a group is calling and when a line in a group is called.

54. In a switching system including switching apparatus operable to extend calling lines to respective idle trunks, a line controller common to said lines for controlling said switching apparatus, each line having a line relay for controlling said line controller and having an electromagnet operable over a circuit extending thereto from the line controller to disconnect the line relay incidental to the extension of the calling line, means in the line controller for testing the continuity of said circuit before attempting to extend the calling line, and means responsive to said circuit being open when tested for causing said line controller to forego attempting to extend the calling line.

55. In a switching system including switching apparatus operable to extend calling lines to respective idle trunks, a line controller common to said lines for controlling said switching apparatus, each line having a line relay for controlling said line controller and having an electromagnet operable over a circuit extending thereto from the line controller to disconnect the line relay incidental to the extension of the calling line, means in the line controller including a high-resistance test relay for testing the continuity of said circuit by setting up a current flow thereover below the operate value of said electromagnet, and means responsive to operation of said high-resistance relay over said circuit for closing circuits to effect the said extension of the calling line, one such circuit being closed by short-circuiting said high-resistance relay, and means responsive to the consequent restoration of said high-resistance relay for clearing out the line controller.

56. In a switching system including switching apparatus operable to extend calling lines to respective idle trunks, a line controller common to said lines for controlling said switching apparatus, means responsive to a calling condition on any line for associating said line controller specifically therewith, means for thereupon causing the line controller to undergo a series of predetermined operations normally effective to operate said switching apparatus to extend the associated line to an idle trunk, means for thereupon disassociating the line controller from the associated line whether the connection has been successfully extended or not, means responsive to at least a predetermined number of unsuccessful attempts by the line controller to extend a connection for rendering it non-responsive to calling lines for a substantial predetermined interval of time, and timing means for nullifying the last said means at the end of said interval.

57. In a switching system as set forth in claim 56, said lines comprising groups having access to the line controller in an order of preference, means responsive to successive operations of the line controller for giving first choice to the groups in succession, means rendering said predetermined number of attempts equal to the number of said groups, and means for affording first choice to a different one of said groups on each attempt of the said number of attempts.

58. In a switching system, equivalent trunks comprising groups, switching apparatus for extending connections over available ones of said trunks respectively, a controller for the switching apparatus, said controller including means for determining the availability of the trunks and including a choice allotter and a call-in allotter, the call-in allotter having means defining successive positions thereof corresponding respectively to said groups, the choice allotter having means defining successive positions thereof corresponding to the respective trunks of any group, means responsive to each operation of the controller for advancing each allotter to its next position, and means responsive to an operation of the controller for extending a connection over the trunk, if available, which is in the group allotted by the call-in allotter and which is the trunk in such group allotted by the choice allotter.

59. In a switching system as set forth in claim 58, said controller including means for causing another available trunk in the allotter call-in group to be used if the allotted one therein is not available.

60. In a switching system as set forth in claim 58, said controller including means for causing another available trunk in the allotted call-in group to be used if the allotted one therein is not available, means for determining that all trunks of the group allotted by the call-in allotter are unavailable, and means responsive to the last said means for advancing the call-in allotter to the next position thereof.

61. In a switching system, trunks comprising groups, switching apparatus for extending connections over available ones of said trunks respectively, a controller for the switching apparatus including means for determining the availability of the trunks and including a call-in allotter having means defining positions thereof corresponding respectively to said groups, means responsive to an operation of the controller for extending a connection over a trunk, if available, in the group allotted by the call-in allotter, means for determining that all trunks in the allotted group are unavailable, means responsive to the last said means for advancing the call-in allotter from position to position until a group is reached containing an available trunk or until all have been allotted, and means responsive to each extension of a connection over an available trunk for advancing the call-in allotter to the next position thereof.

62. In a crossbar switching system, groups of trunks, switches terminating said groups respectively, a controller for controlling any one of said switches to extend a local connection from a trunk terminating thereat and to extend a preferred connection from a trunk terminating thereat, controller switching means operable to connect the controller to any switch terminating a trunk from which a connection of either kind is to be extended, means controlled from any trunk to be extended for operating said controller switching means, resetting means and means rendering it normally effective when the controller switching means is set on a said switch pursuant to the extension of a local connection for summarily resetting the switching means pursuant to the extension of a preferred connection, and holding means and means rendering it effective, dependent upon said controller having reached a predetermined stage in its controlling operation, for holding said summary resetting means in abeyance.

63. In a block controller for controlling crossbar switches in extending connections to called lines each through a matched path which includes (1) a block link, (2) a terminating trunk corresponding to the block link, and (3) a line link corresponding to the block link and the terminating trunk, matching relays corresponding respectively to said paths, link-test relays and means for controlling them from the respective block links, trunk-test relays and means for controlling them from the respective terminating trunks, and link wires and means for preparing circuits thereover controlled from the respective line links, and an operating circuit for any match relay over the corresponding link wire through contacts of the corresponding link-test and trunk-test relays.

64. In a block controller for controlling crossbar switches in extending connections through a block-link frame and one or another of a number of line-link frames to called lines, said connection including block links on the block-link frames, terminating trunks extending in groups to the respective line-link frames, and line links on the line-link frames, groups of link wires incoming to the controller from respective line-link frames, groups of trunk-test wires incoming to the controller from the respective groups of terminating trunks, local link wires, trunk-test relays and means for operating them to test trunks over respective trunk-test wires, link-test relays and means for operating them to test block links when associated therewith, relay means operable in accordance with the line-link frame at which a called line terminates for connecting the corresponding group of incoming link wires to said local link wires and for connecting the corresponding group of said trunk-test wires to said trunk-test relays, and means operable independent of the line-link frame at which the called line terminates for associating said link-test relays respectively with one of said block links.

65. In a crossbar switching system, means including in tandem (1) a group of block links, (2) a plurality of alternative groups of terminating trunks, and (3) a group of line links for extending connections to called lines, the block links being related similarly to the respective trunks in any said group thereof, the trunks in the several groups being differently related to the line links to provide a number of different relationships between the block links and the line links depending upon the group of terminating trunks employed, a block controller having test means for determining the availability of (1) the respective block links, (2) the respective trunks in any said group, and (3) the respective line links, path selecting means controlled by said determining means, and means included in the path-selecting means for compensating for the said different relationships between block-links and links according to the group of terminating trunks employed.

66. In a crossbar switching system wherein a block-link frame is connected to each of a number of line-link frames by a separate principal group of terminating trunks each comprising a number of call-in groups, a block controller including trunk test apparatus common to all said call-in groups, groups of call-in relays corresponding respectively to said principal groups, the relays in any said group corresponding respectively to the call-in groups of trunks within the principal group, call-in wires and means for connecting them respectively to the relays of any one of said groups of relays, means for applying a relay-operating potential to said wires in succession, and means including said relays for connecting the said call-in groups of trunks of any principal group successively to said test apparatus.

67. In a crossbar switching system, means including block links, terminating trunks, and line links all related in tandem for extending connections to called lines, means including said block links for extending connections to idle outgoing trunks in called groups, said latter means excluding terminating trunks and line links, crossbar switches, a block controller for controlling said crossbar switches to extend all said connections, means in the block controller requiring for a connection to a called line that four elements test idle, comprising the block link, the terminating trunk, the line link, and the called line, and means for altering the requirements for a connection to an outgoing trunk to only two items testing idle, comprising the block link and the outgoing trunk.

68. In a block controller, a group of link call-in relays, a number of groups of trunk call-in relays each containing relays corresponding respectively to the link call-in relays, local means for operating the link call-in relays in succession and for coincidentally operating respectively corresponding trunk call-in relays in any said group, and externally controlled means for determining the group within which any said operated trunk call-in relay is located.

69. In a crossbar switching system, a block-link frame, line-link frames and groups of outgoing trunks accessible from the block-link frame, a block controller, an outgoing controller, and a block translator all at the block-link frame, line controllers at the respective line-link frames, means for taking the block controller for use on terminating calls through the block-link frame to any line-link frame and on outgoing calls through the block-link frame to any group of outgoing trunks, means responsive to any said outgoing call for taking the outgoing controller for use in cooperation with the block controller, and means responsive to any said terminating call for taking said block translator and the line controller on the concerned line-link frame for use along with the block controller.

70. In a crossbar switching system, a block-link frame, line-link frames each accessible from the block-link frame over separate trunk groups, a block controller at the block-link frame, line controllers at the respective line-link frames, means responsive to a call through any said line-link frame for taking the line controller thereat for use, means responsive thereto for identifying the line controller at the block controller, and means responsive thereto for associating the block controller with the corresponding one of said groups of trunks.

71. In a crossbar switching system, a controller for controlling crossbar switches to extend connections from calling trunks to respective idle trunks in called groups, block couplers interposed in the respective calling trunks, means in any block coupler responsive to the calling therethrough of any said group of trunks and to the calling of a non-existing group of trunks for initiating an operation of said controller which includes testing the trunks in the called group, busy-signalling means in the block coupler, means in the controller for indicating the condition of no idle trunk being available in any called one of said groups, including said non-existing group, and means controlled by the last said means for operating said busy signalling means in the block coupler.

72. In a crossbar switching system, switching apparatus including crossbar switches at which trunks terminate in a separate physical group for each switch, a controller including means for associating said trunks together in numerical groups which bear no necessary correspondence to said physical groups, normally ineffective trunk-test relays corresponding respectively to said trunks, said test relays having their contacts chained together in groups corresponding respectively to said physical groups, means in the controller for rendering said relays effective by numerical groups, and means including said controller and controlled through said chained contacts for selecting an available idle trunk in any said numerical group.

73. In an outgoing controller for use in a system for extending connections to idle ones of trunks in called ones of numerical groups indexed by respective digits, test relays corresponding respectively to trunks arranged in physical groups, contacts on said relays chained together in accordance with said physical groups, connect relays corresponding respectively to numerical groups to which the trunks may be assigned, each connect relay having a number of contacts and means connecting desired ones of such contacts to said test relays in accordance with a desired numerical assignment having no necessary correspondence with said physical grouping.

74. In an outgoing controller for controlling the extension through a switching system of connections to respective idle trunks in called groups, normally disconnected test relays corresponding individually to said trunks, a group of digit relays and means for operating them selectively according to respective digit values assigned to the groups of trunks, connect relays and means controlled by the digit relays for operating them, and means controlled by each connect relay for connecting the test relays of a separate group respectively to their corresponding trunks.

75. In a telephone switching system, lines certain of which have a number of separately numbered stations thereon, there being call numbers assigned to the lines and call numbers assigned to the stations according to a numbering system for the lines and stations which limits the number of said stations on a line to a given number without increasing the number of digits in the call numbers of the stations, switching apparatus responsive to called line numbers for extending calls to called lines, means associated therewith for signalling the called station on the line including means for controlling the signalling means according to the called station number, translating apparatus for controlling said switching apparatus to connect with the same line terminals for each of two called line numbers, and means controlled by said translating apparatus for further controlling said signalling means according to which of the two line numbers is used to call the concerned line.

References Cited in the file of this patent

UNITED STATES PATENTS

| Number | Name | Date |
|---|---|---|
| 1,575,140 | Williams | Mar. 2, 1926 |
| 1,628,358 | Friendly | May 10, 1927 |
| 1,811,753 | Hovland | June 23, 1931 |
| 1,825,000 | Kessler et al. | Sept. 29, 1931 |
| 1,945,990 | Battegay | Feb. 6, 1934 |
| 2,108,140 | Patterson | Feb. 15, 1938 |
| 2,112,375 | Mead | Mar. 29, 1938 |
| 2,120,419 | Stokely | June 14, 1938 |
| 2,201,573 | Carpenter et al. | May 21, 1940 |
| 2,224,251 | Busch et al. | Dec. 10, 1940 |
| 2,227,488 | Collis et al. | Jan. 7, 1941 |
| 2,236,246 | King et al. | Mar. 25, 1941 |
| 2,279,531 | Saunders | Apr. 14, 1942 |
| 2,291,496 | Newstedt | July 28, 1942 |
| 2,310,452 | Meacham et al. | Feb. 9, 1943 |
| 2,314,933 | Griffins | Mar. 30, 1943 |
| 2,320,885 | Powell | June 1, 1943 |
| 2,333,039 | Peterson | Oct. 26, 1943 |
| 2,342,279 | Hersey | Feb. 22, 1944 |
| 2,364,146 | Joel | Dec. 5, 1944 |
| 2,392,089 | Hersey | Jan. 1, 1946 |
| 2,409,063 | Ostline | Oct. 8, 1946 |
| 2,413,708 | Hersey | Jan. 7, 1947 |
| 2,416,710 | Myers | Mar. 4, 1947 |
| 2,443,945 | Bellamy | June 22, 1948 |
| 2,456,169 | Bellamy | Dec. 14, 1948 |
| 2,468,300 | Maloney et al. | Apr. 26, 1949 |
| 2,485,351 | Bellamy | Oct. 18, 1949 |
| 2,491,377 | Joel | Dec. 13, 1949 |
| 2,512,942 | Jones | June 27, 1950 |
| 2,530,104 | Voss | Nov. 14, 1950 |
| 2,532,097 | Hersey | Nov. 28, 1950 |
| 2,533,342 | Avery | Dec. 12, 1950 |
| 2,582,959 | Bruce et al. | Jan. 22, 1952 |